(12) United States Patent
Kitamura et al.

(10) Patent No.: US 8,445,141 B2
(45) Date of Patent: May 21, 2013

(54) SULFONIC ACID GROUP-CONTAINING POLYMER, METHOD FOR PRODUCING THE SAME, RESIN COMPOSITION CONTAINING SUCH SULFONIC ACID GROUP-CONTAINING POLYMER, POLYMER ELECTROLYTE MEMBRANE, POLYMER ELECTROLYTE MEMBRANE/ELECTRODE ASSEMBLY, AND FUEL CELL

(75) Inventors: Kota Kitamura, Otsu (JP); Yoshimitsu Sakaguchi, Otsu (JP); Hiroki Yamaguchi, Otsu (JP); Masahiro Yamashita, Otsu (JP); Kousuke Sasai, Otsu (JP)

(73) Assignee: Toyo Boseki Kabushiki Kaisha, Osaka-Shi (JP)

( * ) Notice: Subject to any disclaimer, the term of this patent is extended or adjusted under 35 U.S.C. 154(b) by 1473 days.

(21) Appl. No.: 11/921,799
(22) PCT Filed: Jun. 6, 2006
(86) PCT No.: PCT/JP2006/311272
§ 371 (c)(1),
(2), (4) Date: Dec. 7, 2007

(87) PCT Pub. No.: WO2006/132207
PCT Pub. Date: Dec. 14, 2006

(65) Prior Publication Data
US 2009/0075147 A1    Mar. 19, 2009

(30) Foreign Application Priority Data

Jun. 9, 2005 (JP) ................... 2005-169309
Jun. 27, 2005 (JP) ................... 2005-186685
Jun. 27, 2005 (JP) ................... 2005-186686
May 12, 2006 (JP) ................... 2006-133772
May 12, 2006 (JP) ................... 2006-133773

(51) Int. Cl.
H01M 6/18 (2006.01)
H01M 10/0562 (2010.01)
H01M 8/10 (2006.01)

(52) U.S. Cl.
USPC ........... 429/314; 429/303; 429/304; 429/492; 429/493; 429/495

(58) Field of Classification Search
USPC ................ 429/33, 492, 493, 495, 303, 304
See application file for complete search history.

(56) References Cited

U.S. PATENT DOCUMENTS
5,438,082 A    8/1995  Helmer-Metzmann et al.
7,202,001 B2 *  4/2007  Cao et al. .................. 429/314
(Continued)

FOREIGN PATENT DOCUMENTS
EP    1 238 998 A1    9/2002
EP    1 561 768 A1    8/2005
(Continued)

OTHER PUBLICATIONS

Nolte, R., et al.: *Partially solfonated poly(arylene ether sulfone)—A versatile proton conducting membrane material for modern energy conversion technologies*, Journal of Membrane Science, 83, pp. 211-220, Elsevier Science Publishers B.V., 1993.

(Continued)

*Primary Examiner* — Peter F Godenschwager
*Assistant Examiner* — Jane L Stanley
(74) *Attorney, Agent, or Firm* — Kenyon & Kenyon LLP

(57) ABSTRACT

The present invention relates to a sulfonic acid group-containing polymer excellent in ion conductivity and durability, a method for producing the same, a resin composition containing the sulfonic acid group-containing polymer, a polymer electrolyte membrane, a polymer electrolyte membrane/electrode assembly, and a fuel cell. The sulfonic acid group-containing polymer of the present invention, in a first embodiment, includes a constituent represented by the following chemical formula 1:

(chemical formula 1)

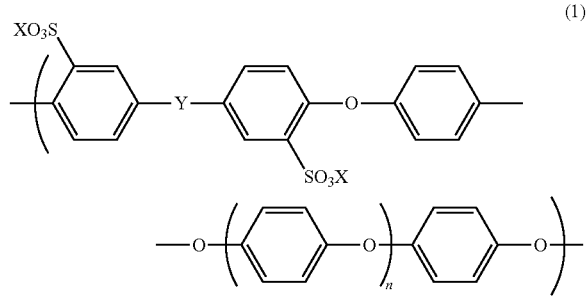

(1)

wherein X represents hydrogen or a monovalent cation species; Y represents a sulfone group or a ketone group; and n represents an arbitrary integer not less than 2.

16 Claims, 6 Drawing Sheets

U.S. PATENT DOCUMENTS

| | | | |
|---|---|---|---|
| 7,354,679 B2 * | 4/2008 | Cao et al. | 429/314 |
| 7,727,654 B2 * | 6/2010 | Kanaoka et al. | 429/483 |
| 7,964,676 B2 * | 6/2011 | Lee et al. | 525/535 |
| 8,187,734 B2 * | 5/2012 | Yamashita et al. | 429/492 |
| 2002/0091225 A1 | 7/2002 | McGrath et al. | |
| 2003/0113605 A1 | 6/2003 | Hidaka et al. | |
| 2003/0116824 A1 | 6/2003 | Lee | |
| 2004/0039148 A1 * | 2/2004 | Cao et al. | 528/86 |
| 2004/0121211 A1 * | 6/2004 | Asano et al. | 429/33 |
| 2004/0138352 A1 | 7/2004 | Taniguchi et al. | |
| 2006/0041100 A1 * | 2/2006 | Cao | 528/171 |
| 2006/0182678 A1 * | 8/2006 | Shinoda et al. | 423/414 |
| 2006/0258836 A1 * | 11/2006 | McGrath et al. | 528/373 |
| 2007/0096066 A1 * | 5/2007 | Yoshida et al. | 252/511 |
| 2007/0196721 A1 * | 8/2007 | Lee et al. | 429/42 |
| 2008/0286626 A1 * | 11/2008 | Olmeijer | 429/30 |
| 2009/0130526 A1 * | 5/2009 | Higami et al. | 429/33 |

FOREIGN PATENT DOCUMENTS

| | | |
|---|---|---|
| JP | 06-093114 A | 4/1994 |
| JP | 2001-261791 A | 9/2001 |
| JP | 2003-151346 | 5/2003 |
| JP | 2003-183526 | 7/2003 |
| JP | 2003-201403 | 7/2003 |
| JP | 2003-238678 | 8/2003 |
| JP | 2003-282096 | 10/2003 |
| JP | 2003-292609 A | 10/2003 |
| JP | 2004-047396 | 2/2004 |
| JP | 2004-509224 A | 3/2004 |
| JP | 2004-149779 | 5/2004 |
| JP | 2004-175997 | 6/2004 |
| JP | 2004-217715 A | 8/2004 |
| JP | 2004-311302 | 11/2004 |
| JP | 2005-133146 A | 5/2005 |
| JP | 2005-174897 A | 6/2005 |
| JP | 2006-506472 | 2/2006 |
| JP | 2006-206809 | 8/2006 |
| WO | WO 03/095509 | 11/2003 |
| WO | WO 2004/033534 A1 | 4/2004 |

OTHER PUBLICATIONS

Office Action of JP 2005-169309 dated Aug. 29, 2006, and partial English translation thereof.

* cited by examiner

SULFONIC ACID GROUP-CONTAINING POLYMER, METHOD FOR PRODUCING THE SAME, RESIN COMPOSITION CONTAINING SUCH SULFONIC ACID GROUP-CONTAINING POLYMER, POLYMER ELECTROLYTE MEMBRANE, POLYMER ELECTROLYTE MEMBRANE/ELECTRODE ASSEMBLY, AND FUEL CELL

This is a 371 U.S. national phase application of PCT/JP2006/311272 filed 06 Jun. 2006, claiming priority to Japanese Patent Applications No. 2005-169309 filed 09 Jun. 2005, No. 2005-186685 filed 27 Jun. 2005, No. 2005-186686 filed 27 Jun. 2005, No. 2006-133772 filed 12 May 2006, and No. 2006-133773 filed 12 May 2006, the contents of which are incorporated herein by reference.

TECHNICAL FIELD

The present invention relates to a sulfonic acid group-containing polymer having a novel structure and a method for producing the same, a resin composition containing such sulfonic acid group-containing polymer, a polymer electrolyte membrane, a polymer electrolyte membrane/electrode assembly, and a fuel cell.

BACKGROUND ART

In recent years, attention has been focused on new power generating techniques excellent in energy efficiency or environmental friendliness, and water electrolytic cells and fuel cells have been developed as examples of electrochemical apparatuses using a solid polymer electrolyte as an ion conductor in place of an liquid electrolyte. Solid polymer type fuel cells using the solid polymer electrolyte are characterized by high energy density as well as easier start and stop than fuel cells of other systems due to their lower operating temperature. Therefore, they are under development as power supplies for electric motorcars, dispersed power generation and the like. Bonding resins for polymer electrolyte membranes or membrane/electrode assemblies used for the water electrolytic cells or fuel cells as mentioned above are required to have a high proton conductivity as a cation exchange membrane and an inhibitory activity of permeation of fuels such as hydrogen, and to be sufficiently stable chemically, thermally, electrochemically and mechanically. Therefore, perfluorocarbon sulfonic acid membranes to which have been introduced sulfonic acid groups, a typical example of which is "Nafion (registered trade mark)" manufactured by DuPont Inc., USA, have been mainly utilized as one which can be utilized for a long period of time. In the case where the perfluorocarbon sulfonic acid membrane is operated under the condition where the temperature is 100° C. or higher, however, the water content of the membrane rapidly decreases and the membrane is significantly softened as well. In addition, in a fuel cell wherein methanol is used as the fuel, reduction of performance in power generation occurs due to the permeation of methanol through the membrane, and thus the fuel cell cannot exert sufficient performance. Further, referring also to a fuel cell that is operated at a temperature around 80° C. using hydrogen as the fuel, an excessively high cost of the membrane is pointed out as an obstacle impeding the establishment of a fuel cell technology. The same problem is also pointed out in the case where perfluorocarbon sulfonic acid resins are used as the bonding resin. Furthermore, when fluorine-based ion exchange membranes such as a perfluorocarbon sulfonic acid-based ion exchange membrane are used as the polymer electrolyte membrane for fuel cells, problems such as contamination of harmful fluoric acid into exhaust gas depending on operating conditions, and infliction of large load to the environment at the time of wasting have also been risen.

In order to overcome such drawbacks, a variety of polymer electrolyte membranes wherein a sulfonic acid group has been introduced into a polymer that contains a non-fluorine-based aromatic ring have been studied. A polymer skeleton of polyarylene ether compounds, such as polyarylene ether ketones and polyarylene ether sulfones, is considered to be a promising structure, taking heat resistance and chemical stability into consideration, and sulfonated polyarylene ether sulfones (see, for example, Journal of Membrane Science (Netherlands) 1993, vol. 83, pp. 211-220 (Non-Patent Document 1)), sulfonated polyether ether ketones (see, for example, Japanese Patent Laying-Open No. 6-93114 (Patent Document 1)) and the like have been reported. These compounds are those obtained by reacting a polymer with a sulfonating agent so that a sulfonic acid group is introduced. Meanwhile, a method for directly obtaining a sulfonated polymer through polymerization using a sulfonated monomer has also been reported (see, for example, US Published Patent Application No. 2002/0091225 (Patent Document 2), WO 2003/095509 (Patent Document 3), WO 2004/033534 (Patent Document 4), Japanese Patent Laying-Open No. 2004-509224 (Patent Document 5), and Japanese Patent Laying-Open No. 2004-149779 (Patent Document 6)). For example, in Patent Documents 2 and 5, polymers obtained by introducing an ionic group such as sulfonic acid group into a heat-resistant polymer such as polyimide and polysulfone have been proposed as a hydrocarbon-based ion exchange membrane.

Even among these aromatic hydrocarbon-based membranes, however, there has been a demand for a polymer having a more excellent ion conductivity. In addition, when used as a bonding resin for fabricating an electrolyte membrane/electrode assembly, a polymer having a stronger joining property to a polymer electrolyte membrane has been demanded so as to improve its durability.

Generally, in the hydrocarbon-based ion exchange membranes, it is necessary to introduce more ionic groups so as to express an ion conductivity comparable to that of perfluorocarbon sulfonic acid-based ion exchange membrane. However, the more the amount of the ionic group is, the larger is the swellability by water, and this causes problems such as dimensional change and deterioration of physical characteristics at the time of moisture absorption. Accordingly, as disclosed in, for example, Patent Documents 4 and 6, hydrocarbon-based ion exchange membranes of which the swellability is more suppressed by improving the structure of polymers have been proposed.

If it is tried to make the swellability of a polymer smaller, however, there were sometimes cases where its physical durability was deteriorated. For example, its joining property to an electrode catalyst layer was deteriorated in the case of using it for polymer electrolyte membranes of fuel cells, whereby the problems, such as detachment between the polymer electrolyte membrane and the electrode catalyst layer in the polymer electrolyte membrane/electrode assembly and deterioration in durability, occurred sometimes.

Further, in a fuel cell using hydrogen as a fuel, decomposition of an ion exchange membrane occurs due to radicals produced by a side reaction. Since hydrocarbon-based ion exchange membranes are inferior to perfluorocarbon sulfonic acid-based ion exchange membranes in regard to radical-resistant properties, such properties are improved by the addition of a hindered amine-based compound, a hindered phenol-based compound, an organic phosphorus compound, an organic sulfur compound or the like as a radical scavenger (see, for example, Japanese Patent Laying-Open No. 2003-183526 (Patent Document 7), Japanese Patent Laying-Open No. 2003-201403 (Patent Document 8), Japanese Patent Laying-Open No. 2003-151346 (Patent Document 9), and Japanese Patent Laying-Open No. 2004-047396 (Patent Document 10)), or by the use of an ion exchange resin containing a phosphonic acid group as an ionic group (see, for example, Japanese Patent Laying-Open No. 2003-238678 (Patent Document 11), Japanese Patent Laying-Open No. 2003-282096 (Patent Document 12), and Japanese Patent Laying-Open No. 2004-175997 (Patent Document 13)).

However, since most of such radical scavengers have a low molecular weight, there were problems such as bleed out and elution from the ion-exchange membrane. Further, ion exchange membranes made of an ion exchange resin containing phosphonic acid therein as an ionic group had drawbacks such as low ion conductivity.

As mentioned above, the actual circumstances are such that a solid polymer electrolyte membrane which is able to attain both good ion conductivity and good durability at the time of being used for a fuel cell has not been obtained.

Patent Document 1: Japanese Patent Laying-Open No. 6-93114
Patent Document 2: US Published Patent Application No. 2002/0091225
Patent Document 3: WO 2003/095509
Patent Document 4: WO 2004/033534
Patent Document 5: Japanese Patent Laying-Open No. 2004-509224
Patent Document 6: Japanese Patent Laying-Open No. 2004-149779
Patent Document 7: Japanese Patent Laying-Open No. 2003-183526
Patent Document 8: Japanese Patent Laying-Open No. 2003-201043
Patent Document 9: Japanese Patent Laying-Open No. 2003-151346
Patent Document 10: Japanese Patent Laying-Open No. 2004-047396
Patent Document 11: Japanese Patent Laying-Open No. 2003-238678
Patent Document 12: Japanese Patent Laying-Open No. 2003-282096
Patent Document 13: Japanese Patent Laying-Open No. 2004-175997

Non-Patent Document 1: Journal of Membrane Science (Netherlands) 1993, vol. 83, pp. 211-220

DISCLOSURE OF THE INVENTION

Problems to be Solved by the Invention

An object of the present invention is to obtain a sulfonic acid group-containing polymer capable of imparting an excellent ion conductivity and durability, a polymer electrolyte membrane containing the sulfonic acid group-containing polymer, a resin composition, a polymer electrolyte membrane/electrode assembly using the polymer electrolyte membrane, and a fuel cell.

Means for Solving the Problems

The present invention relates to a sulfonic acid group-containing polymer which contains, in the molecular chain, a constituent represented by the following chemical formula 1:

(chemical formula 1)

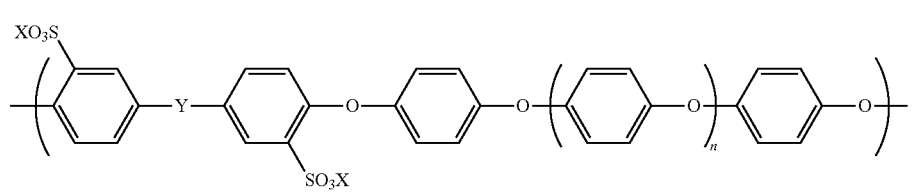

(in the chemical formula 1, X represents hydrogen or a monovalent cation species; Y represents a sulfone group or a ketone group; and n represents an arbitrary integer not less than 2).

It is preferable that the above sulfonic acid group-containing polymer further contains a constituent represented by the following chemical formula 2:

(chemical formula 2)

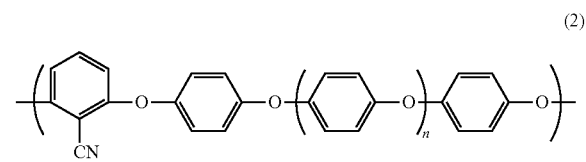

(in the chemical formula 2, n represents an arbitrary integer not less than 2).

It is preferable that the content of the sulfonic acid group in the sulfonic acid group-containing polymer is within a range of 0.3 to 5.0 meq/g.

It is preferable that the sulfonic acid group-containing polymer is obtained by using, as a part of monomer components, a terminal dihydroxy compound represented by the following chemical formula 3 being composed of a plurality of components each having a different number of n and an average composition within a range of $1 < n \leq 10$:

(chemical formula 3)

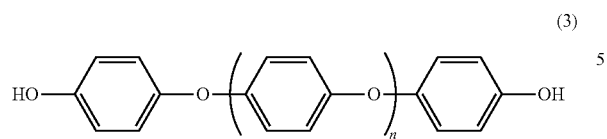

(in the chemical formula 3, n represents an arbitrary integer not less than 0).

The present invention also relates to a sulfonic acid group-containing polymer having, as essential repeating units, structures represented by the following chemical formulas 4 to 7:

(chemical formula 4)

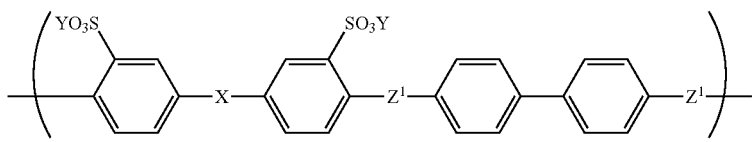

(chemical formula 5)

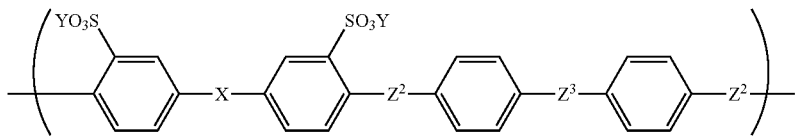

(chemical formula 6)

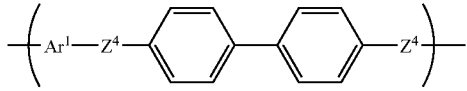

(chemical formula 7)

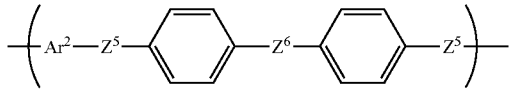

(in the chemical formulas 4 to 7, X represents an —S(=O)$_2$— group or a C(=O)— group; Y represents H or a monovalent cation; $Z^1$, $Z^2$, $Z^4$ and $Z^5$ each independently represent either of an O atom or an S atom; $Z^3$ and $Z^6$ each independently represent any one of an O atom, an S atom, a —C(CH$_3$)$_2$— group, a —C(CF$_3$)$_2$— group, a —CH$_2$— group or a cyclohexyl group).

In the present invention, it is preferable that Ar$^1$ and Ar$^2$ in the chemical formulas 4 to 7 are one or more kind(s) of group(s) selected from structures represented by the following chemical formulas 8 to 11:

(chemical formula 8)

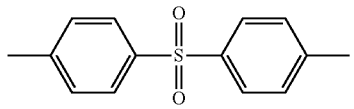

(chemical formula 9)

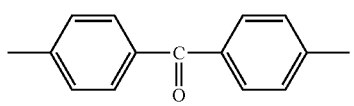

(chemical formula 10)

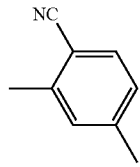

(chemical formula 11)

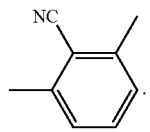

In the present invention, it is preferable that $Z^1$, $Z^2$, $Z^4$, and $Z^5$ in the chemical formulas 4 to 7 are all O atoms.

In the present invention, it is preferable that $Z^3$ and $Z^6$ in the chemical formulas 4 to 7 are both S atoms.

In the present invention, it is preferable that X in the chemical formulas 4 to 7 is an —S(=O)$_2$— group.

In the present invention, it is preferable that Ar$^1$ and Ar$^2$ in the chemical formulas 4 to 7 are one or more kind(s) of group(s) selected from structures represented by the following chemical formulas 10 to 11:

(chemical formula 10)

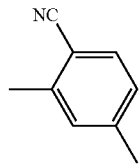

(chemical formula 11)

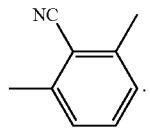

In the present invention, it is preferable that the sulfonic acid group-containing polymer having, as essential repeating units, the structures represented by the above chemical formulas 4 to 7 satisfies the following mathematical expressions 1 to 3:

$0.9 \leq (n1+n2+n3+n4)/(n1+n2+n3+n4+n5) \leq 1.0$ (mathematical expression 1)

$0.05 \leq (n1+n2)/(n1+n2+n3+n4) \leq 0.7$ (mathematical expression 2)

$0.01 \leq (n2+n4)/(n1+n2+n3+n4) \leq 0.95$ (mathematical expression 3)

(in the mathematical expressions, n1 to n4 represent a respective mol % of the repeating units represented by the chemical formulas 4 to 7, in the molecule of the sulfonic acid group-containing polymer, and n5 represents a mol % of another repeating unit in the molecule of the sulfonic acid group-containing polymer).

The present invention further relates to a sulfonic acid group-containing polymer having a structure represented by the following chemical formula 12:

(chemical formula 12)

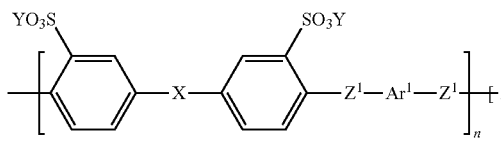

(in the chemical formula 12, X represents a —S(=O)$_2$— group or a C(=O)— group; Y represents H or a monovalent cation; and $Z^1$, $Z^2$ and $Z^3$ each independently represent either of an O atom or an S atom; $Ar^1$ represents a divalent organic group; $Ar^2$, $Ar^3$ and $Ar^4$ represent a divalent organic group not containing an ionic group; $Ar^5$ represents a trivalent organic group; n, m and o represent a positive number not less than 1, respectively; and the part enclosed by the bracket [ ] represents a minimum repeating unit, and each of the repeating units may be bound at random or each of the same repeating units may be bound continuously).

The present invention further relates to a sulfonic acid group-containing polymer having a structure represented by the following chemical formula 13:

(chemical formula 13)

(in the chemical formula 13, X represents an —S(=O)$_2$— group or a C(=O)— group; Y represents H or a monovalent cation; and $Z^5$, $Z^6$ and $Z^7$ each independently represent either of an O atom or an S atom; $Ar^6$ represents any one of structures represented by the following chemical formulas 14 to 16;

(chemical formula 14)

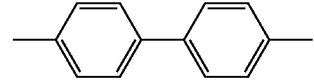

(chemical formula 15)

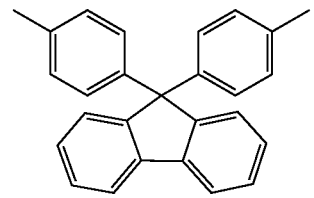

-continued (chemical formula 16)

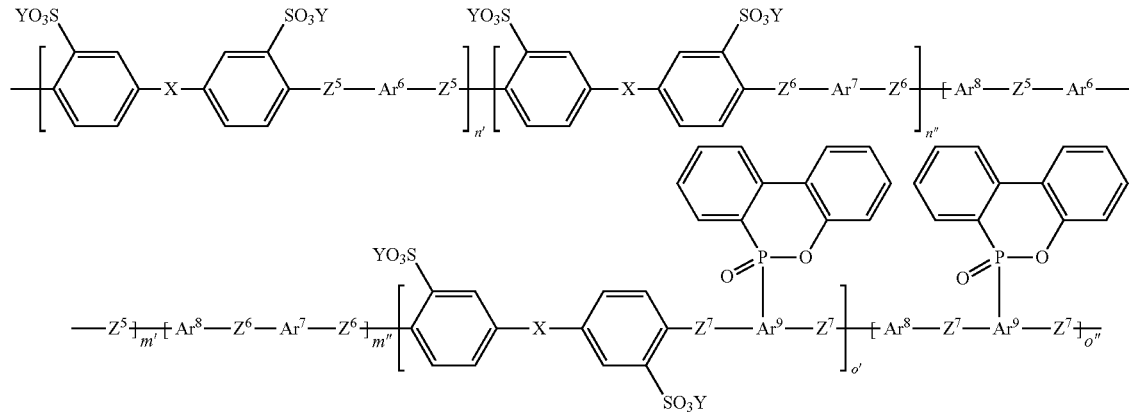

-continued

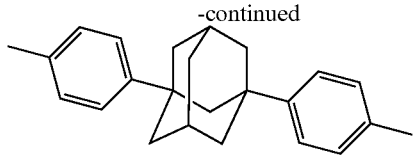

$Ar^7$ represents any one of structures represented by the following chemical formulas 17 to 24;

(chemical formula 17)

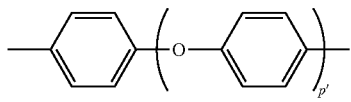

(chemical formula 18)

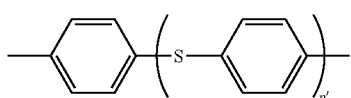

(chemical formula 19)

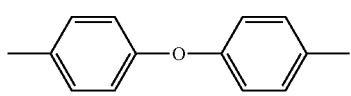

(chemical formula 20)

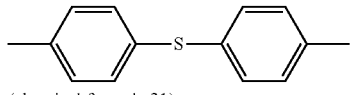

(chemical formula 21)

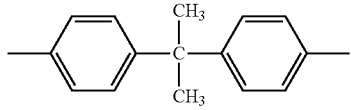

(chemical formula 22)

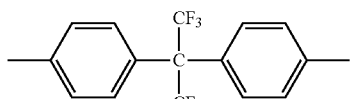

(chemical formula 23)

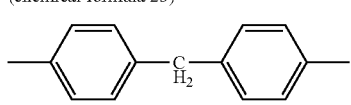

(chemical formula 24)

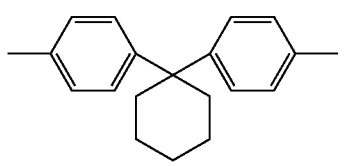

(in the chemical formulas 17 and 18, p' represents an integer of 2 to 50; $Ar^8$ represents any one of structures represented by the following chemical formulas 8 to 11;

(chemical formula 8)

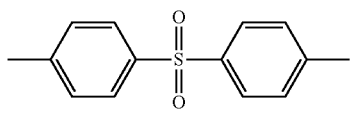

-continued (chemical formula 9)

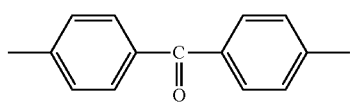

(chemical formula 10)

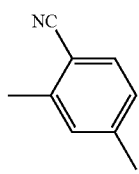

(chemical formula 11)

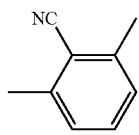

$Ar^9$ represents a trivalent organic group; n', n'', m' and m'' represent an integer not less than 1, respectively; o' and o'' represent an integer not less than zero, respectively, provided that o' and o'' are not zero simultaneously; and the part enclosed by the bracket [ ] represents a minimum repeating unit, and each of the repeating units may be bound at random or each of the same repeating units may be bound continuously).

In the present invention, it is preferable that $Ar^7$ in the chemical formula 13 is any one of structures represented by the following chemical formulas 17 to 20:

(chemical formula 17)

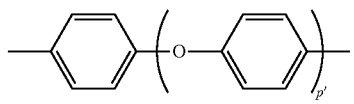

(chemical formula 18)

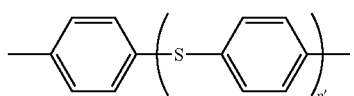

(chemical formula 19)

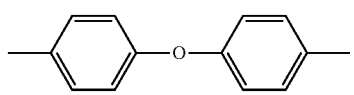

(chemical formula 20)

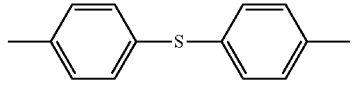

In the present invention, it is preferable that $Ar^7$ in the chemical formula 13 is a structure represented by the following chemical formula 19 or 20:

(chemical formula 19)

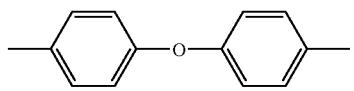

(chemical formula 20)

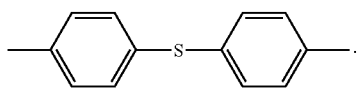

In the present invention, it is preferable that $Ar^9$ in the chemical formula 13 is a phenyl group.

In the present invention, it is preferable that $Z^7$ in the chemical formula 13 is an O atom.

In the present invention, it is preferable that n', n", m', m", o', and o" in the chemical formula 13 satisfy the following mathematical expressions 4 to 7:

$0.05 \leq (n'+n'')/(n'+n''+m'+m'') \leq 0.8$ (mathematical expression 4)

$0.001 \leq (o'+o'')/(n'+n''+m'+m''+o'+o'') \leq 0.1$ (mathematical expression 5)

$0.01 \leq (n'/n'') \leq 100$ (mathematical expression 6)

$0.01 \leq (m'/m'') \leq 100$ (mathematical expression 7).

In the sulfonic acid group-containing polymer of the present invention, it is preferable that its glass transition temperature is within a range of 130° C. to 270° C.

In the sulfonic acid group-containing polymer of the present invention, it is more preferable that its glass transition temperature is within a range of 130° C. to 220° C.

The present invention further relates to a method for producing the sulfonic acid group-containing polymer containing the constituent represented by the above chemical formula 1, wherein the sulfonic acid group-containing polymer is obtainable by polymerization through an aromatic nucleophilic substitution reaction using, as at least one kind of monomer component(s), a compound represented by the following chemical formula 3:

(chemical formula 3)

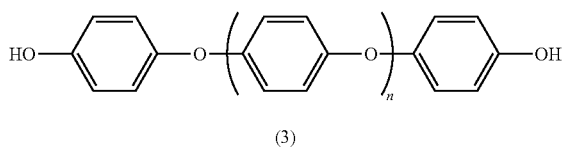

(3)

(in the chemical formula 3, n represents an arbitrary integer not less than 2).

The present invention further relates to a resin composition containing the sulfonic acid group-containing polymer.

In the resin composition, it is preferable that the content of the sulfonic acid group-containing polymer is 50 to 100% by mass.

The present invention further relates to a polymer electrolyte membrane containing the resin composition.

The present invention further relates to a polymer electrolyte membrane containing the sulfonic acid group-containing polymer.

The present invention further relates to a method for producing the polymer electrolyte membrane, which includes the steps of casting a solution containing a sulfonic acid group-containing polymer and a solvent to a thickness within a range of 10 to 1500 μm; and drying the casted solution.

The present invention further relates to a polymer electrolyte membrane/electrode assembly using the polymer electrolyte membrane.

The present invention further relates to a fuel cell using the polymer electrolyte membrane/electrode assembly.

The present invention further relates to the fuel cell using methanol as a fuel.

The present invention further relates to a polymer electrolyte membrane/electrode assembly using the sulfonic acid group-containing polymer as an electrode catalyst layer, and still further relates to a fuel cell using the polymer electrolyte membrane/electrode assembly.

The present invention further relates to a polymer electrolyte membrane which contains a sulfonic acid group-containing polymer having, as essential repeating units, structures represented by the following chemical formulas 4 to 7:

(chemical formula 4)

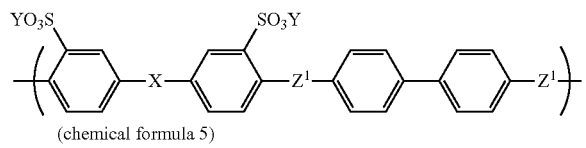

(chemical formula 5)

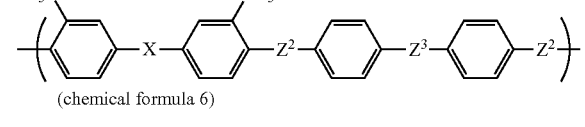

(chemical formula 6)

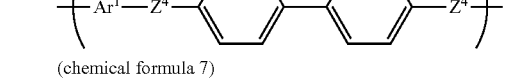

(chemical formula 7)

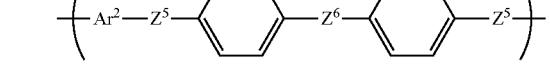

(in the chemical formulas 4 to 7, X represents an —S(=O)$_2$— group or a C(=O)— group; Y represents H or a monovalent cation; $Z^1$, $Z^2$, $Z^4$ and $Z^5$ each independently represent either of an O atom or an S atom; and $Z^3$ and $Z^6$ each independently represent any one of an O atom, an S atom, a —C(CH$_3$)$_2$— group, a —C(CF$_3$)$_2$— group, a —CH$_2$— group, and a cyclohexyl group; and satisfying the following mathematical expressions 1, 8 and 9:

$0.9 \leq (n1+n2+n3+n4)/(n1+n2+n3+n4+n5) \leq 1.0$ (mathematical expression 1)

$0.05 \leq (n1+n2)/(n1+n2+n3+n4) \leq 0.5$ (mathematical expression 8)

$0.05 \leq (n2+n4)/(n1+n2+n3+n4) \leq 0.95$ (mathematical expression 9)

(in the mathematical expressions, n1 to n4 represent a respective mol % of the repeating units represented by the chemical formulas 4 to 7, in the molecule of the sulfonic acid group-containing polymer, and n5 represents a mol % of another repeating unit in the molecule of the sulfonic acid group-containing polymer, and which is used in a direct methanol fuel cell.

The present invention further relates to a polymer electrolyte membrane which contains a sulfonic acid group-containing polymer having, as essential repeating units, structures represented by the following chemical formulas 4 to 7:

(chemical formula 4)

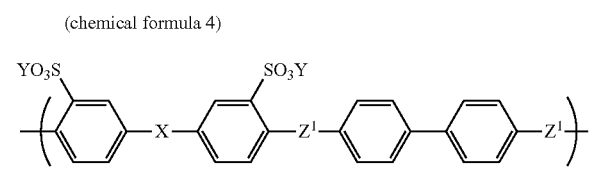

(chemical formula 13)

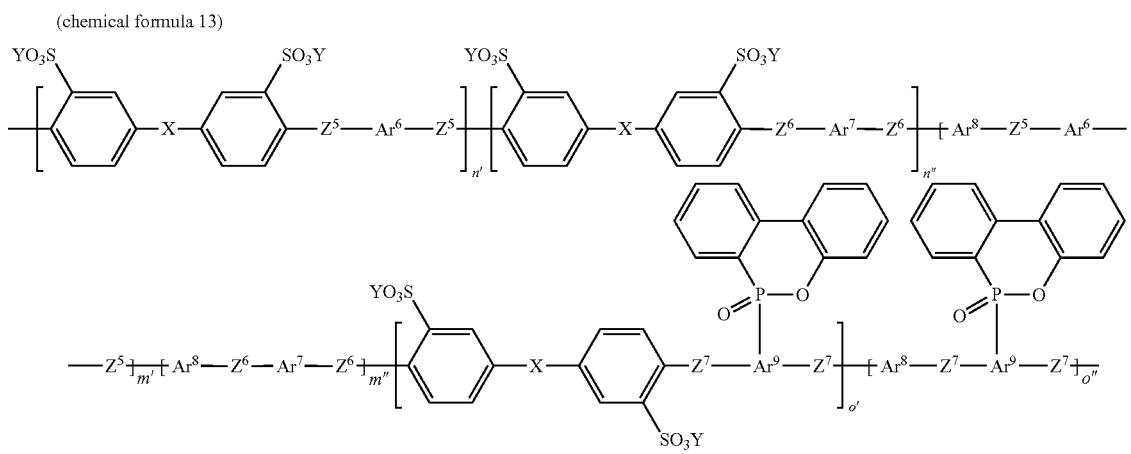

-continued (chemical formula 5)

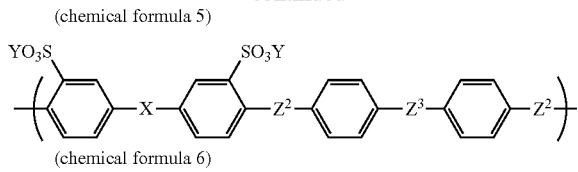

(chemical formula 6)

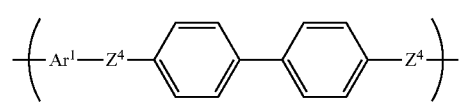

(chemical formula 7)

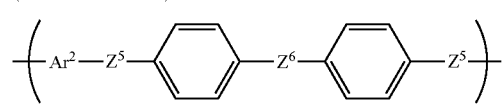

(in the chemical formulas 4 to 7, X represents an —S(=O)$_2$— group or a C(=O)— group; Y represents H or a monovalent cation; $Z^1$, $Z^2$, $Z^4$ and $Z^5$ each independently represent either of an O atom or an S atom; and $Z^3$ and $Z^6$ each independently represent any one of an O atom, an S atom, a —C(CH$_3$)$_2$— group, a —C(CF$_3$)$_2$— group, a —CH$_2$— group, and a cyclohexyl group; and satisfying the following mathematical expressions 1, 10 and 11:

$0.9 \leq (n1+n2+n3+n4)/(n1+n2+n3+n4+n5) \leq 1.0$ (mathematical expression 1)

$0.3 \leq (n1+n2)/(n1+n2+n3+n4) \leq 0.7$ (mathematical expression 10)

$0.01 \leq (n2+n4)/(n1+n2+n3+n4) \leq 0.25$ (mathematical expression 11)

(in the mathematical expressions, n1 to n4 represent a respective mol % of the repeating units represented by the chemical formulas 4 to 7, in the molecule of the sulfonic acid group-containing polymer, and n5 represents a mol % of another repeating unit in the molecule of the sulfonic acid group-containing polymer, and which is used in a solid polymer type fuel cell using hydrogen as a fuel.

The present invention further relates to a polymer electrolyte membrane which contains a sulfonic acid group-containing polymer having a structure represented by the following chemical formula 13:

(in the chemical formula 13, X represents an —S(=O)$_2$— group or a C(=O)— group; Y represents H or a monovalent cation; $Z^5$, $Z^6$ and $Z^7$ each independently represent either of an O atom or an S atom; Ar$^6$ represents any one of structures represented by the following chemical formulas 14 to 16:

(chemical formula 14)

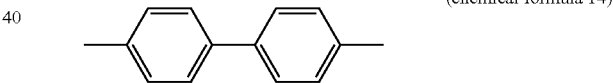

(chemical formula 15)

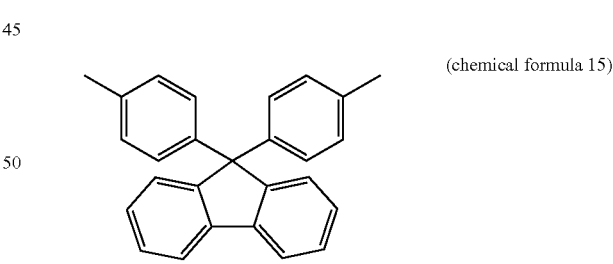

(chemical formula 16)

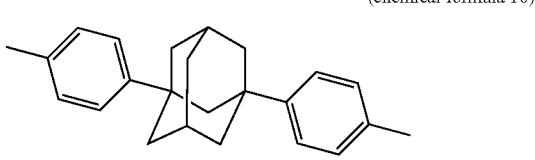

Ar$^7$ represents any one of structures represented by the following chemical formulas 17 to 24:

(chemical formula 17)

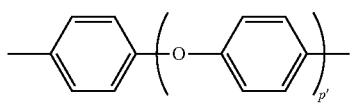

(chemical formula 18)

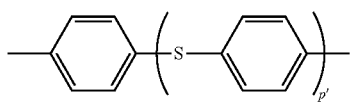

(chemical formula 19)

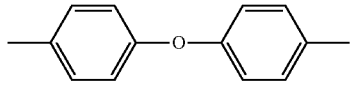

(chemical formula 20)

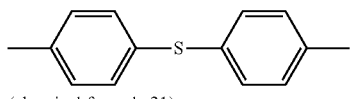

(chemical formula 21)

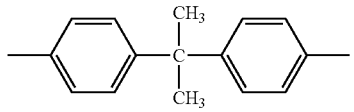

(chemical formula 22)

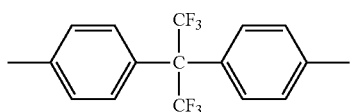

(chemical formula 23)

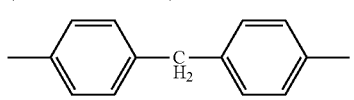

(chemical formula 24)

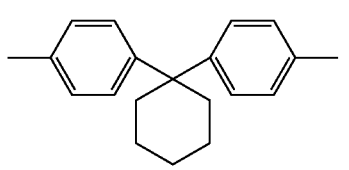

(in the chemical formulas 17 and 18, p' represents an integer of 2 to 50; $Ar^8$ represents any one of structures represented by the following chemical formulas 8 to 11:

(chemical formula 8)

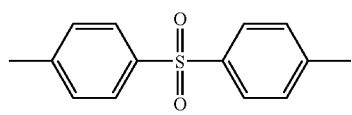

(chemical formula 9)

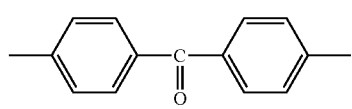

(chemical formula 10)

(chemical formula 11)

$Ar^9$ represents a trivalent organic group, respectively; n', n", m' and m" represent an integer not less than 1, respectively; o' and o" represent an integer not less than zero, respectively, provided that o' and o" are not zero simultaneously; and the part enclosed by the bracket [ ] represents a minimum repeating unit, and each of the repeating units may be bound at random or each of the same repeating units may be bound continuously; and n'+n"+m'+m"+o'+o" in the chemical formula 13 satisfy the following mathematical expressions 5, 12 and 13:

$$0.001 \leq (o'+o'')/(n'+n''+m'+m''+o'+o'') \leq 0.1 \quad \text{(mathematical expression 5)}$$

$$0.05 \leq (n'+n''+o')/(n'+n''+m'+m''+o'+o'') \leq 0.5 \quad \text{(mathematical expression 12)}$$

$$0.05 \leq (n''+m'')/(n'+n''+m'+m'') \leq 0.95 \quad \text{(mathematical expression 13), and}$$

which is used in a direct methanol fuel cell.

The present invention further relates to a polymer electrolyte membrane which contains a sulfonic acid group-containing polymer having a structure represented by the following chemical formula 13:

(chemical formula 13)

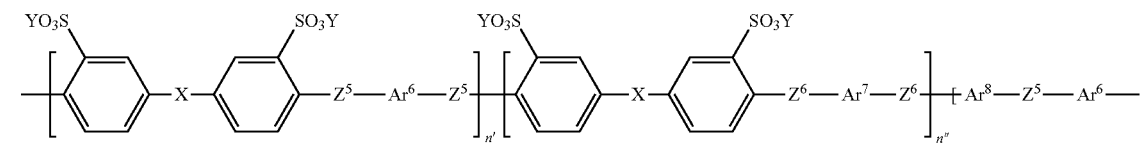

-continued

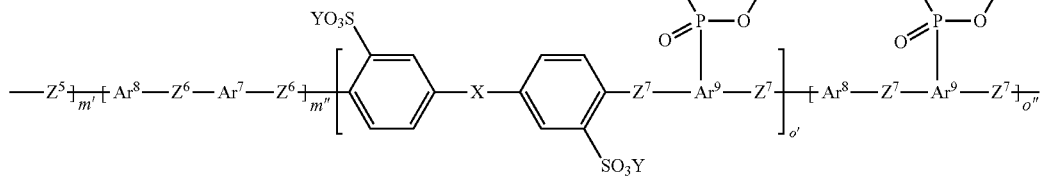

(in the chemical formula 13, X represents an —S(=O)$_2$— group or a C(=O)— group; Y represents H or a monovalent cation; $Z^5$, $Z^6$ and $Z^7$ each independently represent either of an O atom or an S atom; $Ar^6$ represents any one of structures represented by the following chemical formulas 14 to 16:

(chemical formula 14)

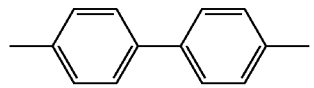

(chemical formula 15)

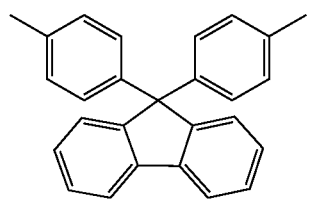

(chemical formula 16)

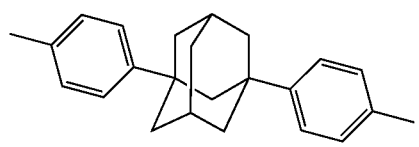

$Ar^7$ represents any one of structures represented by the following chemical formulas 17 to 24:

(chemical formula 17)

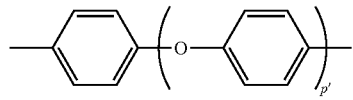

(chemical formula 18)

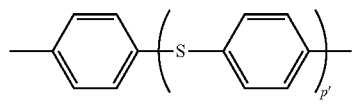

(chemical formula 19)

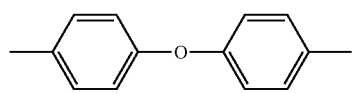

(chemical formula 20)

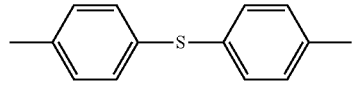

(chemical formula 21)

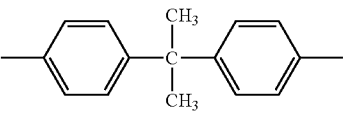

(chemical formula 22)

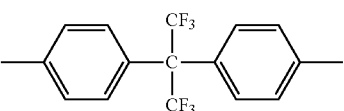

(chemical formula 23)

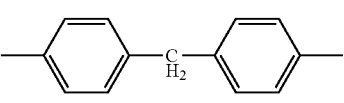

(chemical formula 24)

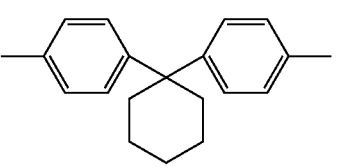

(in the chemical formulas 17 and 18, p' represents an integer of 2 to 50; $Ar^8$ represents any one of structures represented by the following chemical formulas 8 to 11;

(chemical formula 8)

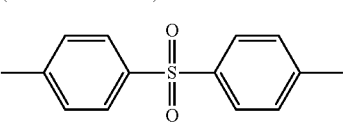

(chemical formula 9)

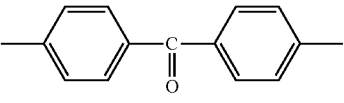

(chemical formula 10)

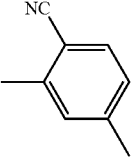

-continued (chemical formula 11)

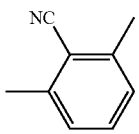

$Ar^9$ represents a trivalent organic group; n', n", m' and m" represent an integer not less than 1, respectively; o' and o" represent an integer not less than zero, respectively, provided that o' and o" are not zero simultaneously; the part enclosed by the bracket [ ] represents a minimum repeating unit and each of the repeating units may be bound at random or each of the same repeating units may be bound continuously; and n'+n"+m'+m"+o'+o" in the chemical formula 13 satisfy the following mathematical expressions 5, 14 and 15:

$$0.001 \leq (o'+o")/(n'+n"+m'+m"+o'+o") \leq 0.1 \quad \text{(mathematical expression 5)}$$

$$0.3 \leq (n'+n"+o')/(n'+n"+m'+m"+o'+o") \leq 0.7 \quad \text{(mathematical expression 14)}$$

$$0.01 \leq (n"+m")/(n'+n"+m'+m") \leq 0.25 \quad \text{(mathematical expression 15), and}$$

which is used in a solid polymer-type fuel cell using hydrogen as a fuel.

The present invention further relates to a method for producing a polymer electrolyte membrane used for the direct methanol fuel cells, and a method for producing a polymer electrolyte membrane used for the solid polymer-type fuel cells using hydrogen as a fuel, each of which includes the steps of: casting a solution containing a sulfonic acid group-containing polymer and a solvent to a thickness within a range of 10 to 1500 µm; and drying the casted solution.

The present invention further relates to a polymer electrolyte membrane used for the direct methanol fuel cells or a polymer electrolyte membrane/electrode assembly using the polymer electrolyte membrane used for the solid polymer-type fuel cells using hydrogen as a fuel.

The present invention further relates to a fuel cell using the polymer electrolyte membrane/electrode assembly.

The present invention further relates to the fuel cell using methanol as a fuel.

Effect of the Invention

The sulfonic acid group-containing polymer of the present invention is a polymer material capable of imparting conspicuous performance in ion conductivity and durability to polymer electrolytes used for fuel cells or the like. By using the sulfonic acid group-containing polymer, it becomes possible to obtain a polymer electrolyte membrane excellent in ion conductivity and durability, and a polymer electrolyte membrane/electrode assembly using the polymer electrolyte membrane, and a fuel cell.

BEST MODE FOR CARRYING OUT THE INVENTION

Figure 1:
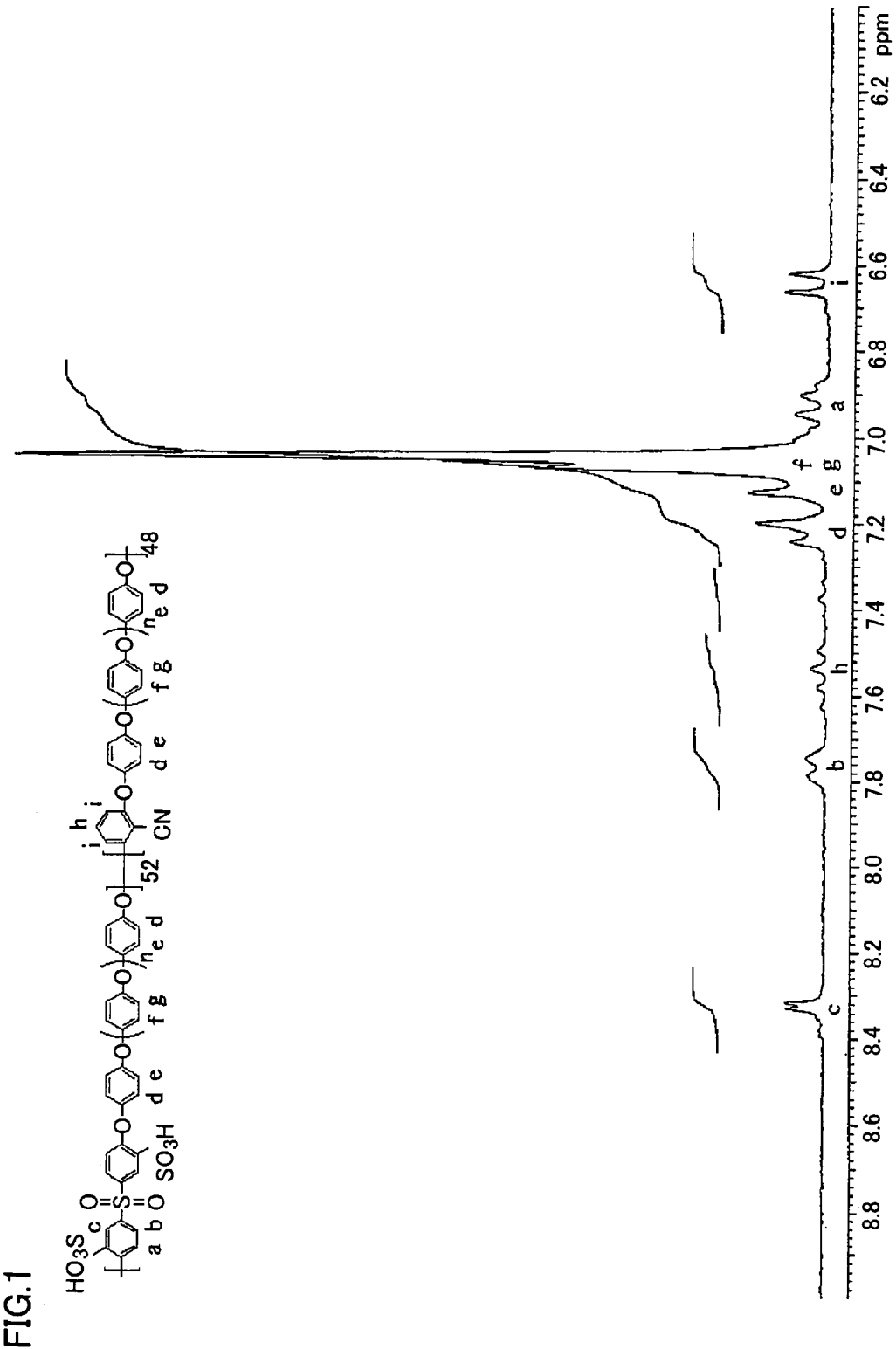
FIG. 1 is a chart showing a $^1$H-NMR spectrum of a film of a polyarylene ether-based compound containing a sulfonic acid group obtained in Example 1A, and a structural formula assigned from the spectrum.

The present invention relates to a specific sulfonic acid group-containing polymer wherein a sulfonic acid group is introduced to an aromatic ring, and relates to a polymer electrolyte membrane which is excellent in ion conductivity, heat resistance, processability, dimensional stability, and durability and which is particularly useful as an ion conducting membrane. The sulfonic acid group-containing polymer of the present invention contains, in the molecular chain, a structural unit represented by the following chemical formula 1.

(chemical formula 1)

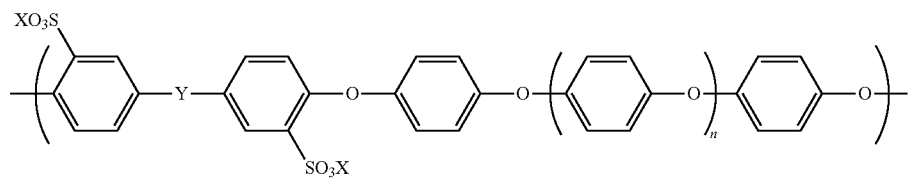

(1)

(Here, Y represents a sulfone group or a ketone group, X represents hydrogen or a monovalent cation species, and n represents an arbitrary integer not less than 2.)

In the chemical formula 1, examples of the monovalent cation species represented by X include a monovalent metal (sodium, potassium, and the like) salt, and a salt with an organic base compound, such as ammonium salt. The structure of the above chemical formula 1 can be formed through an aromatic nucleophilic substitution reaction between 3,3'-disulfo-4,4'-dihalogenated diphenylsulfone, 3,3'-disulfo-4,4'-dihalogenated-benzophenone or a derivative thereof and a phenylene ether oligomer containing a terminal hydroxyl group. The structural part formed by the phenylene ether oligomer can be represented by an arbitrary integer in which n is not less than 2 in the above chemical formula 1. The sulfonic acid group-containing polymer of the present invention may contain, as a structural unit represented by the chemical formula 1, only a single structural unit wherein n is a specific single number, or may contain a plurality of structural units wherein n represents a plurality of numbers different from each other. In addition, the sulfonic acid group-containing polymer of the present invention may further contain a diphenyl ether unit or a diphenoxybenzene unit corresponding to the structure in the chemical formula 1 when n is zero or 1, so far as the sulfonic acid group-containing polymer contains a structural unit represented by the chemical formula 1, i.e. a structural unit in which n is an integer not less than 2.

The structural unit represented by the chemical formula 1 has preferably an average composition wherein n is not more than 10 so that a sufficient amount of the sulfonic acid group is effectively contained in the molecular chain of the sulfonic acid group-containing polymer of the present invention. The average composition of the present specification means a number average of bonds in the case wherein n represents a plurality of numbers of bonds different from each other, and it can be determined by NMR or the like.

Although the sulfonic acid group-containing polymer of the present invention contains the structure of the chemical formula 1 in the polymer chain, it may be composed of only the structure of the chemical formula 1, or may contain one or more kind(s) of aromatic dihydroxy compound(s) or aromatic dihalogenated compound(s) in the form of a copolymer as a constituent other than the structural unit represented by the chemical formula 1. In either case, when the structural unit represented by the chemical formula 1 is present in the sulfonic acid group-containing polymer, the ion conductivity, heat resistance, processability, and dimensional stability of the compound become good. In the present invention, inclusion of the structural unit represented by the chemical formula 1, wherein n is an integer not less than 2, improves the flexibility of the molecular chain of the sulfonic acid group-containing polymer so that not only characteristics of excellency in processability in joining of a polymer electrolyte membrane/electrode assembly for use particularly in fuel cells are exhibited, but also durability of the polymer electrolyte membrane/electrode assembly is improved as a result of such improved joining of the polymer electrolyte membrane to the electrode. Therefore, it is preferable that the structural unit represented by the chemical formula 1 is contained in the sulfonic acid group-containing polymer in not less than 10% by mass, more preferably in not less than 20% by mass.

As mentioned above, since in the sulfonic acid group-containing polymer of the present invention, it is important to contain the structural unit of the chemical formula 1 in the polymer chain, there is no particular limitation on methods for the introduction of the structural unit of the chemical formula 1. As a general synthetic method, such a polymer can be synthesized by an aromatic nucleophilic substitution reaction between 4,4'-dihalogenated benzophenone and/or 4,4'-dihalogenated diphenylsulfone containing a sulfonic acid group or its derivative capable of giving the chemical structure 1 and a phenylene ether oligomer containing a terminal hydroxyl group which is used as at least a part of monomer components.

Specific examples of the 4,4'-dihalogenated benzophenone and/or 4,4'-dihalogenated diphenylsulfone include 3,3'-disulfo-4,4'-dichlorodiphenylsulfone, 3,3'-disulfo-4,4'-difluorodiphenylsulfone, 3,3'-disulfo-4,4'-dichlorobenzophenone, 3,3'-disulfo-4,4'-difluorobenzophenone, and a sulfonic acid salt thereof with a monovalent cation species. The monovalent cation species includes, but is not limited to, a metal species such as sodium, potassium, and other metal species, and various amines, and the like.

Moreover, it is preferable that the sulfonic acid group-containing polymer of the present invention further contains a structural unit represented by the following chemical formula 2, in addition to the structure of the chemical formula 1.

(chemical formula 2)

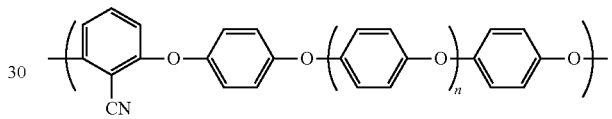

(2)

(In the Chemical Formula 2, n Represents an Arbitrary Integer not Less than 2.)

The sulfonic acid group-containing polymer of the present invention may contain, as a structural unit represented by the chemical formula 2, only a single structural unit wherein n is a specific single number, or may contain a plurality of structural units wherein n represents a plurality of numbers different from each other.

Since the ratio of the phenylene ether oligomer in the structural unit represented by the chemical formula 2 is larger than that of the structural unit of the chemical formula 1, in the case where the sulfonic acid group-containing polymer of the present invention has the structural unit of the chemical formula 2, an effect that better flexibility is imparted to the molecular chain of the compound is exerted. Further, in the case where the sulfonic acid group-containing polymer of the present invention contains both the structural units of the chemical formulas 1 and 2, if a total of not less than 40% by mass of the structural units of the chemical formulas 1 and 2 is contained in the total structural units of the sulfonic acid group-containing polymer of the present invention, such a ratio is preferable to obtain a sulfonic acid group-containing polymer excellent in flexibility, and a ratio of not less than 60% by mass is more preferable in this respect.

There is no particular limitation on methods for the introduction of the structural unit of the chemical formula 2 in the sulfonic acid group-containing polymer of the present invention. As a general synthetic method, there can be mentioned an aromatic nucleophilic substitution reaction using a 2,6-dihalogenated benzonitrile capable of giving the structural unit of the chemical formula 2 and a phenylene ether oligomer containing a terminal hydroxyl group, as at least a part of monomer components, and the like.

Examples of the 2,6-dihalogenated benzonitrile include 2,6-dichlorobenzonitrile, 2,6-difluorobenzonitrile, and the like.

In the aromatic nucleophilic substitution reaction for obtaining the sulfonic acid group-containing polymer of the present invention, an oligomer represented by the following chemical formula 3 may be used as the phenylene ether oligomer containing a terminal hydroxyl group, which is able to impart the structural units of the chemical formulas 1 and 2.

(chemical formula 3)

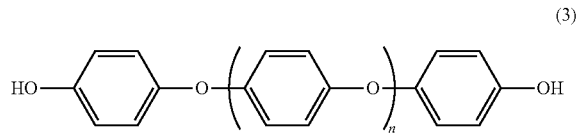

(3)

(In the Chemical Formula 3, n Represents an Arbitrary Integer not Less than 2.)

As the phenylene ether oligomer having a terminal hydroxyl group represented by the chemical formula 3, a single component wherein n is a single number or a mixture of a plurality of components wherein n represents numbers different from each other may be employed. In the case where a plurality of components based on the different numbers of n are contained, it is preferable that the terminal hydroxyl group-containing phenylene ether oligomer represented by the chemical formula 3, having an average composition within a range of $1 < n \leq 10$, is used as a part of a monomer component. Further, more preferably, such an oligomer of which the average composition is within a range of $2 \leq n \leq 10$ is used as a part of a monomer component. This is because if n of an average composition is not more than 1, glass transition temperature of the polymer obtained tends to become higher and its processability as a material for fuel cells tends to deteriorate, and if n of an average composition is larger than 10, glass transition temperature tends to decrease, and heat resistance when used as a material for fuel cells tends to become insufficient. Further, if the terminal hydroxyl group-containing phenylene ether oligomer represented by the chemical formula 3, contains a plurality of components wherein n represents different numbers, an average composition of the oligomer can be determined by NMR or the like, and an existence ratio of the components wherein n represents different numbers can be determined by GPC or the like.

In the aromatic nucleophilic substitution reaction for obtaining the sulfonic acid group-containing polymer of the present invention, an activated difluoro-aromatic compound and a dichloro-aromatic compound can be used as a monomer component capable of giving a structure other than those represented by the chemical formulas 1 and 2. Specific examples includes, but are not limited to, decafluorobiphenyl, decafluorodiphenyl ether, decafluorobenzophenone, 2,4-dichlorobenzonitrile, 2,4-difluorobenzonitrile, 4,4'-dichlorobenzophenone, 4,4'-dichlorodiphenylsulfone, 4,4'-difluorobenzophenone, 4,4'-difluorodiphenylsulfone, and the like, as well as other aromatic dihalogenated compounds, aromatic dinitro compounds, aromatic dicyano compounds and the like, which are active in such an aromatic nucleophilic substitution reaction. Further, these compounds may be used solely or in combination of two or more kinds thereof.

In addition, an aromatic diol component may also be used as a monomer component for giving a structure other than the structures represented by the chemical formulas 1 and 2. Specific examples of such an aromatic diol component include 4,4'-biphenol, bis(4-hydroxyphenyl)sulfone, 1,1-bis(4-hydroxyphenyl)ethane, 2,2-bis(4-hydroxyphenyl)propane, bis(4-hydroxyphenyl)methane, 2,2-bis(4-hydroxyphenyl)butane, 3,3-bis(4-hydroxyphenyl)pentane, 2,2-bis(4-hydroxy-3,5-dimethylphenyl)propane, bis(4-hydroxy-3,5-dimethylphenyl)methane, bis(4-hydroxy-2,5-dimethylphenyl)methane, bis(4-hydroxyphenyl)phenylmethane, bis(4-hydroxyphenyl)diphenylmethane, 9,9-bis(4-hydroxyphenyl)fluorene, 9,9-bis(3-methyl-4-hydroxyphenyl)fluorene, 9,9-bis(3-phenyl-4-hydroxyphenyl)fluorene, 2,2-bis(4-hydroxyphenyl)hexafluoropropane, hydroquinone, resorcin, 1,4-dihydroxynaphthalene, 1,8-dihydroxynaphthalene, 1,5-dihydroxynaphthalene, 1,6-dihydroxynaphthalene, 1,7-dihydroxynaphthalene, 2,6-dihydroxynaphthalene, 2,7-dihydroxynaphthalene, bis(4-hydroxyphenyl)ketone, bis(4-hydroxyphenyl)ether, bis(4-hydroxyphenyl)thioether, bis(4-hydroxyphenoxy)-1,4-benzene, bis(4-hydroxyphenoxy)-1,3-benzene, and the like. In addition to these compounds, a variety of aromatic diols used in polymerization of polyarylene ether-based compounds through the aromatic nucleophilic substitution reaction can be employed. Furthermore, a substituent such as methyl group, halogen, cyano group, sulfonic acid group and a salt compound thereof may be bonded to these aromatic diols. There is no particular limitation to the kind of such substituents, but the number of the substituents is preferably 0 to 2 per an aromatic ring. Moreover, diphenylthioether-4,4'-dithiol and the like having the same reactivity as an aromatic diol may be used. These aromatic diols and the like may be used solely or in combination of two or more kinds thereof.

In the polymerization of the sulfonic acid group-containing polymer of the present invention, a halogenated aromatic hydroxy compound may be added as a reactive monomer component to perform such a polymerization. The halogenated aromatic hydroxy compound used in this polymerization is not particularly limited, but examples thereof include 4-hydroxy-4'-chlorobenzophenone, 4-hydroxy-4'-fluorobenzophenone, 4-hydroxy-4'-chlorodiphenylsulfone, 4-hydroxy-4'-fluorodiphenylsulfone, 4-chloro-4'-(p-hydroxyphenyl)diphenylsulfone, 4-fluoro-4'-(p-hydroxyphenyl)benzophenone, and the like. These compounds may be used solely or in combination of two or more kinds thereof.

In addition to the above compounds, the sulfonic acid group-containing polymer of the present invention may contain, as a main chain, a side chain or a terminal group of the polymer, a component which can be crosslinked upon heat and/or light, in the molecular chain. Examples of the thermally crosslinkable components include, but are not limited to, reactive unsaturated bond-containing groups such as an ethylene group, an ethynyl group, and an ethynylene group, so far as it may form a new bond between polymer chains through a reaction by heat. As a photocrosslinkable component, there can be exemplified by functional groups such as a benzophenone group, an α-diketone group, an acyloin group, an acyloin ether group, a benzylalkyl ketal group, an acetophenone group, polynuclear quinones, a thioxanthone group, an acylphosphine group, an ethylenic unsaturated group. Among these, a combination of a group capable of generating a radical upon light from a benzophenone group or the like, with an aromatic group having a hydrocarbon group such as a methyl group or an ethyl group and being able to react with a radical is preferable. It is preferable that a photoinitiator such as benzophenones, α-diketones, acyloins, acyloin ethers, benzylalkyl ketals, acetophenones, polynuclear quinones, thioxanthones, acylphosphines, or the like is added in advance when an ethylenically unsaturated group is used.

When a crosslinkable group is introduced to a terminal in the polymerization for the sulfonic acid group-containing polymer of the present invention, such introduction of the crosslinkable group may be performed by adding a monofunctional terminal blocking agent imparting a terminal structure containing the crosslinkable group. Specific examples of the monofunctional terminal blocking agent include 3-fluoropropene, 3-fluoro-1-propyne, 4-fluoro-1-butene, 4-fluoro-1-butyne, 3-fluorocyclohexene, 4-fluorostyrene, 3-fluorostyrene, 2-fluorostyrene, 4-fluoroethynylbenzene, 3-fluoroethynylbenzene, α-fluoro-4-ethynyltoluene, 4-fluorostilbene, 4-(phenylethynyl)fluorobenzene, 3-(phenylethynyl)fluorobenzene, 3-chloropropene, 3-chloro-1-propyne, 4-chloro-1-butene, 4-chloro-1-butyne, 3-chlorocyclohexene, 4-chlorostyrene, 3-chlorostyrene, 2-chlorostyrene, 4-chloroethynylbenzene, 3-chloroethynylbenzene, α-chloro-4-ethynyltoluene, 4-chlorostilbene, 4-(phenylethynyl)chlorobenzene, 3-(phenylethynyl)chlorobenzene, 3-hydroxypropene, 3-hydroxy-1-propyne, 4-hydroxy-1-butene, 4-hydroxy-1-butyne, 4-hydroxystyrene, 3-hydroxystyrene, 2-hydroxystyrene, 4-hydroxyethynylbenzene, 3-hydroxyphenol, 4-ethynylbenzyl alcohol, 4-hydroxystilbene, 4-(phenylethynyl)phenol, 3-(phenylethynyl)phenol, 4-chlorobenzophenone, 4-fluorobenzophenone, 4-hydroxybenzophenone, 4-methylphenol, 3-methylphenol, 2-methylphenol, 4-ethylphenol, 3-ethylphenol, 4-propylphenol, 4-butylphenol, 4-pentylphenol, 4-benzylphenol, and the like. These terminal blocking agents may be used solely or in combination of two or more kinds thereof.

In addition, specific examples of the monomer containing a crosslinkable group include 1-butene-3,4-diol, 3,5-dihydroxystyrene, 3,5-dihydroxystilbene, 1-butyne-3,4-diol, 1-butene-3,4-diol, 2,4-hexadyne-1,6-diol, 2-ethynylhydroquinone, 2-(phenylethynyl)hydroquinone, 5-ethynylresorcin, 2-butene-1,4-diol, 4,4'-dihydroxystilbene, 1,4-butynediol, 1,2-bis(4-hydroxyphenyl)acetylene, 1,2-bis(3-hydroxyphenyl)acetylene, 3,3-difluoropropene, 3,3-difluoropropyne, 3,3,3-trifluoropropyne, 3,4-difluoro-1-butene, 1,4-difluoro-2-butene, 3,4-difluoro-1-butyne, 1,4-difluoro-2-butyne, 1,6-difluoro-2,4-hexadyne, 3,4-difluorostyrene, 2,6-difluorostyrene, 2,5-difluoroethynylbenzene, 3,5-difluoroethynylbenzene, α,α,-difluoro-4-ethynyltoluene, α,α,α-trifluoro-4-ethynyltoluene, 2,4-difluorostilbene, 4,4'-difluorostilbene, 1,2-bis(4-fluorophenyl)acetylene, 3,4-difluoro(phenylethynyl)benzene, 3,3-dichloropropene, 3,3-dichloropropyne, 3,3,3-trichloropropyne, 3,4-dichloro-1-butene, 1,4-dichloro-2-butene, 3,4-dichloro-1-butyne, 1,4-dichloro-2-butyne, 3,4-dichlorostyrene, 2,6-dichlorostyrene, 2,4-difluorocinnamic acid, 2,5-dichloroethynylbenzene, 3,5-dichloroethynylbenzene, α,α,-dichloro-4-ethynyltoluene, α,α,α-trichloro-4-ethynyltoluene, 2,4-dichlorostilbene, 4,4'-dichlorostilbene, 1,2-bis(4-chlorophenyl)acetylene, 3,4-dichloro(phenylethynyl)benzene, 4,4'-dihydroxybenzophenone, 4,4'-dichlorobenzophenone, 4,4'-difluorobenzophenone, 4-chlorobenzophenone, 4-fluorobenzophenone, 4-hydroxybenzophenone, 1,1-bis(4-hydroxyphenyl)ethane, 2,2-bis(4-hydroxyphenyl)propane, bis(4-hydroxyphenyl)methane, 2,2-bis(4-hydroxyphenyl)butane, 3,3-bis(4-hydroxyphenyl)pentane, 2,2-bis(4-hydroxy-3,5-dimethylphenyl)propane, bis(4-hydroxy-3,5-dimethylphenyl)methane, bis(4-hydroxy-2,5-dimethylphenyl)methane, bis(4-hydroxyphenyl)phenylmethane, 4-benzylresorcin, 2,5-dimethylresorcin, 4-ethylresorcin, and the like. By adding these monomers containing a crosslinkable group in the polymerization of the polyarylene ether-based compounds of the present invention, it is possible to introduce such a crosslinkable group into the molecular chain.

The sulfonic acid group-containing polymer of the present invention is a sulfonic acid group-containing polymer having, as essential repeating units, all of the structures represented by the following chemical formulas 4 to 7.

(chemical formula 4)

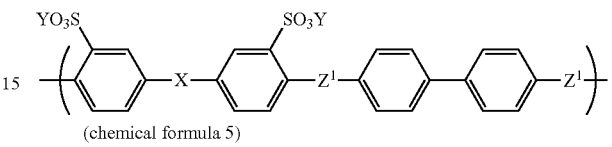

(chemical formula 5)

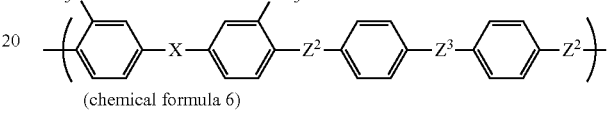

(chemical formula 6)

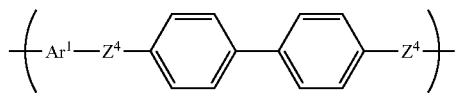

(chemical formula 7)

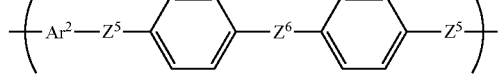

(In the chemical formulas 4 to 7, X represents an —S(=O)$_2$— group or a C(=O)— group; Y represents H or a monovalent cation; $Z^1$, $Z^2$, $Z^4$ and $Z^5$ each independently represent either of an O atom or an S atom; and $Z^3$ and $Z^6$ each independently represent any one of an O atom, an S atom, a —C(CH$_3$)$_2$— group, a —C(CF$_3$)$_2$— group, a —CH$_2$— group, and a cyclohexyl group.)

Each of the repeating units represented by the chemical formulas 4 to 7 may be bound at random, or each of the same repeating units may be bound continuously. In that case, all kinds of the repeating units may be bound continuously, or only a part of the kinds of the repeating units may be bound continuously.

Although X represents an —S(=O)$_2$— group or a C(=O)— group, it is preferable that X is the —S(=O)$_2$— group, because solubility in a solvent is increased. Also, the C(=O)-group is preferable, because a photocrosslinkability can be given to the polymer.

Y represents H or a monovalent cation, and in the case of using as a proton exchange membrane for fuel cells, Y is preferably H. In processing such as dissolution, molding, or membrane formation, Y is preferably a monovalent cation rather than H, because thermal stability of the sulfonic acid group is increased. As the monovalent cation, for example, alkali metal ions such as Na, K, and Li, an ammonium ion, and a quaternary amine salt, and the like can be mentioned, among which the alkali metal ions such as Na, K, and Li are preferable. The sulfonic acid group in the form of an alkali metal salt can be converted into a sulfonic acid group by treating the polymer with a strong acid such as sulfuric acid, hydrochloric acid or perchloric acid, or with an aqueous solution thereof. A polymer having a sulfonic acid group shows a high ion conductivity and can be used as proton exchange resins or proton exchange membranes. Particularly, the proton exchange membrane can be used as an electrolyte for solid polymer-type fuel cells, and by use of the polymer of the present invention, it is possible to obtain a fuel cell with excellent performance.

In the chemical formulas 4 to 7, $Z^1$, $Z^2$, $Z^4$ and $Z^5$ each independently represent either of an O atom or an S atom. A case where $Z^1$, $Z^2$, $Z^4$ and $Z^5$ are all O atoms is preferable, because cost and toxicity of the monomer do not become high and coloration in polymerization is less likely to occur. The oxidation resistance of the polymer in the case of an S atom becomes higher rather than that of an O atom. $Z^3$ and $Z^6$ each independently represent any one of an O atom, an S atom, a —C(CH$_3$)$_2$— group, a —C(CF$_3$)$_2$— group, a —CH$_2$— group, and a cyclohexyl group. Among these, an O atom, an S atom, a —C(CH$_3$)$_2$— group, a —C(CF$_3$)$_2$— group, and a cyclohexyl group are preferable, and an O atom and an S atom are more preferable.

Among $Z^1$ to $Z^6$ in the chemical formulas 4 to 7, it is preferable that at least $Z^3$ and $Z^6$ are both S atoms, in view of oxidation resistance, and it is more preferable that $Z^2$ and $Z^5$ are both S atoms. It is furthermore preferable that $Z^1$ to $Z^6$ are all S atoms.

$Ar^1$ and $Ar^2$ in the chemical formulas 6 and 7 are preferably an aromatic group having an electron withdrawing group. Examples of such an electron withdrawing group include a sulfone group, a carbonyl group, a sulfonyl group, a phosphine group, a cyano group, a perfluoroalkyl group such as a trifluoromethyl group, a nitro group, a halogen group, and the like, among which the cyano, sulfone, and carbonyl groups are preferable. Further, it is preferable that $Ar^1$ and $Ar^2$ are one or more kind(s) of group(s) selected from the structures represented by the following chemical formulas 8 to 11.

(chemical formula 8)

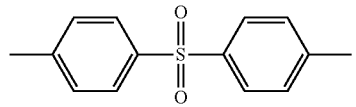

(chemical formula 9)

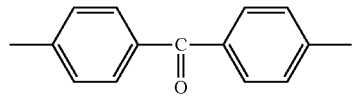

(chemical formula 10)

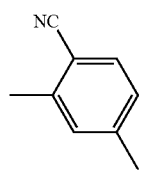

(chemical formula 11)

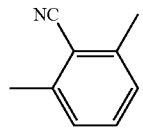

In the case of the structure of the chemical formula 8, solubility in a solvent is increased, and accordingly the structure of the chemical formula 8 is preferable. In addition, in the case of the structure of the chemical formula 9, photo-crosslinkability can be imparted to a polymer, and thus the structure of the chemical formula 9 is preferable. Further, in the case of the structures of the chemical formulas 10 and 11, the swellability of a polymer becomes smaller and thus the structures of the chemical formulas 10 and 11 are preferable. Among the chemical formulas 8 to 11, the structure of the chemical formulas 10 and 11 are preferable and the structure of the chemical formula 11 is most preferable.

By using the sulfonic acid group-containing polymer of the present invention having, as essential repeating units, structures represented by the chemical formulas 4 to 7, a polymer electrolyte membrane excellent in physical durability and joining property to electrode catalyst layers due to its small swellability can be obtained.

It is preferable that a molar ratio of a repeating structure represented respectively by the chemical formulas 4 to 7 and other repeating structures in the molecule satisfies mathematical expressions 1 to 3.

$0.9 \leq (n1+n2+n3+n4)/(n1+n2+n3+n4+n5) \leq 1.0$ (mathematical expression 1)

$0.05 \leq (n1+n2)/(n1+n2+n3+n4) \leq 0.7$ (mathematical expression 2)

$0.01 \leq (n2+n4)/(n1+n2+n3+n4) \leq 0.95$ (mathematical expression 3)

(In the mathematical expressions, n1 to n4 represent a respective mol % of repeating units represented by the chemical formulas 4 to 7, in the molecule of a sulfonic acid group-containing polymer, and n5 represents a mol % of another repeating unit in the molecule of the sulfonic acid group-containing polymer.)

The another repeating unit is not particularly limited, and includes, for example, a phosphonic acid group and a phosphoric acid group, because of improved oxidation resistance. If the another repeating unit contains a crosslinkable group such as an alkyl group (e.g. methyl group), an allyl group, an ethynyl group, or a maleimide group, crosslinkability is imparted to a polymer to improve the durability and strength of a polymer electrolyte membrane, and accordingly such crosslinkable groups are preferred.

A preferable range of the ratio of repeating units represented by the chemical formulas 4 to 7 in the sulfonic acid group-containing polymer according to the present invention to total repeating units can be expressed by a mathematical expression 1. (n1+n2+n3+n4)/(n1+n2+n3+n4+n5) is preferably within a range of 0.9 to 1.0, more preferably within a range of 0.95 to 1.0, and furthermore preferably within a range of 0.96 to 1.0. In the case where other repeating units other than the structures represented by the chemical formulas 4 to 7 are contained, the ratio of such other repeating units to the total repeating units is preferably within a range of 0.001 to 0.04.

A preferable range of the ratio of the repeating units containing a sulfonic acid group in the repeating units represented by the chemical formulas 4 to 7 can be expressed by a mathematical expression 2. (n1+n2)/(n1+n2+n3+n4) is preferably within a range of 0.05 to 0.7. If (n1+n2)/(n1+n2+n3+n4) is lower than 0.05, there is a tendency making it difficult to obtain a sufficient ion conductivity, and if higher than 0.7, there is a tendency that swellability becomes remarkably large or water-solubility is acquired, and this makes the use as a polymer electrolyte membrane difficult.

Referring to the structures represented by the chemical formulas 5 and 7 among the repeating units represented by the chemical formulas 4 to 7, a preferable range of the total ratio can be expressed by a mathematical expression 3. (n2+n4)/(n1+n2+n3+n4) is preferably within a range of 0.01 to 0.95. If (n2+n4)/(n1+n2+n3+n4) is smaller than 0.01, there is a tendency that it is difficult to obtain a sufficient improving effect, and if larger than 0.95, the swellability of a membrane tends to become larger.

The sulfonic acid group-containing polymer according to the present invention can be used for ion exchange resins, ion exchange membranes, moisture absorptive resins, moisture absorptive membranes, moisture permeable membranes, electrolyte membranes, or the like, and it is particularly preferable to use the polymer as a polymer electrolyte membrane which functions as an ion exchange membrane. Further, the polymer electrolyte membrane using the sulfonic acid group-containing polymer of the present invention can be used as a proton exchange membrane by converting the sulfonic acid group into a sulfonic acid type, and in particular, it is suitable as a proton exchange membrane for fuel cells. In addition, the sulfonic acid group-containing polymer of the present invention is suitable as an adhesive in joining an ion exchange membrane to electrodes and catalysts.

In the case where the polymer electrolyte membrane of the present invention is used as a proton exchange membrane for direct methanol fuel cells using directly an aqueous methanol solution as a fuel, it is preferable that the structures represented by the chemical formulas 4 to 7 satisfy the following mathematical expressions 1, 8 and 9.

$$0.9 \leq (n1+n2+n3+n4)/(n1+n2+n3+n4+n5) \leq 1.0 \quad \text{(mathematical expression 1)}$$

$$0.05 \leq (n1+n2)/(n1+n2+n3+n4) \leq 0.5 \quad \text{(mathematical expression 8)}$$

$$0.05 \leq (n2+n4)/(n1+n2+n3+n4) \leq 0.95 \quad \text{(mathematical expression 9)}$$

(In the above expressions, n1 to n4 represent a respective mol % of repeating structures represented by the chemical formulas 4 to 7, in the molecule of a sulfonic acid group-containing polymer, and n5 represents a mol % of other repeating structures in the molecule of the sulfonic acid group-containing polymer.)

In the mathematical expression 1, $(n1+n2+n3+n4)/(n1+n2+n3+n4+n5)$ is preferably within a range of 0.9 to 1.0, more preferably within a range of 0.95 to 1.0, and furthermore preferably within a range of 0.96 to 1.0. In the case where other repeating units other than the structures represented by the chemical formulas 4 to 7 are contained, it is more preferable that the ratio of such other repeating units to the total repeating units be within a range of 0.001 to 0.04.

In the mathematical expression 8, $(n1+n2)/(n1+n2+n3+n4)$ is preferably within a range of 0.05 to 0.5. If $(n1+n2)/(n1+n2+n3+n4)$ is smaller than 0.05, it is difficult to obtain a sufficient proton conductivity, and thus the output of a fuel cell tends to easily decline. If $(n1+n2)/(n1+n2+n3+n4)$ is larger than 0.5, the amount of methanol permeating a membrane becomes too large, and a fuel cell tends to easily decline in its output. A more preferable range of $(n1+n2)/(n1+n2+n3+n4)$ is 0.07 to 0.4. Further, if the concentration of an aqueous methanol solution used as a fuel is low, the larger $(n1+n2)/(n1+n2+n3+n4)$ is, the larger the proton conductivity is, and thus the output of a fuel cell becomes high. Meanwhile, in the case where a high concentration of aqueous methanol solution is used, if $(n1+n2)/(n1+n2+n3+n4)$ is small, the output decline accompanied by methanol permeation can be suppressed, resulting in possible increase of the output of a fuel cell.

In the mathematical expression 9, $(n2+n4)/(n1+n2+n3+n4)$ is preferably within a range of 0.05 to 0.95. If $(n2+n4)/(n1+n2+n3+n4)$ is smaller than 0.05, insufficient joining tends to easily occur in joining of an ion exchange membrane to electrodes and catalysts, and if $(n2+n4)/(n1+n2+n3+n4)$ is larger than 0.95, the swellability tends to easily become larger. A more preferable range of $(n2+n4)/(n1+n2+n3+n4)$ is within a range of 0.2 to 0.8. If $(n1+n2)/(n1+n2+n3+n4)$ is smaller than 0.2, $(n2+n4)/(n1+n2+n3+n4)$ is preferably within a range of 0.4 to 0.8. Further, if $(n1+n2)/(n1+n2+n3+n4)$ is larger than 0.2, $(n2+n4)/(n1+n2+n3+n4)$ is preferably within a range of 0.1 to 0.5.

In the case where the polymer electrolyte membrane of the present invention is used as a proton exchange membrane for fuel cells using hydrogen as a fuel, it is preferable that the following mathematical expressions 1, 10 and 11 are satisfied.

$$0.9 \leq (n1+n2+n3+n4)/(n1+n2+n3+n4+n5) \leq 1.0 \quad \text{(mathematical expression 1)}$$

$$0.3 \leq (n1+n2)/(n1+n2+n3+n4) \leq 0.7 \quad \text{(mathematical expression 10)}$$

$$0.01 \leq (n2+n4)/(n1+n2+n3+n4) \leq 0.25 \quad \text{(mathematical expression 11)}$$

(In the mathematical expressions, n1 to n4 represent a respective mol % of the repeating units represented by the chemical formulas 4 to 7, in the molecule of a sulfonic acid group-containing polymer, and n5 represents a mol % of another repeating unit in the molecule of the sulfonic acid group-containing polymer.)

In the mathematical expression 1, $(n1+n2+n3+n4)/(n1+n2+n3+n4+n5)$ is preferably within a range of 0.9 to 1.0, more preferably within a range of 0.95 to 1.0, and furthermore preferably within a range of 0.96 to 1.0. In the case where other repeating units other than the structures represented by the chemical formulas 4 to 7 are contained, it is preferable that the ratio of such other repeating units to the total repeating units be within a range of 0.001 to 0.04.

In the mathematical expression 10, $(n1+n2)/(n1+n2+n3+n4)$ is preferably within a range of 0.3 to 0.7. If $(n1+n2)/(n1+n2+n3+n4)$ is smaller than 0.3, a sufficient proton conductivity is hardly obtained, and the output of a fuel cell tends to easily decline. If $(n1+n2)/(n1+n2+n3+n4)$ is larger than 0.7, the swellability of a membrane becomes too large, resulting in a tendency of easy occurrence of destruction or output decline. A more preferable range of $(n1+n2)/(n1+n2+n3+n4)$ is 0.35 to 0.7, and furthermore preferably 0.4 to 0.5.

In the mathematical expression 11, $(n2+n4)/(n1+n2+n3+n4)$ is preferably within a range of 0.01 to 0.25. If $(n2+n4)/(n1+n2+n3+n4)$ is smaller than 0.01, an insufficient joining tends to easily occur in the joining of an electrode or a catalyst to a proton exchange membrane. If $(n2+n4)/(n1+n2+n3+n4)$ is larger than 0.25, the swellability tends to become too large. A more preferable range of $(n2+n4)/(n1+n2+n3+n4)$ is within a range of 0.1 to 0.2.

A polymer electrolyte membrane containing the sulfonic acid group-containing polymer of the present invention can be joined with an electrode and a catalyst, thereby to fabricate a polymer electrolyte membrane/electrode assembly. In addition, the sulfonic acid group-containing polymer of the present invention can also be used as an adhesive to electrodes and catalysts for the polymer electrolyte membranes of the present invention or other membranes. If the sulfonic acid group-containing polymer of the present invention is used as an adhesive, it is preferable that Y in the chemical formulas 4 and 5 is H and a sulfonic acid group is of an acid type. When a sulfonic acid group is used in the state of a salt with a cation, the sulfonic acid group may be converted into an acid type by acid treatment after joining.

Among the sulfonic acid group-containing polymers of the present invention, specific examples of preferable structures will be shown in the chemical formulas 25A to 25BJ, but the scope of the present invention should not to be limited to these.

(chemical formula 25A)
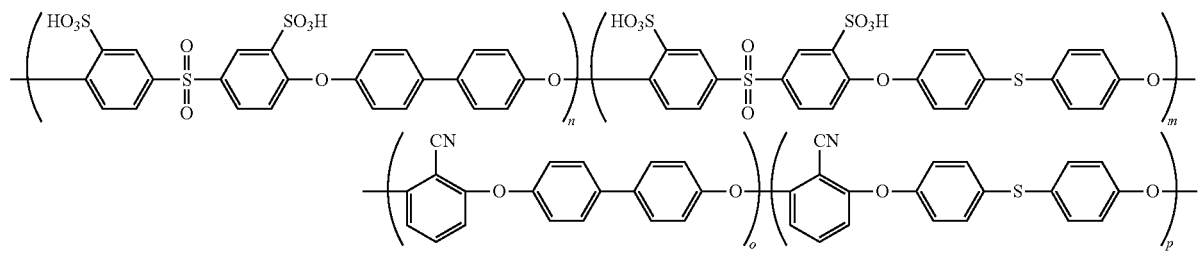
(chemical formula 25B)
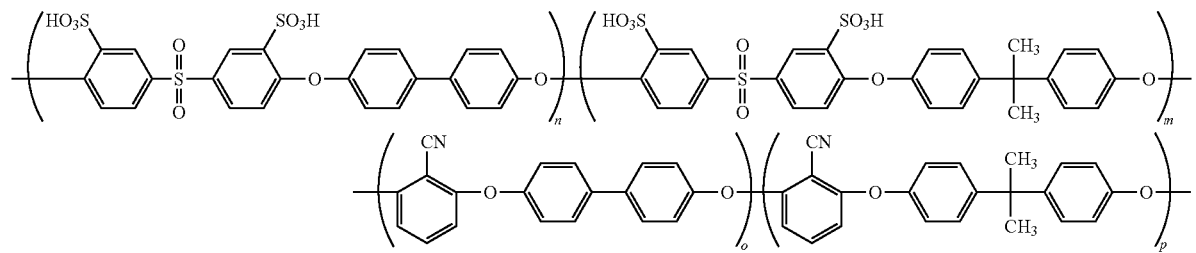
(chemical formula 25C)
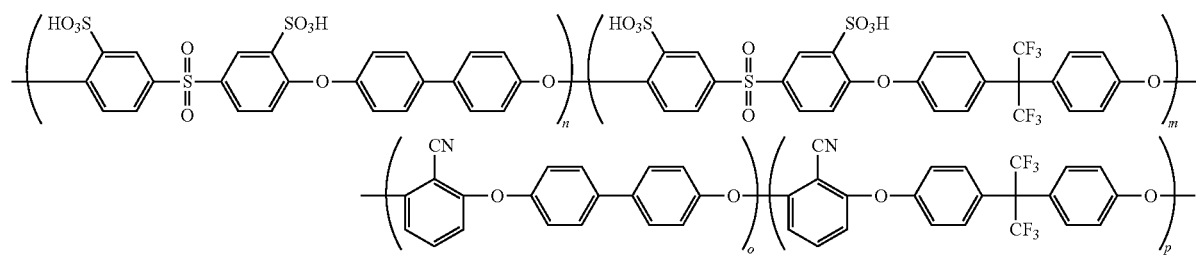
(chemical formula 25D)
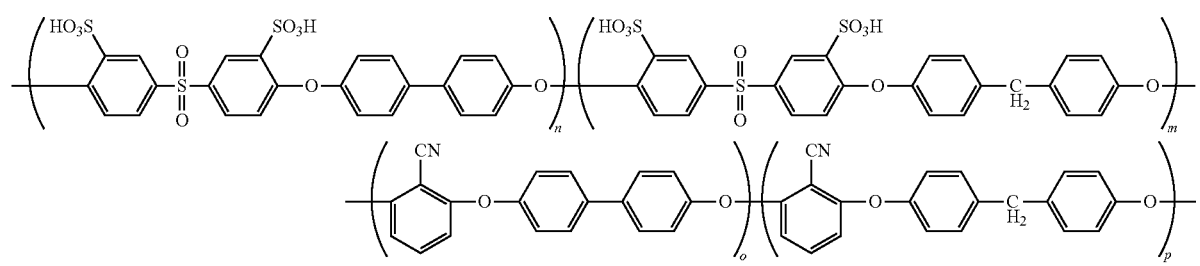
(chemical formula 25E)
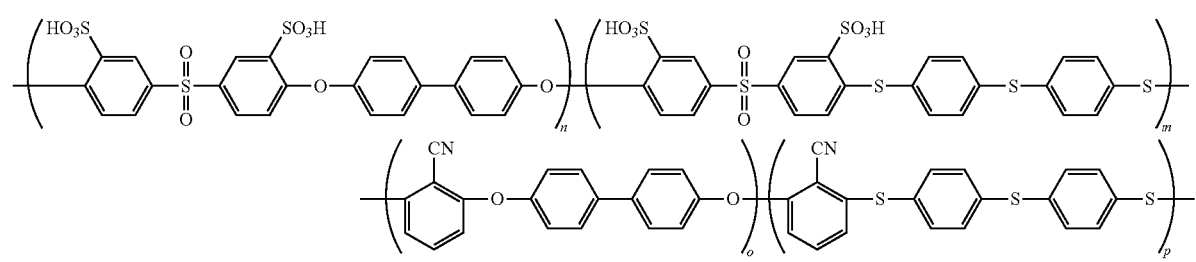
(chemical formula 25F)
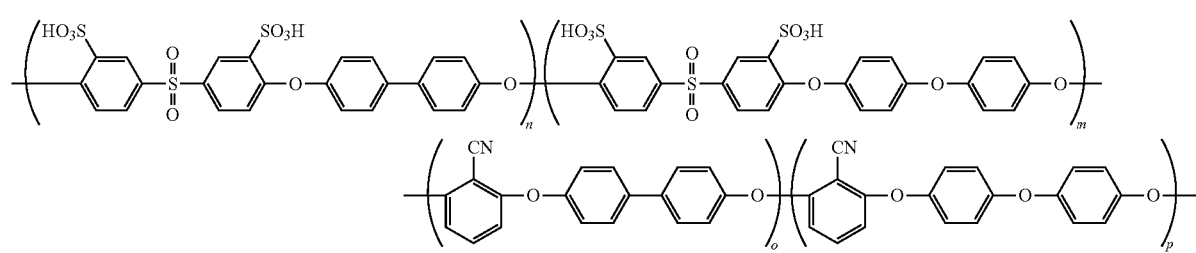

-continued
(chemical formula 25G)
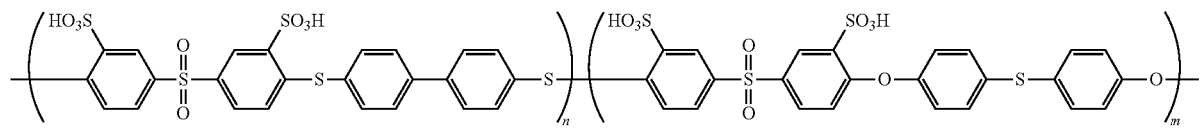
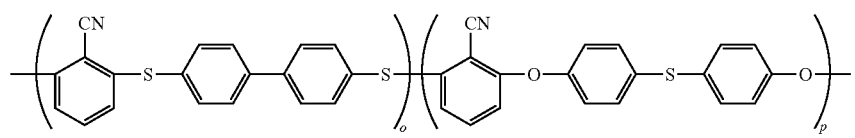
(chemical formula 25H)
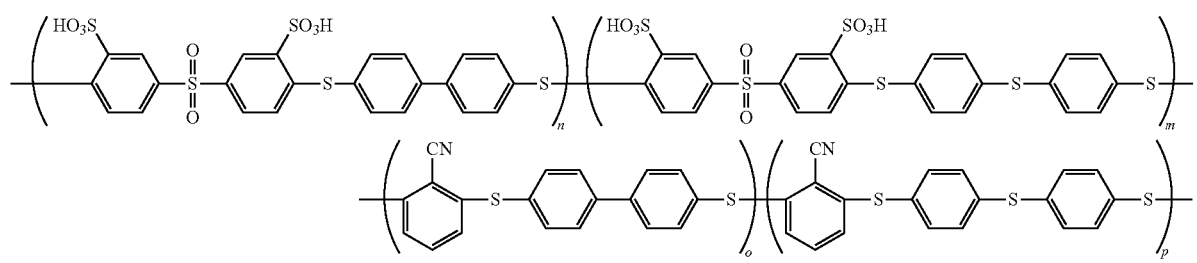
(chemical formula 25I)
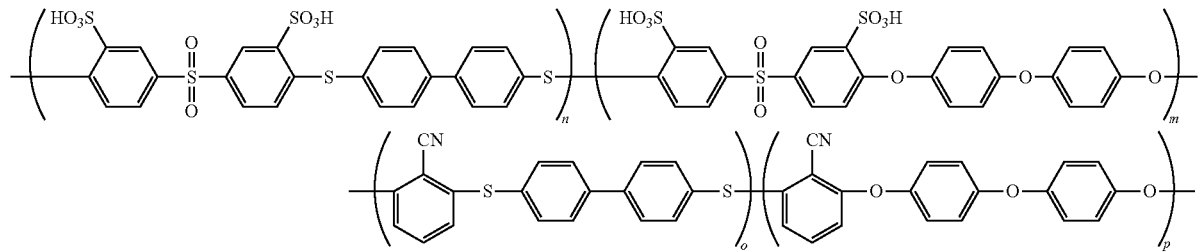
(chemical formula 25J)
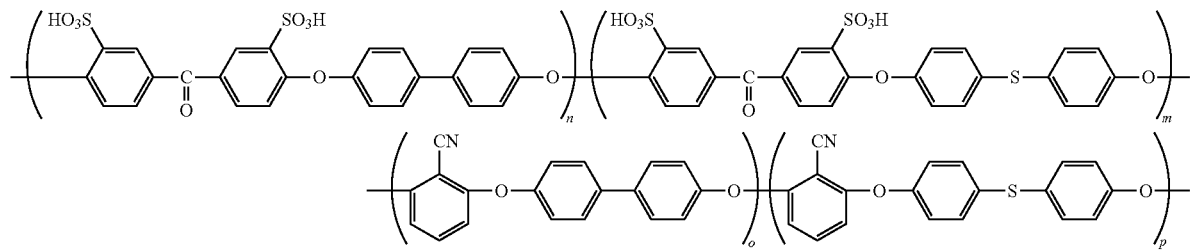
(chemical formula 25K)
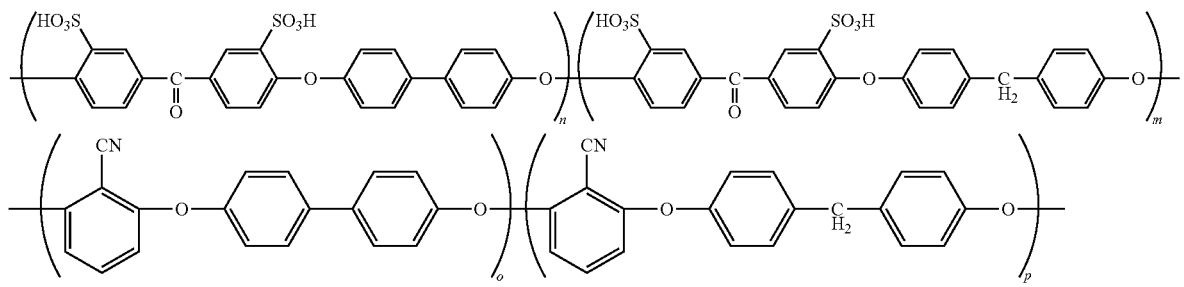

(chemical formula 25L)
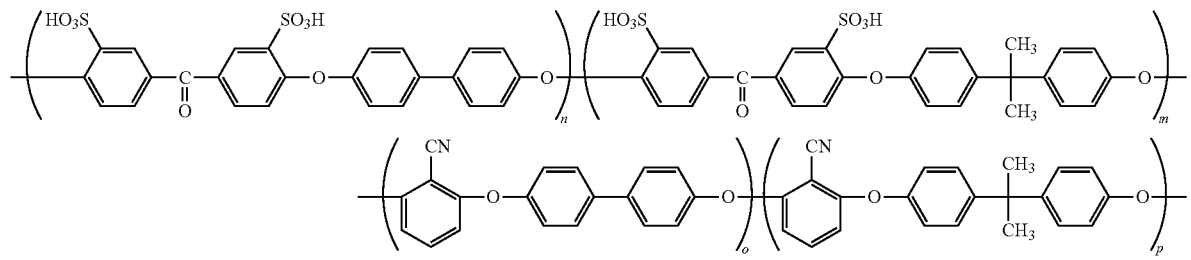
(chemical formula 25M)
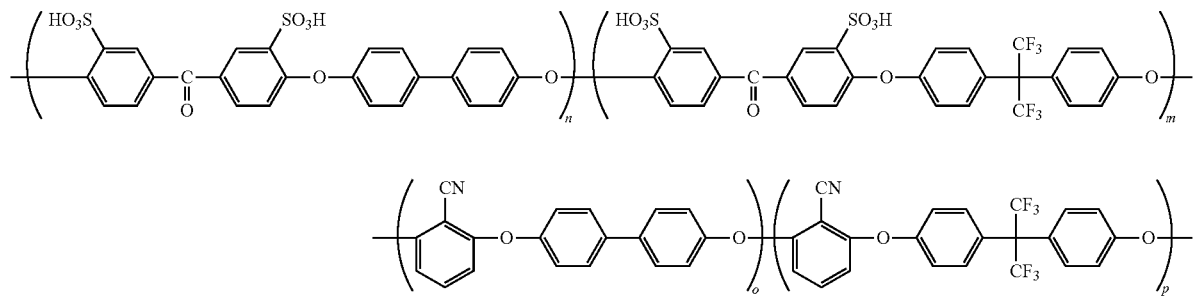
(chemical formula 25N)
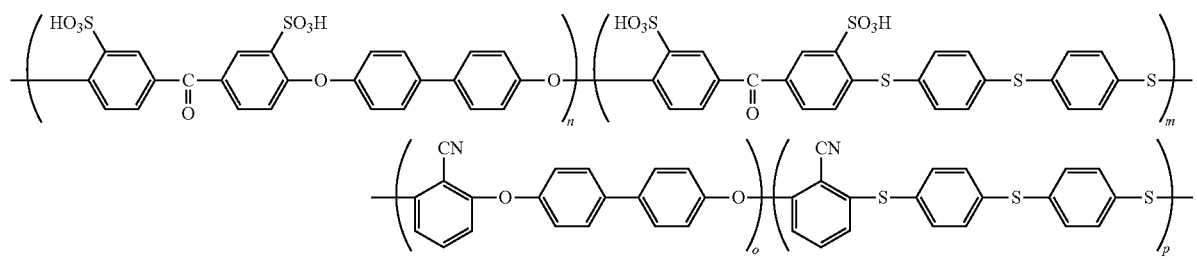
(chemical formula 25O)
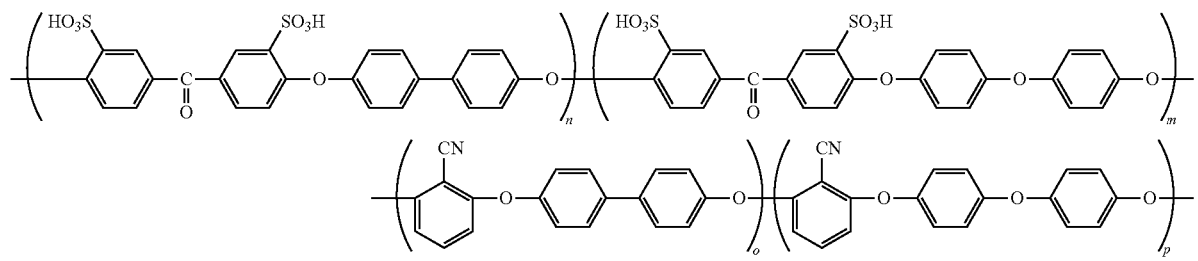
(chemical formula 25P)
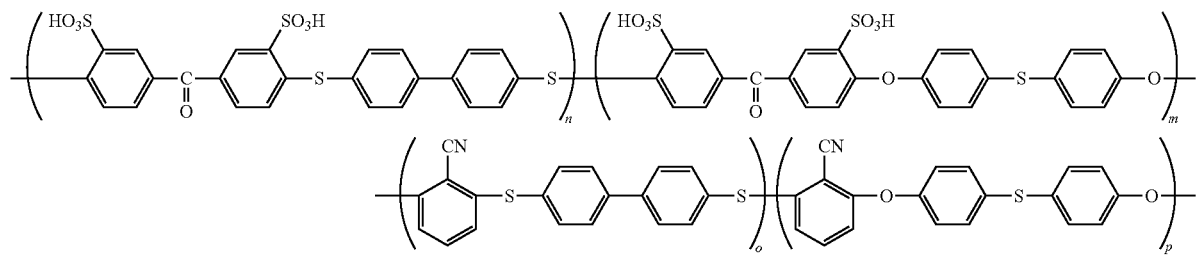
(chemical formula 25Q)
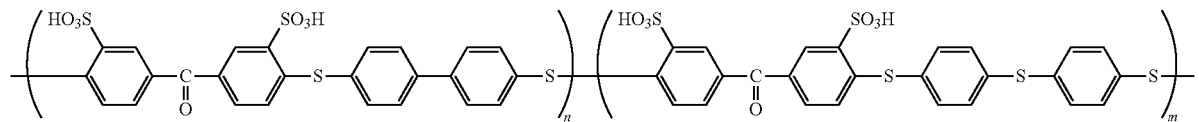

-continued
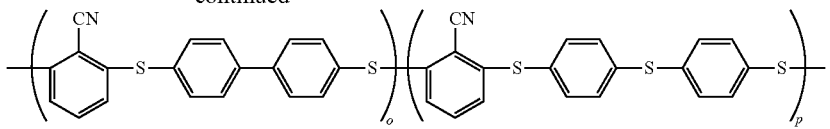
(chemical formula 25R)
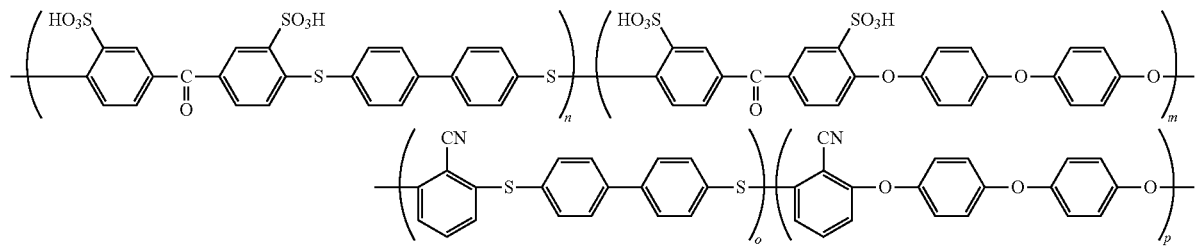
(chemical formula 25S)
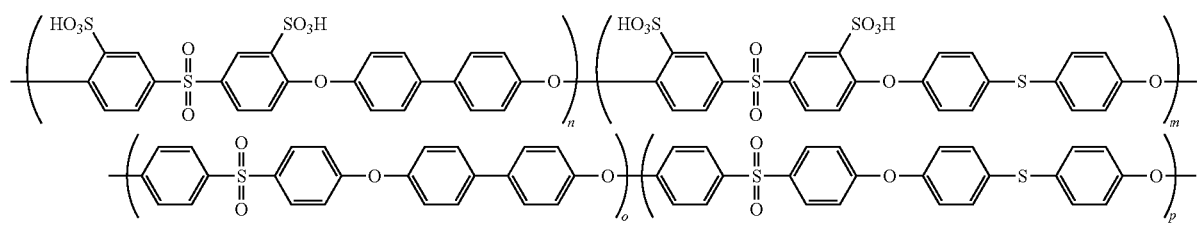
(chemical formula 25T)
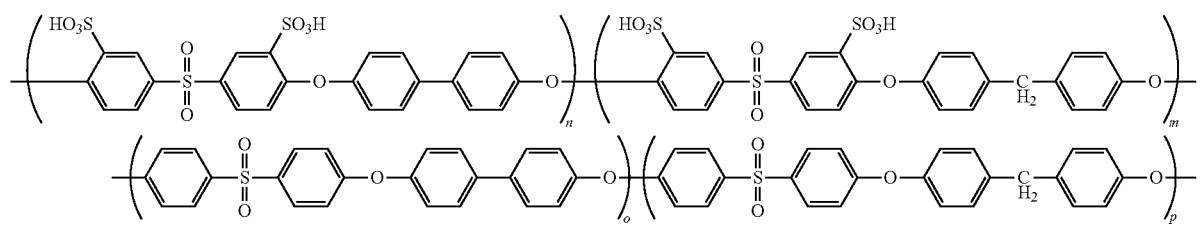
(chemical formula 25U)
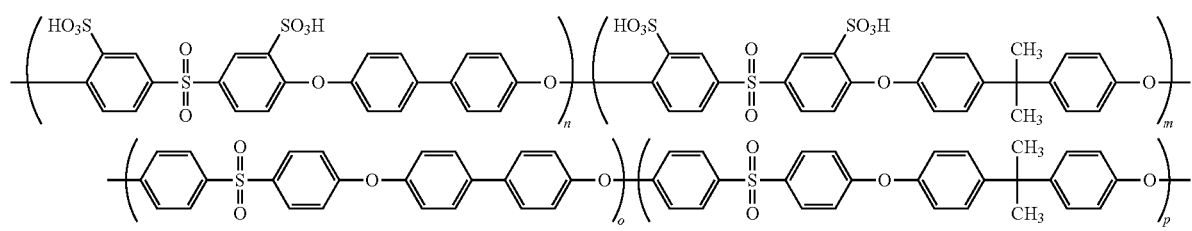
(chemical formula 25V)
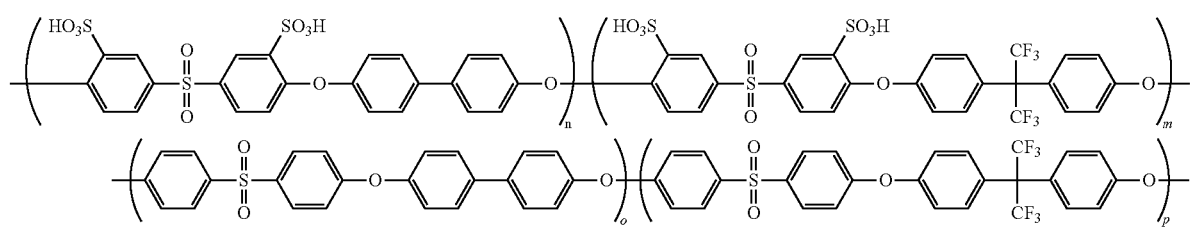
(chemical formula 25W)
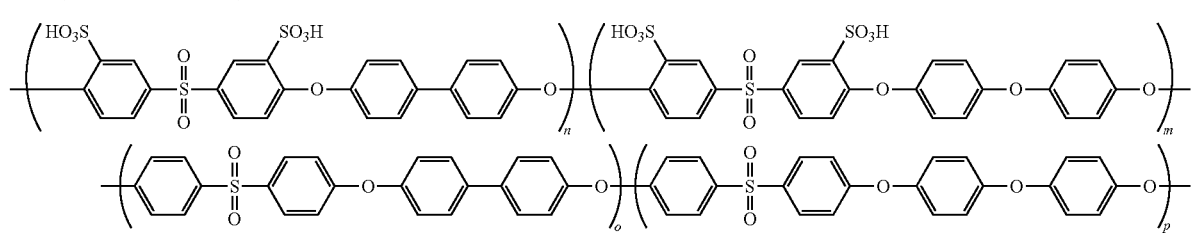

-continued
(chemical formula 25X)
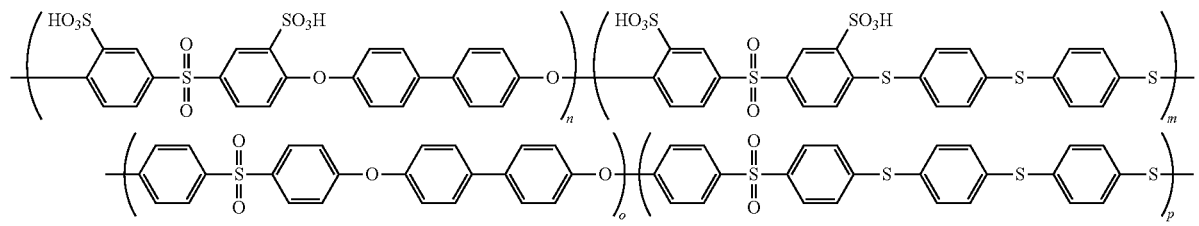
(chemical formula 25Y)
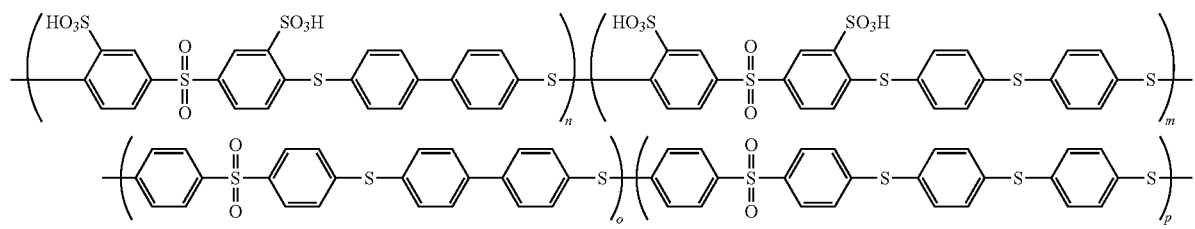
(chemical formula 25Z)
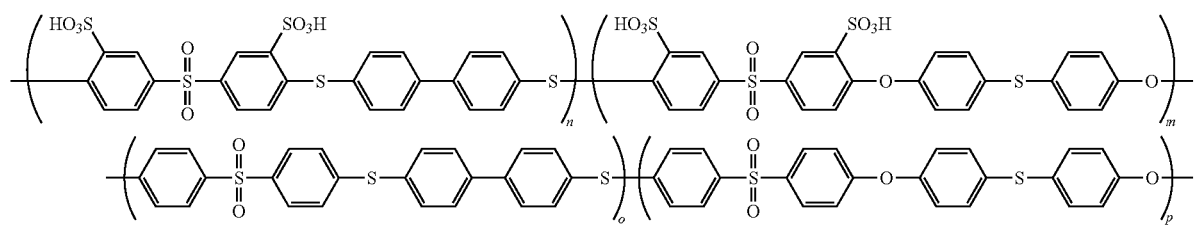
(chemical formula 25AA)
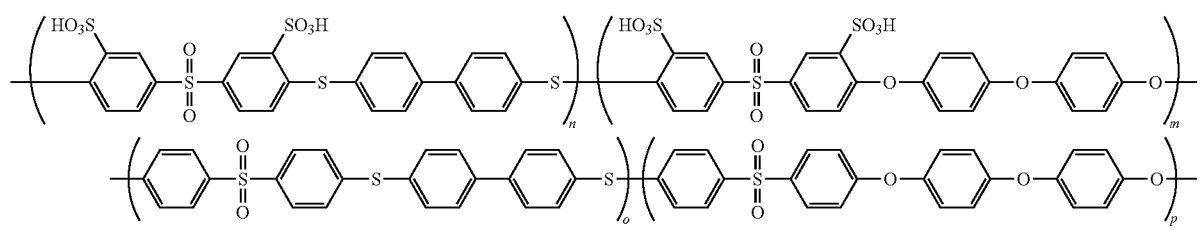
(chemical formula 25AB)
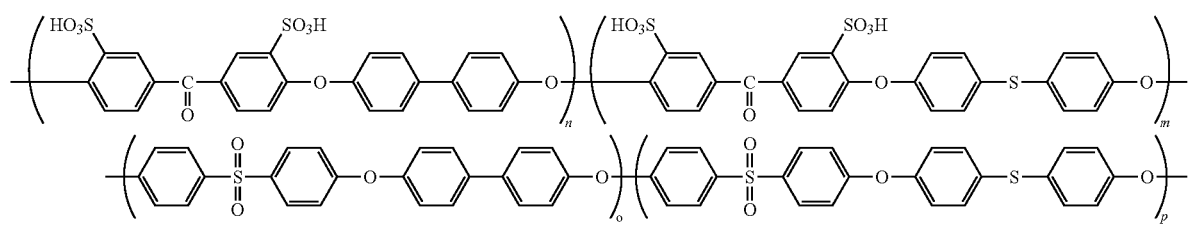
(chemical formula 25AC)
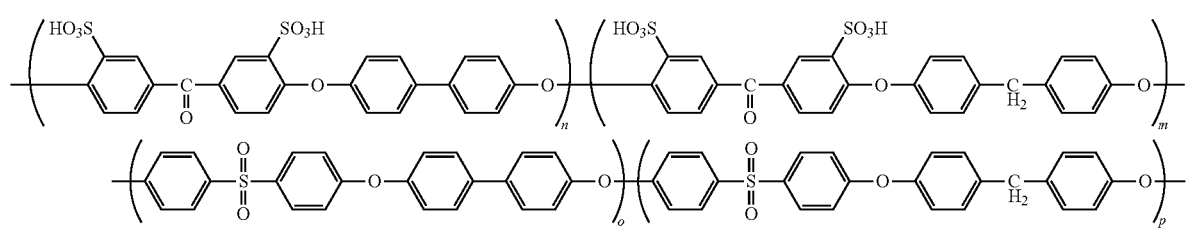
(chemical formula 25AD)
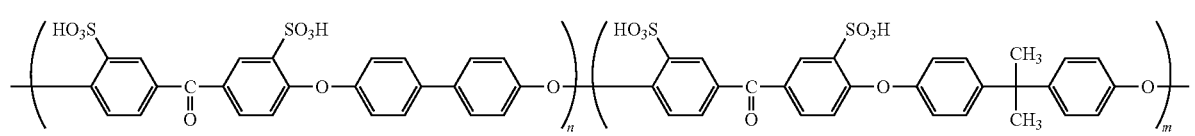

-continued
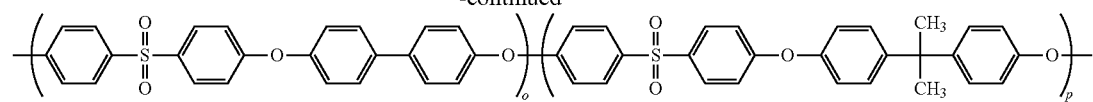
(chemical formula 25AE)
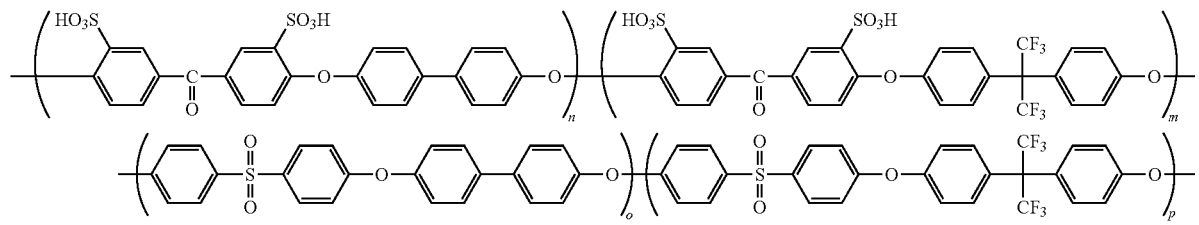
(chemical formula 25AF)
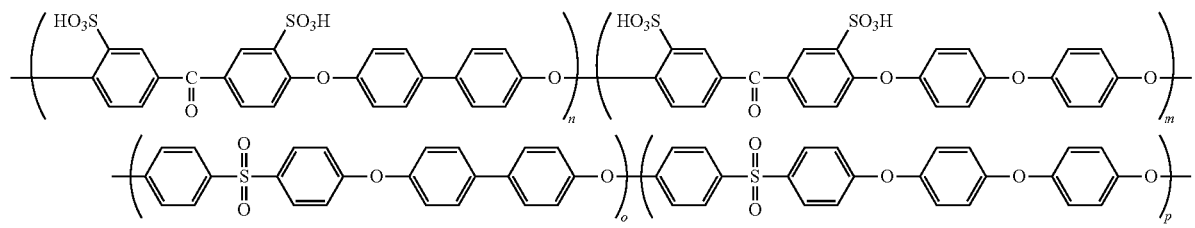
(chemical formula 25AG)
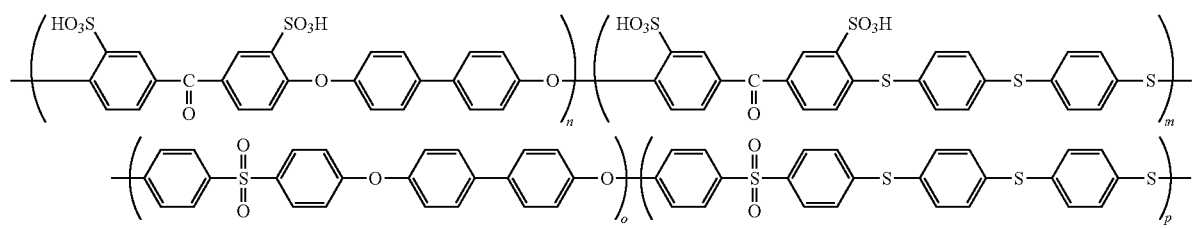
(chemical formula 25AH)
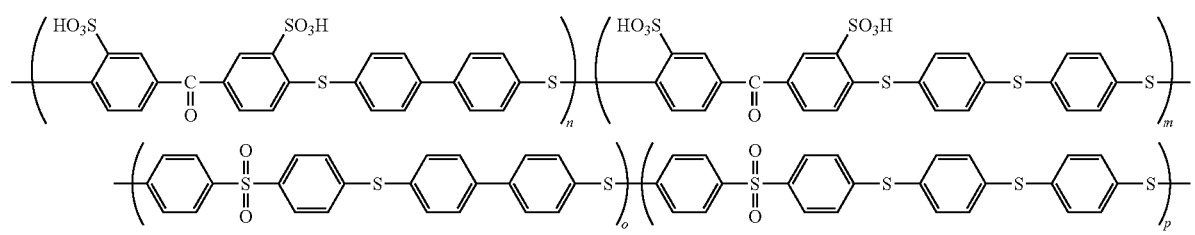
(chemical formula 25AI)
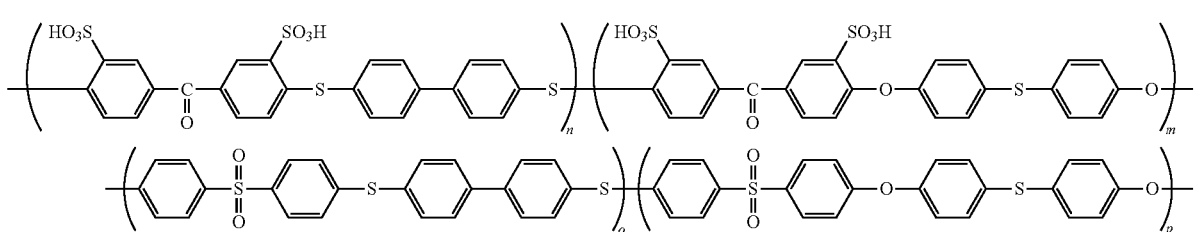
(chemical formula 25AJ)
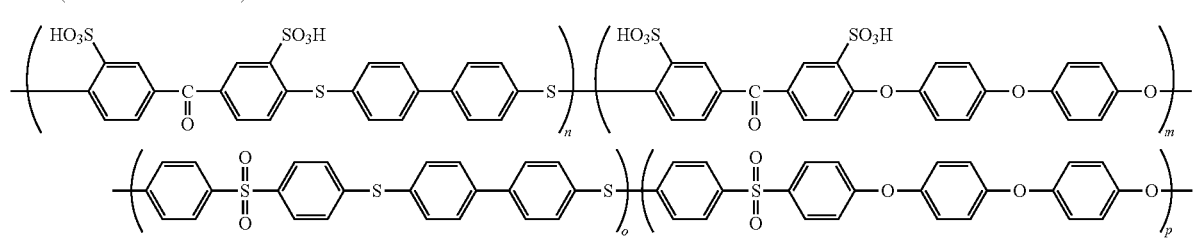

(chemical formula 25AK)
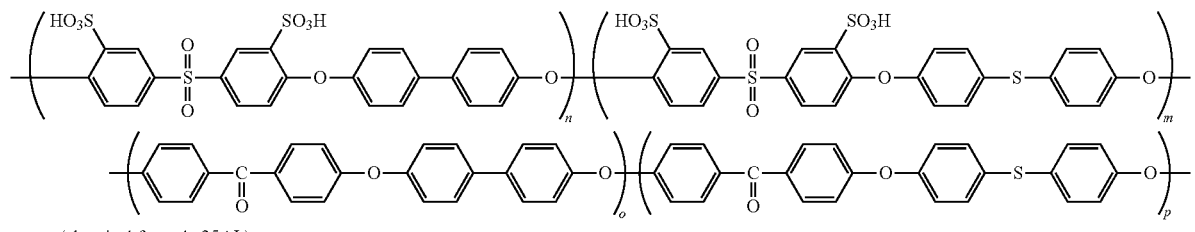
(chemical formula 25AL)
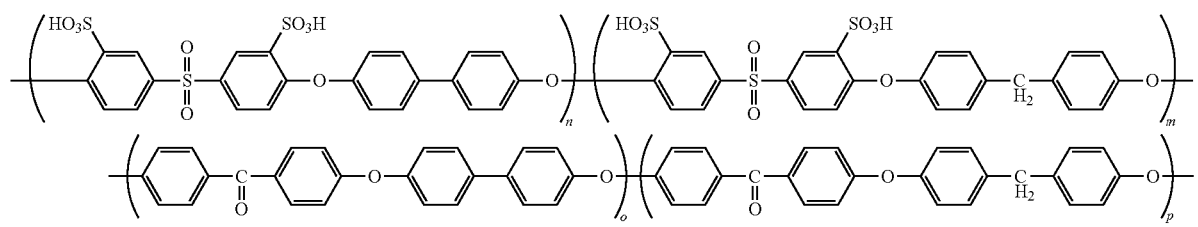
(chemical formula 25AM)
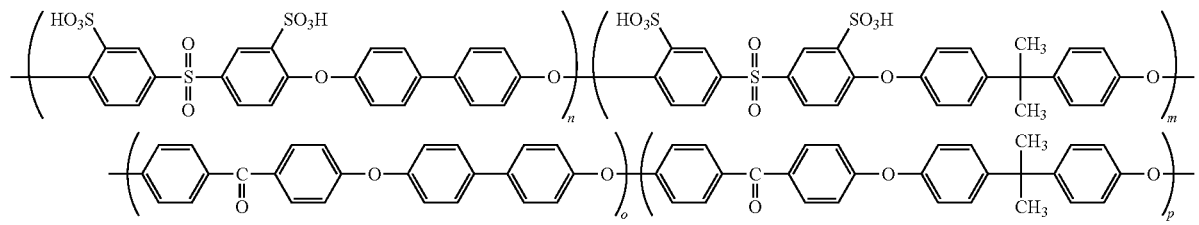
(chemical formula 25AN)
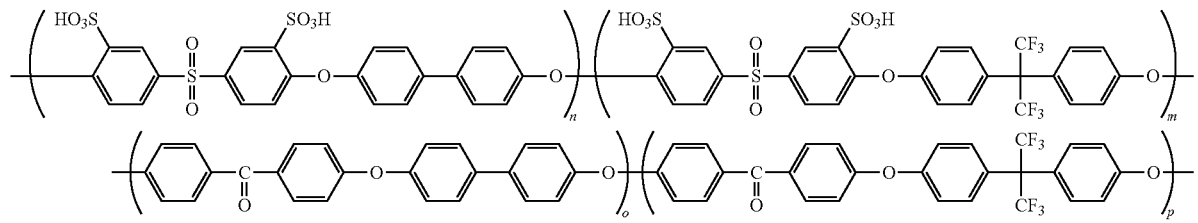
(chemical formula 25AO)
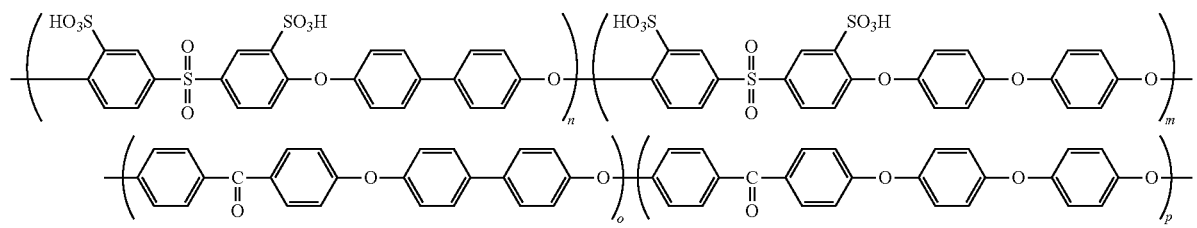
(chemical formula 25AP)
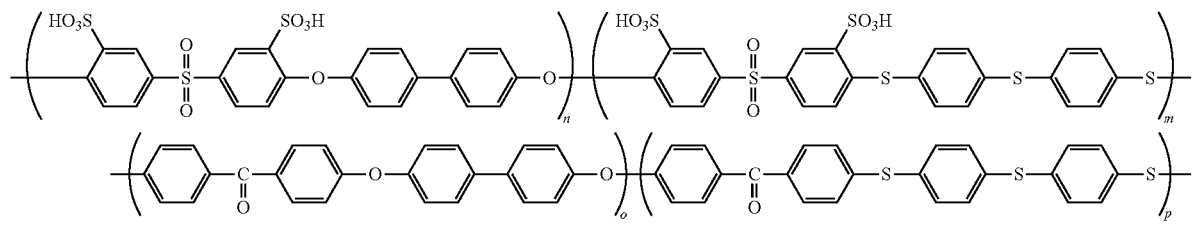
(chemical formula 25AQ)
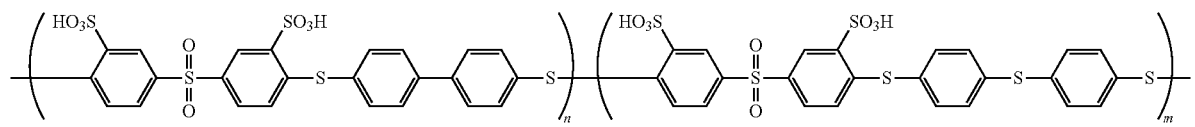

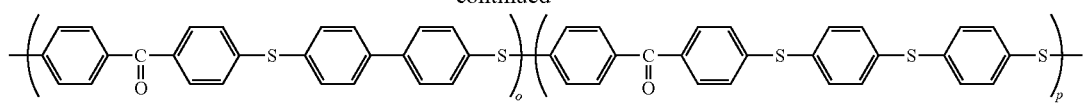
(chemical formula 25AR)
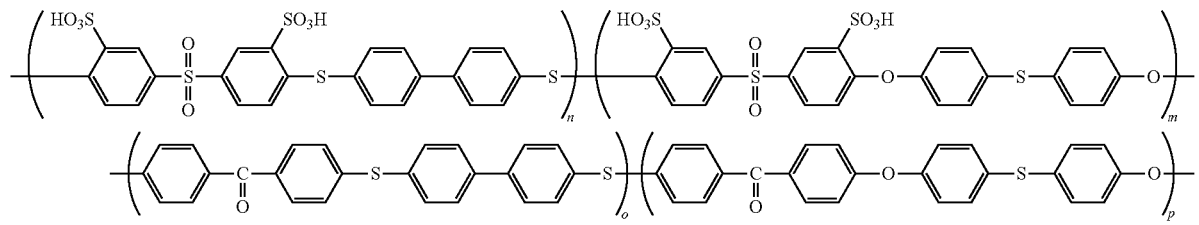
(chemical formula 25AS)
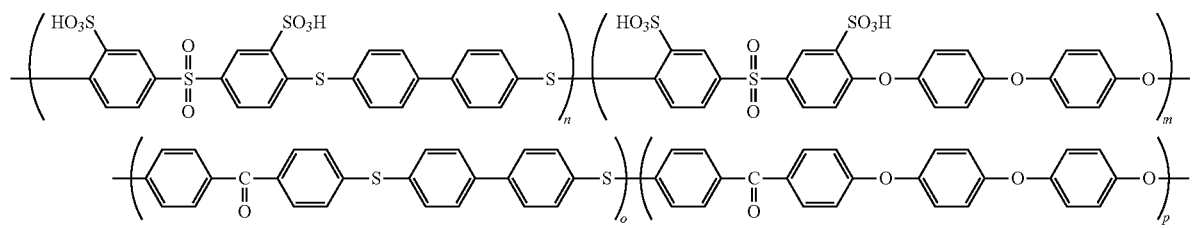
(chemical formula 25AT)
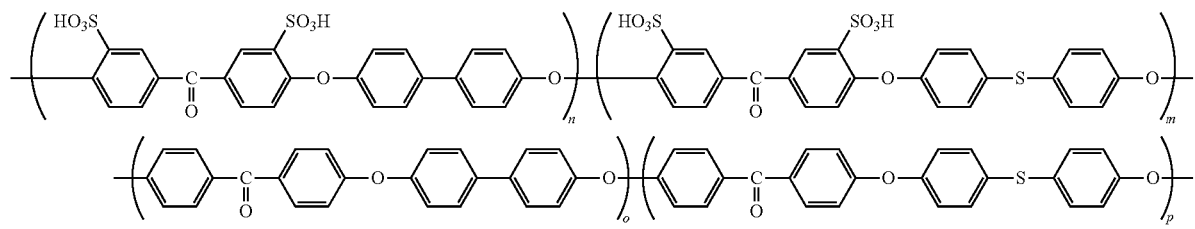
(chemical formula 25AU)
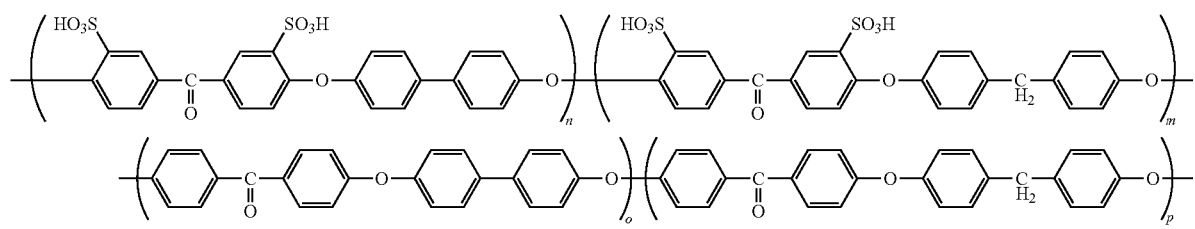
(chemical formula 25AV)
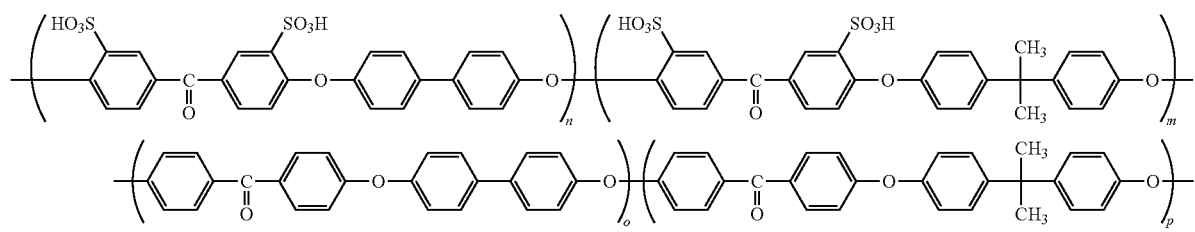
(chemical formual 25AW)
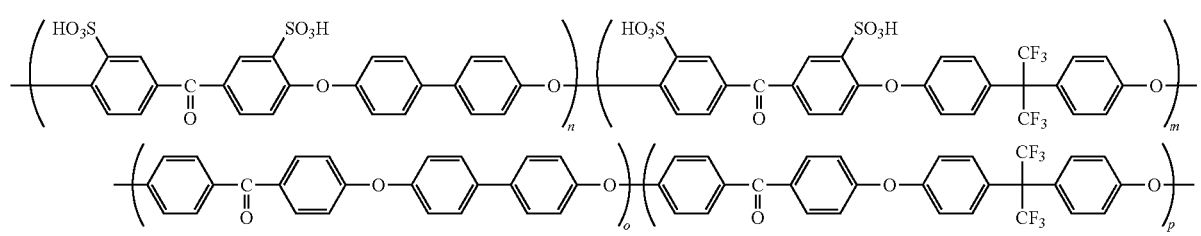

-continued
(chemical formula 25AX)
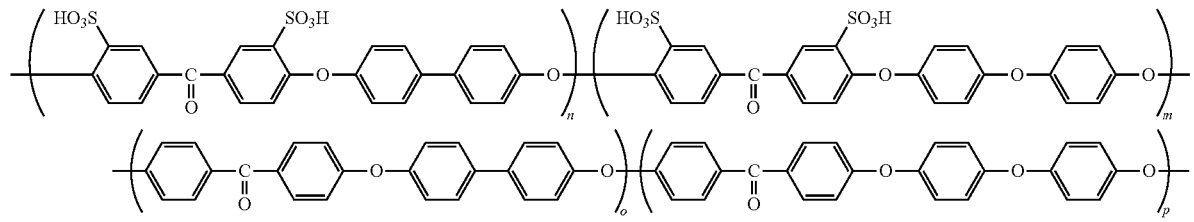
(chemical formula 25AY)
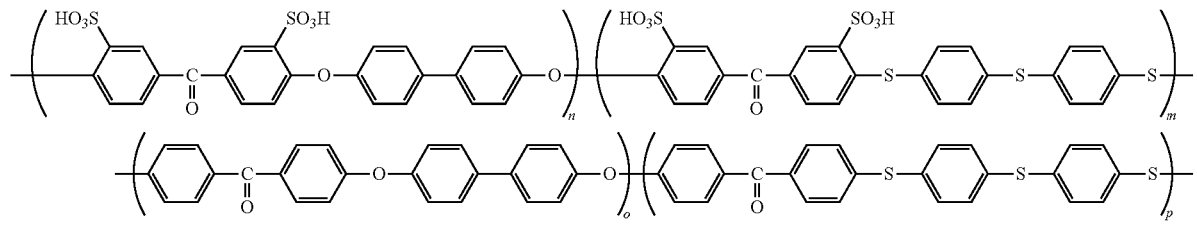
(chemical formula 25AZ)
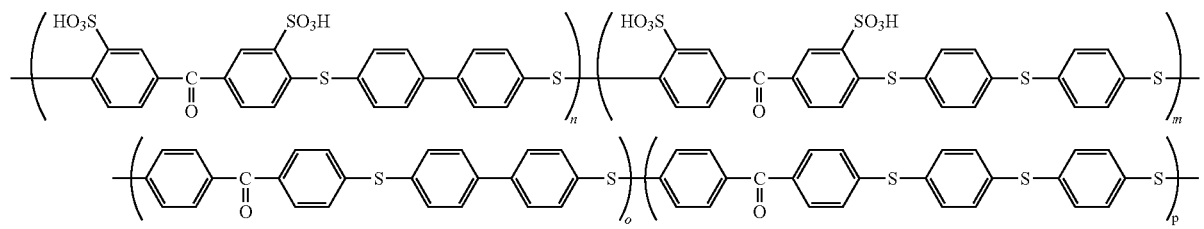
(chemical formula 25BA)
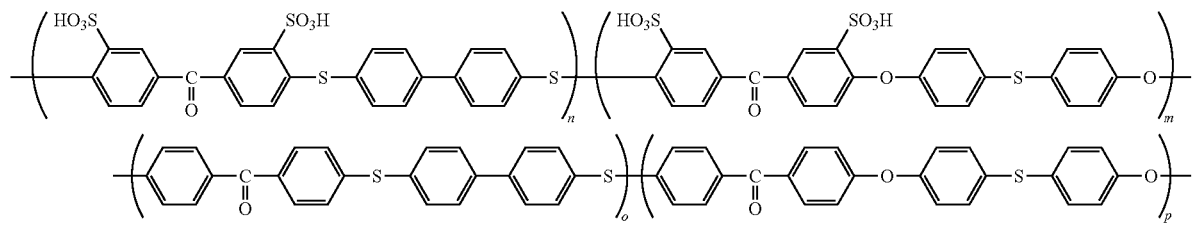
(chemical formula 25BB)
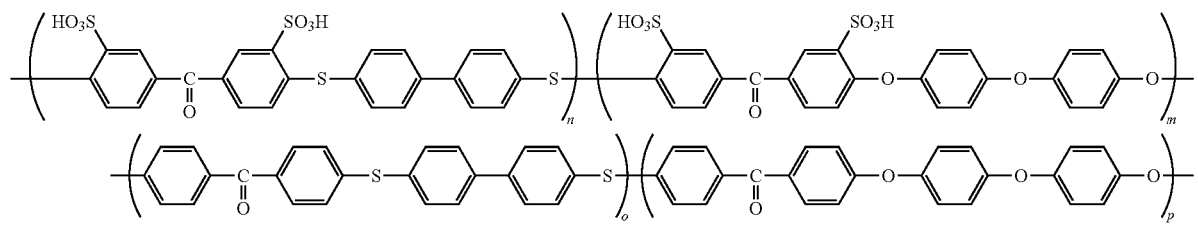
(chemical formula 25BC)
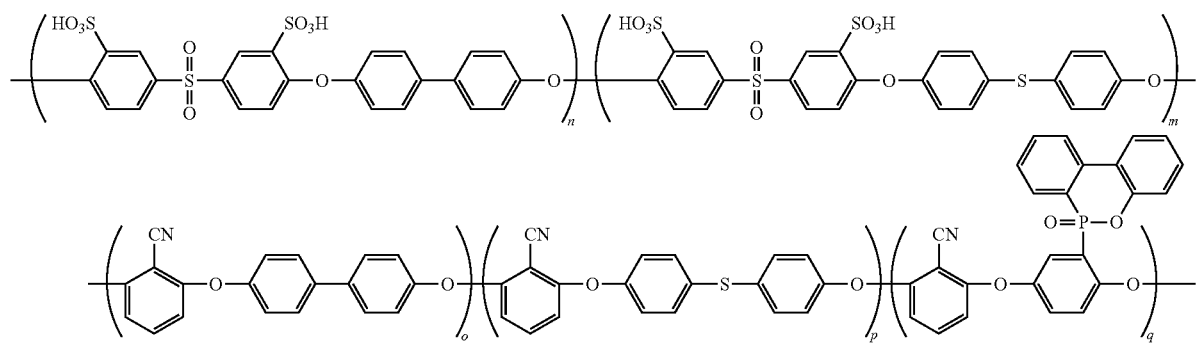

-continued
(chemical formula 25BD)
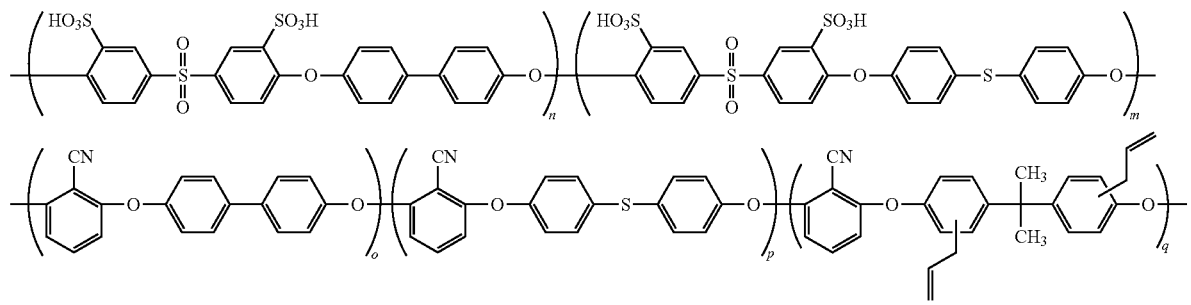
(chemical formula 25BE)
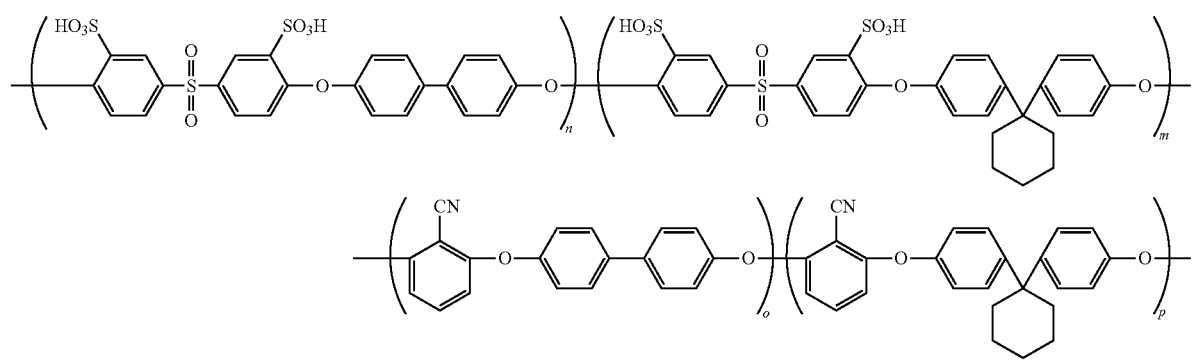
(chemical formula 25BF)
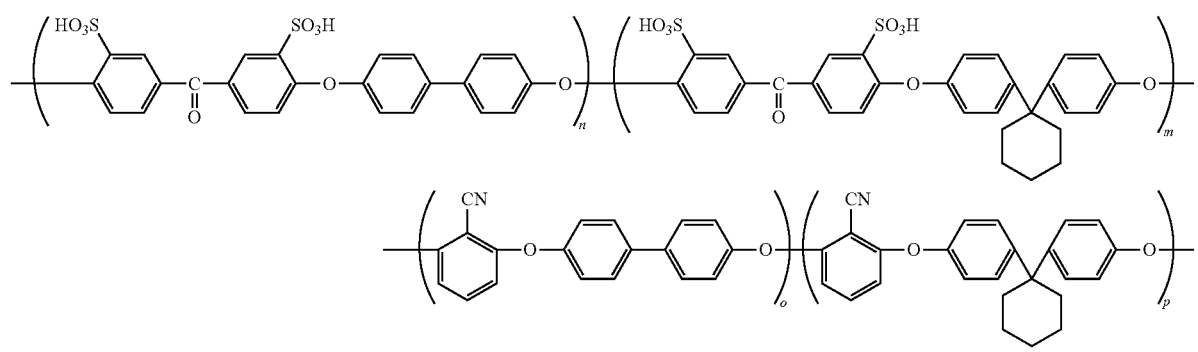
(chemical formula 25BG)
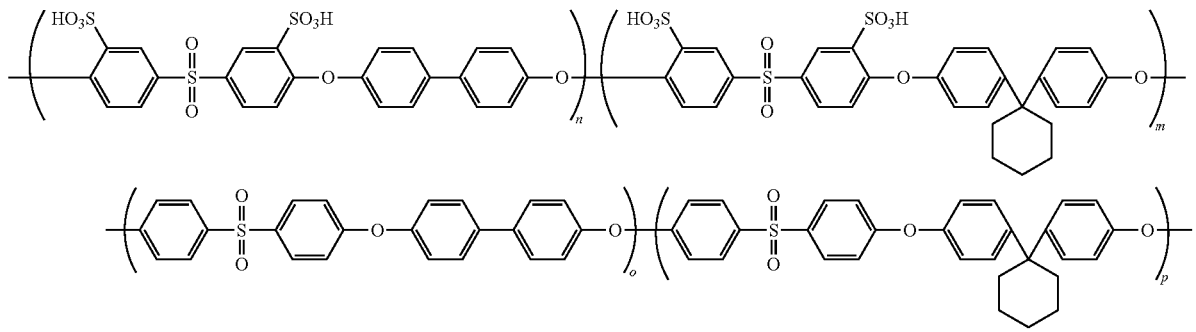
(chemical formula 25BH)
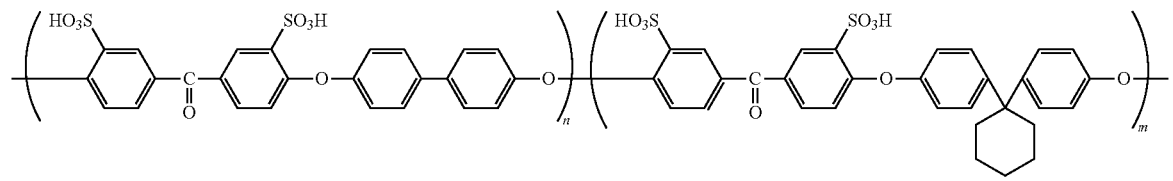

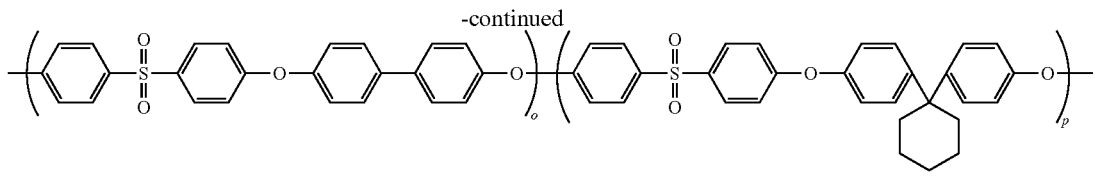

(chemical formula 25BI)

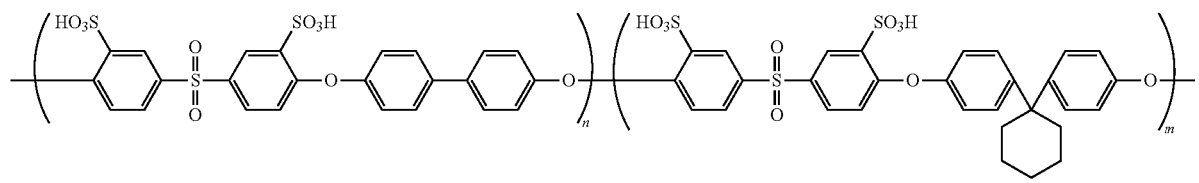

(chemical formula 25BJ)

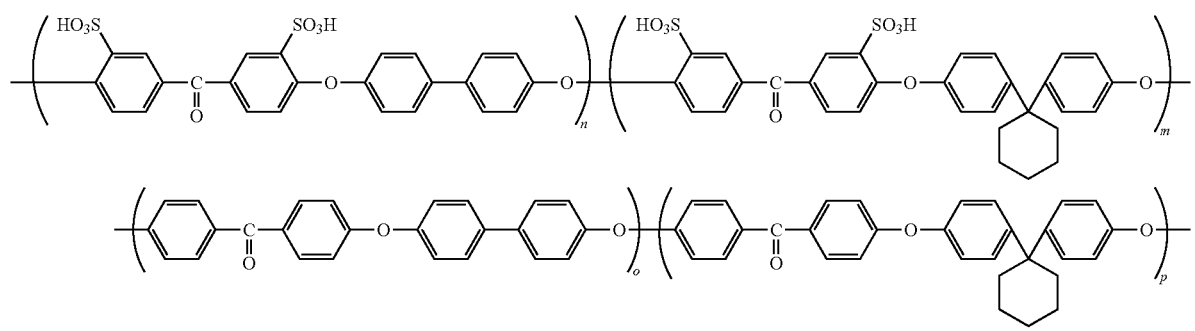

Among the chemical formulas 25A to 25BJ, preferred are the chemical formulas 25A, 25C, 25E, 25J, 25M, 25N, 25BE and 25BF because of excellency in proton conductivity and resistance to swelling, and the chemical formulas 25A, 25C and 25E are more preferable, and the chemical formula 25A is most preferable. In addition, a structure represented by the chemical formula 25BC is preferable due to improved resistance of the polymer to oxidation. Further, the structure represented by the chemical formula 25BD is possible to improve physical characteristics and durability, because of crosslinkability of the polymer.

In the chemical formulas 25A to 25BJ, it is preferable that n, m, o, p, and q satisfy the following mathematical expressions 16 to 18.

$$0.9 \leq (n+m+o+p)/(n+m+o+p+q) \leq 1.0 \quad \text{(mathematical expression 16)}$$

$$0.05 \leq (n+m)/(n+m+o+p) \leq 0.7 \quad \text{(mathematical expression 17)}$$

$$0.01 \leq (m+p)/(n+m+o+p) \leq 0.95 \quad \text{(mathematical expression 18)}$$

In the mathematical expression 16, $(n+m+o+p)/(n+m+o+p+q)$ is preferably within a range of 0.9 to 1.0. $(n+m+o+p)/(n+m+o+p+q)$ is more preferably within a range of 0.95 to 1.0, and furthermore preferably within a range of 0.96 to 1.0. If q is not zero, $(q)/(n+m+o+p+q)$ is more preferably within a range of 0.001 to 0.04.

In the mathematical expression 17, $(n+m)/(n+m+o+p)$ is preferably within a range of 0.05 to 0.7. If $(n+m)/(n+m+o+p)$ is lower than 0.05, there is a tendency that it is difficult to obtain a sufficient proton conductivity. If $(n+m)/(n+m+o+p)$ is higher than 0.7, there is a tendency that it is difficult to be used as a polymer electrolyte membrane due to the greatly increased swellability and acquired water solubility.

In the mathematical expression 18, $(m+p)/(n+m+o+p)$ is preferably within a range of 0.01 to 0.95. If $(m+p)/(n+m+o+p)$ is smaller than 0.01, there is a tendency that it is difficult to obtain a sufficient improving effect, and if larger than 0.95, the swellability of a membrane tends to become larger easily.

In the sulfonic acid group-containing polymer of the present invention, the repeating structures represented by the chemical formulas 5 and 7 bring about effects, such as improved flexibility of a polymer, less destruction due to deformation, improved processability due to decline of glass transition temperature in fabricating a polymer electrolyte membrane/electrode assembly, as well as improved joining properties to electrodes in a polymer electrolyte membrane/electrode assembly, and improved physical durability. Also, the repeating structures represented by the chemical formulas 4 and 6 bring about effects of making the swellability of the whole polymer small or making the methanol permeability small.

In the case where the polymer electrolyte membrane of the present invention is used as a proton exchange membrane for direct methanol fuel cells using directly an aqueous methanol solution as a fuel, it is preferable that the following mathematical expressions 16, 19 and 20 are satisfied.

$$0.9 \leq (n+m+o+p)/(n+m+o+p+q) \leq 1.0 \quad \text{(mathematical expression 16)}$$

$$0.05 \leq (n+m)/(n+m+o+p) \leq 0.5 \quad \text{(mathematical expression 19)}$$

$$0.05 \leq (m+p)/(n+m+o+p) \leq 0.95 \quad \text{(mathematical expression 20)}$$

In the mathematical expression 16, $(n+m+o+p)/(n+m+o+p+q)$ is preferably within a range of 0.9 to 1.0. $(n+m+o+p)/(n+m+o+p+q)$ is more preferably within a range of 0.95 to 1.0, and furthermore preferably within a range of 0.96 to 1.0. If q is not zero, $(q)/(n+m+o+p+q)$ is more preferably within a range of 0.001 to 0.04.

In the mathematical expression 19, $(n+m)/(n+m+o+p)$ is preferably within a range of 0.05 to 0.5. If $(n+m)/(n+m+o+p)$ is lower than 0.05, there is a tendency that a sufficient proton conductivity is not obtained, leading to less output of a fuel cell. If $(n+m)/(n+m+o+p)$ is larger than 0.5, the output of a fuel cell tends to easily decline due to an excessive amount of methanol permeating a membrane. A more preferable range of $(n+m)/(n+m+o+p)$ is 0.07 to 0.4. Further, if the concentration of an aqueous methanol solution to be used as a fuel is low, the larger the $(n+m)/(n+m+o+p)$ is, the larger the proton conductivity, and as a result, the output of a fuel cell is increased. Meanwhile, in the case where a high concentration of aqueous methanol solution is used, if $(n+m)/(n+m+o+p)$ is small, an output decline accompanied by methanol permeation can be suppressed to be able to increase the output of a fuel cell.

In the mathematical expression 20, $(m+p)/(n+m+o+p)$ is preferably within a range of 0.05 to 0.95. If $(m+p)/(n+m+o+p)$ is smaller than 0.05, there is a tendency that insufficient joining between electrodes or catalysts and ion exchange membranes is occurred at the time of such joining, and if higher than 0.95, the swellability tends to become too large. A more preferable range of $(m+p)/(n+m+o+p)$ is 0.2 to 0.8. If $(n+m)/(n+m+o+p)$ is smaller than 0.25, then $(m+p)/(n+m+o+p)$ is preferably within a range of 0.4 to 0.8. Also, if $(n+m)/(n+m+o+p)$ is larger than 0.25, $(m+p)/(n+m+o+p)$ is preferably within a range of 0.1 to 0.5.

In the case where the polymer electrolyte membrane of the present invention is used as a proton exchange membrane for solid polymer type fuel cells using hydrogen as a fuel, it is preferable that the following mathematical expressions 16, 21 and 22 are satisfied.

$$0.9 \leq (n+m+o+p)/(n+m+o+p-q) \leq 1.0 \quad \text{(mathematical expression 16)}$$

$$0.3 \leq (n+m)/(n+m+o+p) \leq 0.7 \quad \text{(mathematical expression 21)}$$

$$0.01 \leq (m+p)/(n+m+o+p) \leq 0.25 \quad \text{(mathematical expression 22)}$$

In the mathematical expression 16, $(n+m+o+p)/(n+m+o+p+q)$ is preferably within a range of 0.9 to 1.0. $(n+m+o+p)/(n+m+o+p+q)$ is more preferably within a range of 0.95 to 1.0, and furthermore preferably within a range of 0.96 to 1.0. If q is not zero, $(q)/(n+m+o+p+q)$ is more preferably within a range of 0.001 to 0.04.

In the mathematical expression 21, $(n+m)/(n+m+o+p)$ is preferably within a range of 0.3 to 0.7. If $(n+m)/(n+m+o+p)$ is smaller than 0.3, there is a tendency that a sufficient proton conductivity is hardly obtained, leading to less output of a fuel cell. If $(n+m)/(n+m+o+p)$ is larger than 0.7, there is a tendency that the swellability of a membrane becomes too large, leading to destruction or output decline. A more preferable range of $(n+m)/(n+m+o+p)$ is 0.35 to 0.7, and further preferably 0.4 to 0.5.

In the mathematical expression 22, a value of $(m+p)/(n+m+o+p)$ is preferably within a range of 0.01 to 0.25. If $(m+p)/(n+m+o+p)$ is smaller than 0.01, there is a tendency that insufficient joining between electrodes or catalysts and proton exchange membranes easily occurs at the time of such joining, and if larger than 0.25, the swellability tends to become too large. A more preferable range of $(m+p)/(n+m+o+p)$ is 0.1 to 0.2.

The sulfonic acid group-containing polymer of the present invention can be obtained by polymerizing a monomer mixture containing, as essential components, compounds represented by chemical formulas 26 to 29 through an aromatic nucleophilic substitution reaction.

(chemical formula 26)

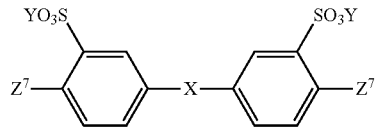

(chemical formula 27)

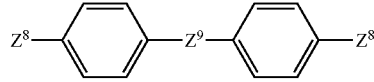

(chemical formula 28)

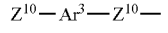

(chemical formula 29)

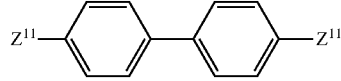

In the chemical formulas 26 to 29, X represents a —S(=O)$_2$— group or a C(=O)-group; Y represents H or a monovalent cation; $Z^7$ and $Z^{10}$ each independently represent any one of a Cl atom, a F atom, an I atom, a Br atom, and a nitro group; $Z^8$ and $Z^{11}$ each independently represent any one of an OH group, an SH group, a —O—NH—C(=O)—R group, and a —S—NH—C(=O)—R group (wherein R represents an aromatic or aliphatic hydrocarbon group); $Z^9$ represents any one of an O atom, an S atom, a —C(CH$_3$)$_2$— group, a —C(CF$_3$)$_2$— group, a —CH$_2$— group and a cyclohexyl group; and Ar$^3$ represents an aromatic group containing an electron withdrawing group such as a sulfone group, a carbonyl group, a sulfonyl group, a phosphine group, a cyano group, a perfluoroalkyl group such as a trifluoromethyl group, a nitro group, or a halogen group, in the molecule.

Specific examples of the compounds represented by the chemical formula 26 include 3,3'-disulfo-4,4'-dichlorodiphenylsulfone, 3,3'-disulfo-4,4'-difluorodiphenylsulfone, 3,3'-disulfo-4,4'-dichlorodiphenylketone, 3,3'-disulfo-4,4'-difluorodiphenylsulfone, 3,3'-disulfobutyl-4,4'-dichlorodiphenylsulfone, 3,3'-disulfobutyl-4,4'-difluorodiphenylsulfone, 3,3'-disulfobutyl-4,4'-dichlorodiphenylketone, 3,3'-disulfobutyl-4,4'-difluorodiphenylsulfone, and a salt of the sulfonic acid group with a monovalent cation species. The monovalent cation species may be, but is not limited to, sodium, potassium, other metal species, various amines, or the like. Among the compounds represented by the chemical formula 26, examples of the compound wherein the sulfonic acid group is in the form of a salt include sodium 3,3'-disulfonate-4,4'-dichlorodiphenylsulfone, sodium 3,3'-disulfonate-4,4'-difluorodiphenylsulfone, sodium 3,3'-disulfonate-4,4'-dichlorodiphenylketone, sodium 3,3'-disulfonate-4,4'-difluorodiphenylsulfone, sodium 3,3'-disulfonate-4,4'-difluorodiphenylketone, potassium 3,3'-disulfonate-4,4'-dichlorodiphenylsulfone, potassium 3,3'-disulfonate-4,4'-difluorodiphenylsulfone, potassium 3,3'-disulfonate-4,4'-dichlorodiphenylketone, potassium 3,3'-disulfonate-4,4'-difluorodiphenylsulfone, potassium 3,3'-disulfonate-4,4'-difluorodiphenylketone, and the like.

Specific examples of the compound represented by the chemical formula 27 include 2,2-bis(4-hydroxyphenyl)propane, bis(4-hydroxyphenyl)methane, 2,2-bis(4-hydroxyphenyl)hexafluoropropane, 4,4'-thiobisbenzenethiol, 4,4'-oxybisbenzenethiol, bis(4-hydroxyphenyl)sulfide, 4,4'-dihydroxydiphenyl ether, 1,1-bis(4-hydroxyphenyl)cyclohexane, and the like, among which 4,4'-thiobisbenzenethiol, bis(4-hydroxyphenyl)sulfide, and 1,1-bis(4-hydroxyphenyl)cyclohexane are preferable.

The monomer having the structure represented by the chemical formula 27 bring about effects, such as improved flexibility of a polymer, less destruction due to deformation, improved processability due to decline of glass transition temperature in fabricating a polymer electrolyte membrane/electrode assembly, as well as improved joining properties to electrodes in a polymer electrolyte membrane/electrode assembly, and improved physical durability.

The compound represented by the chemical formula 28 includes a compound having, on the same aromatic ring, a leaving group in a nucleophilic substitution reaction, such as halogen or a nitro group and a compound having an electron withdrawing group which activates the leaving group. Specific examples include, but are not limited to, 2,6-dichlorobenzonitrile, 2,4-dichlorobenzonitrile, 2,6-difluorobenzonitrile, 2,4-difluorobenzonitrile, 4,4'-dichlorodiphenylsulfone, 4,4'-difluorodiphenylsulfone, 4,4'-difluorobenzophenone, 4,4'-dichlorobenzophenone, decafluorobiphenyl, and the like, as well as other compounds which are active in the aromatic nucleophilic substitution reaction, such as aromatic dihalogenated compounds, aromatic dinitro compounds, and aromatic dicyano compounds.

Examples of the compound represented by the chemical formula 29 include 4,4'-biphenol, 4,4'-dimercaptobiphenol and the like, among which preferred is 4,4'-biphenol.

In the above aromatic nucleophilic substitution reaction, other various activated compounds such as dihalogenated aromatic compounds, dinitro aromatic compounds, bisphenol compounds, or bisthiophenol compounds, may be used as a monomer in combination with the compounds represented by the chemical formulas 26 to 29.

Examples of other bisphenol compounds and bisthiophenol compounds include 9,9-bis(4-hydroxyphenyl)fluorene, 9,9-bis(3-methyl-4-hydroxyphenyl)fluorene, 4,4'-biphenol, bis(4-hydroxyphenyl)sulfone, 1,1-bis(4-hydroxyphenyl)ethane, 2,2-bis(4-hydroxyphenyl)butane, 3,3-bis(4-hydroxyphenyl)pentane, 2,2-bis(4-hydroxy-3,5-dimethylphenyl)propane, bis(4-hydroxy-3,5-dimethylphenyl)methane, bis(4-hydroxy-2,5-dimethylphenyl)methane, bis(4-hydroxyphenyl)phenylmethane, bis(4-hydroxyphenyl)diphenylmethane, hydroquinone, resorcin, bis(4-hydroxyphenyl)ketone, 1,4-benzenethiol, 1,3-benzenethiol, phenolphthalein, and the like, and other various aromatic diols or aromatic dithiols which may be used in polymerization of polyarylene ether-based compounds through the aromatic nucleophilic substitution reaction, though not limited thereto.

In the polymerization of the sulfonic acid group-containing polymer of the present invention through the aromatic nucleophilic substitution reaction, a polymer can be obtained by reacting a compound having the structures represented by the chemical formulas 26 to 29 and, where necessary, other activated dihalogenated aromatic compounds, dinitro aromatic compounds, aromatic diols, or aromatic dithiols in the presence of a basic compound. By adjusting a molar ratio of a reactive halogen group or a nitro group to that of a reactive hydroxy group or a thiol group to an arbitrary ratio, it is possible to adjust a degree of polymerization of the obtained polymer, and it is preferably 0.8 to 1.2, more preferably 0.9 to 1.1, preferably 0.95 to 1.05, and most preferably 1 because a highly polymerized polymer can be obtained.

The polymerization can be performed at a temperature range of 0° C. to 350° C., preferably 50° C. to 250° C. If the temperature is lower than 0° C., the reaction tends not to proceed sufficiently, and if the temperature is higher than 350° C., there is a tendency that decomposition of the polymer also begin to take place. The reaction may be carried out without a solvent, but the reaction is preferably performed in the presence of a solvent. As a usable solvent, N-methyl-2-pyrrolidone, N,N-dimethylacetamide, N,N-dimethylformamide, dimethyl sulfoxide, diphenylsulfone, sulfolane, and the like can be mentioned without limitation, and any solvents can be used as long as they can be used as a stable solvent in the aromatic nucleophilic substitution reaction. These solvents may be used solely or in combination of two or more kinds thereof.

The basic compound includes, but is not limited to, sodium hydroxide, potassium hydroxide, sodium carbonate, potassium carbonate, sodium hydrogen carbonate, potassium hydrogen carbonate and the like, and other basic compounds being able to convert aromatic diols or aromatic dimercapto compounds into active phenoxide structures may be used. If the basic compound is used in not less than 100 mol % to the total amount of a bisphenol compound and a bisthiophenol compound, polymerization proceeds smoothly, and a preferable range is 105 to 125 mol % to the total amount of a bisphenol compound or a bisthiophenol compound. If the amount of the bisphenol compound or bisthiophenol compound becomes too large, it is not desirable because side reactions such as decomposition may occur.

Further, in the above polymerization reaction, it is possible to react a bisphenol compound or a bisthiophenol compound with an isocyanate compound and react directly the resultant carbamoylated compound with an activated dihalogenated aromatic compound or an activated dinitro aromatic compound, without using a basic compound.

In the aromatic nucleophilic substitution reaction, there are cases where water may be produced as a by-product. In such a case, irrespective of a solvent for polymerization, toluene or the like may be made co-present in the reaction system to remove the water azeotropically out of the system. As a method for removing water out of the system, it is also possible to use a water absorbent such as a molecular sieve. When the aromatic nucleophilic substitution reaction is performed in a solvent, a monomer is preferably supplied so as to have a concentration in a range of 5 to 50% by weight of the polymer obtained. If the concentration is lower than 5% by weight, there is a tendency that the degree of polymerization is not easily increased. Meanwhile, if such a concentration is higher than 50% by weight, viscosity of the reaction system becomes too high and post-treatment of the reaction products tends to become difficult. After completion of the polymerization reaction, the solvent is removed by evaporation from the reaction solution and the residue is optionally washed to obtain a desired polymer. In addition, by adding the reaction solution to a solvent having a low solubility against the polymer, the polymer can be precipitated as a solid and the precipitates can be collected by filtration to obtain a polymer. Further, removal of by-produced salts through filtration can give a polymer solution.

The present invention also relates to a sulfonic acid group-containing polymer having a structure represented by the following chemical formula 12.

(chemical formula 12)

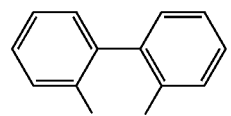
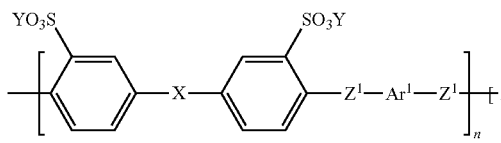

(In the chemical formula 12, X represents an —S(=O)$_2$— group or a C(=O)— group; Y represents H or a monovalent cation; and $Z^1$, $Z^2$ and $Z^3$ each independently represent either of an O atom or an S atom. $Ar^1$ represents a divalent organic group; $Ar^2$, $Ar^3$ and $Ar^4$ represent a divalent organic group not containing an ionic group; and $Ar^5$ represents a trivalent organic group, respectively. n, m and o represent a positive number not less than 1, respectively. The part enclosed by the bracket [ ] represents a minimum repeating unit, and each of the repeating units may be bound at random or each of the same repeating units may be bound continuously.)

In the chemical formula 12, when X is an —S(=O)$_2$— group, polymers or monomers have a high solubility, resulting in easy polymerization or easy processing, and this is desirable. Further, if X is a —C(=O)— group, it is possible to impart photocrosslinkability to a polymer, leading to improvement in mechanical properties and durability, and this is desirable. If $Z^1$, $Z^2$ and $Z^3$ are all O atoms, it is preferable because monomer cost and toxicities are suppressed and coloration or the like in the polymerization hardly takes place. Oxidation resistance in the case of an O atom becomes higher than that in the case of an S atom.

In the chemical formula 12, a case where Y is H (proton) is suitable for proton exchange resins or proton exchange membranes. Y represents H or a monovalent cation, and examples of such a monovalent cation includes, for example, an alkali metal ion such as Na, K, and Li, an ammonium ion, a quaternary ammonium salt, and the like. If the monovalent cation is an alkali metal ion such as Na, K, or Li, heat stability of the sulfonic acid group is increased and thus it is possible to perform high temperature treatment in the processing such as membrane formation, dissolution, and molding, thereby to enhance the processability of a polymer. The sulfonic acid group in the form of an alkali metal salt can be converted into a free sulfonic acid group by treating a polymer with a strong acid such as sulfuric acid, hydrochloric acid or perchloric acid, or with an aqueous solution thereof. A polymer having a sulfonic acid group shows a high proton conductivity and can be used as proton exchange resins or proton exchange membranes. Among them, proton exchange membranes can also be used as electrolyte membranes for solid polymer-type fuel cells. In addition, by using the polymer of the present invention, it is possible to obtain a fuel cell having excellent performance.

$Ar^2$ in the chemical formula 12 is preferably an aromatic group having an electron withdrawing group and not containing an ionic group. Examples of such electron withdrawing group include a sulfone group, a carbonyl group, a sulfonyl group, a phosphine group, a cyano group, a perfluoroalkyl group such as a trifluoromethyl group, a nitro group, a halogen group, and the like, and among them, the cyano group, sulfone group and carbonyl group are preferable. Further, $Ar^1$ and $Ar^2$ are each preferably one or more kind(s) of group(s) selected from the structures represented by the following chemical formulas 8 to 11.

(chemical formula 8)

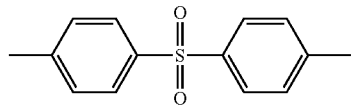

(chemical formula 9)

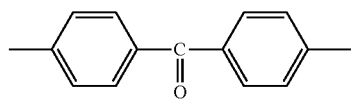

(chemical formula 10)

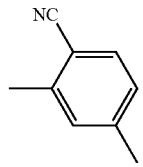

(chemical formula 11)

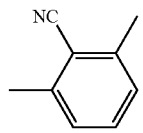

The structure of the chemical formula 8 is preferable because of its increased solubility in a solvent. Further, the structure of the chemical formula 9 is preferable because it is possible to impart photocrosslinkability to a polymer. In addition, the structures of the chemical formulas 10 and 11 are preferable because of reduction in the swellability of a polymer. Among the structures of the chemical formulas 8 to 11, the structures of the chemical formulas 10 and 11 are preferable, and the structure of the chemical formula 11 is most preferable.

It is preferable that $Ar^4$ in the chemical formula 12 is any one of structures represented by the following chemical formulas 8 to 11 and 30 and it may contain a plurality of structures among these.

(chemical formula 8)

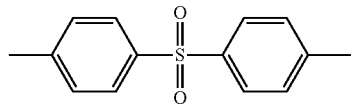

(chemical formula 9)

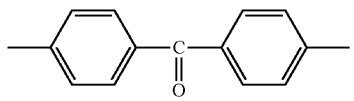

(chemical formula 10)

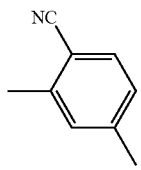

(chemical formula 11)

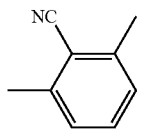

(In the chemical formula 30, X represents an —S(=O)$_2$— group or a C(=O)— group, and Y represents H or a monovalent cation, respectively.)

(chemical formula 30)

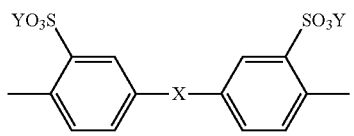

Ar$^1$ and Ar$^3$ in the chemical formula 12 may be a known arbitrary divalent group which is mainly composed of an aromatic group and not containing an ionic group, and a preferable example is a divalent aromatic group selected from the group consisting of the following chemical formulas 31A to 31N.

(chemical formula 31A)

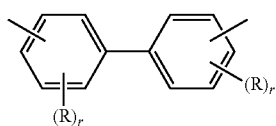

(chemical formula 31B)

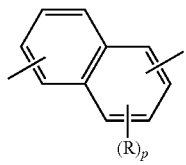

(chemical formula 31C)

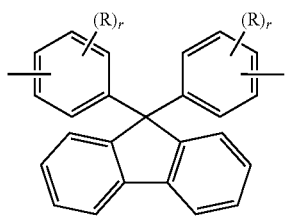

(chemical formula 31D)

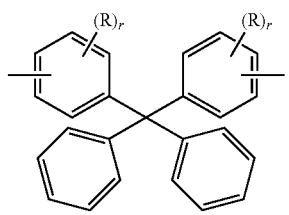

(chemical formula 31E)

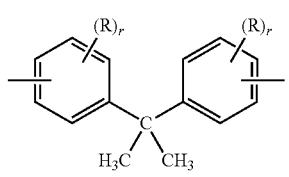

(chemical formula 31F)

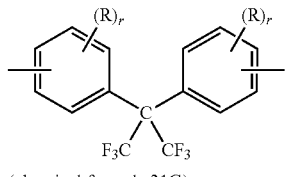

(chemical formula 31G)

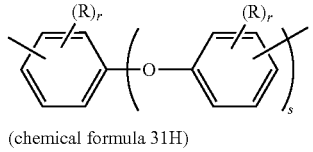

(chemical formula 31H)

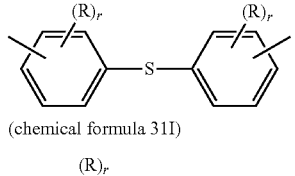

(chemical formula 31I)

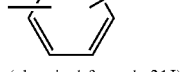

(chemical formula 31J)

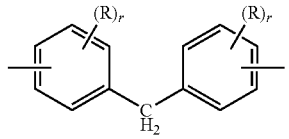

(chemical formula 31K)

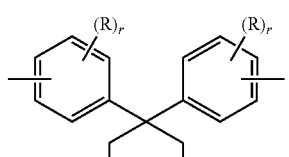

(chemical formula 31L)

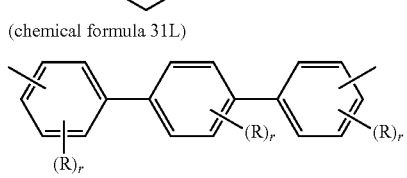

(chemical formula 31M)

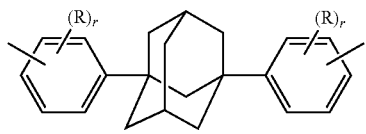

(chemical formula 31N)

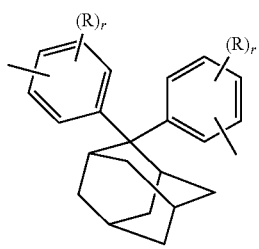

(In the chemical formulas 31A to 31N, R represents a methyl group; r represents an integer of 0 to 2; and s represents an integer not less than 1, respectively.)

Since it is sometimes difficult to obtain a polymer with a high molecular weight in the case of a polymer wherein r is 1 or 2, r is preferably zero. More preferable structures of $Ar^1$ and $Ar^3$ are structures represented by the following chemical formulas 14 to 16 and 32, and among these, they may be composed of a single structure or a plurality of structures.

(chemical formula 14)

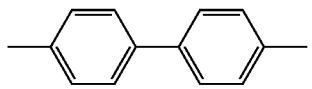

(chemical formula 15)

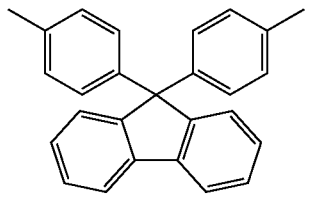

(chemical formula 16)

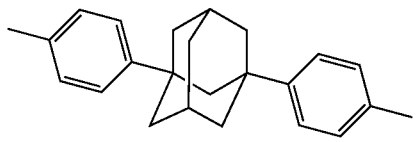

(chemical formula 32)

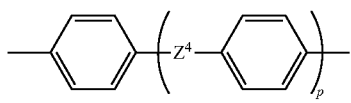

(In the chemical formula 32, $Z^4$ represents either of an O atom or S atom; and P represents an integer not less than 1, respectively.)

In the chemical formula 32, p is preferably an integer of 1 to 50, and more preferably an integer of 1 to 20. Further, $Z^4$ in the chemical formula 32 is preferably an S atom. Although n is preferably 1, an integer of 2 to 20 is also preferable, because it makes a softening temperature of a polymer lower to improve the joining property to an electrode. In the case where $Ar^1$ and $Ar^3$ are composed of a plurality of structures, such structures preferably are any one of the structures represented by the chemical formulas 14 to 16 and the structure represented by the chemical formula 32. By introducing the structure represented by the chemical formula 32, a softening temperature of a polymer is lowered, thereby to bring about advantages in improvement in the joining property to electrodes as well as improvement in physical durability of fuel cells. In that case, the ratio of the structure represented by the chemical formula 32 is preferably 1 to 99 mol %, more preferably within a range of 5 to 80 mol %, and furthermore preferably within a range of 10 to 75 mol %.

$Ar^5$ in the chemical formula 12 may be an aromatic group not containing an ionic group, and is preferably a structure represented by the following chemical formula 33.

(chemical formula 33)

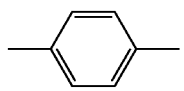

In the present invention, it is preferable that n, m and o in the chemical formula 12 satisfy the following mathematical expressions 23 and 24.

$$0.05 \leq n/(n+m) \leq 0.8 \qquad \text{(mathematical expression 23)}$$

$$0.001 \leq o/(n+m+o) \leq 0.1 \qquad \text{(mathematical expression 24)}$$

If n/(n+m) is smaller than 0.05, ion conductivity is greatly lowered, and use as ion exchange membranes or proton exchange membranes tends to become difficult. If n/(n+m) is larger than 0.8, the swellability is remarkably increased, and this tends to be a cause for problems such as deterioration of mechanical properties at the time of humidification of ion exchange membranes or proton exchange membranes, and dissolution into water. n/(n+m) is more preferably within a range of 0.3 to 0.7, furthermore preferably within a range of 0.35 to 0.5.

If o/(n+m+o) is smaller than 0.001, there is a tendency that it is difficult to obtain a sufficient stabilization effect, and if larger than 0.1, this tends to easily cause problems such as deterioration of ion conductivity in ion exchange membranes or proton exchange membranes and lowered polymerization degree. o/(n+m+o) is more preferably within a range of 0.005 to 0.05, further preferably within a range of 0.01 to 0.04.

The present invention also relates a sulfonic acid group-containing polymer having a structure represented by the following chemical formula 13.

(chemical formula 13)

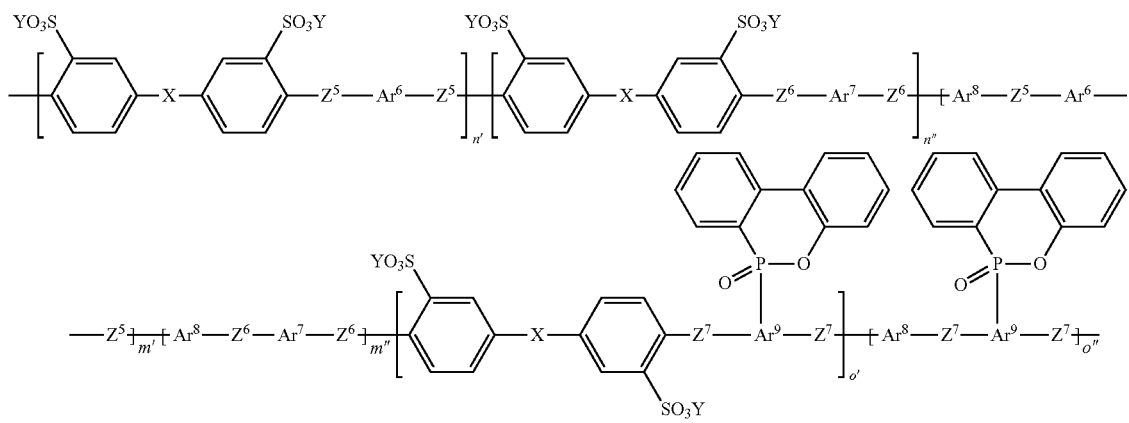

(In the chemical formula 13, X represents an —S(=O)$_2$— group or a C(=O)— group; Y represents H or a monovalent cation; and Z$^5$, Z$^6$, and Z$^7$ each independently represent either of an O atom or an S atom. Ar$^6$ represents any one of structures represented by the following chemical formulas 14 to 16;

(chemical formula 14)

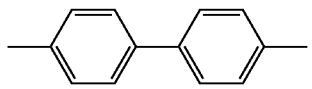

(chemical formula 15)

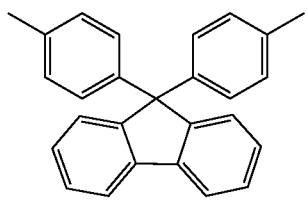

(chemical formula 16)

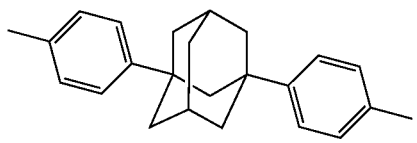

Ar$^7$ represents any one of structures represented by the following chemical formulas 17 to 24;

(chemical formula 17)

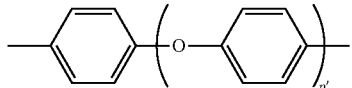

(chemical formula 18)

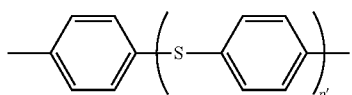

-continued (chemical formula 19)

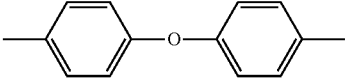

(chemical formula 20)

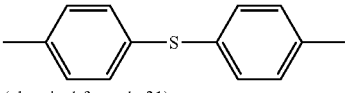

(chemical formula 21)

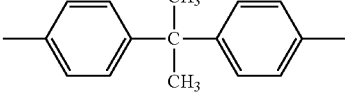

(chemical formula 22)

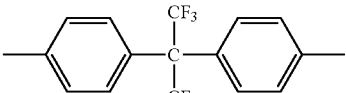

(chemical formula 23)

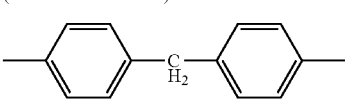

(chemical formula 24)

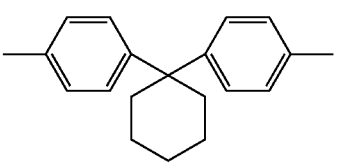

(In the chemical formulas 17 and 18, p' is an integer of 2 to 50.)

Ar$^8$ represents any one of structures represented by the following chemical formulas 8 to 11;

(chemical formula 8)

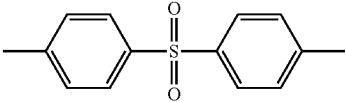

(chemical formula 9)

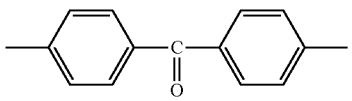

(chemical formula 10)

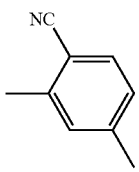

(chemical formula 11)

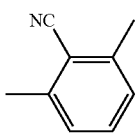

and $Ar^9$ represents a trivalent organic group, respectively. n', n", m' and m" represent an integer not less than 1, respectively, and o' and o" represent an integer not less than zero, respectively, provided that o' and o" are not zero simultaneously. The part enclosed by the bracket [ ] represents a minimum repeating unit, and each of the repeating units may be bound at random or each of the same repeating units may be bound continuously.)

In the chemical formula 13, if X is an —S(=O)$_2$— group, the solubility of a monomer or a polymer is increased, and thus such a case is preferable because of easy polymerization and easy processing. In addition, if X is a —C(=O)— group, this case makes it possible to impart photocrosslinkability to a polymer, leading to desirable improvements of mechanical characteristics and durability. If $Z^1$, $Z^2$ and $Z^3$ are all O atoms, this case is preferable because monomer cost and toxicities are suppressed, and coloration during the polymerization does not occur easily. The oxidation resistance of the polymer in the case of an S atom becomes higher rather than that of an O atom.

In the chemical formula 13, a case where Y is H (proton) is suitable for proton exchange resins or proton exchange membranes. Y represents H or a monovalent cation, and examples of such a monovalent cation includes alkali metal ions such as Na, K, and Li, an ammonium ion, a quaternary ammonium salt, and the like. If the monovalent cation is an alkali metal ion such as Na, K, or Li, heat stability of a sulfonic acid group is increased and thus it is possible to perform high temperature treatment in processing such as membrane formation, dissolution, and molding, thereby to enhance the processability of a polymer. The sulfonic acid group in the form of an alkali metal salt may be converted into a free sulfonic acid group by treating a polymer with a strong acid such as sulfuric acid, hydrochloric acid or perchloric acid, or an aqueous solution thereof. A polymer having a sulfonic acid group shows a high proton conductivity and can be used as proton exchange resins or proton exchange membranes. Among them, proton exchange membranes can also be used as an electrolyte for solid polymer-type fuel cells, and by using the polymer of the present invention, it is possible to obtain a fuel cell having excellent performance.

$Ar^8$ in the chemical formula 13 is preferably an aromatic group having an electron withdrawing group and not containing an ionic group. Examples of such an electron withdrawing group include a sulfone group, a carbonyl group, a sulfonyl group, a phosphine group, a cyano group, a perfluoroalkyl group such as a trifluoromethyl group, a nitro group, a halogen group, and the like, and among them, a cyano group, a sulfone group and a carbonyl group are preferable. Further, $Ar^8$ is preferably one or more kind(s) of group(s) selected from the structures represented by the following chemical formulas 8 to 11.

(chemical formula 8)

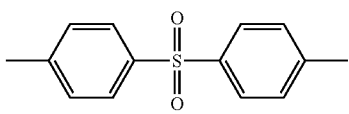

(chemical formula 9)

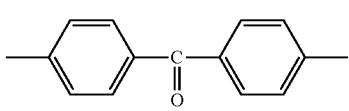

(chemical formula 10)

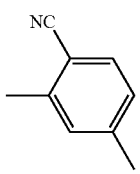

(chemical formula 11)

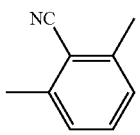

In the case of the structure of the chemical formula 8, solubility in a solvent is increased, and accordingly the structure of the chemical formula 8 is preferable. In addition, in the case of the structure of the chemical formula 9, photocrosslinkability can be imparted to a polymer, and thus the structure of the chemical formula 9 is preferable. Further, in the case of the structures of the chemical formulas 10 and 11, the swellability of a polymer becomes smaller and thus the structures of the chemical formulas 10 and 111 are preferable. Among the chemical formulas 8 to 11, the structures of the chemical formulas 10 and 11 are preferable and the structure of the chemical formula 11 is most preferable.

$Ar^6$ in the chemical formula 13 may be a known arbitrary divalent group which is mainly composed of an aromatic group and not containing an ionic group, and a preferable example is a divalent aromatic group selected from the group consisting of the following chemical formulas 34A to 34G.

(chemical formula 34A)

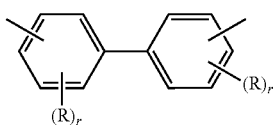

(chemical formula 34B)

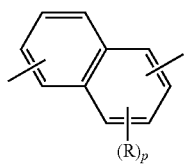

(chemical formula 34C)

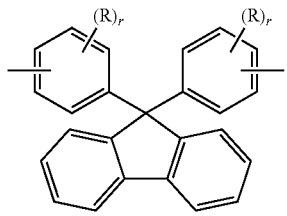

(chemical formula 34D)

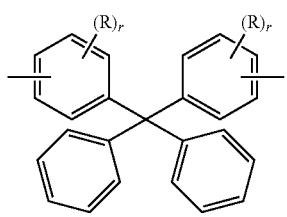

(chemical formula 34E)

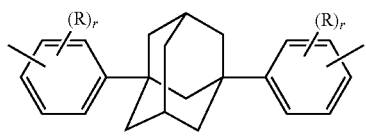

(chemical formula 34F)

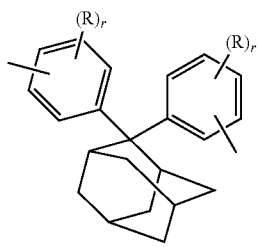

(chemical formula 34G)

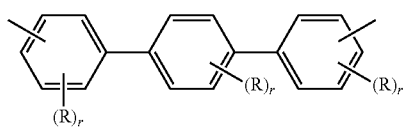

(In the chemical formulas 34A to 34G, R represents a methyl group and r represents an integer of 0 to 2, respectively.)

Since it is sometimes difficult to obtain a polymer with a high molecular weight in the case of a polymer wherein r is 1 or 2, r is preferably zero. More preferable structures of $Ar^6$ are structures represented by the following chemical formulas 14 to 16, and among these, they may be composed of a single structure or a plurality of structures. Particularly, the structure of the chemical formula 14 or the chemical formula 15 is more preferable, and the structure of the chemical formula 14 is furthermore preferable.

(chemical formula 14)

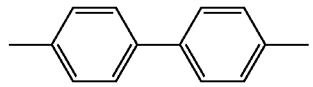

(chemical formula 15)

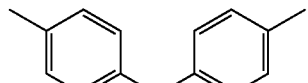

(chemical formula 16)

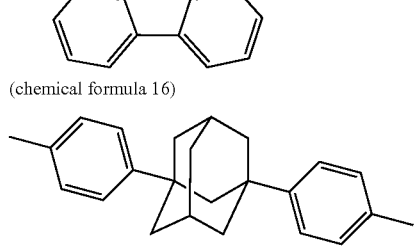

$Ar^7$ in the chemical formula 13 may be a known arbitrary divalent group which is mainly composed of an aromatic group and not containing an ionic group, and a preferable example is a divalent aromatic group selected from the group consisting of the following chemical formulas 35A to 35H.

(chemical formula 35A)

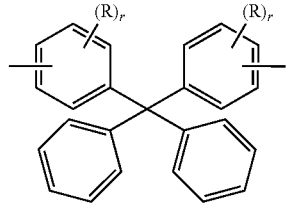

(chemical formula 35B)

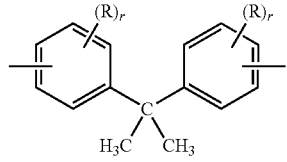

(chemical formula 35C)

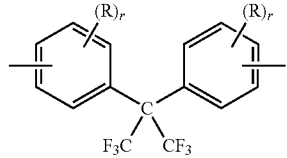

(chemical formula 35D)

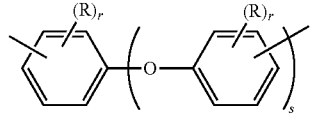

(chemical formula 35E)

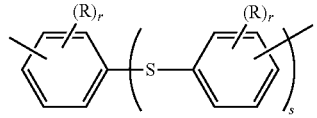

(chemical formula 35F)

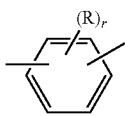

(chemical formula 35G)

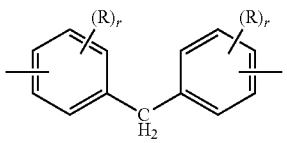

(chemical formula 35H)

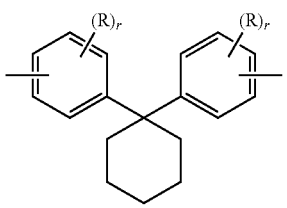

(In the chemical formulas 35A to 35H, R represents a methyl group, r represents an integer of 0 to 2, and s represents an integer not less than 1, respectively.)

Since it is sometimes difficult to obtain a polymer with a high molecular weight in the case of a polymer wherein r is 1 or 2, r is preferably zero. More preferable structures of $Ar^7$ are structures represented by the following chemical formulas 17 to 24, and among these, they may be composed of a single structure or a plurality of structures. Particularly, the structures of the chemical formulas 17 to 20 are more preferable, and the structure of the chemical formula 19 or the chemical formula 20 is furthermore preferable.

(chemical formula 17)

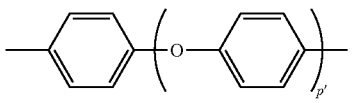

(chemical formula 18)

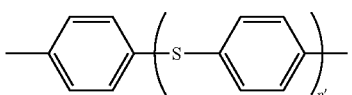

(chemical formula 19)

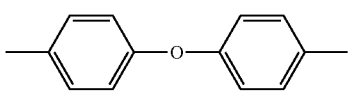

(chemical formula 20)

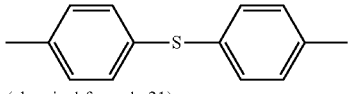

(chemical formula 21)

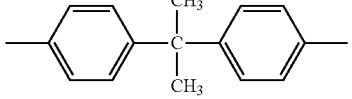

(chemical formula 22)

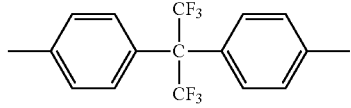

(chemical formula 23)

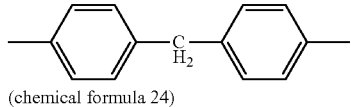

(chemical formula 24)

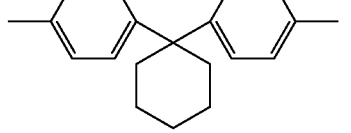

(In the chemical formula 17 and the chemical formula 18, p' represents an integer of 2 to 50.)

p' in the chemical formula 17 or the chemical formula 18 is more preferably within a range of 2 to 20, and furthermore preferably within a range of 2 to 10. A plurality of kinds of structures wherein each p' differs may be included.

When $R^7$ is one or more kind(s) of structure(s) selected from the group consisting of the chemical formulas 17 to 18, glass transition temperature of a polymer declines. As a result, processability in fabricating a polymer electrolyte membrane/electrode assembly is improved, and, at the same time, the joining property to an electrode in a polymer electrolyte membrane/electrode assembly is increased, thereby to give advantages such as improved physical durability. In that case, the ratio of the structures represented by the chemical formulas 17 to 20 is preferably 1 to 99 mol % to the total structures represented by $Ar^6$, $Ar^7$ and $Ar^9$, more preferably 5 to 80 mol %, and furthermore preferably within a range of 10 to 75 mol %.

$Ar^9$ in the chemical formula 13 represents a trivalent organic group which is preferably an aromatic group, and is preferably a structure represented by the following chemical formula 33. That is, the $Ar^9$ is preferably a phenyl group.

(chemical formula 33)

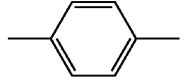

$Z^7$ in the chemical formula 13 is preferably an O atom.

It is preferable that n', n", m', m", o' and o" in the chemical formula 13 satisfy the following mathematical expressions 4 to 7;

$0.05 \leq (n'+n")/(n'+n"+m'+m") \leq 0.8$ (mathematical expression 4)

$0.001 \leq (o'+o")/(n'+n"+m'+m"+o'+o") \leq 0.4$ (mathematical expression 5)

$0.01 \leq (n'/n") \leq 100$ (mathematical expression 6)

$0.01 \leq (m'/m") \leq 100$ (mathematical expression 7)

If (n'+n")/(n'+n"+m'+m") is smaller than 0.05, ion conductivity is remarkably decreased, and use as ion exchange membranes and proton exchange membranes tends to become difficult. If (n'+n")/(n'+n"+m'+m") is larger than 0.8, the swellability is remarkably increased, and this tends to be a cause for problems such as deterioration of mechanical properties at the time of humidification of ion exchange membranes or proton exchange membranes, and dissolution into water. (n'+n")/(n'+n"+m'+m") is more preferably within a range of 0.3 to 0.7, and furthermore preferably within a range of 0.35 to 0.5.

If (o'+o")/(n'+n"+m'+m"+o'+o") is smaller than 0.001, there is a tendency that it is difficult to obtain a sufficient stabilization effect, and if larger than 0.1, this tends to cause problems such as deterioration of ion conductivity in ion exchange membranes or proton exchange membranes, and lowered polymerization degree. (o'+o")/(n'+n"+m'+m"+o'+o") is more preferably within a range of 0.005 to 0.05, furthermore preferably within a range of 0.01 to 0.04.

It is preferable that n'/n" and m'/m" are each within a range of 0.01 to 100, furthermore preferably within a range of 0.11 to 10.

The sulfonic acid group-containing polymer represented by the chemical formula 12 or 13 has, in the molecule, a structure represented by the following chemical formula 36.

(chemical formula 36)

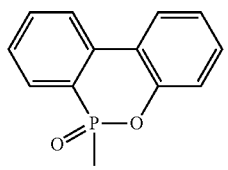

Resistance to radicals is improved by having the structure represented by the chemical formula 36, and when the polymer is used, for example, as a polymer electrolyte membrane for fuel cells, excellent durability is imparted thereto.

By using the sulfonic acid group-containing polymer of the present invention having the structure represented by the chemical formula 12 or 13, a polymer electrolyte membrane excellent in ion conductivity, durability and processability can be obtained without causing a decrease in ion conductivity, bleed out of additives, elution, and the like.

A polymer electrolyte membrane containing the sulfonic acid group-containing polymer of the present invention is able to join with an electrode and a catalyst to make a polymer electrolyte membrane/electrode assembly. Also, the sulfonic acid group-containing polymer of the present invention can be applied, as an adhesive to electrodes and catalysts, to a membrane other than the polymer electrolyte membrane of the present invention. When the sulfonic acid group-containing polymer of the present invention is used as an adhesive, it is preferable that Y in the chemical formulas 12 and 13 is H and the sulfonic acid group is an acid type. If a polymer wherein the sulfonic acid group is in the form of a salt with a cation is used, acid treatment after joining may convert the sulfonic acid group into an acid type.

In the structure represented by the chemical formula 12 or 13, the sulfonic acid group-containing polymer of the present invention may take any sequence order of individual repeating units, including alternating polymer type, block polymer type and random polymer type. In the case of a block copolymer, ion conductivity and water absorptivity tend to become high.

Examples of preferable structures of the sulfonic acid group-containing polymer of the present invention are specifically shown in the following chemical formulas 37A to 37BX, but the scope of the present invention is not limited to these.

(chemical formula 37A)

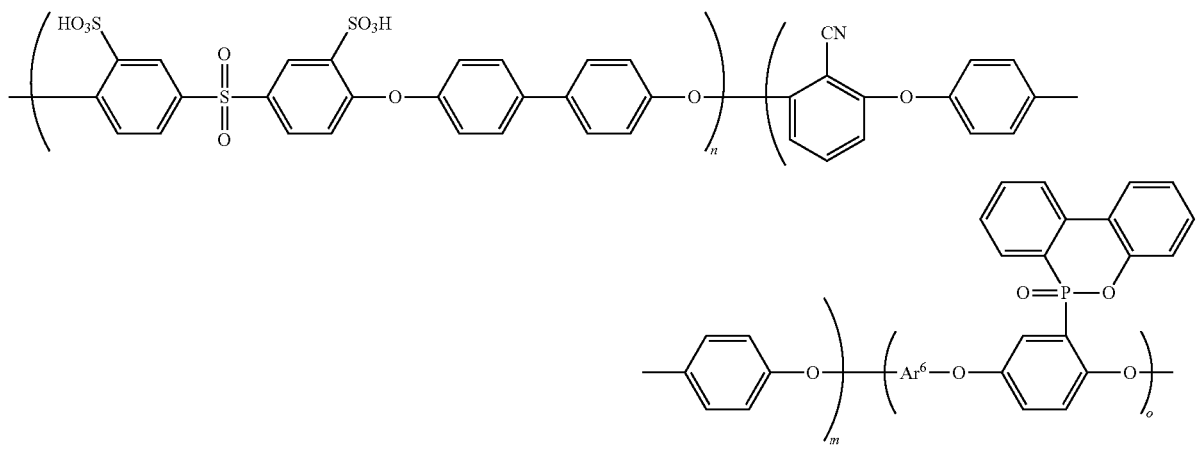

(chemical formula 37B)

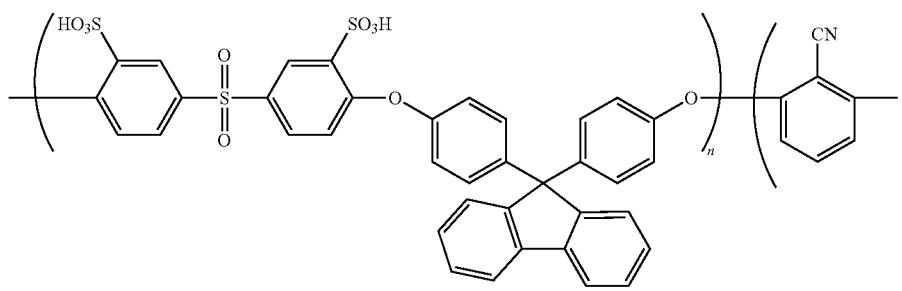

-continued
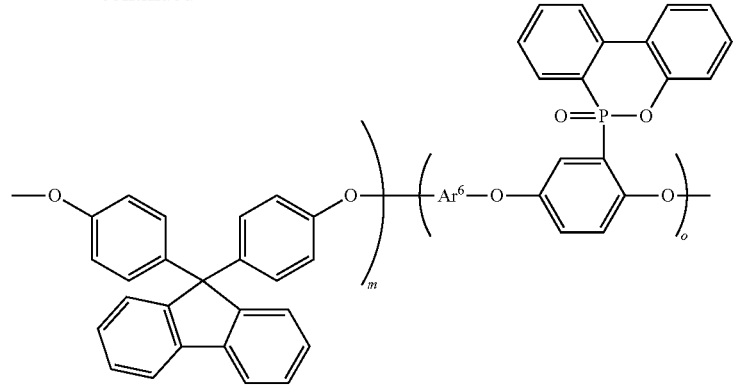
(chemical formula 37C)
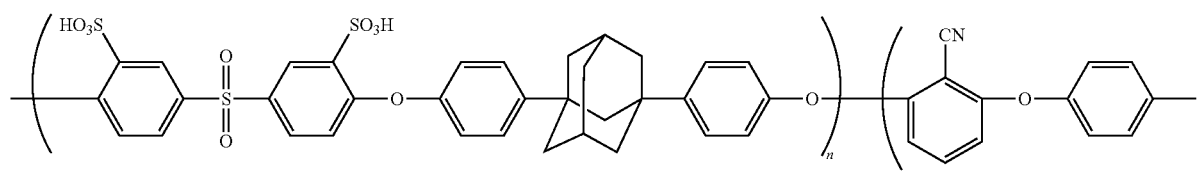
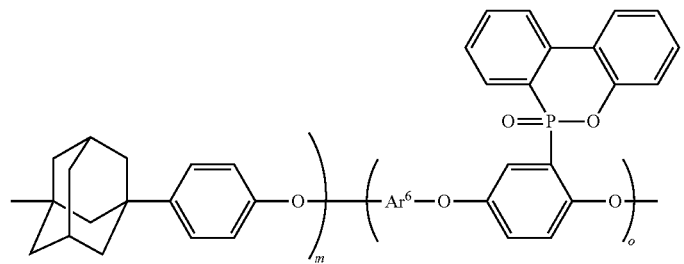
(chemical formula 37D)
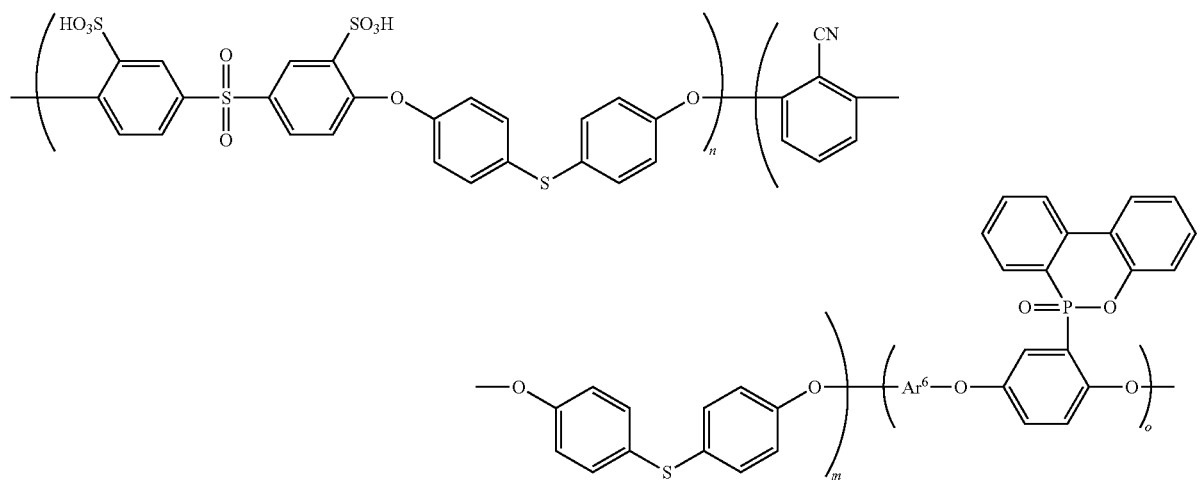

Ar⁶ represents either of
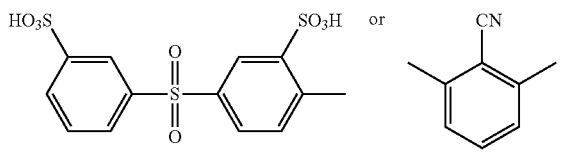
(chemical formula 37E)
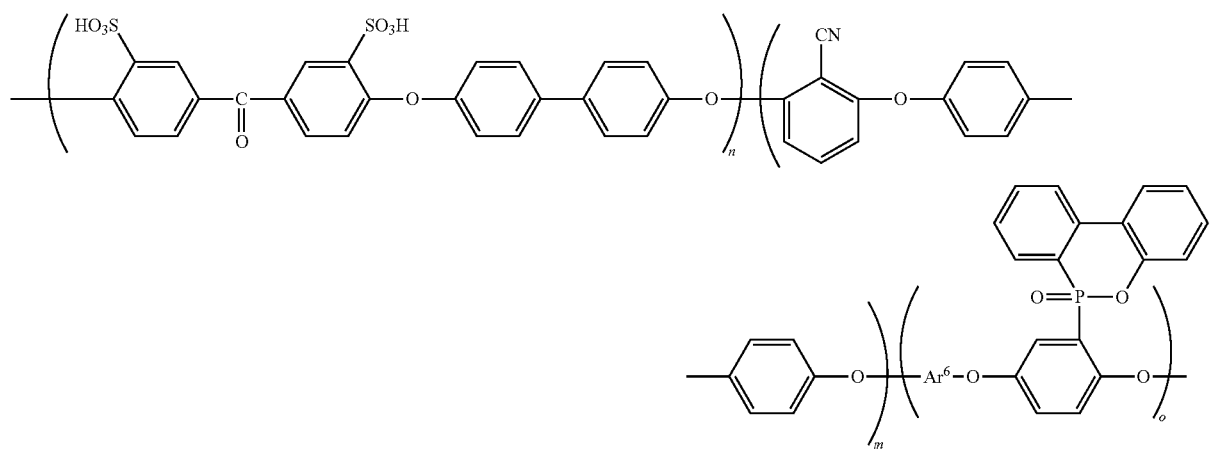
(chemical formula 37F)
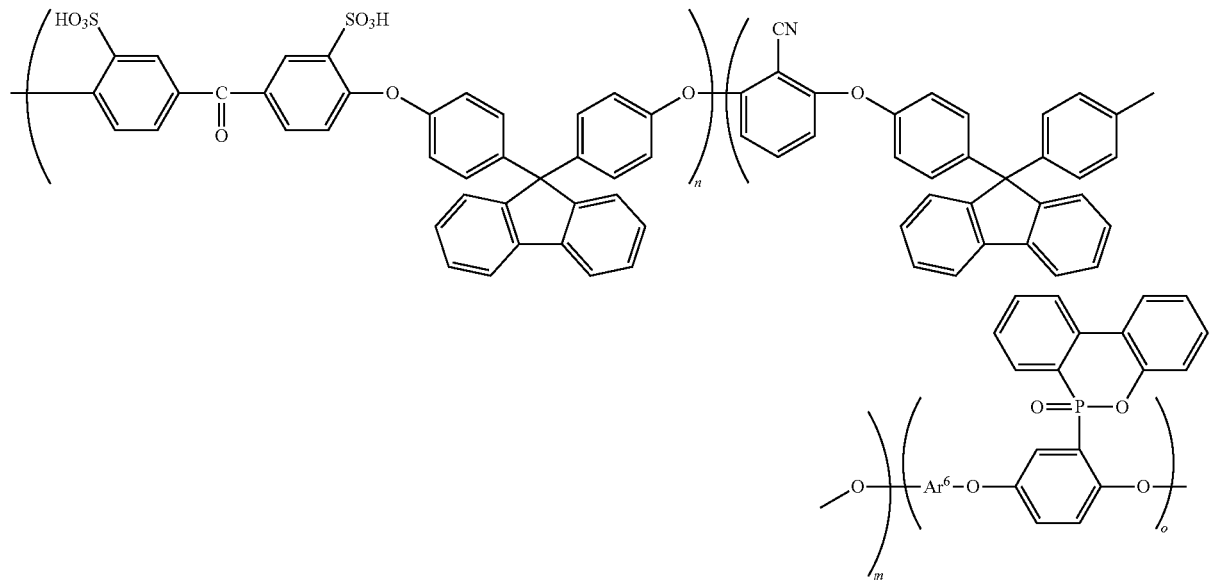
(chemical formula 37G)
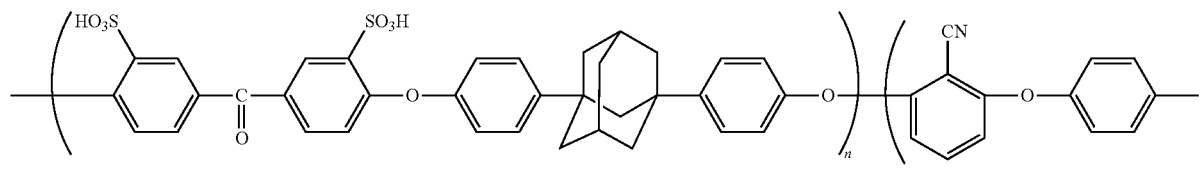

-continued
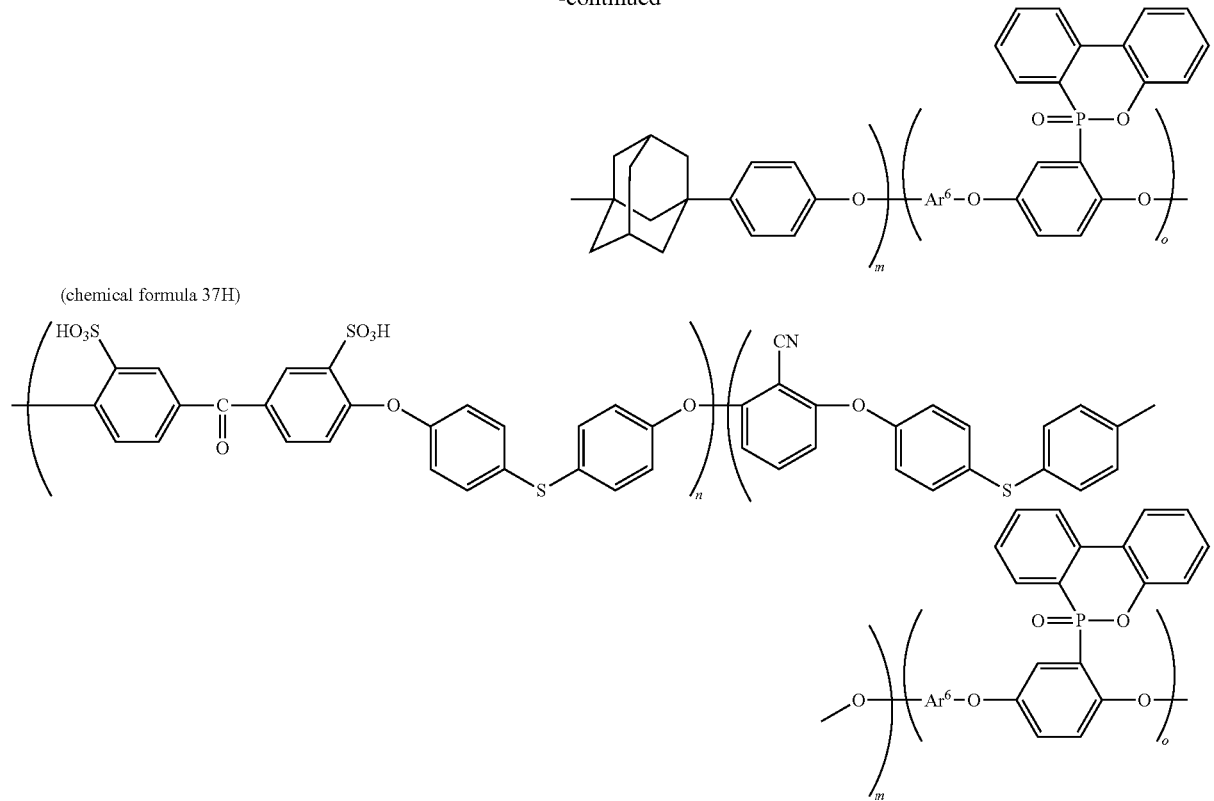
(chemical formula 37H)
Ar⁶ represents either of
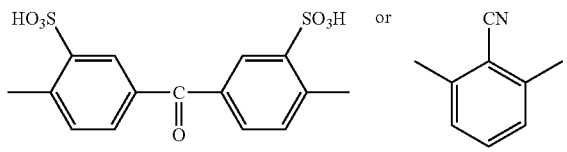
(chemical formula 37I)
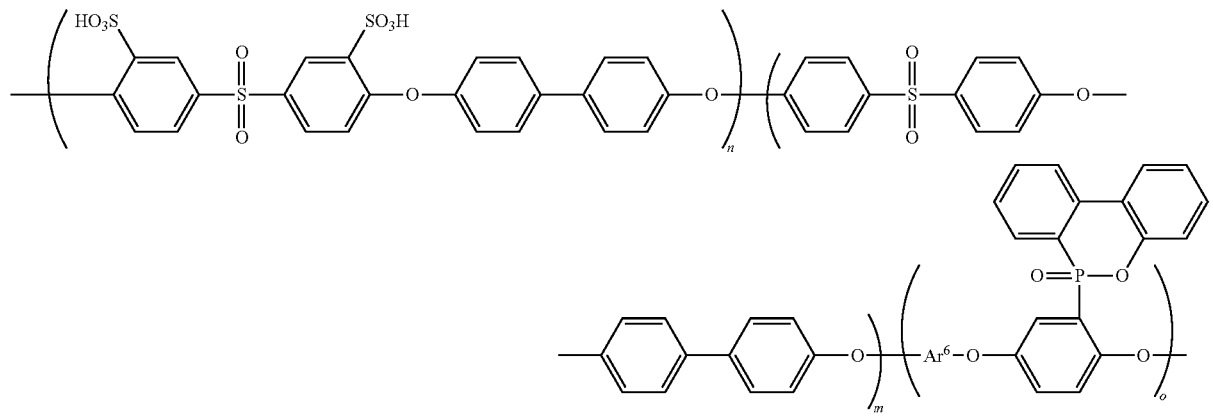

(chemical formula 37J)
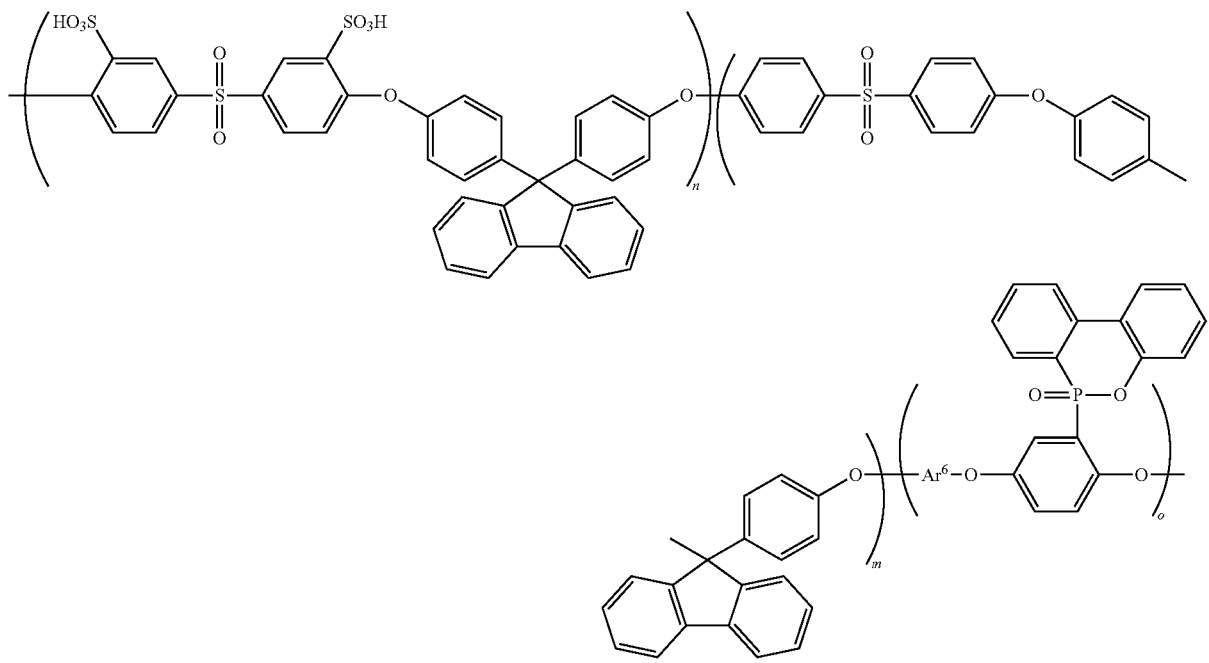
(chemical formula 37K)
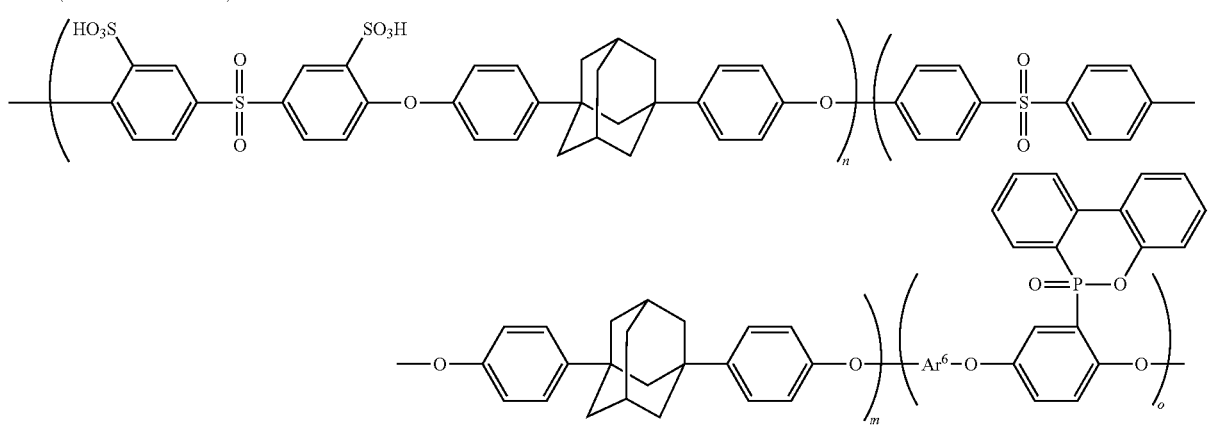
(chemical formula 37L)
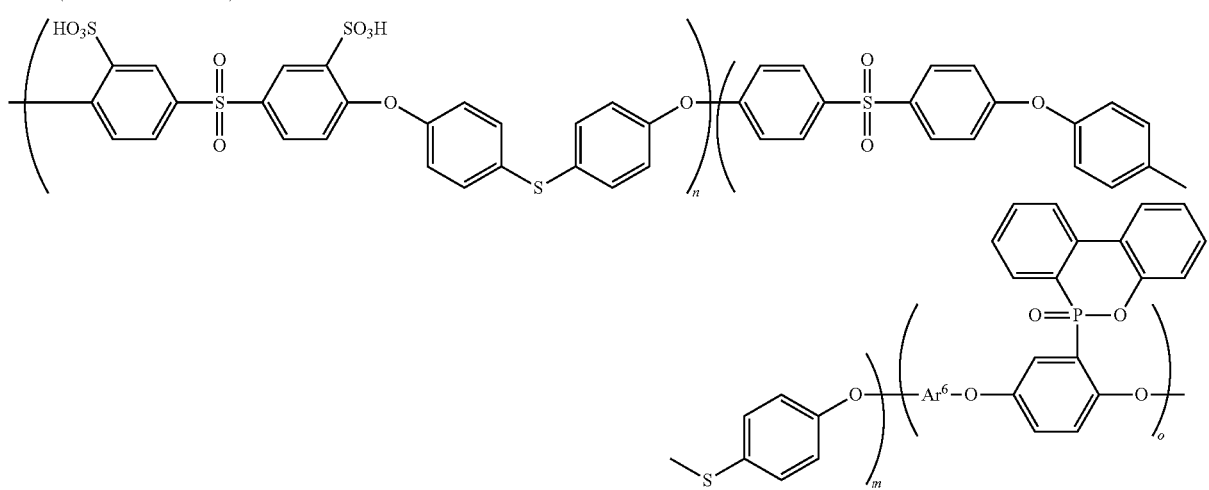

Ar⁶ represents either of
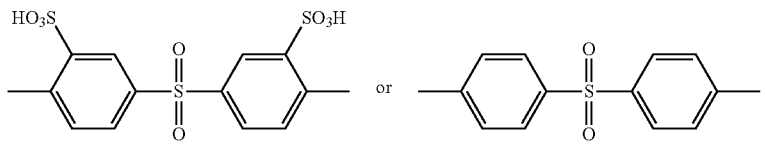
(chemical formula 37M)
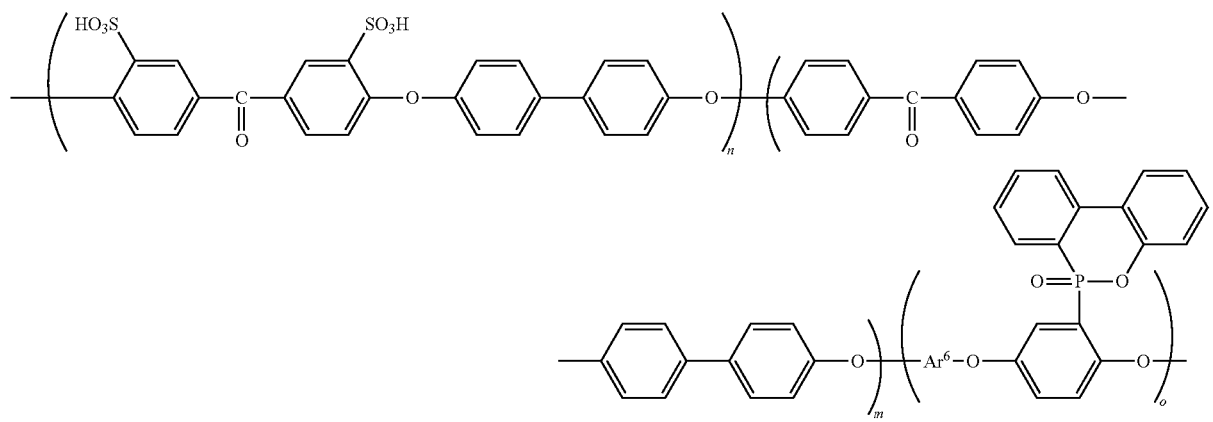
(chemical formula 37N)
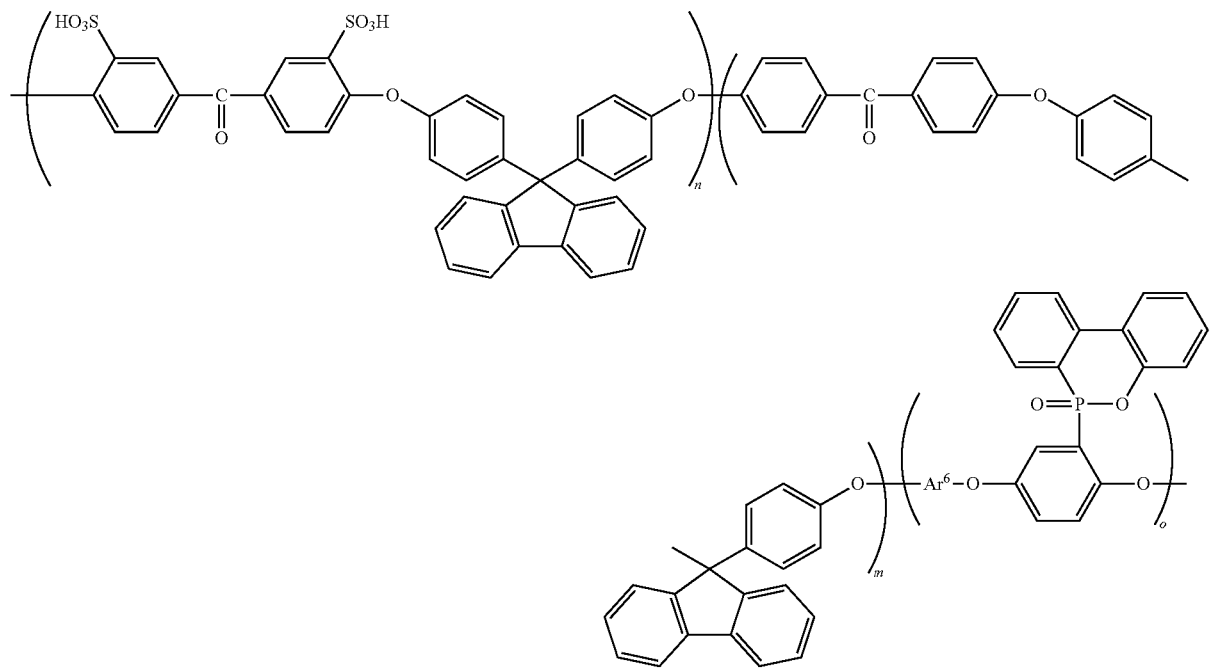
(chemical formula 37O)
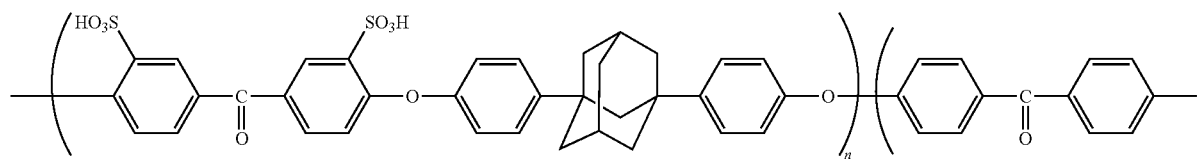

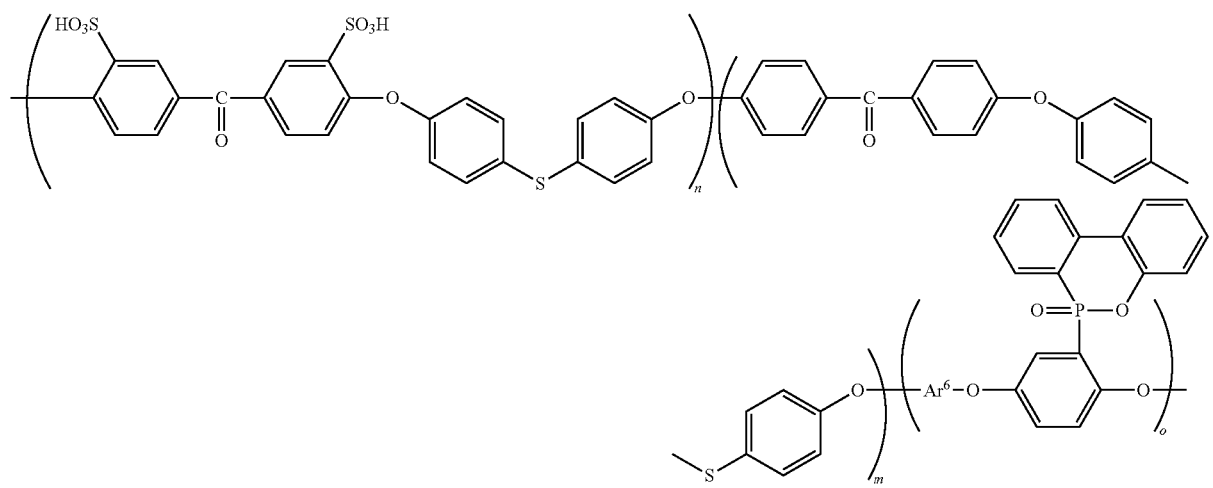
(chemical formula 37P)
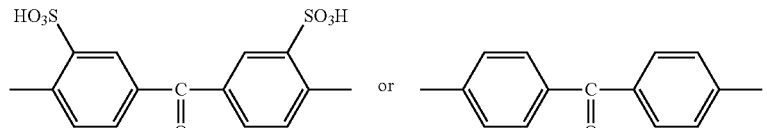
Ar⁶ represents either of
(chemical formula 37Q)
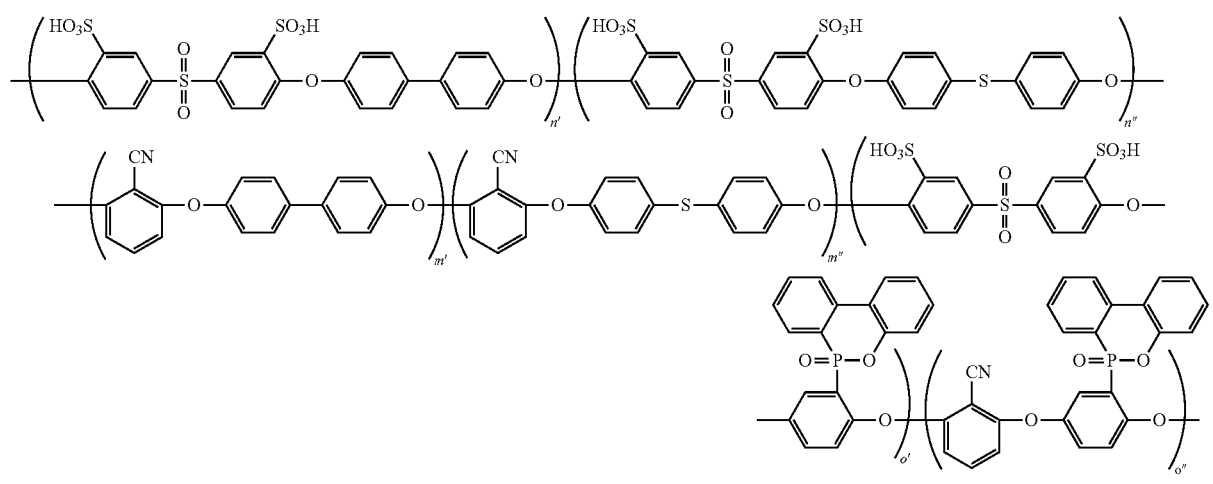
(chemical formula 37R)
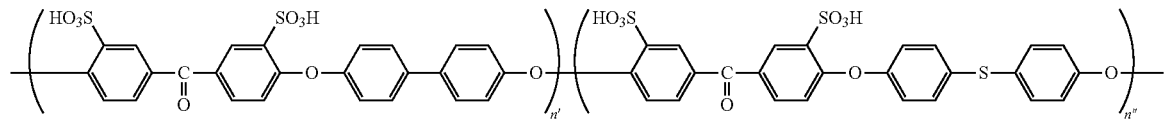

-continued
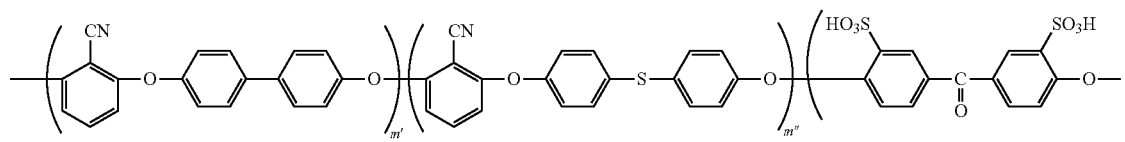
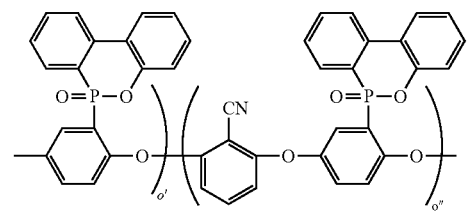
(chemical formula 37S)
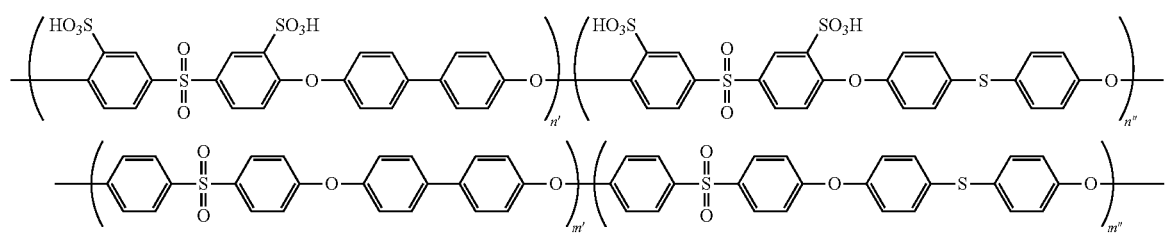
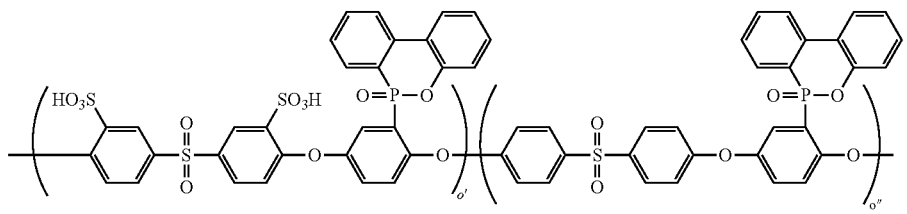
(chemical formula 37T)
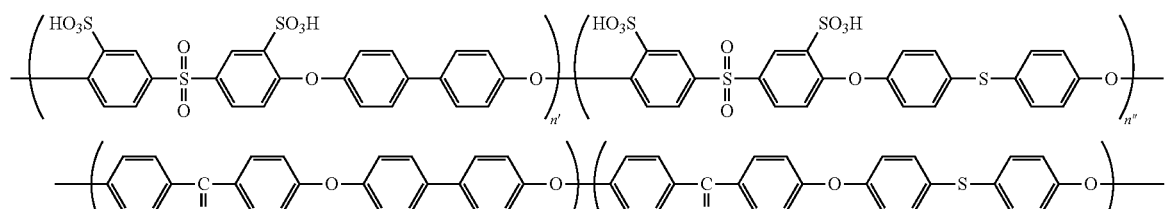
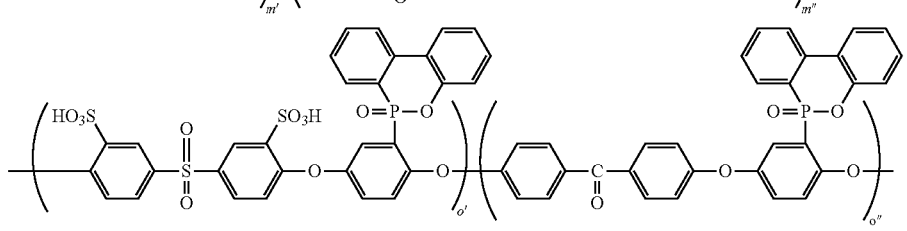
(chemical formula 37U)
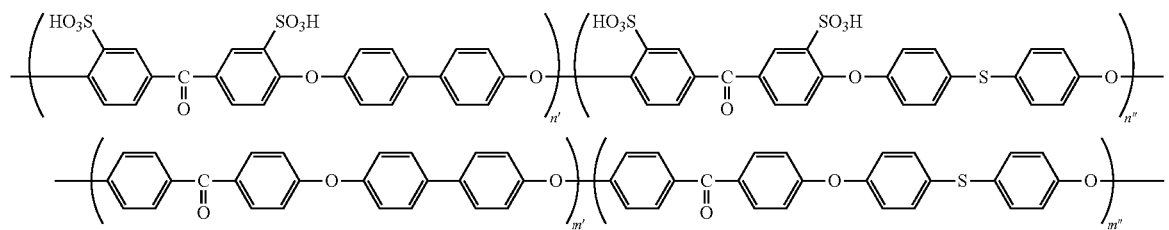

-continued
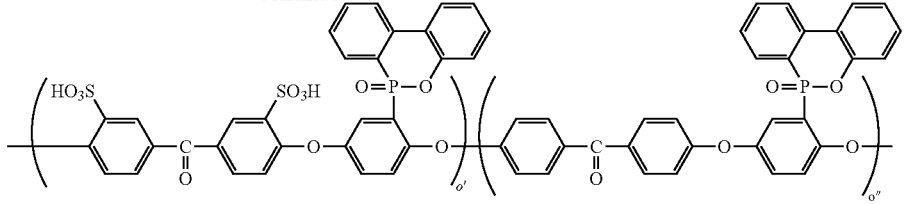
(chemical formula 37V)
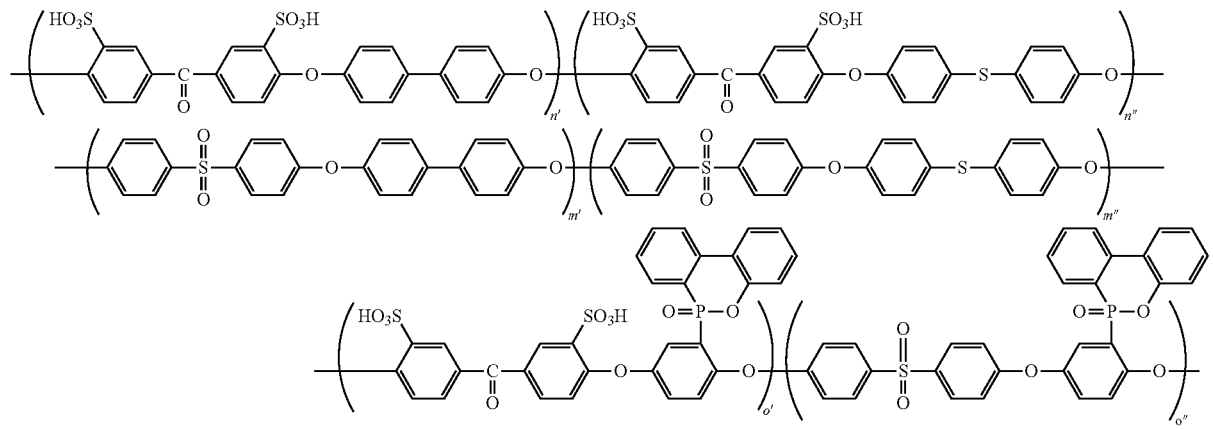
(chemical formula 37W)
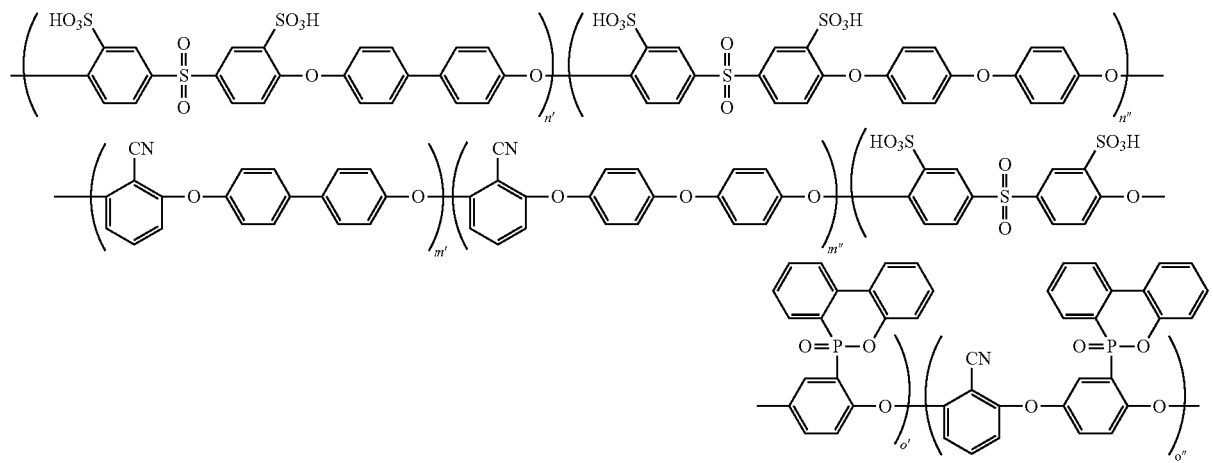
(chemical formula 37X)
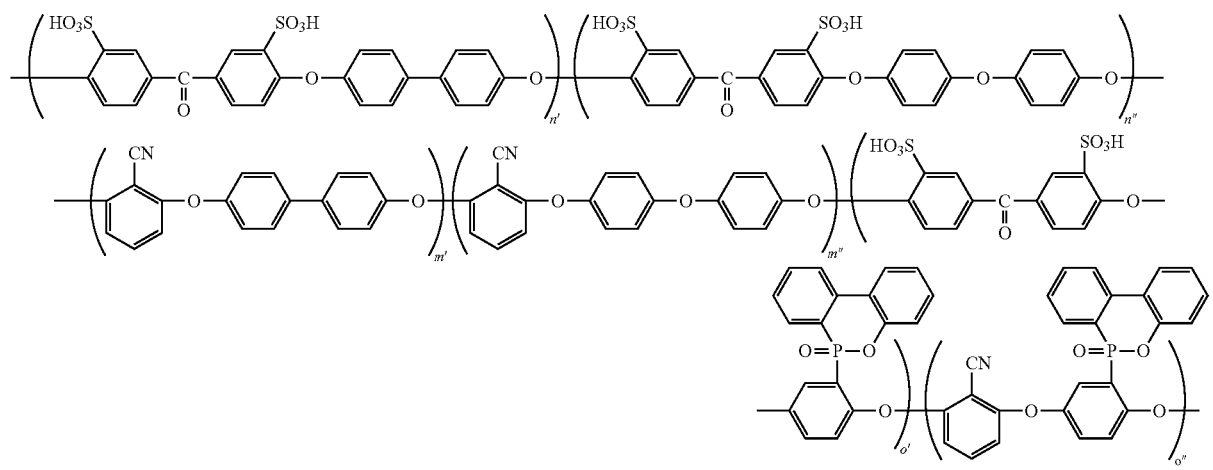

-continued
(chemical formula 37Y)
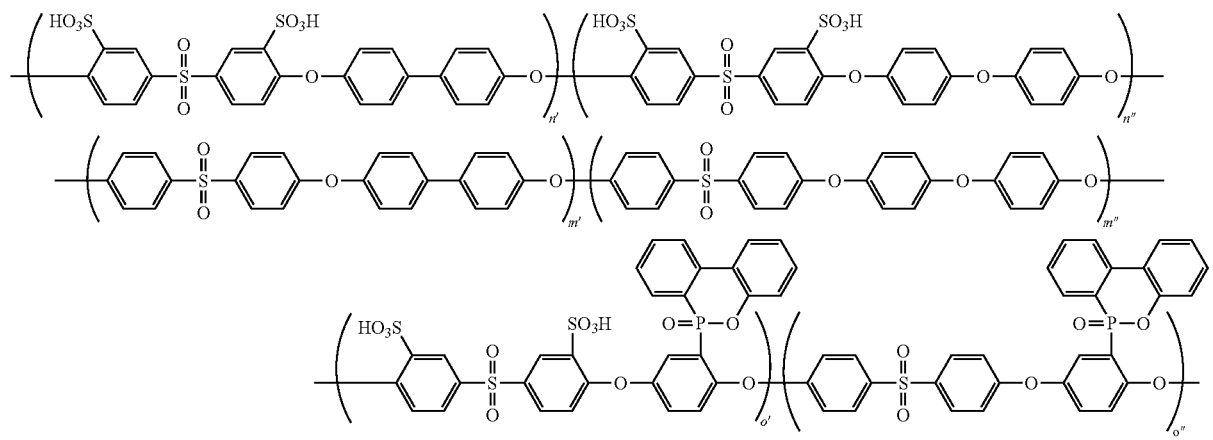
(chemical formula 37Z)
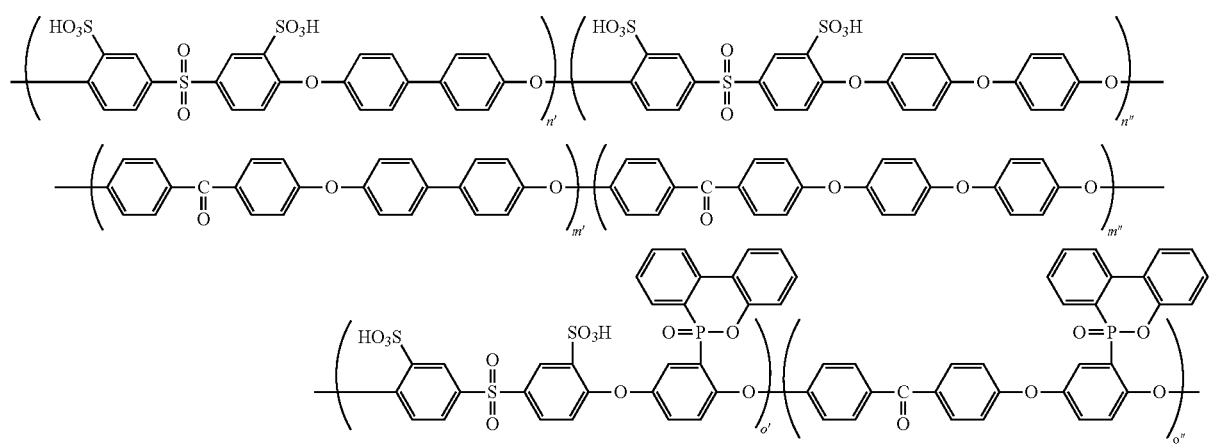
(chemical formula 37AA)
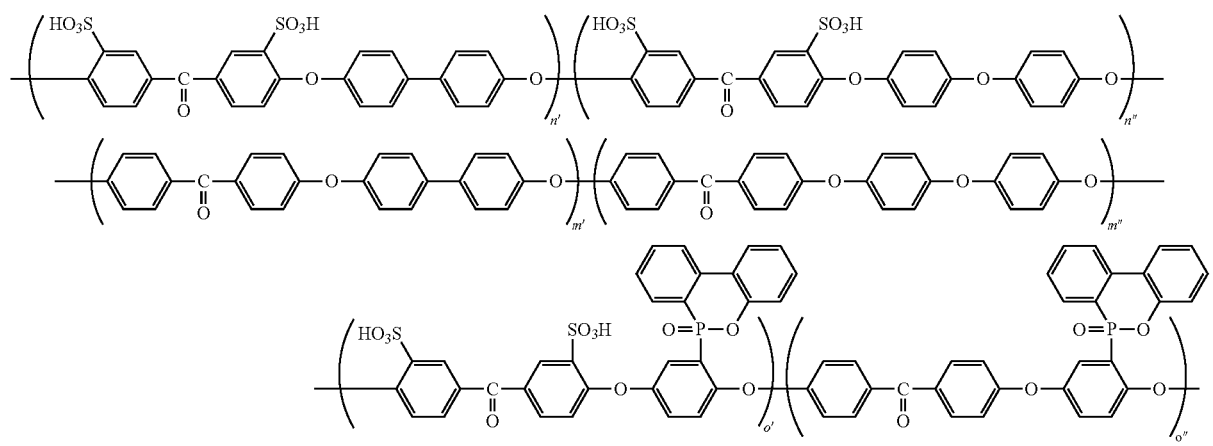
(chemical formula 37AB)
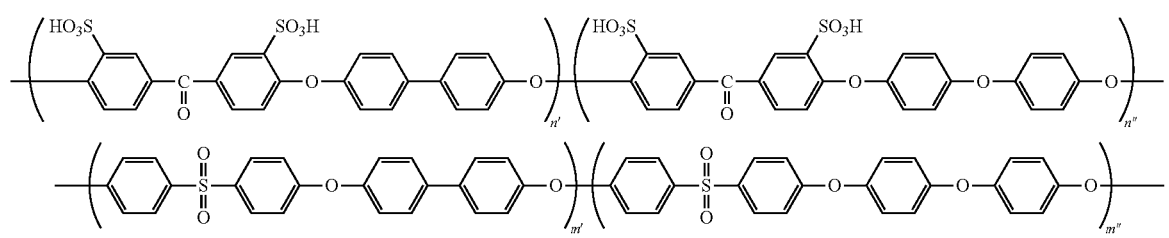

-continued
(chemical formula 37AC)
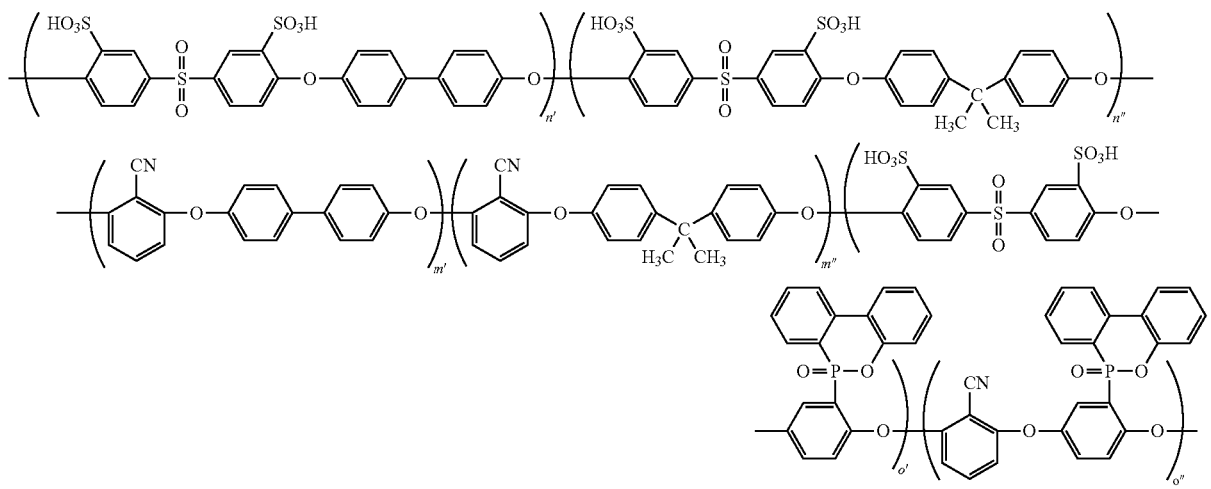
(chemical formula 37AD)
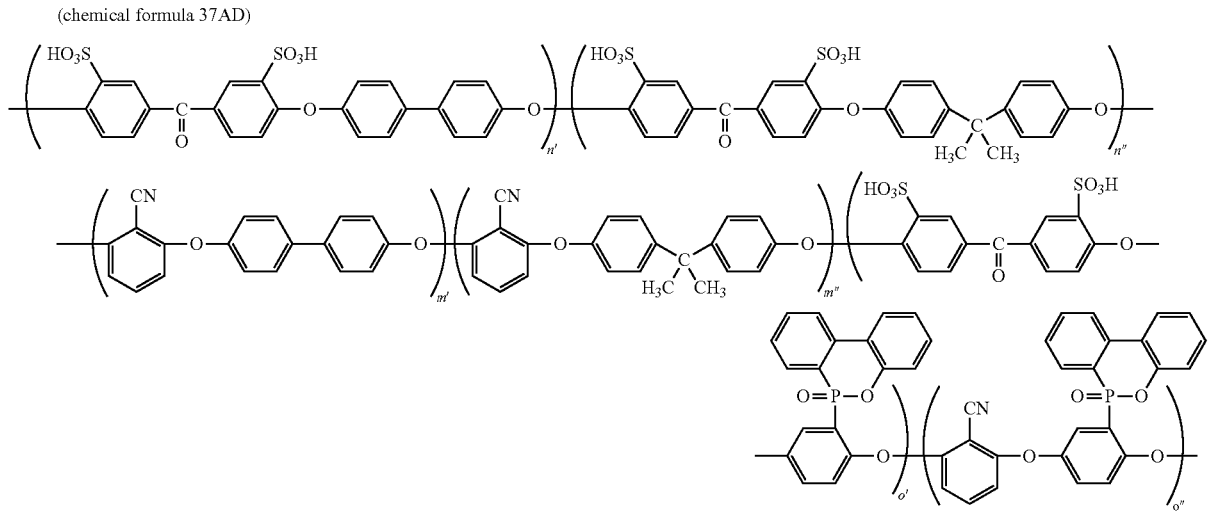
(chemical formula 37AE)
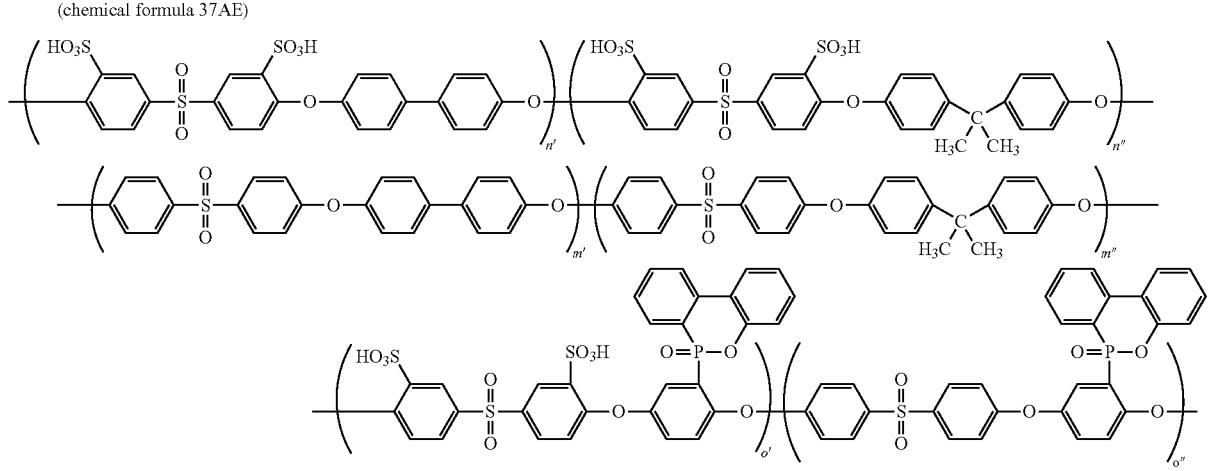

(chemical formula 37AF)
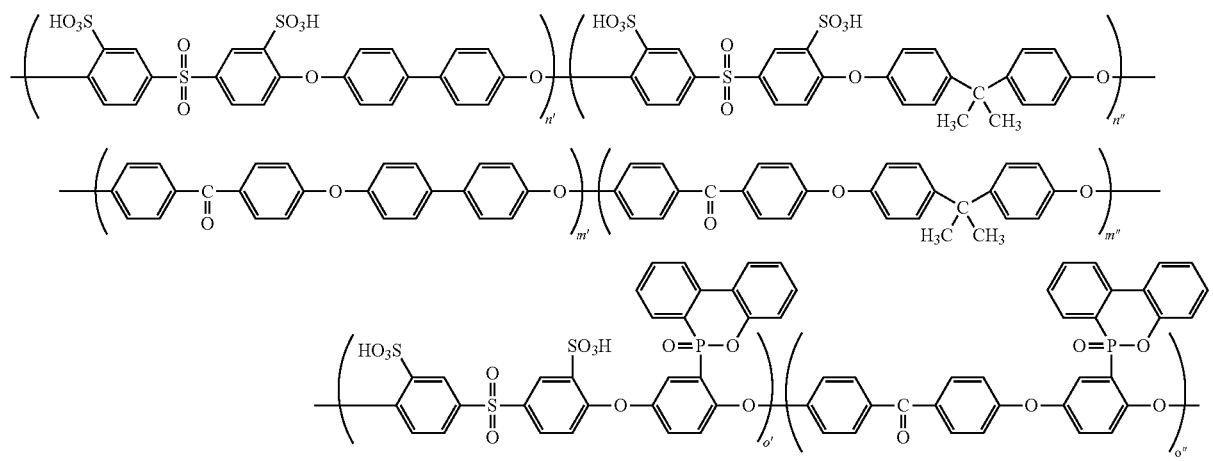
(chemical formula 37AG)
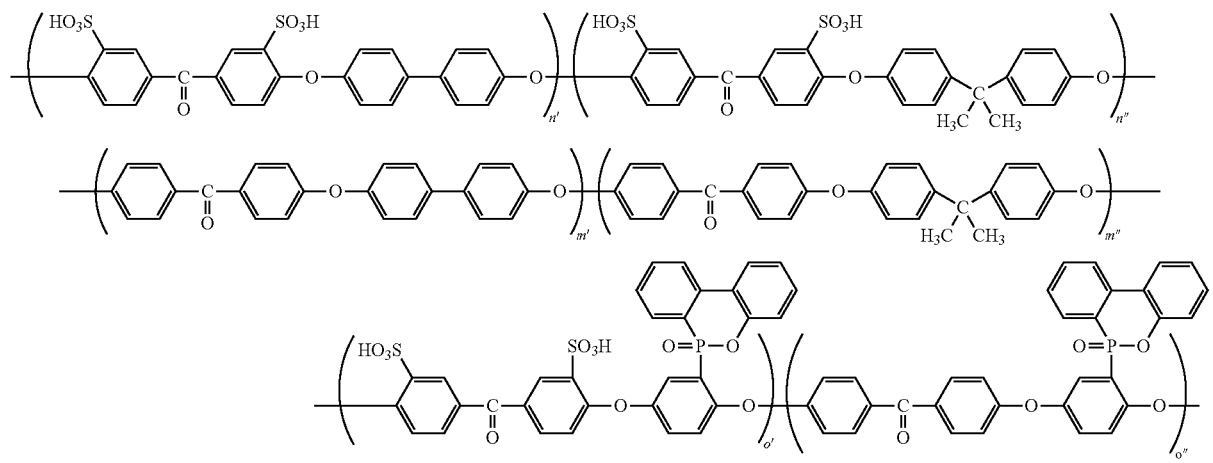
(chemical formula 37AH)
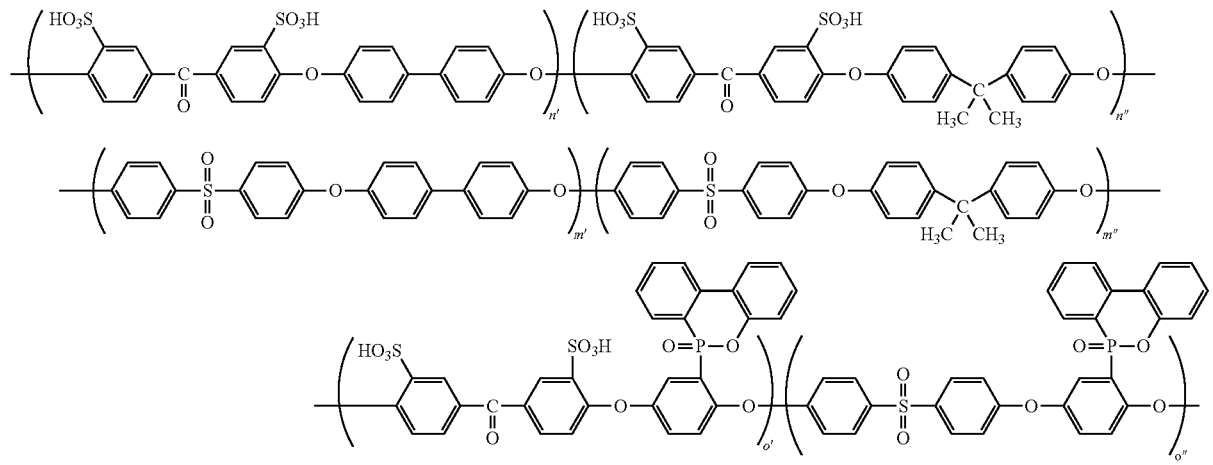
(chemical formula 37AI)
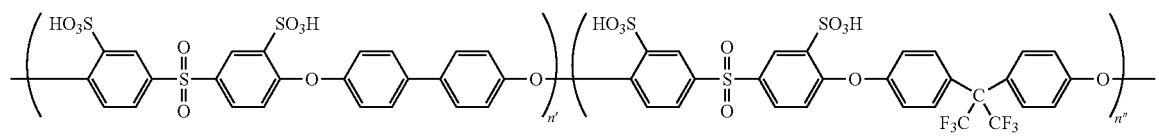

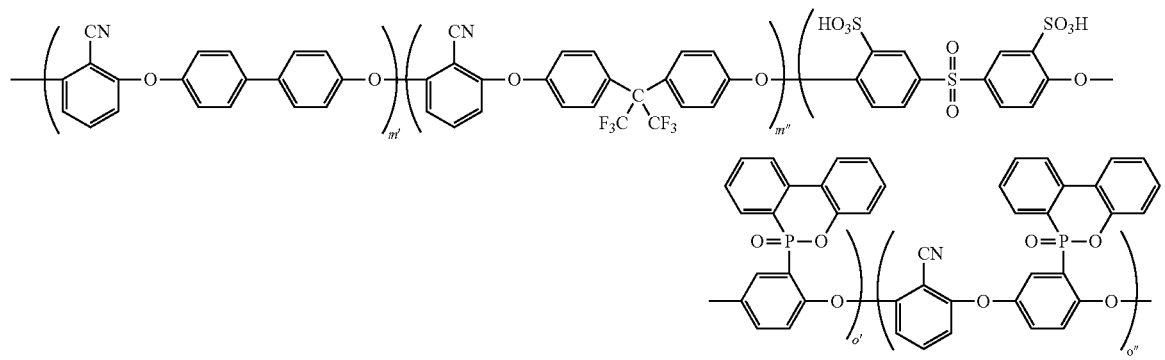
(chemical formula 37J)
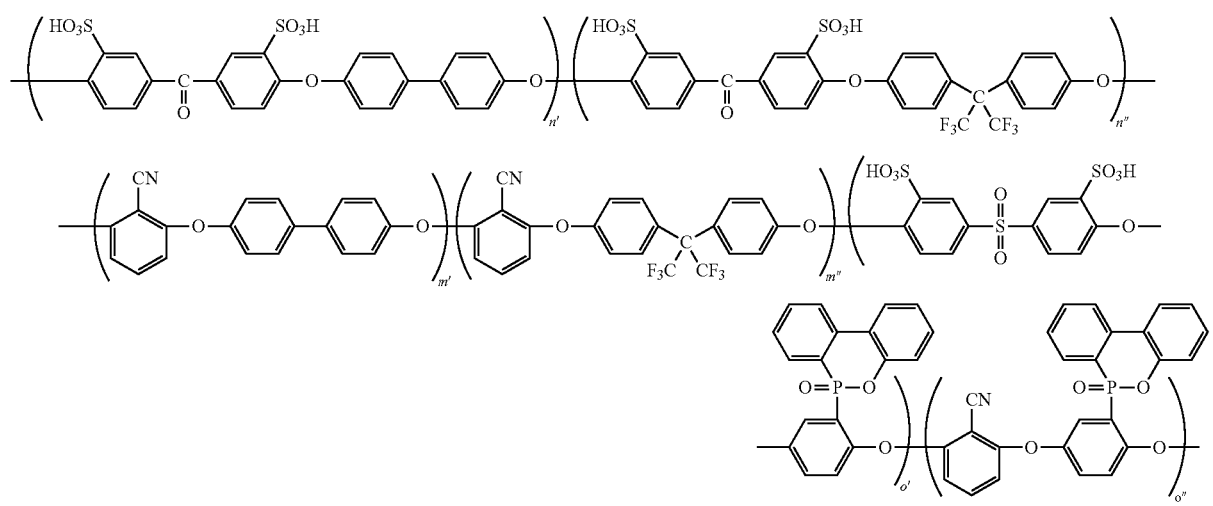
(chemical formula 37AK)
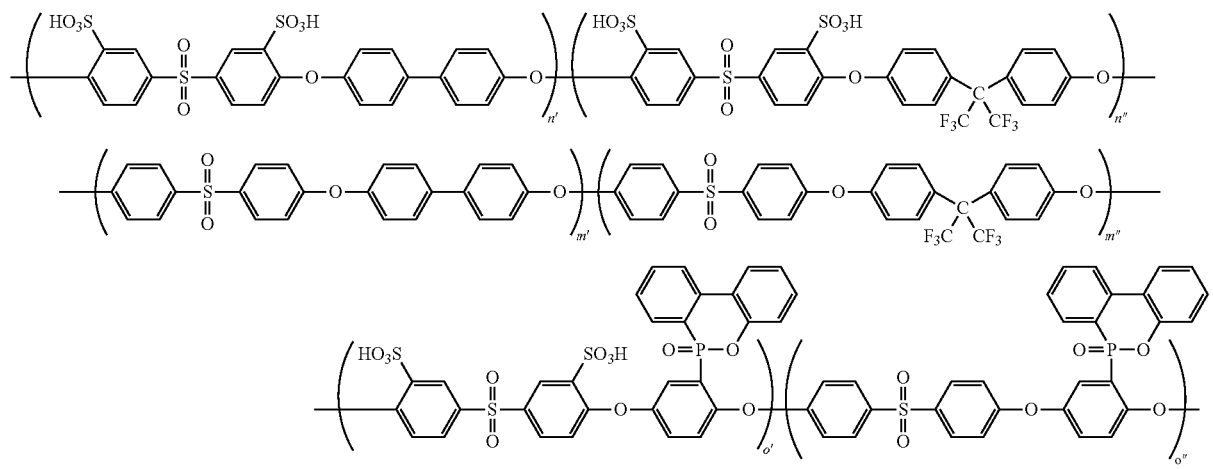
(chemical formula AL)
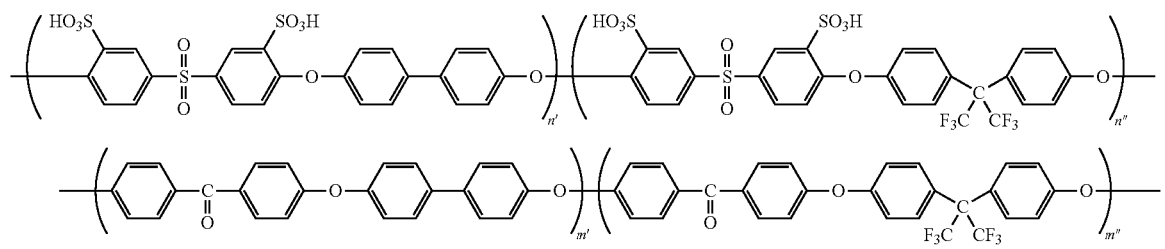

-continued
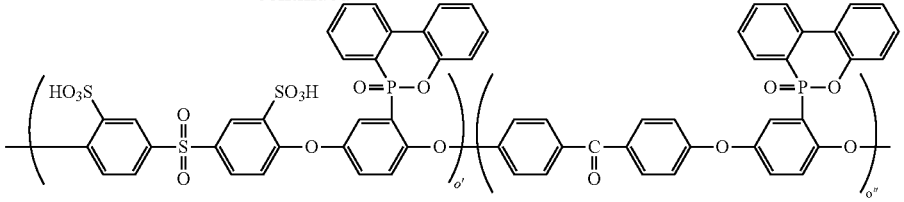
(chemical formula 37AM)
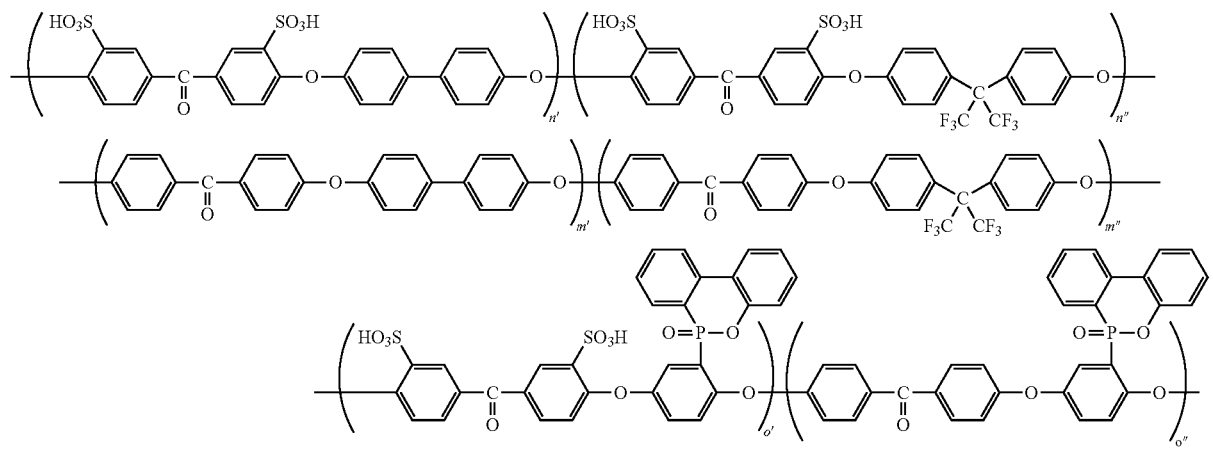
(chemical formula 37AN)
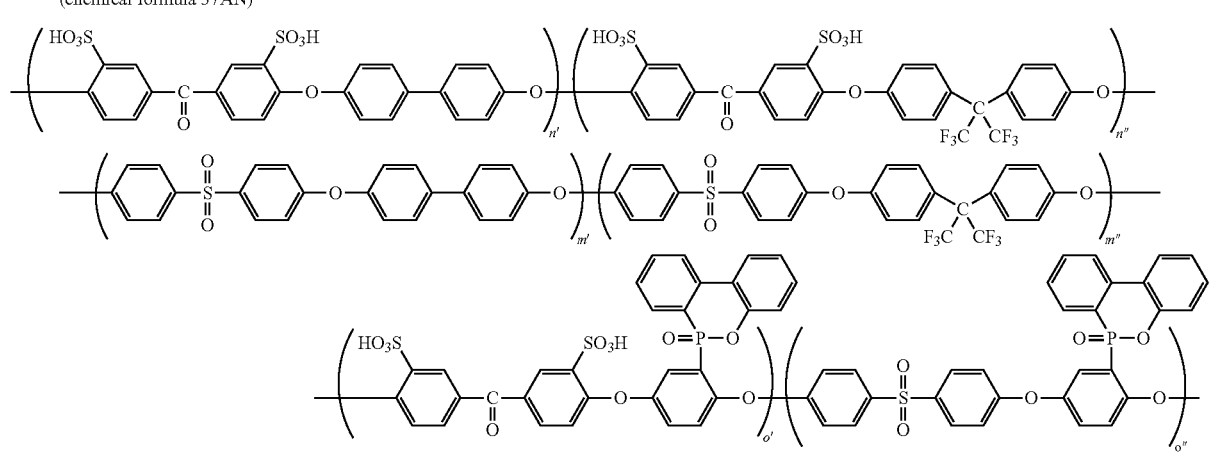
(chemical formula 37AO)
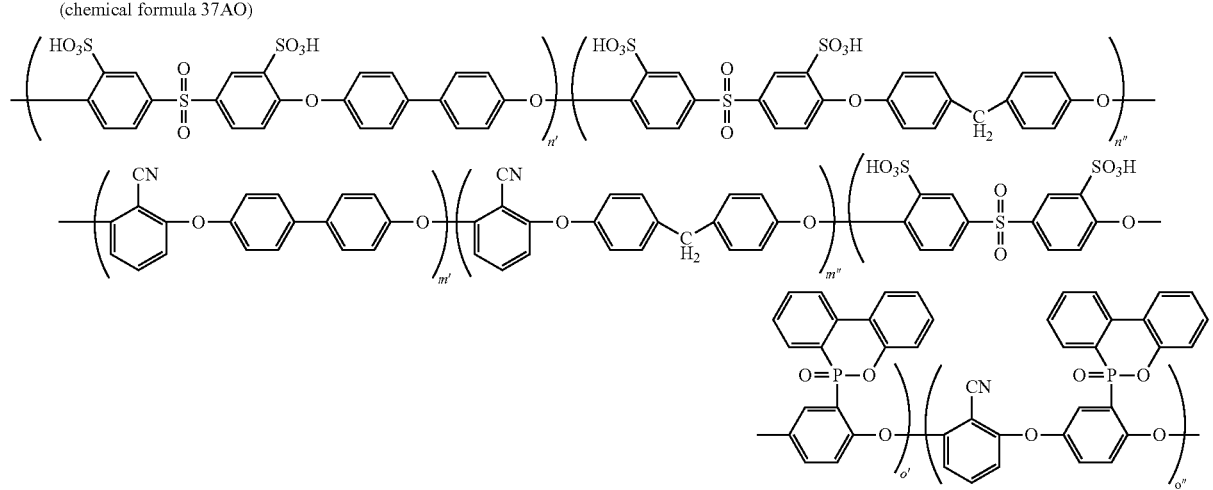

(chemcial formula 37AP)
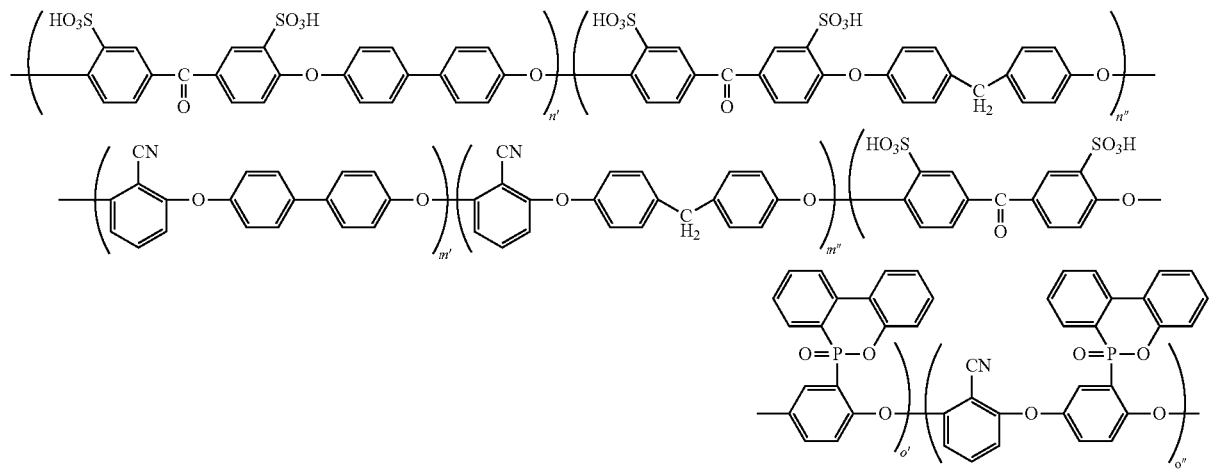
(chemical formula 37AQ)
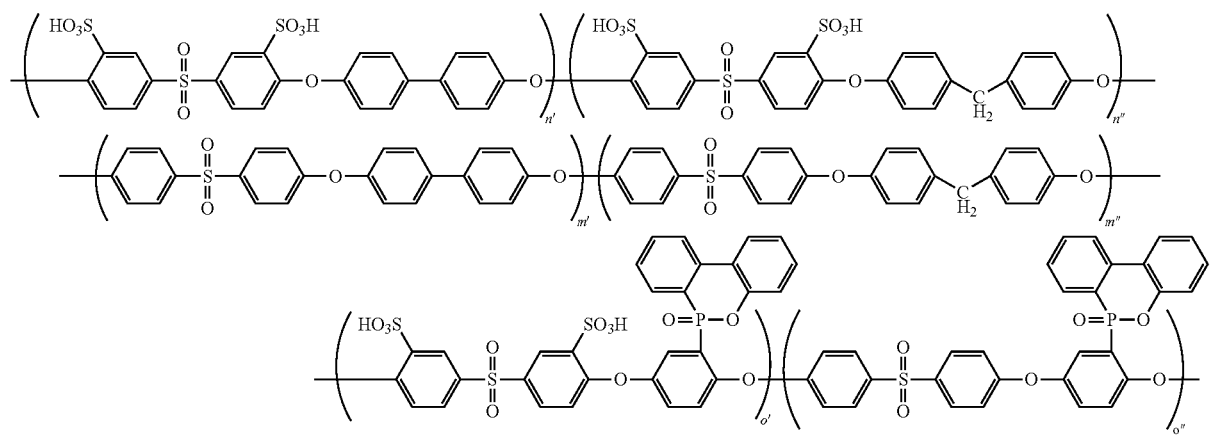
(chemical formula 37AR)
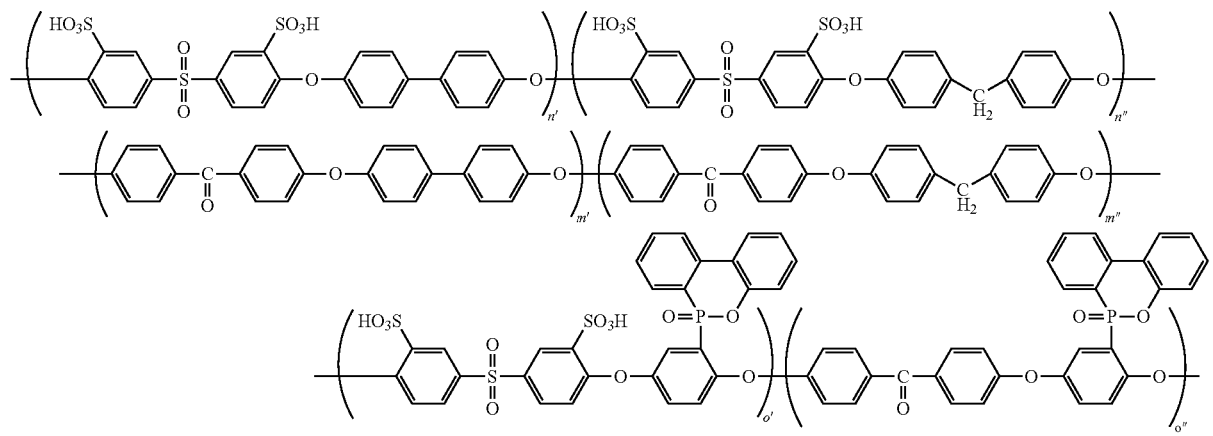
(chemical formula 37AS)
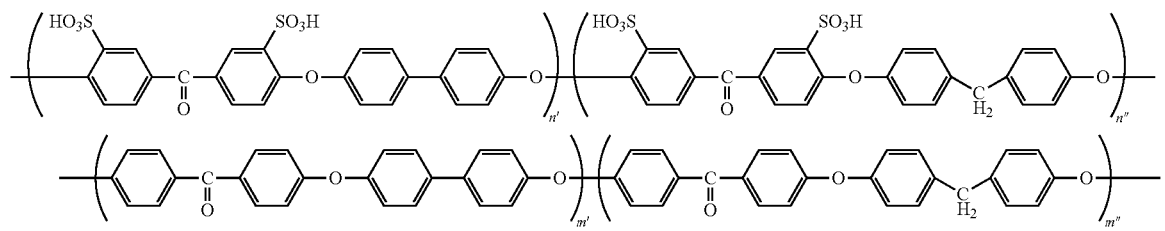

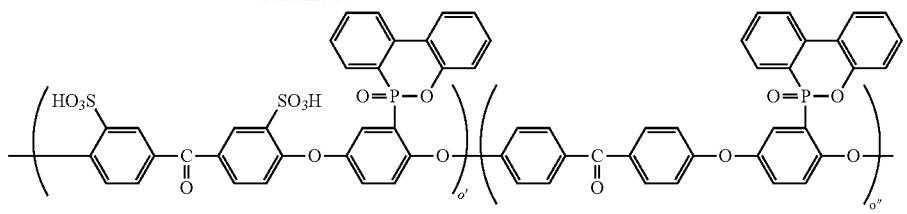
(chemical formula 37AT)
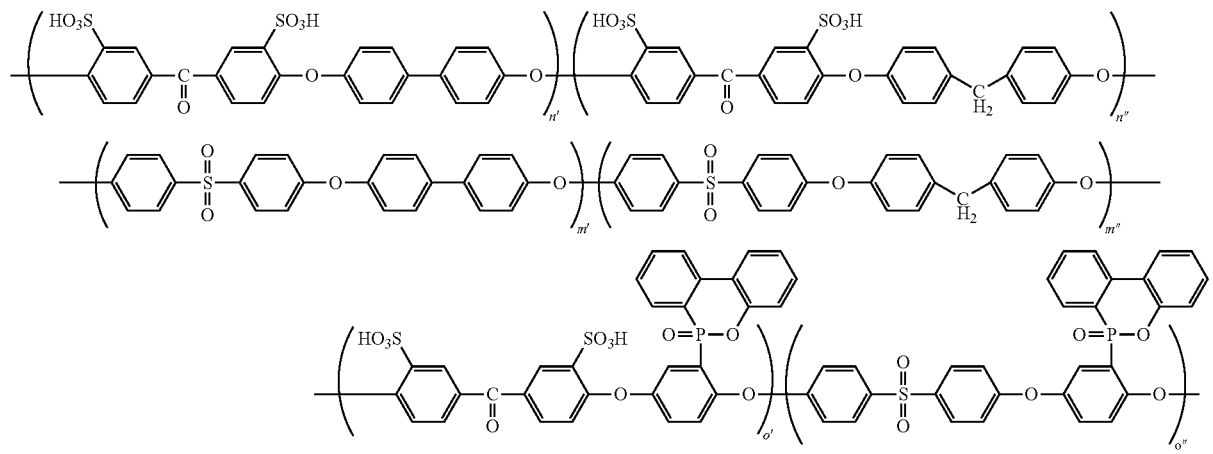
(chemical formula 37AU)
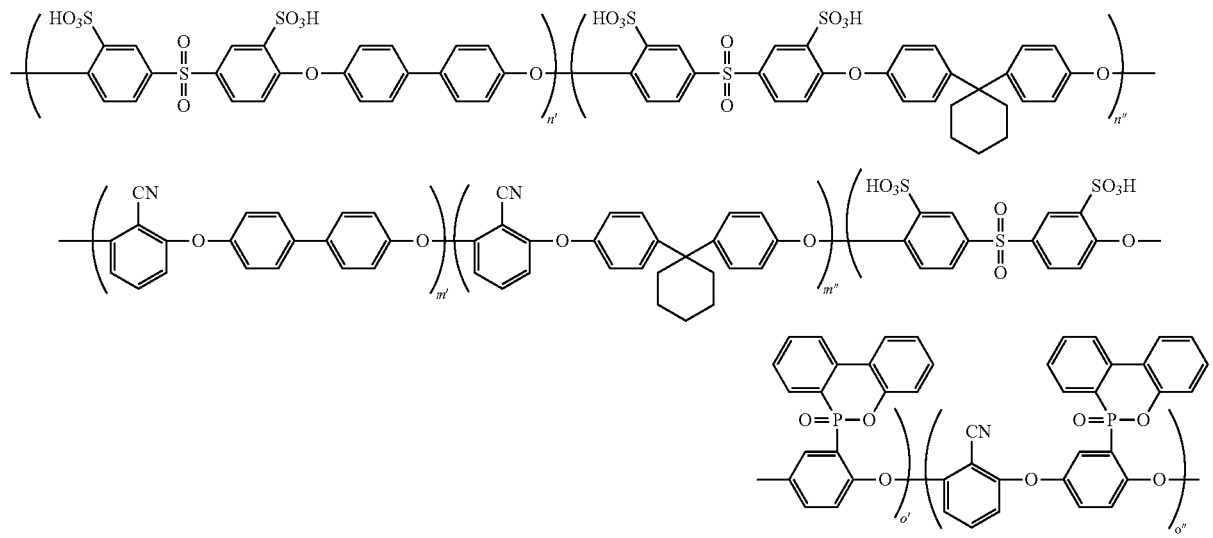
(chemical formula 37AV)
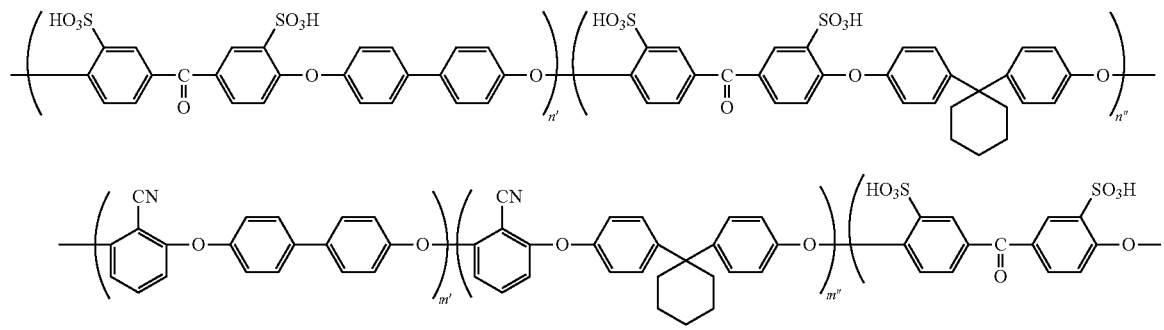

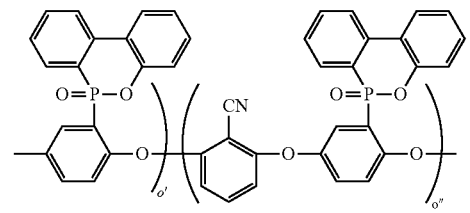
(chemical formula 37AW)
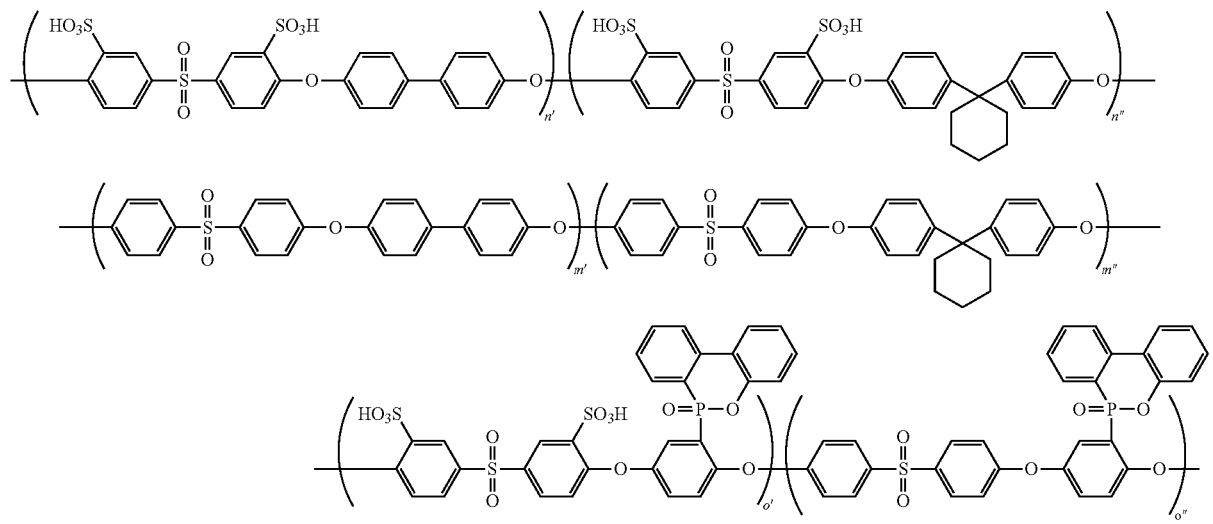
(chemical formula 37AX)
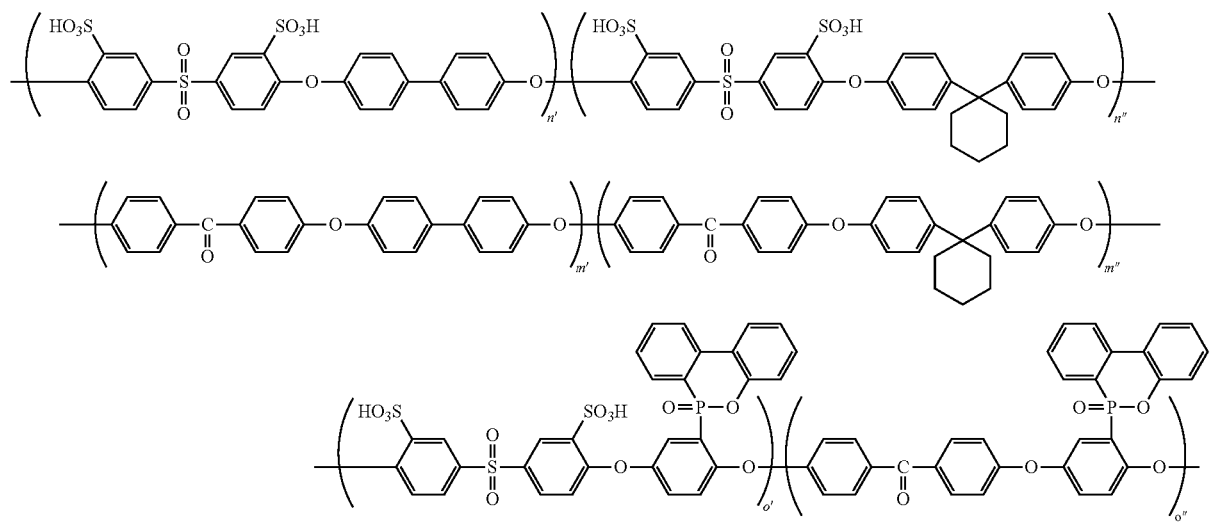
(chemical formula 37AY)
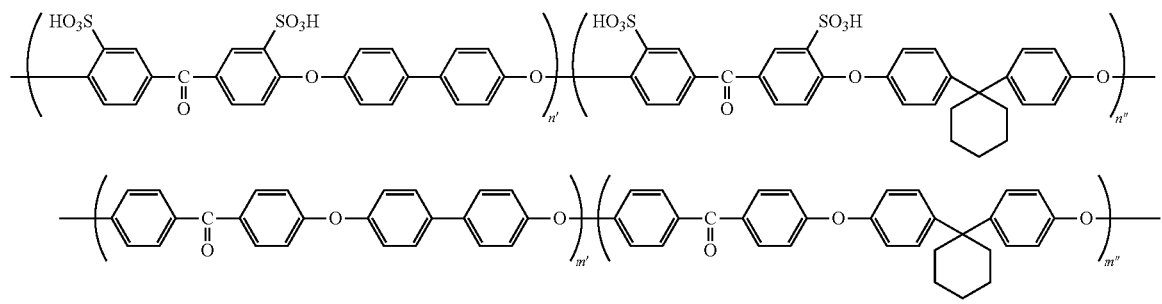

-continued
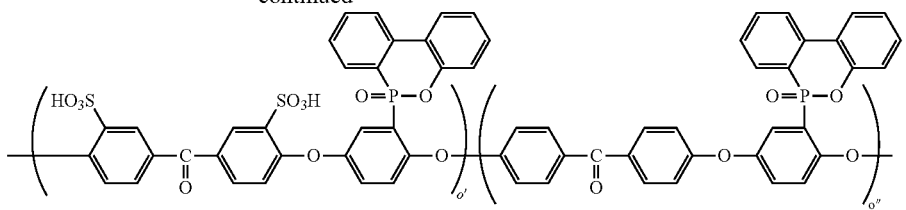
(chemical formula 37AZ)
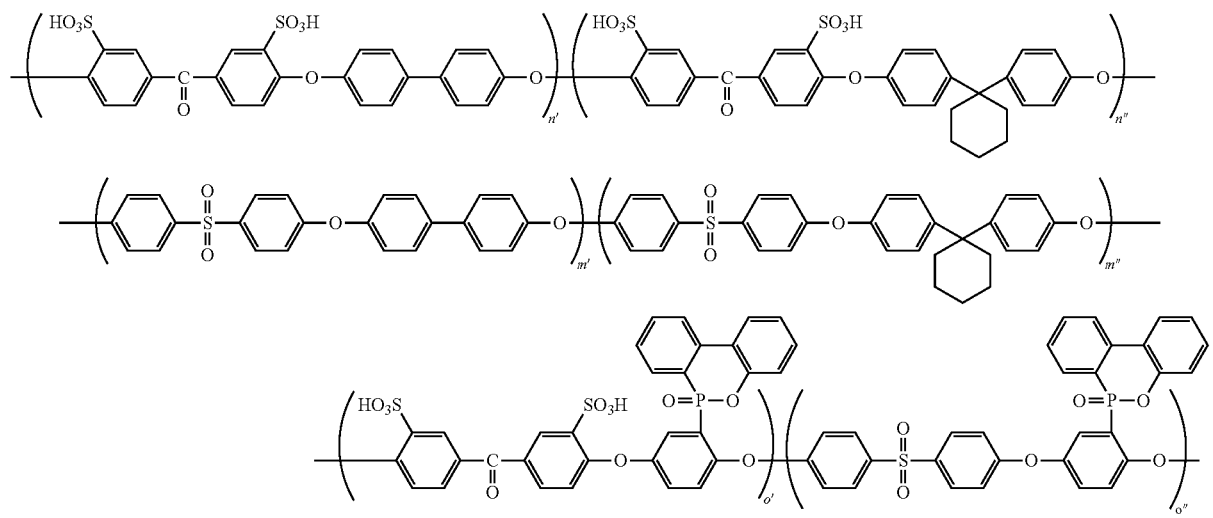
(chemical formula 37BA)
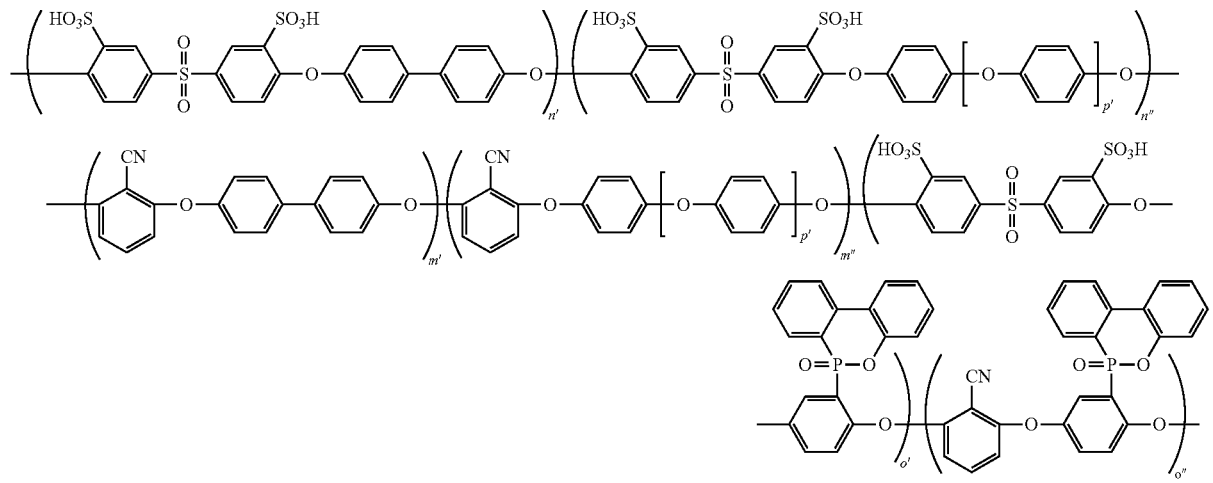
(chemical formula 37BB)
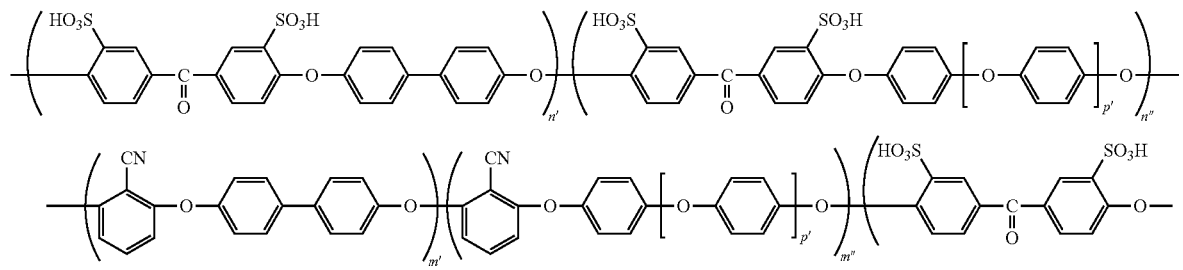

-continued
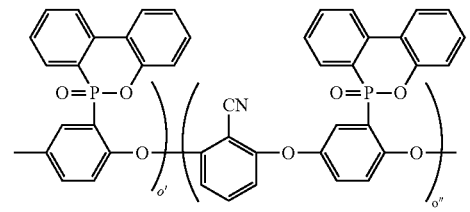
(chemical formula 37BC)
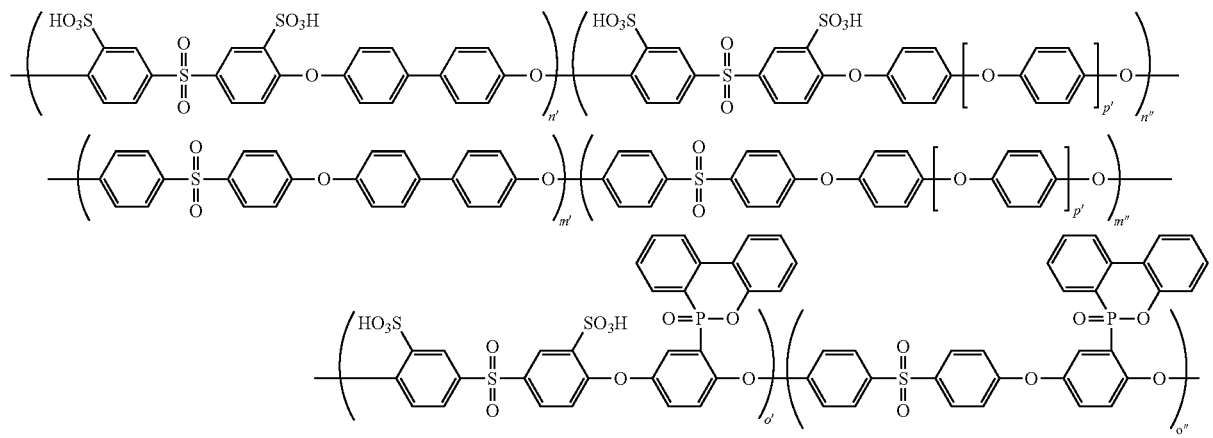
(chemical formula 37BD)
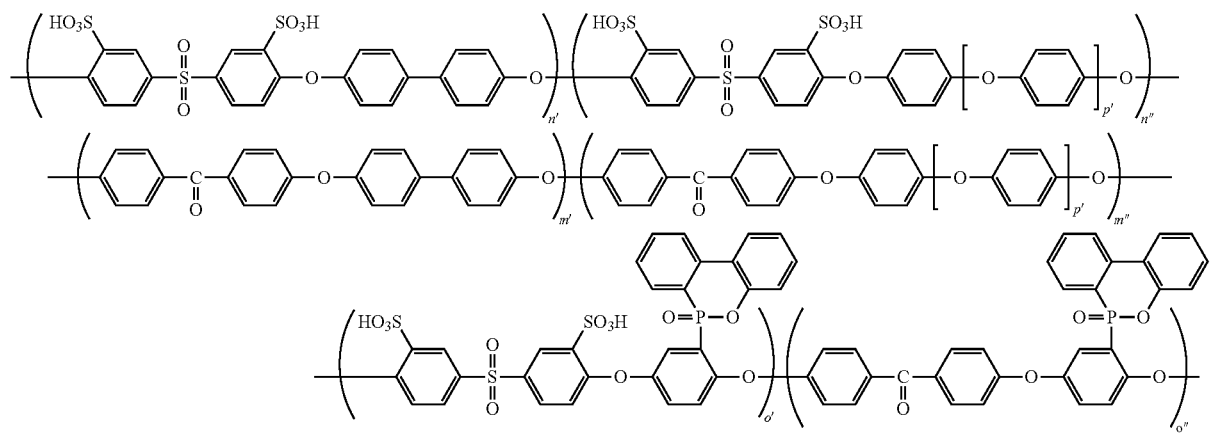
(chemical formula 37BE)
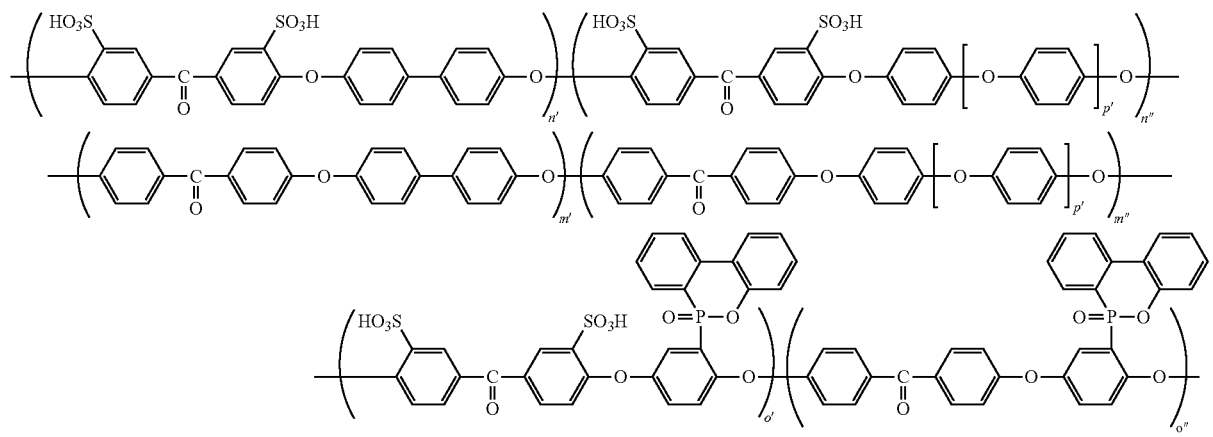

-continued
(chemical formula 37BF)
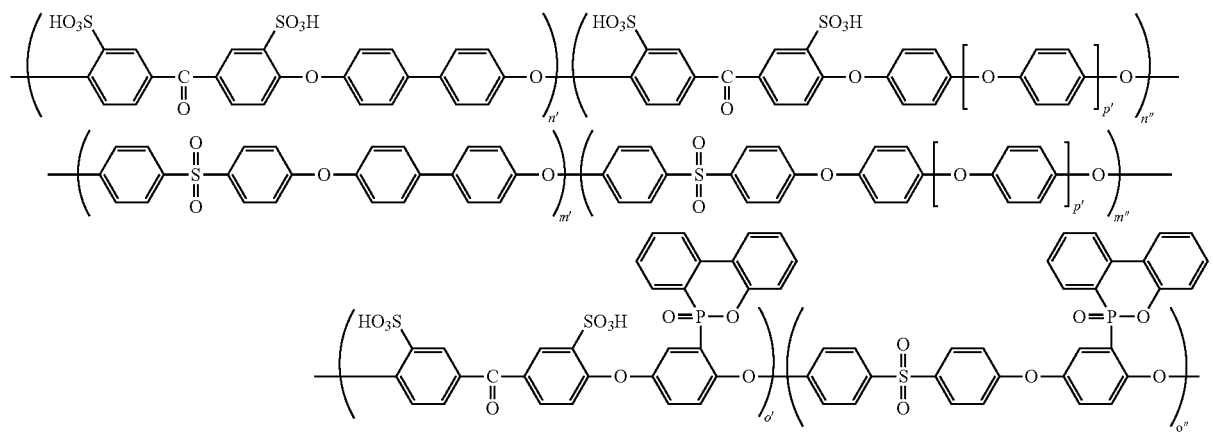
(chemical formula 37BG)
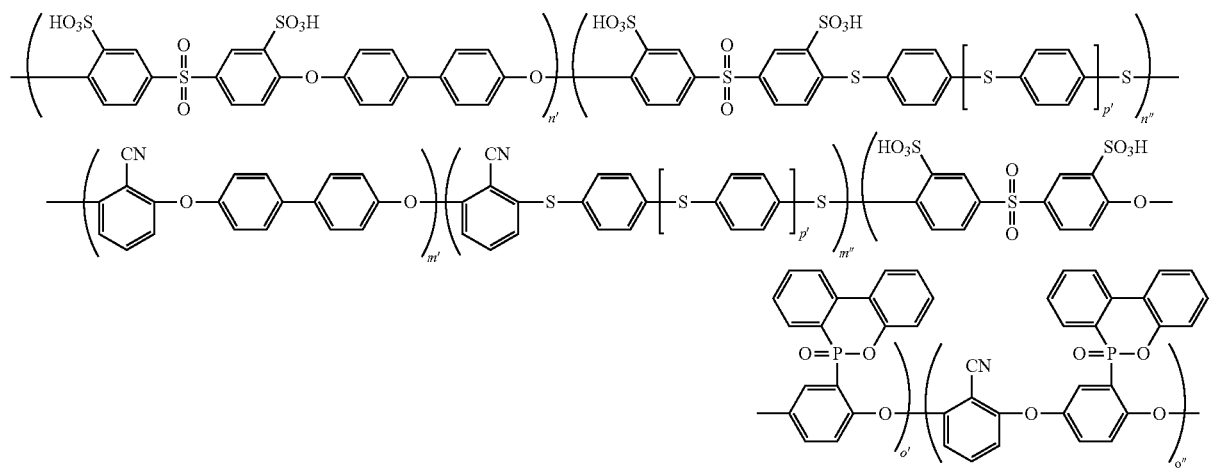
(chemical formula 37BH)
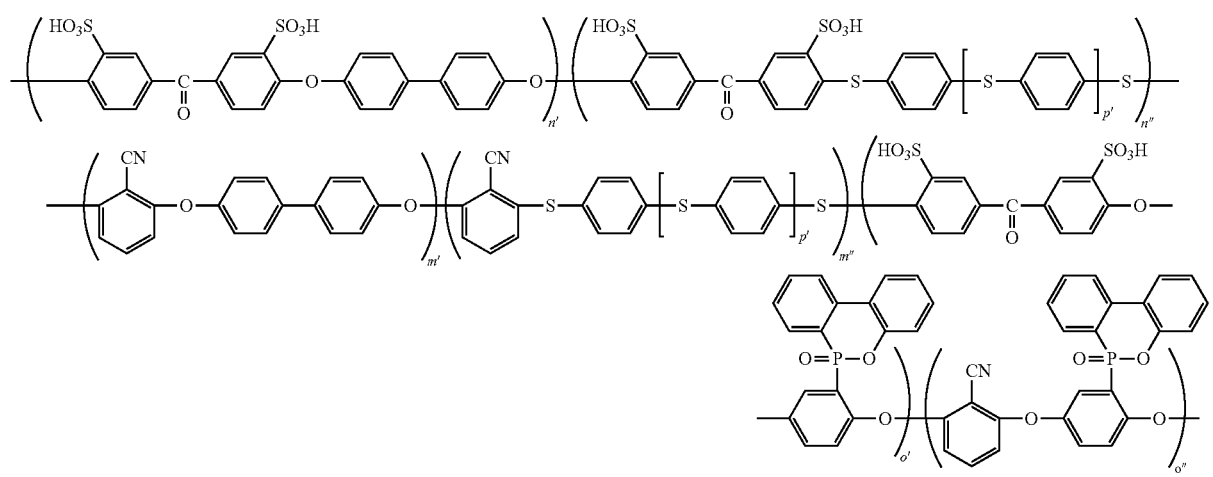
(chemical formula 37BI)
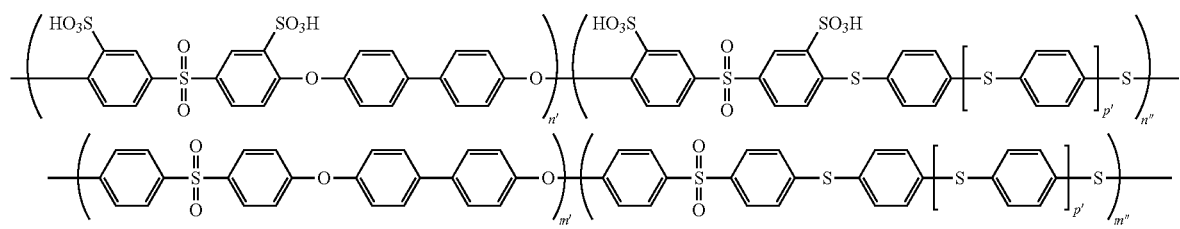

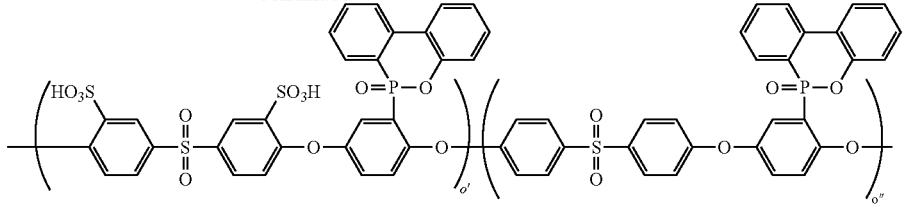
(chemical formula 37BJ)
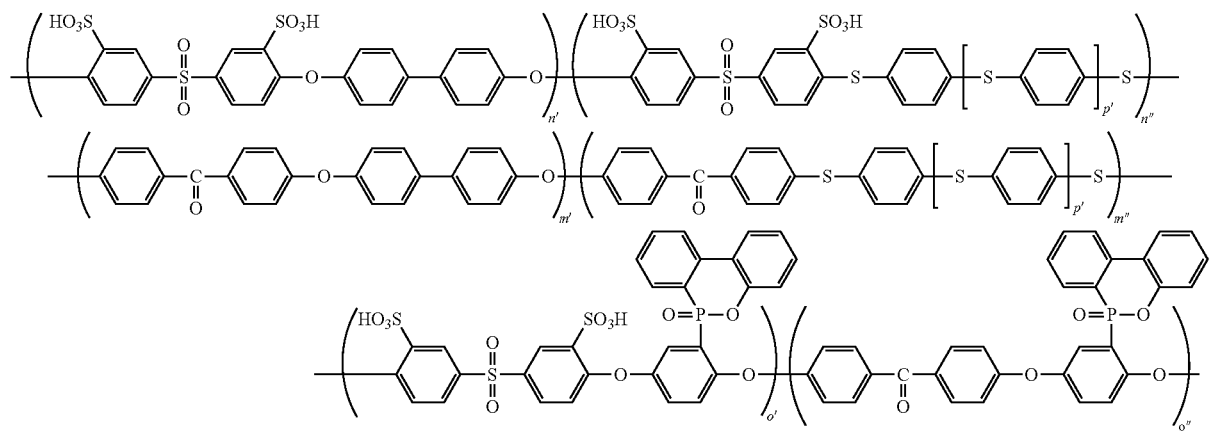
(chemical formula 37BK)
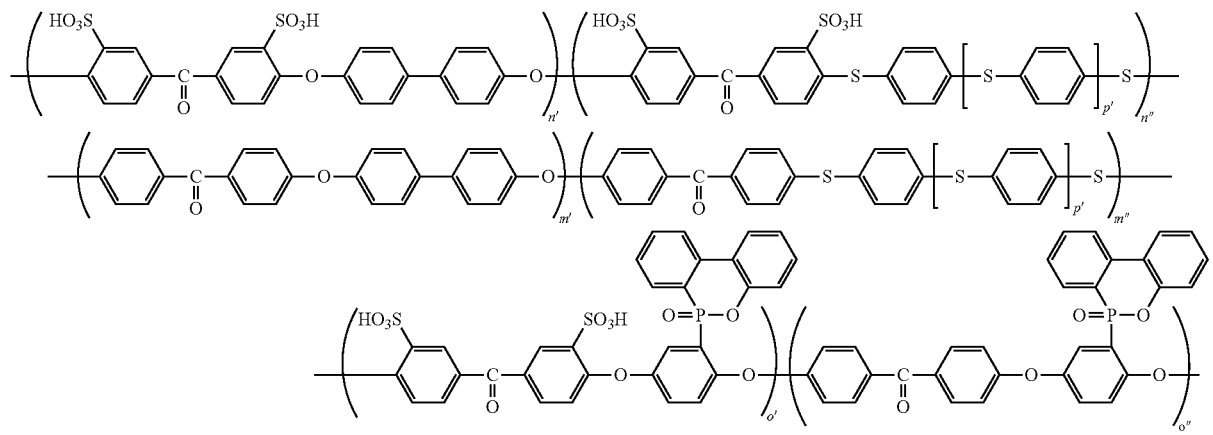
(chemical formula 37BL)
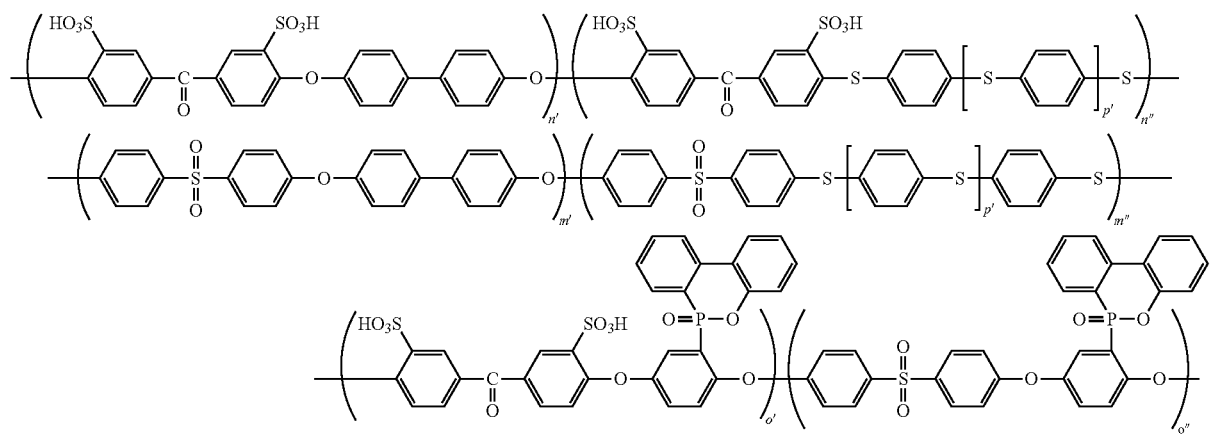

(chemical formula 37BM)
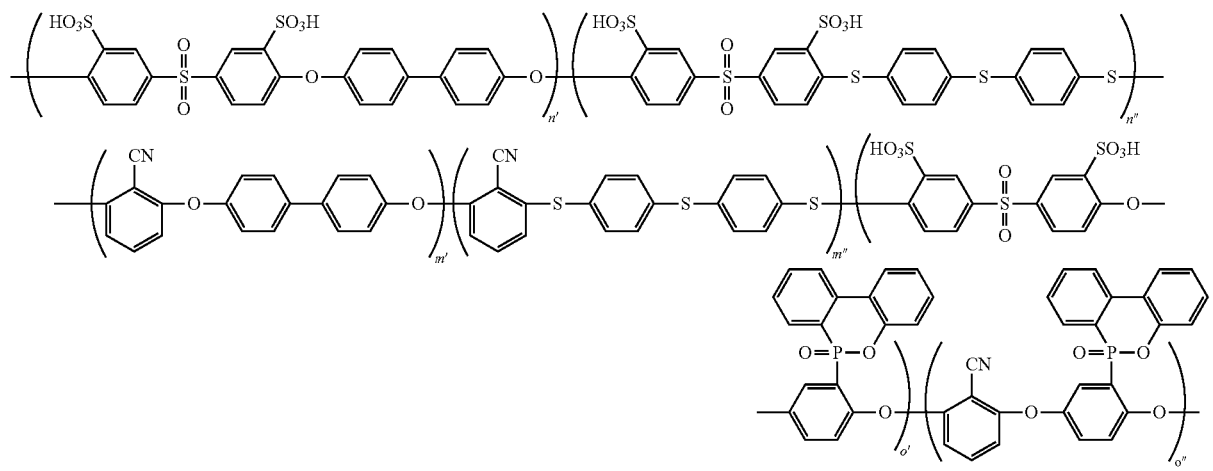
(chemical formula 37BN)
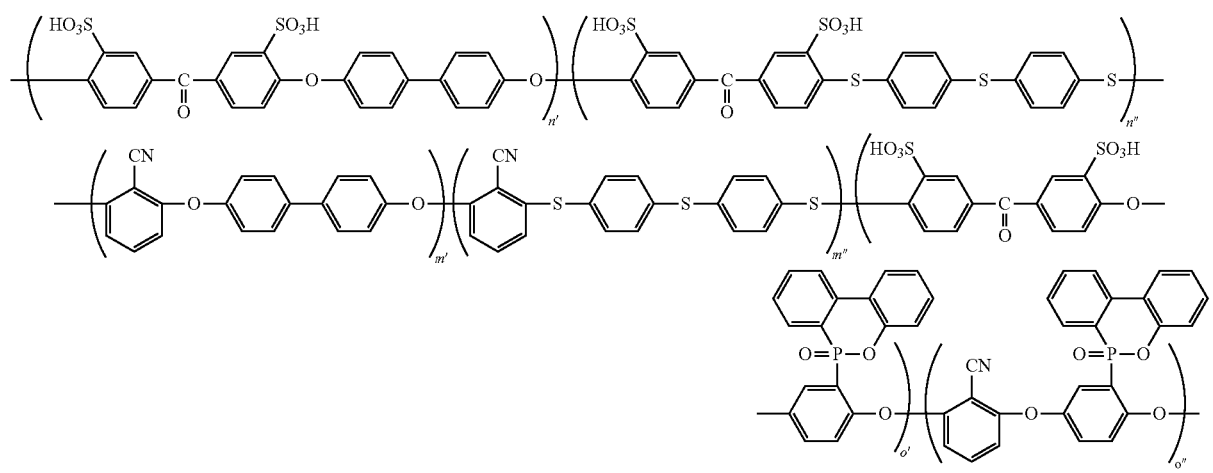
(chemical formula 37BO)
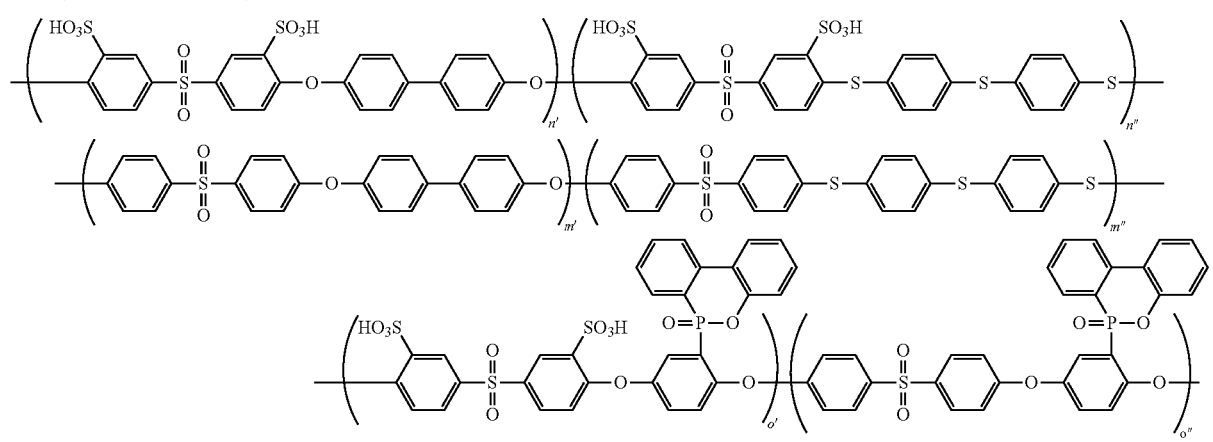
(chemical formula 37BP)
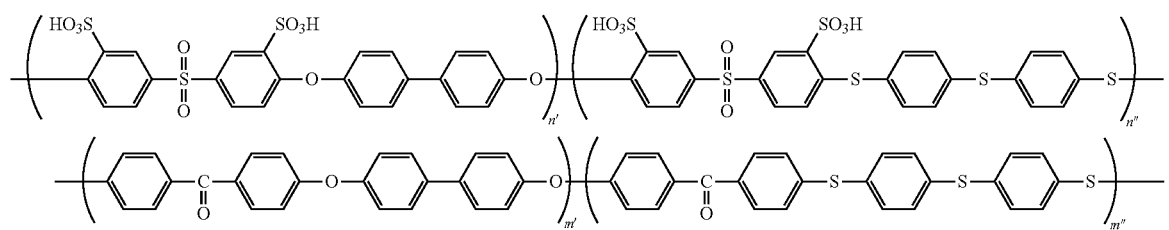

-continued
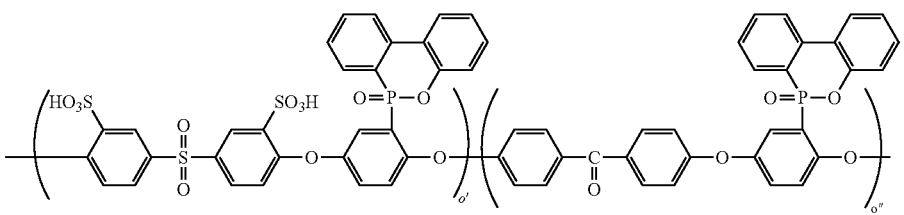
(chemical formula 37BQ)
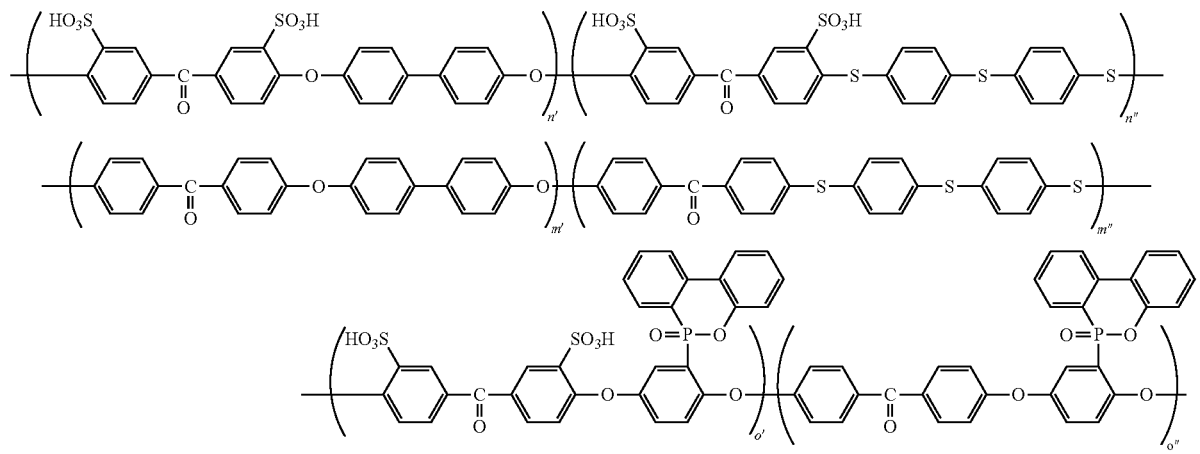
(chemical formula 37BR)
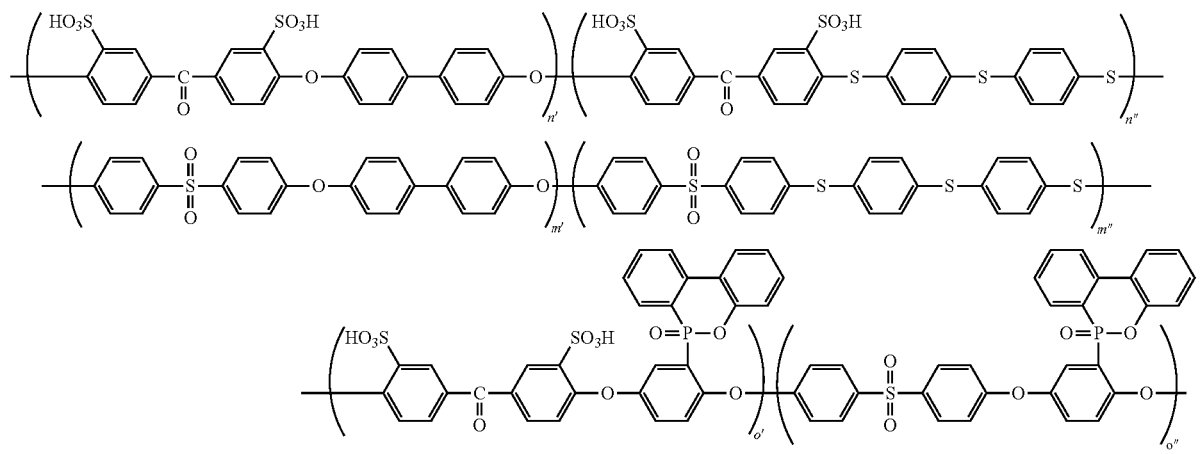
(chemical formula 37BS)
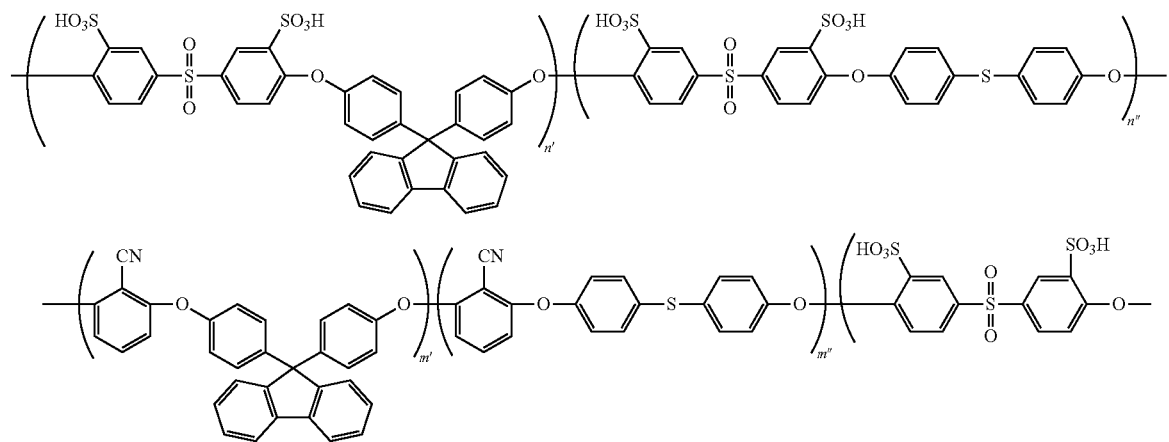

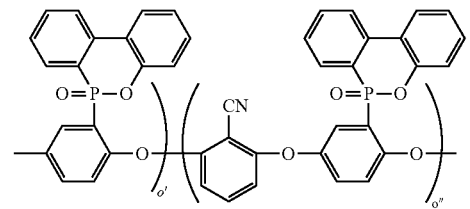
(chemical formula 37BT)
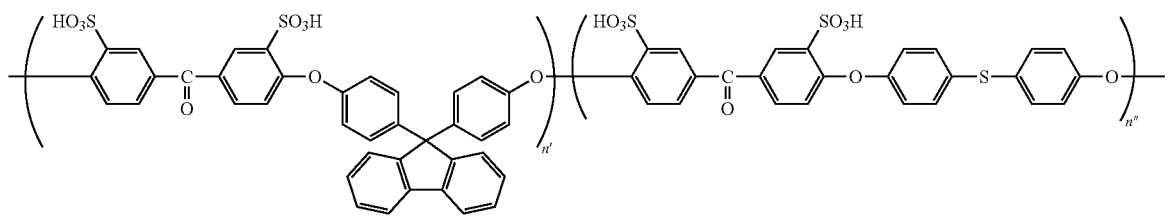
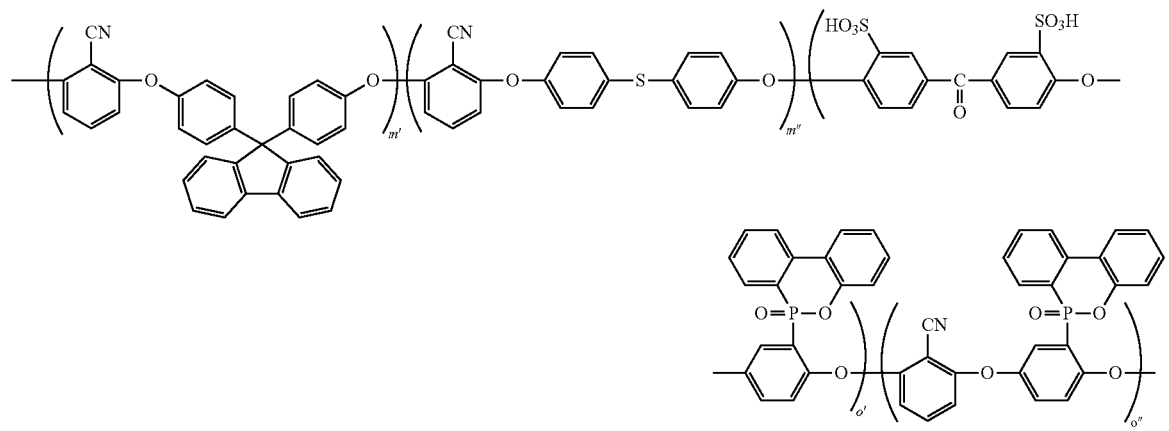
(chemical formula 37BU)
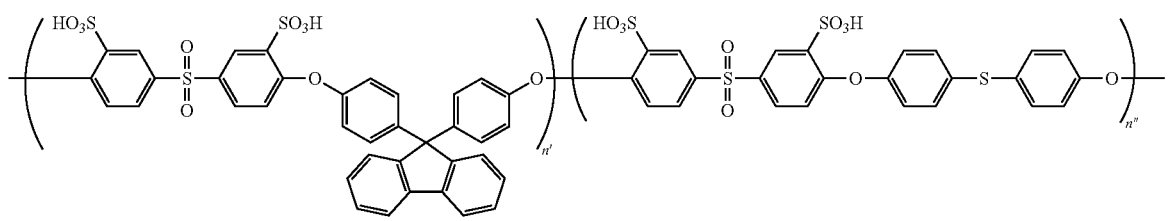
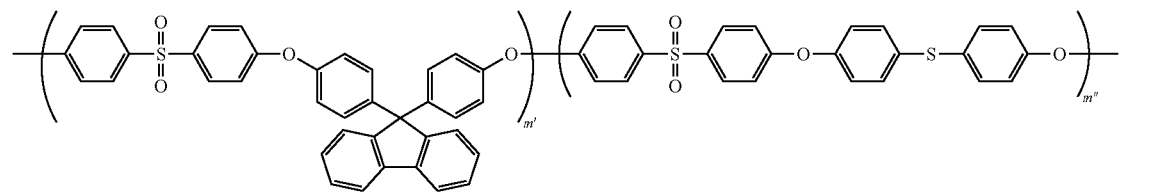
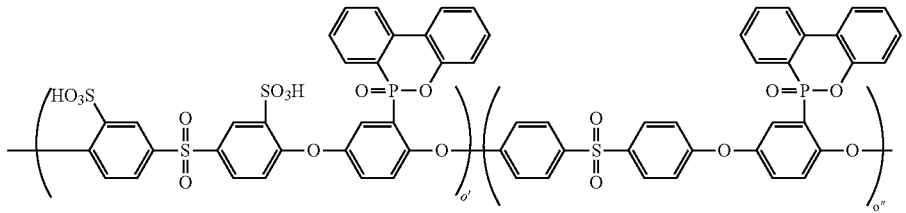

(chemical formula 37BV)
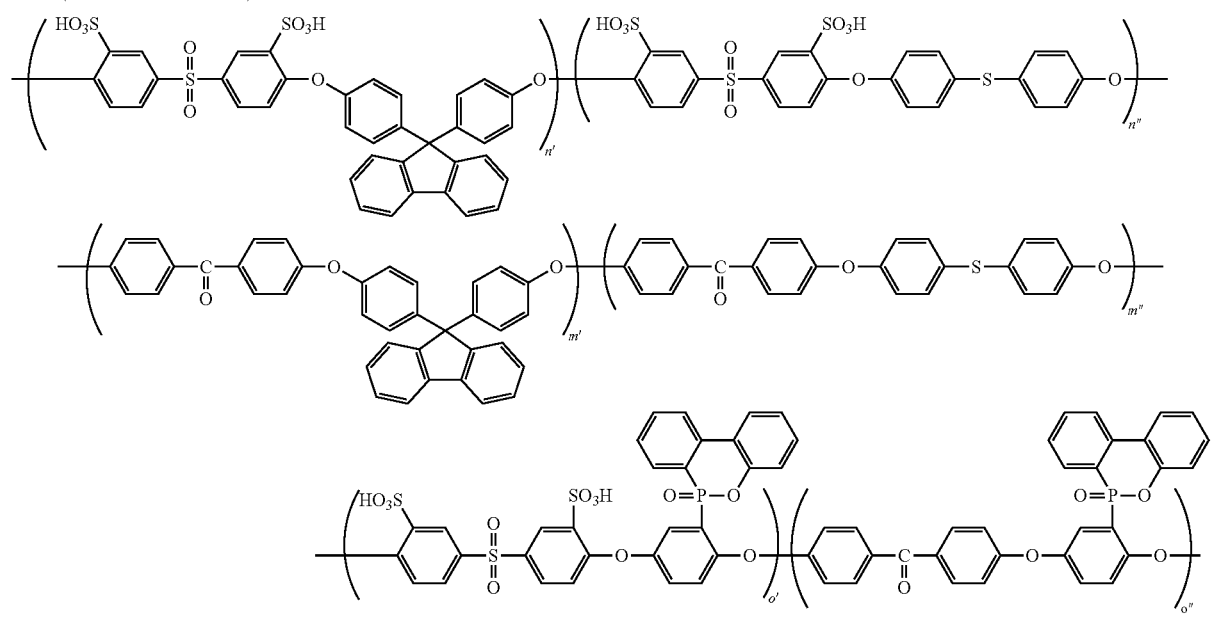
(chemical formula 37BW)
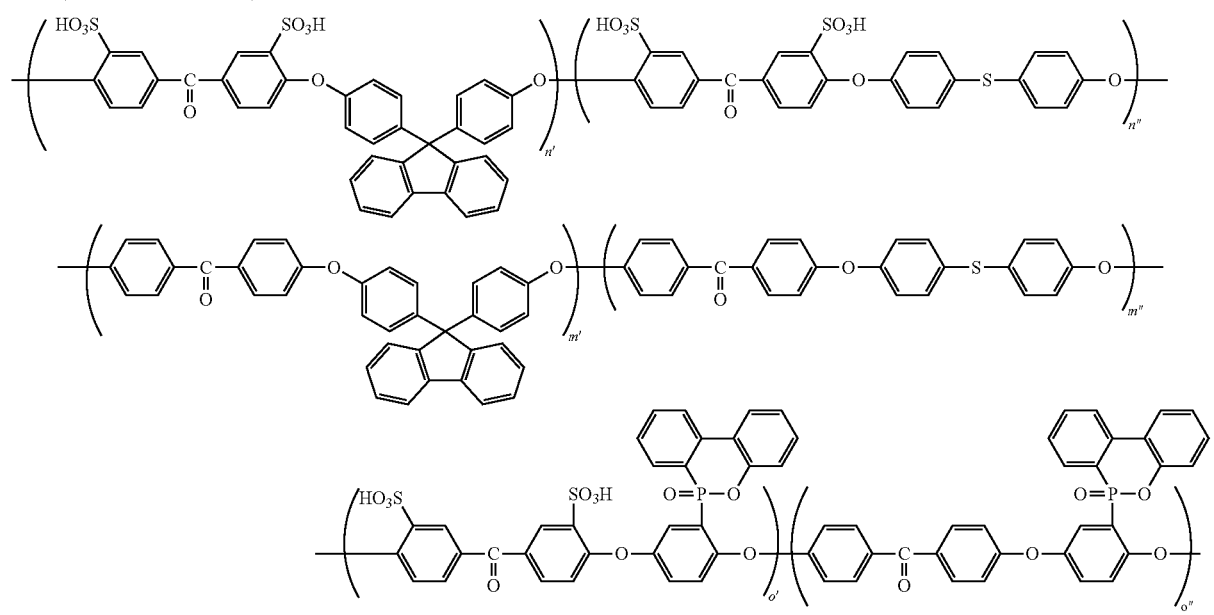
(chemical formula 37BX)
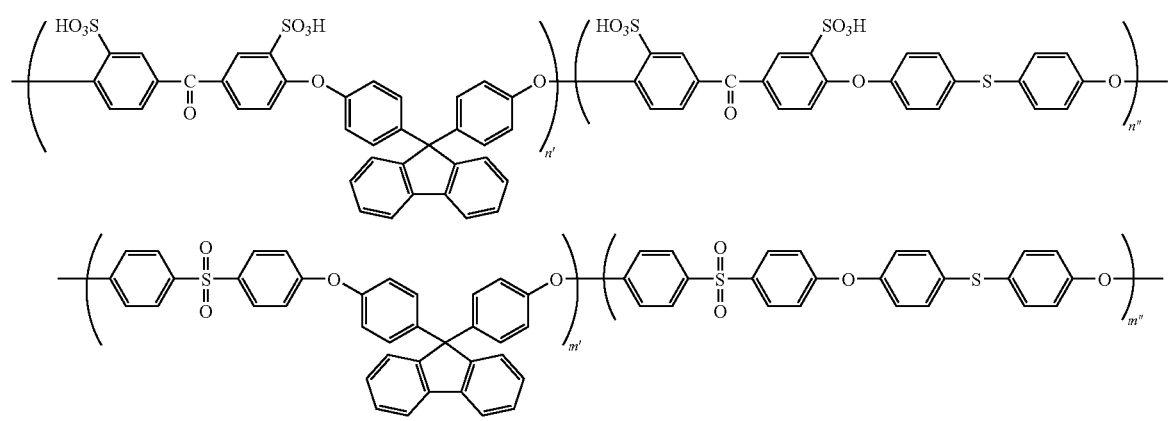

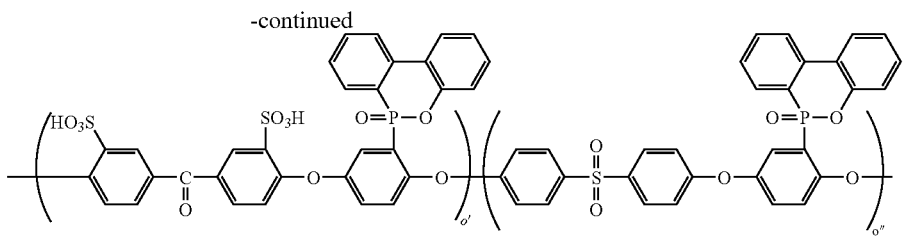

Among the chemical formulas 37A to 37BX, the most preferable structures are the chemical formulas 37A, 37E, 37Q, 37R, 37W, 37X, 37BM and 37BN, preferable structures next to the above are the chemical formulas 37I, 37K, 37M, 37O, 37AU, 37AV, 37BA, 37BB, 37BG and 37BH, and preferable structures next to the preceding structures are the chemical formulas 37C, 37G, 37S, 37T, 37AC, 37AD, 37AI, 37AJ, 37BS and 37BT.

In the case where the polymer electrolyte membrane of the present invention is used as a proton exchange membrane for direct methanol fuel cells using directly an aqueous methanol solution as a fuel, it is preferable that the following mathematical expressions 5, 25 and 26 are satisfied.

$$0.001 \leq (o'+o'')/(n'+n''+m'+m''+o'+o'') \leq 0.1 \quad \text{(mathematical expression 5)}$$

$$0.05 \leq (n'+n''+o')/(n'+n''+m'+m''+o'+o'') \leq 0.5 \quad \text{(mathematical expression 25)}$$

$$0.05 \leq (n''+m'')/(n'+n''+m'+m'') \leq 0.95 \quad \text{(mathematical expression 26)}$$

If $(o'+o'')/(n'+n''+m'+m''+o'+o'')$ is smaller than 0.001, there is a tendency that it is difficult to obtain a sufficient stabilization effect, and if larger than 0.1, this tends to be a cause for problems such as deterioration of proton conductivity in proton exchange membranes, and lowered polymerization degree. $(o'+o'')/(n'+n''+m'+m''+o'+o'')$ is more preferably within a range of 0.005 to 0.05, furthermore preferably within a range of 0.01 to 0.04.

If $(n'+n''+o')/(n'+n''+m'+m''+o'+o'')$ is smaller than 0.05, it is difficult to obtain a sufficient proton conductivity, and thus the output of a fuel cell tends to easily decline. If $(n'+n''+o')/(n'+n''+m'+m''+o'+o'')$ is larger than 0.5, the amount of methanol which permeates a membrane becomes too large, resulting in a tendency for a fuel cell to easily decline in its output. A more preferable range of $(n'+n''+o')/(n'+n''+m'+m''+o'+o'')$ is 0.05 to 0.4. Further, if the concentration of the aqueous methanol solution used as a fuel is low, the larger $(n'+n''+o')/(n'+n''+m'+m''+o'+o'')$ is, the larger the proton conductivity is, resulting in high output of a fuel cell. Meanwhile, in the case where a high concentration of aqueous methanol solution is used, if $(n'+n''+o')/(n'+n''+m'+m''+o'+o'')$ is small, output decline accompanied by methanol permeation can be suppressed to increase the output of a fuel cell.

A preferable range of $(n''+m'')/(n'+n''+m'+m'')$ is 0.05 to 0.95. If $(n''+m'')/(n'+n''+m'+m'')$ is smaller than 0.05, there is a tendency that insufficient joining between electrodes or catalysts and proton exchange membranes takes place at the time of such joining, and if larger than 0.95, there is a tendency that the swellability becomes too large. A more preferable range of $(n''+m'')/(n'+n''+m'+m'')$ is 0.2 to 0.8. If $(n'+n''+o')/(n'+n''+m'+m''+o'+o'')$ is smaller than 0.25, then $(n''+m'')/(n'+n''+m'+m'')$ is furthermore preferably within a range of 0.4 to 0.8. Also, if $(n'+n''+o')/(n'+n''+m'+m''+o'+o'')$ is larger than 0.25, $(n''+m'')/(n'+n''+m'+m'')$ is furthermore preferably within a range of 0.1 to 0.5.

In the case where the polymer electrolyte membrane of the present invention is used as a proton exchange membrane for fuel cells using hydrogen as the fuel, it is preferable that such membrane satisfies the following mathematical expressions 5, 27 and 28.

$$0.001 \leq (o'+o'')/(n'+n''+m'+m''+o'+o'') \leq 0.1 \quad \text{(mathematical expression 5)}$$

$$0.3 \leq (n'+n''+o')/(n'+n''+m'+m''+o'+o'') \leq 0.7 \quad \text{(mathematical expression 27)}$$

$$0.01 \leq (n''+m'')/(n'+n''+m'+m'') \leq 0.25 \quad \text{(mathematical expression 28)}$$

If $(o'+o'')/(n'+n''+m'+m''+o'+o'')$ is smaller than 0.001, there is a tendency that it is difficult to obtain a sufficient stabilization effect, and if larger than 0.1, this tends to easily cause problems such as deterioration of proton conductivity in proton exchange membranes, and lowered polymerization degree. It is more preferable that $(o'+o'')/(n'+n''+m'+m''+o'+o'')$ is within a range of 0.005 to 0.05, furthermore preferably within a range of 0.01 to 0.04.

If $(n'+n''+o')/(n'+n''+m'+m''+o'+o'')$ is smaller than 0.3, it is difficult to obtain a sufficient proton conductivity, and thus the output of a fuel cell tends to easily decline. If $(n'+n''+o')/(n'+n''+m'+m''+o'+o'')$ is larger than 0.7, there is a tendency that the swellability of a membrane becomes too large, resulting in its destruction and output decline. $(n'+n''+o')/(n'+n''+m'+m''+o'+o'')$ is more preferably within a range of 0.35 to 0.7, and furthermore preferably within a range of 0.4 to 0.5.

It is preferable that $(n''+m'')/(n'+n''+m'+m'')$ is within a range of 0.01 to 0.25. If it is smaller than 0.01, there is a tendency that insufficient joining between electrodes or catalysts and proton exchange membranes is caused at the time of such joining, and if larger than 0.25, there is a tendency that the swellability becomes too large. It is more preferable that $(n''+m'')/(n'+n''+m'+m'')$ is within a range of 0.1 to 0.2.

The sulfonic acid group-containing polymer of the present invention may also be obtained by polymerizing a monomer having the structure represented by the chemical formula 36 and a sulfonic acid- or its derivative-containing monomer as essential components and optionally another monomer. Alternatively, after a polymer of a monomer having the structure represented by the chemical formula 36 is polymerized, it is also possible to obtain such polymer of the present invention by introducing a sulfonic acid group. It is also possible to obtain the polymer of the present invention by polymerizing previously a monomer not containing the structure of the chemical formula 36 and a sulfonic acid group, and introducing a sulfonic acid group and the structure of the chemical formula 36 into the polymer.

A preferred embodiment of the sulfonic acid group-containing polymer of the present invention may be polymerized through the aromatic nucleophilic substitution reaction of a monomer mixture containing, as essential components, compounds represented by chemical formulas 38 and 39.

(chemical formula 38)

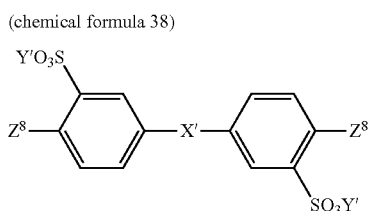

(chemical formula 39)

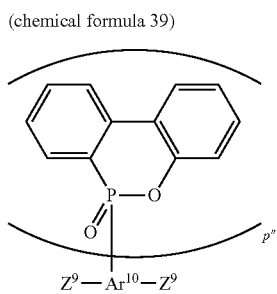

(In the above chemical formulas, Y' represents an H atom or a monovalent cation; $Z^8$ represents a halogen atom; X' represents an —S(=O)$_2$— group or a C(=O)— group; $Ar^{10}$ represents an aromatic group; $Z^9$ represents an OH group or an SH group, or a derivative thereof; and p" represents 1 or 2, respectively.)

Specific examples of the compound represented by the chemical formula 38 include 3,3'-disulfo-4,4'-dichlorodiphenylsulfone, 3,3'-disulfo-4,4'-difluorodiphenylsulfone, 3,3'-disulfo-4,4'-dichlorodiphenylketone, 3,3'-disulfo-4,4'-difluorodiphenylsulfone, 3,3'-disulfobutyl-4,4'-dichlorodiphenylsulfone, 3,3'-disulfobutyl-4,4'-difluorodiphenylsulfone, 3,3'-disulfobutyl-4,4'-dichlorodiphenylketone, 3,3'-disulfobutyl-4,4'-difluorodiphenylsulfone, and sulfonic acid salts thereof wherein the sulfonic acid group forms a salt with a monovalent cation species. The monovalent cation species includes, but is not limited to, a metal species such as sodium, potassium, and other metal species, and various amines, and the like. Among the compounds represented by the chemical formula 38, examples of compounds wherein the sulfonic acid group is in the form of a salt include sodium 3,3'-disulfonate-4,4'-dichlorodiphenylsulfone, sodium 3,3'-disulfonate-4,4'-difluorodiphenylsulfone, sodium 3,3'-disulfonate-4,4'-dichlorodiphenylketone, sodium 3,3'-disulfonate-4,4'-difluorodiphenylsulfone, sodium 3,3'-disulfonate-4,4'-difluorodiphenylketone, potassium 3,3'-disulfonate-4,4'-dichlorodiphenylsulfone, potassium 3,3'-disulfonate-4,4'-difluorodiphenylsulfone, potassium 3,3'-disulfonate-4,4'-dichlorodiphenylketone, potassium 3,3'-disulfonate-4,4'-difluorodiphenylsulfone, potassium 3,3'-disulfonate-4,4'-difluorodiphenylketone, and the like, and sodium 3,3'-disulfonate-4,4'-dichlorodiphenylsulfone and sodium 3,3'-disulfonate-4,4'-difluorodiphenylsulfone are preferable.

Examples of the compound represented by the chemical formula 39 include, but are not limited to, compounds of the following chemical formulas 39A to 39L.

(chemical formula 39A)

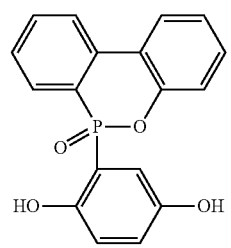

(chemical formula 39B)

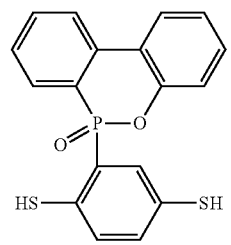

(chemical formula 39C)

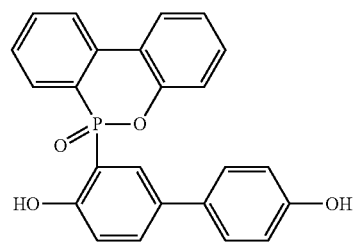

(chemical formula 39D)

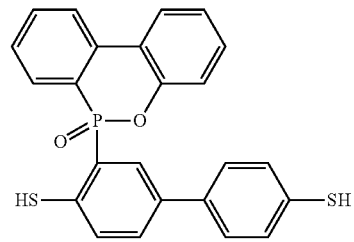

(chemical formula 39E)

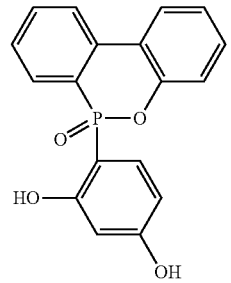

(chemical formula 39F)

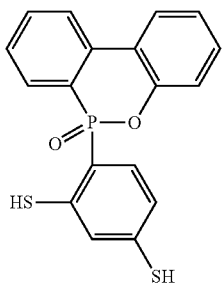

(chemical formula 39G)

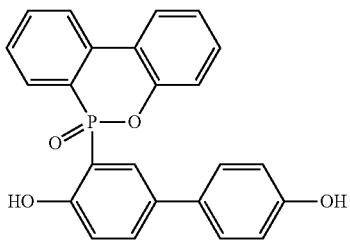

(chemical formula 39H)

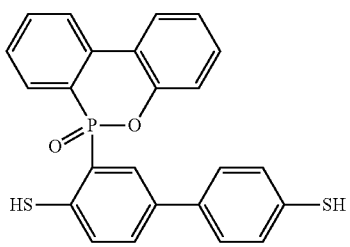

(chemical formula 39I)

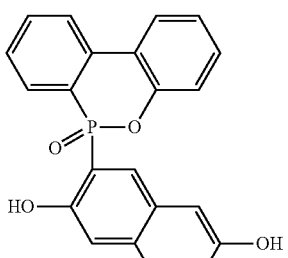

(chemical formula 39J)

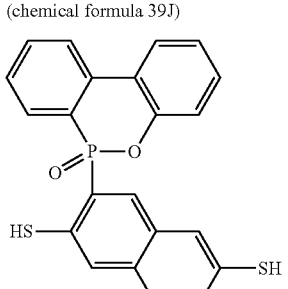

(chemical formula 39K)

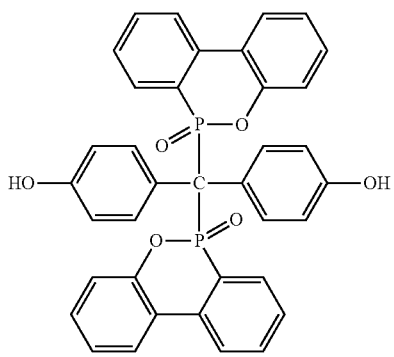

(chemical formula 39L)

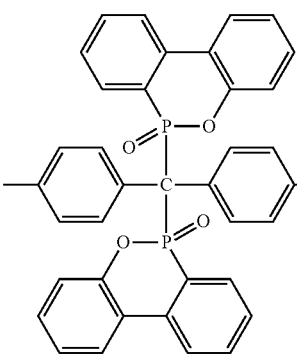

Among these compounds, the compounds of the chemical formulas 39A to 39D are preferable, and the compound of the chemical formula 39A is more preferable.

In the above aromatic nucleophilic substitution reaction, other various activated compounds such as dihalogenated aromatic compounds, dinitro aromatic compounds, bisphenol compounds, and bisthiophenol compounds in combination with the compound represented by the chemical formula 38 or 39 may be copolymerized as a monomer to give the sulfonic acid group-containing polymer of the present invention.

Specific examples of the activated dihalogenated aromatic compound include, but are not limited to, 2,6-dichlorobenzonitrile, 2,4-dichlorobenzonitrile, 2,6-difluorobenzonitrile, 2,4-difluorobenzonitrile, 4,4'-dichlorodiphenylsulfone, 4,4'-difluorodiphenylsulfone, 4,4'-difluorobenzophenone, 4,4'-dichlorobenzophenone, decafluorobiphenyl, and the like, and other aromatic dihalogenated compounds, aromatic dinitro compounds, and aromatic dicyano compounds, all of which are active in the aromatic nucleophilic substitution reaction, may be used. Among them, 2,6-dichlorobenzonitrile, 2,4-dichlorobenzonitrile, 2,6-difluorobenzonitrile, and 2,4-difluorobenzonitrile are preferable, and 2,6-dichlorobenzonitrile and 2,6-difluorobenzonitrile are more preferable.

Examples of the bisphenol compound or bisthiophenol compound include, but are not limited to, 9,9-bis(4-hydroxyphenyl)fluorene, 9,9-bis(3-methyl-4-hydroxyphenyl)fluorene, 4,4'-biphenol, 4,4'-dimercaptobiphenyl, bis(4-hydroxyphenyl)sulfone, 1,1-bis(4-hydroxyphenyl)ethane, 2,2-bis(4-hydroxyphenyl)propane, 1,1-bis(4-hydroxyphenyl)cyclohexane, bis(4-hydroxyphenyl)methane, 2,2-bis(4-hydroxyphenyl)butane, 3,3-bis(4-hydroxyphenyl)pentane, 2,2-bis(4-hydroxy-3,5-dimethylphenyl)propane, bis(4-hydroxy-3,5-dimethylphenyl)methane, bis(4-hydroxy-2,5-dimethylphenyl)methane, bis(4-hydroxyphenyl)phenylmethane, bis(4-hydroxyphenyl)diphenylmethane, 2,2-bis(4- hydroxyphenyl)hexafluoropropane, hydroquinone, resorcin, bis(4-hydroxyphenyl)ketone, 4,4'-thiodiphenol, 4,4'-oxydiphenol, 1,3-bis(4-hydroxyphenyl)adamantane, 2,2-bis(4-hydroxyphenyl)adamantane, 4,4'-thiobisbenzenethiol, 1,3-benzenedithiol, 1,4-benzenedithiol, phenolphthalein, poly (oxyphenyl)bisphenol, and the like, and other various aromatic diols or aromatic dithiols used in polymerization through the aromatic nucleophilic substitution reaction of polyarylene ether-based compounds may be used. Preferable examples of compounds used in combination include 4,4'-biphenol, 9,9-bis(4-hydroxyphenyl)fluorene, 1,3-bis(4-hydroxyphenyl)adamantane, 4,4'-thiodiphenol, 4,4'-oxydiphenol, 4,4'-thiobisbenzenethiol, and poly(oxyphenyl) bisphenol. When a plurality of kinds of bisphenol compounds and bisthiophenol compounds are used, it is preferable to use a combination of one or more kind(s) of compound(s) selected from the group consisting of 4,4'-biphenol, 9,9-bis (4-hydroxyphenyl)fluorene and 1,3-bis(4-hydroxyphenyl) adamantane with one or more kind(s) of compound(s) selected from the group consisting of 4,4'-thiodiphenol, 4,4'-oxydiphenol, 4,4'-thiobisbenzenethiol, 2,2-bis(4-hydroxyphenyl)hexafluoropropane, 2,2-bis(4-hydroxyphenyl)propane, 4,4'-dihydroxydiphenylmethane, 1,1-bis(4-hydroxyphenyl)cyclohexane, and poly(oxyphenyl)bisphenol so as to improve the joining property, processability, and durability in polymer electrolyte membranes.

In polymerization through the aromatic nucleophilic substitution reaction of the sulfonic acid group-containing polymer according to the present invention, compounds having the structures represented by the chemical formulas 38 and 39 and optionally other activated dihalogenated aromatic compound, dinitro aromatic compound, bisphenol compound or bisthiophenol compound may be added and reacted in the presence of a basic compound to obtain a polymer. By adjusting a molar ratio of a reactive halogen group or a nitro group to a reactive hydroxy group or a thiol group to an arbitrary ratio, the degree of polymerization of the polymer obtained may be adjusted, and it is preferably within a range of 0.8 to 1.2, more preferably within a range of 0.9 to 1.1, furthermore preferably within a range of 0.95 to 1.05, and most preferably 1 because a highly polymerized polymer can be obtained.

The content of the sulfonic acid group in the sulfonic acid group-containing polymer of the present invention is preferably within a range of 0.1 to 5.0 meq/g, more preferably within a range of 0.3 to 5.0 meq/g, further preferably within a range of 0.3 to 3.5 meq/g, furthermore preferably within a range of 0.5 to 3.5 meq/g, and still furthermore preferably within a range of 1.0 to 2.5 meq/g. If the sulfonic acid group content is smaller than 0.1 meq/g, the polymer tends not to exert a sufficient ion conductivity when used as a polymer electrolyte membrane. If larger than 5.0 meq/g, there is a tendency of not only easily causing problems that a membrane is swelled too much or dissolved into water, but also of reaching the ceiling in ion conductivity. In addition, after the sulfonic acid group is converted into an acid type structure by treatment with an acidic aqueous solution or the like, the sulfonic acid group content can be determined in terms of ion-exchange capacity by a titration method mentioned later.

Further, it is preferable that the sulfonic acid group-containing polymer of the present invention has a glass transition temperature within a range of 130° C. to 270° C., especially within a range of 130° C. to 220° C. If the glass transition temperature is lower than 130° C., thermal resistance of the polymer tends to become insufficient when used as a polymer electrolyte membrane. If the glass transition temperature is higher than 270° C., or higher than 220° C., there is a tendency that processability of the polymer is deteriorated in fabricating a polymer electrolyte membrane/electrode assembly. A glass transition temperature within a range of 130° C. to 270° C., especially within a range of 130° C. to 220° C. not only makes the processability of the polymer excellent in fabricating a polymer electrolyte membrane/electrode assembly, but also makes its heat resistance especially excellent when used as a fuel cell. The glass transition temperature herein mentioned can be determined by a dynamic viscoelasticity measurement which will be mentioned later.

In the present invention, when a sulfonic acid group-containing polyarylene ether-based compound which constitutes the sulfonic acid group-containing polymer is polymerized through the aromatic nucleophlilic substitution reaction, an activated difluoro aromatic compound and/or a dichloro aromatic compound and an aromatic diol may be reacted in the presence of a basic compound, thereby to give a polymer. The polymerization may be performed at a temperature range of 0° C. to 350° C., but preferably at a temperature range of 50° C. to 250° C. If the reaction temperature is lower than 0° C., the reaction tends not to sufficiently proceed, and if higher than 350° C., the polymer tends to begin to decompose. The reaction can be performed without any solvent, but preferably performed in the presence of a solvent. Usable solvents include, but are not limited to, N-methyl-2-pyrrolidone, N,N-dimethylacetamide, N,N-dimethylformamide, dimethyl sulfoxide, diphenylsulfone, sulfolane, and the like, and any solvent can be used as long as it can be used as a stable solvent in the aromatic nucleophilic substitution reaction. These organic solvents may be used solely or in combination of two or more thereof. The basic compound includes, but is not limited to, sodium hydroxide, potassium hydroxide, sodium carbonate, potassium carbonate, sodium hydrogen carbonate, potassium hydrogen carbonate and the like, and other basic compounds being able to convert an aromatic diol into an active phenoxide structure may be used.

If the basic compound is used in not less than 100 mol % to the total amounts of a bisphenol compound and a bisthiophenol compound, polymerization proceeds smoothly, and a preferable range is 105 to 125 mol % to the total amounts of a bisphenol compound and a bisthiophenol compound. If the amount of the basic compound becomes too much, it is not desirable because it becomes a cause of a side reaction such as decomposition.

Further, in the above polymerization reaction, it is possible to react a bisphenol compound or a bisthiophenol compound with an isocyanate compound such as phenyl isocyanate and react directly the resultant carbamoylated compound with an activated dihalogenated aromatic compound or a dinitro aromatic compound, without using a basic compound.

In the aromatic nucleophilic substitution reaction, there are some cases where water is produced as a by-product. In such a case, irrespective of a solvent for polymerization, toluene or the like may be made co-present in the reaction system to remove the water azeotropically out of the system. As a method for removing water out of the system, it is also possible to use a water-absorbent such as a molecular sieve. When the aromatic nucleophilic substitution reaction is performed in a solvent, a monomer is preferably supplied so as to have a concentration in a range of 5 to 50% by mass of the polymer obtained. If the concentration is lower than 5% by mass, there is a tendency that the degree of polymerization is not easily increased. Meanwhile, if such a concentration is higher than 50% by mass, viscosity of the reaction system becomes too high and post-treatment of the reaction products tends to become difficult.

It is preferable that polymerization is performed in such a manner that a monomer is added in a lump at an early stage of the reaction so that a polymer having high random chain distribution is obtained. After completion of the polymerization reaction, the solvent is removed by evaporation from the reaction solution and the residue is optionally washed to obtain a desired polymer. Alternatively, by adding the reaction solution to a solvent having a low solubility to the polymer, the polymer may be precipitated as a solid and the precipitates may be collected by filtration to obtain a polymer. Where necessary, the filtration process may be carried out prior to precipitation formation to remove by-produced salts, thereby giving a polymer solution.

It is also preferable that the sulfonic acid group-containing polymer of the present invention has a logarithmic viscosity of the polymer of not less than 0.1 dL/g as measured by the method mentioned later. If the logarithmic viscosity is smaller than 0.1 dL/g, there is a tendency for a membrane to become weak easily when molded into a polymer electrolyte membrane. It is more preferable that the logarithmic viscosity is not less than 0.3 g/dL. Meanwhile, if the logarithmic viscosity exceeds 5 g/dL, problems in processability such as difficulty of dissolution of the polymer tend to occur easily. Further, as a solvent for measuring the logarithmic viscosity, it is generally possible to use a polar organic solvent such as N-methyl-2-pyrrolidone or N,N-dimethylacetamide, but when the solubility of the polymer in these solvents is low, a concentrated sulfuric acid may be used for such measurement.

In the case where the sulfonic acid group-containing polymer of the present invention is used as a polymer electrolyte membrane, the sulfonic acid group-containing polymer may be used solely or in the form of a resin composition in combination with other polymers. The other polymers include, but are not limited to, for example, polyesters such as polyethylene terephthalate, polybutylene terephthalate and polyethylene naphthalate; polyamides such as nylon 6, nylon 6,6, nylon 6,10 and nylon 12; acrylate-based resins such as polymethyl methacrylate, polymethacrylates, polymethyl acrylate and polyacrylates; polyacrylic acid-based resins; polymethacrylic acid-based resins; various polyolefins including polyethylene, polypropylene, polystyrene and diene polymers; polyurethane-based resins; cellulose-based resins such as cellulose acetate and ethyl cellulose; aromatic-based polymers such as polyarylate, aramide, polycarbonate, polyphenylene sulfide, polyphenylene oxide, polysulfone, polyethersulfone, polyetheretherketone, polyetherimide, polyimide, polyamideimide, polybenzimidazole, polybenzoxazole and polybenzthiazole; thermosetting resins such as epoxy resins, phenol resins, novolac resins and benzoxazine resins, and the like. A resin composition in combination with a basic polymer such as polybenzimidazole and polyvinylpyridine is a particularly preferable combination for increasing a dimension stability of the polymer. Use of an acidic group-containing basic polymer obtained by introduction of an acidic group such as a sulfonic acid group or a phosphonic acid group into the basic polymer increases the processability of the resin composition further.

It is preferable for the sulfonic acid group-containing polymer of the present invention, which is contained in the resin composition, to be not less than 50% by mass to not more than 100% by mass of the whole resin composition. More preferably, the polymer is contained in not less than 70% by mass to not more than 100% by mass. In the case where the content of the sulfonic acid group-containing polymer of the present invention is less than 50% by mass of the whole of the resin composition, the concentration of the sulfonic acid group in the polymer electrolyte membrane which contains this resin composition tends to be low, and thus unable to obtain a good ion conductivity, and in addition, the units which contain a sulfonic acid group tend to form a discontinuous phase, thus lowering the mobility of conducting ions.

The sulfonic acid group-containing polymer of the present invention and the resin composition containing the same may include, where necessary, a variety of additives such as an antioxidant, a thermal stabilizer, a lubricant, a tackifier, a plasticizer, a crosslinking agent, a viscosity adjuster, an antistatic agent, an anti-microbial agent, an antifoaming agent, a dispersing agent and a polymerization inhibitor.

As the acidic group-containing basic polymer mentioned above, an acidic group-containing polybenzimidazole having a structural unit represented by the following chemical formula 40 may be preferably used.

(chemical formula 40)

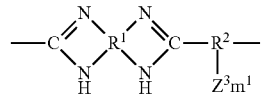

(In the chemical formula 40, $m^1$ represents an integer of 1 to 4; $R^1$ represents a tetravalent aromatic bond unit which is able to form an imidazole ring; $R^2$ represents a divalent aromatic unit; and $R^1$ and $R^2$ each may be a single aromatic ring, a combined body of a plurality of aromatic rings, or a fused ring, or may have a stable substituent. $Z^3$ represents a sulfonic acid group and/or a phosphonic acid group and a part thereof may take a salt structure.)

The route for synthesizing the acidic group-containing polybenzimidazole-based compound which contains the structural unit represented by the above chemical formula 40 is not particularly limited and it can be usually carried out by a reaction between one or more types of compounds selected from the group consisting of aromatic tetramines able to form an imidazole ring in the compound, as well as its derivative, and one or more types of compounds selected from the group consisting of an aromatic dicarboxylic acid and its derivative. At this time, a dicarboxylic acid containing a sulfonic acid group, a phosphonic acid group, or a salt thereof may be used as a part of the dicarboxylic acids to be used, thereby to introduce a sulfonic acid group and a phosphonic acid group into the polybenzimidazole to be obtained. It is possible to use a dicarboxylic acid containing a sulfonic acid group or a phosphonic acid group by combining one or more types of these dicarboxylic acids, and it is also possible to simultaneously utilize a dicarboxylic acid which contains a sulfonic acid group and a dicarboxylic acid which contains a phosphonic acid group.

Here, it is preferable that benzimidazole-based bond units which are components of a polybenzimidazole-based compound, aromatic dicarboxylic acid bond units having a sulfonic acid group and/or a phosphonic acid group, aromatic dicarboxylic acid bond units having neither a sulfonic acid group nor a phosphonic acid group, and other bond units are bonded through random polymerization and/or alternating polymerization. In addition, the polymerization form of these units is not limited to one type, but rather, two or more types of polymerization forms may coexist in the same compound.

The sulfonic acid group-containing polymer of the present invention and the resin composition containing the same can be molded into fibers or films by an arbitrary method such as extrusion, spinning, rolling, or casting. Among them, molding from a solution dissolved in a suitable solvent is preferred.

In addition, the above material may be dissolved in a suitable solvent to obtain a solution composition. Examples of the solvent include, but are not limited to, aprotic polar solvents such as N,N-dimethylformamide, N,N-dimethylacetamide, N,N-diethylacetamide, dimethyl sulfoxide, N-methyl-2-pyrrolidone, hexamethylphosphonamide, and N-morpholine oxide, and a mixed solvent selected from a combination of alcohols such as methanol and ethanol, ketones such as acetone, ethers such as diethyl ether, water, and the like. A plurality of these solvents may be mixed and used to the possible extent.

It is preferable that the concentration of the compound in the solution is within a range of 0.1 to 50% by mass. If the concentration of the compound in the solution is less than 0.1% by mass, it tends to become difficult to obtain a good molded product, and if the concentration exceeds 50% by mass, the processability tends to be lowered.

In the case where a membrane or a fiber is molded from the solution, it is preferable that the concentration is within a range of 5 to 50% by weight, more preferably within a range of 10 to 40% by weight. If the solution is used as an adhesive, the concentration is more preferably within a range of 0.1 to 20% by weight. When the solution is used as an adhesive, it may contain other components such as carbon particles-supported catalysts including Pt, Pt—Ru or the like, and fluororesins.

The method for obtaining a molded product from the solution can be performed using a known conventional method. For example, by heating, drying under reduced pressure, immersing into a solvent which is unable to dissolve the compound, but is miscible with a solvent capable of dissolving the compound, the solvent may be removed to obtain a molded product. In the case where the solvent is an organic solvent, it is preferable that the solvent is distilled away by heating or drying under reduced pressure. At that time, the solution may also be molded into any type of shapes such as fiber, film, pellet, plate, rod, pipe, ball and block, in a composite form with other compounds according to the necessity. Combination use of compounds each having similar dissolution behaviors is advantageous in performing good molding. The sulfonic acid group in the molded product thus obtained may take a salt form with a cation species, and may also be converted into a free sulfonic acid group by acid treatment, if necessary.

In the present invention, a polymer electrolyte membrane can be prepared from a sulfonic acid group-containing polymer and a resin composition containing the same. A most preferable technique for molding a polymer electrolyte membrane is casting from the solution. As described above, the solvent can be removed from the solution and a polymer electrolyte membrane can be obtained from the casted solution. Examples of the solution include a solution using an organic solvent such as N-methyl-2-pyrrolidone, N,N-dimethylformamide, N,N-dimethylacetamide or dimethyl sulfoxide, and a mixed solvent selected from a combination of alcohols, ketones, water and the like, depending on the circumstances. Drying is preferable for removing the solvent in view of uniformity of the ion conductive membrane. In addition, it is preferable to dry the solution under a reduced pressure and at a temperature as low as possible in order to avoid decomposition or alteration of the compound or the solvent. Further, in the case where the viscosity of the solution is high, casting can be easily carried out at a high temperature when the substrate and the solution are heated so that the viscosity of the solution is lowered.

Although the thickness of the solution at the time of casting is not particularly limited, it is preferably 10 to 1500 μm, more preferably 50 to 500 μm. If the thickness of the solution is smaller than 10 μm, the polymer electrolyte membrane tends not to maintain its shape, and in the case where the thickness is greater than 1500 μm, the polymer electrolyte membrane tends to easily become uneven.

A known method can be used in order to control the casting thickness of the solution. For example, the thickness is made to be constant by using, for example, an applicator, a doctor blade, or the like, or the thickness can be controlled by adjusting the amount and the concentration of the solution when the area of the casting is made constant by using a frame or a glass petri dish preventing the solution from overflowing. The membrane that is casted from the solution can be made more uniform by adjusting the rate of removal of the solvent. For example, in the case the solvent is removed by heating, the rate of evaporation can be lowered by lowering the temperature at the initial stage. In addition, in the case where the solution is immersed into a non-solvent such as water, the rate of coagulation of the compound and the rate of removal of the solvent can be adjusted by leaving the solution in the air or in an inert gas for an appropriate period of time.

The thickness of the polymer electrolyte membrane of the present invention can be adjusted to an arbitrary thickness in accordance with its application, and it is preferable for the membrane to be as thin as possible in view of ion conductivity. The thickness is preferably within a range of 5 to 300 μm, more preferably within a range of 5 to 100 μm, furthermore preferably within a range of 5 to 50 μm, still furthermore preferably within a range of 10 to 50 μm, and most preferably within a range of 20 to 50 μm. If the thickness of the membrane is smaller than 5 μm, handling of the polymer electrolyte membrane becomes difficult, and short circuiting or the like in the case of making a fuel cell tends to easily occur, and thus it tends to become difficult to satisfy predetermined characteristics. If the thickness is larger than 300 μm, the electric resistance value of the polymer electrolyte membrane becomes high, and as the result, the power generation performance of the fuel cell tends to lower or its production tends to become difficult.

In the case where the polymer electrolyte membrane of the present invention is used as an ion conducting membrane, the sulfonic acid group in the membrane may take a metal salt form, and may be converted into a free sulfonic acid group by an appropriate acid treatment. In this case, it is also effective to subject the membrane to an immersion treatment in an aqueous solution of sulfuric acid, hydrochloric acid or the like with or without heating.

It is preferable that ion conductivity of the polymer electrolyte membrane of the present invention is not less than $1.0 \times 10^{-3}$ S/cm. In the case where the ion conductivity is not less than $1.0 \times 10^{-3}$ S/cm, a fuel cell using this polymer electrolyte membrane tends to obtain an appropriate output, and in the case where the ion conductivity is less than $1.0 \times 10^{-3}$ S/cm, the output of the fuel cell tends to decline.

The polymer electrolyte membrane of the present invention is also useful for a direct methanol type fuel cell using methanol as a fuel. Especially, it is preferable that a polymer electrolyte membrane is one showing an average thickness of 50 μm after production of a membrane and a permeation rate of methanol of not more than 7 mmol/(m$^2$·sec) measured at 25° C. using a 5M aqueous methanol solution. In this case, excellent power generating performance is imparted to the fuel cell. Further, it is more preferable for the permeation rate of methanol to be not more than 4 mmol/(m$^2$·sec), and it is still more preferable to be not more than 1 mmol/(m$^2$·sec).

Although there is a case where the permeation characteristic of methanol depends on the thickness of the membrane and such permeation rate of methanol is described on a produced sample having an average thickness of 50 μm, the thickness of the membrane is not particularly limited when the membrane is actually used as an ion conducting membrane for a fuel cell. The membrane having an average thickness of 50 μm refers to a membrane of which the thickness is essentially in a range of from an average thickness of 48 μm to an average thickness of 52 μm.

In the case where a polymer electrolyte membrane obtained from the sulfonic acid group-containing polymer of the present invention and the resin composition containing the same contains a heat- and/or photo-crosslinkable component, a crosslinked structure can be introduced into the molecular chain by heat treatment and/or light irradiation treatment, so that the dimensional stability of the membrane further becomes excellent. Although the heating temperature in heat-crosslinking varies depending on the structure of a crosslinkable polymer, the kind of a crosslinkable group, the amount of introducing a crosslinkable group, and the like, it is usually 150° C. to 450° C., preferably 200° C. to 400° C. The heating time is usually 0.01 to 50 hours, preferably 0.02 to 24 hours, though it depends on the heating temperature, the structure of a crosslinkable polymer, and the like. The pressure may be any of normal pressure, reduced pressure, and pressurization. Further, the gas atmosphere may be any of an air atmosphere, a nitrogen atmosphere, and an argon atmosphere. If the heating temperature is high, it is preferable for the sulfonic acid group in the state of a salt to be treated under heating. Moreover, the light source used in the photo-crosslinking is not particularly limited, but includes a low-pressure mercury lamp, a high-pressure mercury lamp, a xenon lamp, a metal halide lamp, and the like. Although the irradiation amount varies depending on the polymer structure and the thickness of the membrane, it is usually 100 to 50000 mJ/cm$^2$, preferably 300 to 30000 mJ/cm$^2$.

In addition, by joining the above polymer electrolyte membrane of the present invention, a film or the like to an electrode, an assembly of the polymer electrolyte membrane, a film or the like and the electrode can be obtained as the polymer electrolyte membrane/electrode assembly of the present invention. As a method for fabricating such an assembly, it is possible to use a known conventional method, such as a method for joining a polymer electrolyte membrane and an electrode to each other by applying an adhesive to the surface of the electrode, a method for pressing a polymer electrolyte membrane and an electrode against each other under application of heat, and the like. Among these, a method for applying an adhesive containing the sulfonic acid group-containing polymer of the present invention and its resin composition as main components to the surface of an electrode for adhesion is preferable. This is because according to this method, adhesion between the polymer electrolyte membrane and the electrode is improved, and loss in the ion conductivity of the polymer electrolyte membrane is reduced.

Also, the sulfonic acid group-containing polymer of the present invention may be applied to an electrode catalyst layer to form a polymer electrolyte membrane/electrode assembly.

It is also possible to fabricate a fuel cell by use of the assembly of the polymer electrolyte membrane, a film or the like and the electrode. The fuel cell can be made from a unit cell provided with an oxygen electrode, a fuel electrode, and a polymer electrolyte membrane disposed so as to be sandwiched between the oxygen electrode and the fuel electrode, an oxidant distribution plate forming an oxidant channel installed at the oxygen electrode side, and a fuel distribution plate forming a fuel channel installed at the fuel electrode side. The polymer electrolyte membrane, a film or the like of the present invention is particularly suitable for solid polymer type fuel cells. The polymer electrolyte membrane of the present invention is able to provide a fuel cell excellent in ion conductivity and durability; durability even in high temperature operation; good processability in fabricating a polymer electrolyte membrane/electrode assembly; easy fabrication; and sufficient output. The sulfonic acid group-containing polymer of the present invention is preferably used in a direct methanol type fuel cells using methanol as a fuel, and in solid polymer type fuel cells using hydrogen as a fuel, by adjusting the amount of the sulfonic acid group in the polymer. Further, such a polymer of the present invention can also be used preferably in fuel cells using other substances such as dimethyl ether, hydrogen, and formic acid as a fuel. In addition, the polymer may be used for known arbitrary applications as ion exchange membranes such as electrolyte membranes and separation membranes.

EXAMPLES

In the following, the present invention is concretely described using Examples, but is not limited to these Examples.

Examples 1A to 12A

Various measurements were performed in the following manner.

Viscosity of Solution: A polymer powder was dissolved in N-methylpyrrolidone so as to have a concentration of 0.5 g/dl, and the viscosity thereof was measured using an Ubbelohde viscometer in a thermostatic bath at 30° C., and the viscosity was evaluated in terms of a logarithmic viscosity ($\ln[ta/tb]/c$) (wherein ta is the number of seconds for a sample solution to drop, tb is the number of seconds for only the solvent to drop, and c is the polymer concentration).

TGA: A thermogravimeter (TGA-50) manufactured by Shimadzu Corporation was used, and measurement was carried out in an argon atmosphere at a temperature rise rate of 10° C./min (during the heating, the temperature was maintained at 150° C. for 30 minutes to sufficiently remove moisture).

Ion Conductivity Measurement: A platinum wire (diameter: 0.2 mm) was placed on the surface of a membrane sample in strip form on a self-made probe for measurement (made from a tetrafluoroethylene resin (Teflon: registered trademark)), and the sample was held in a thermostat and humidistat oven (Nagano Science Co., Ltd., LH-20-01) at 80° C., 95% RH, so that the alternating current impedance between the platinum wires could be measured by a 1250 FREQUENCY RESPONSE ANALYSER manufactured by Solartron Corporation. Measurement was carried out while changing the distance between the electrodes, and the conductivity was calculated as the ionic conductivity standard by cancelling the contact resistance between the membrane and the platinum wire from the inclination of the plot for the resistance measurement values, which were estimated from the C-C plots, against the distance between the electrodes, using the following equation: conductivity [S/cm]=1/width of membrane[cm]×thickness of membrane[cm]×resistance inclination between electrodes[Ω/cm]. Further, a similar measurement was performed by immersing the probe to be measured in ultrapure water kept at 25° C., and its conductivity in water was also calculated.

Content of Sulfonic Acid Group: The mass weight of a sample which had been dried overnight under a nitrogen atmosphere was measured, and the sample was subjected to stirring treatment with an aqueous sodium hydroxide solution. After that, the content of the sulfonic acid group was determined by back titration in terms of ion exchange capacity (IEC) (meq/g) using an aqueous hydrochloric acid solution.

Methanol Permeation Rate: A membrane which had been immersed for 24 hours in a 5M (mol/liter) aqueous methanol solution which had been adjusted to a temperature of 25° C. was inserted into an H-type cell, where 100 ml of the 5M aqueous methanol solution was injected into one side of the cell and 100 ml of ultrapure water (18 MΩ·cm) was injected into the other cell, and the amount of methanol that was diffused into the ultrapure water through the ion exchange membrane was measured using a gas chromatograph while stirring the cells on both sides at 25° C., whereby the permeation rate of methanol was calculated (the area of the ion exchange membrane is 2.0 $cm^2$).

Glass Transition Temperature: A sine wave tension was applied to a film sample of 5 mm in width and 15 mm in effective length, and the dynamic viscoelasticity measurement was performed at a temperature rise rate of 2° C./min using a Rheogel-E4000 manufactured by Orientec Co., Ltd. The temperature when the elastic modulus begins to decrease due to the temperature rise is defined as a glass transition temperature.

H-NMR Measurement: A sample was dissolved in deuterated dimethyl sulfoxide, and its NMR spectrum was measured at 80° C. using a VARIAN GEMINI-200 NMR spectrometer.

Evaluation of Power Generation: A small amount of ultrapure water and isopropyl alcohol were added to a carbon-supported Pt/Ru catalyst (TEC61E54 manufactured by Tanaka Precious Metals Co., Ltd.) so that the catalyst was moistened, and after that, a 20% Nafion (registered trademark) solution (product number: SE-20192) manufactured by DuPont Corporation was added so that the mass ratio of the carbon-supported Pt/Ru catalyst to Nafion (registered trademark) becomes 2.5:1. Next, the solution was stirred so as to prepare a catalyst paste for the anode. This catalyst paste was applied to carbon paper TGPH-060 manufactured by Toray Corporation to be the gas diffusion layer so that the amount of attached platinum becomes 2 mg/$cm^2$ by spreading and drying by screen printing, and thus, carbon paper attached with an electrode catalyst layer for the anode was prepared. In addition, a small amount of ultrapure water and isopropyl alcohol were added to a carbon-supported Pt catalyst (TEC10V40E, Tanaka Precious Metals Co., Ltd.) so that the catalyst was moistened, and after that, a 20% Nafion (registered trademark) solution (product number: SE-20192) manufactured by DuPont Corporation was added so that the mass ratio of the carbon-supported Pt catalyst to Nafion (registered trademark) becomes 2.5:1, and the solution was stirred so as to prepare a catalyst paste for the cathode. This catalyst paste was applied to water-repellent carbon paper TGPH-060 manufactured by Toray Corporation so that the amount of attached platinum became 1 mg/$cm^2$ by spreading and drying, and thus, carbon paper attached with an electrode catalyst layer for the cathode was prepared. A membrane sample was sandwiched between the above-described two types of carbon paper attached with an electrode catalyst layer, so that the electrode catalyst layers made contact with the membrane sample, and pressure and heat were applied to the resulting assembly for 3 minutes at 130° C. under 8 Mpa by a hot press method, and thus, a polymer electrolyte membrane/electrode assembly was obtained.

This assembly was incorporated in a fuel cell FC25-02SP for evaluation manufactured by ElectroChem, Inc., and a power generation test was carried out using a fuel cell power generation testing apparatus (manufactured by Toyo Corporation). The power was generated while 2 mol/l of an aqueous methanol solution (1.5 ml/min) and a highly pure oxygen gas (80 ml/min), which were respectively adjusted to a temperature of 40° C., were supplied to the anode and the cathode at a cell temperature of 40° C.

Example 1A 9.6228 g (0.019588 mole) of disodium 3,3'-disulfo-4,4'-dichlorodiphenylsulfone (abbreviation: S-DCDPS), 3.1102 g (0.018082 mole) of 2,6-dichlorobenzonitrile (abbreviation: DCBN), 20.71319 g (0.037670 mole) of a terminal hydroxyl group-containing phenylene ether oligomer (abbreviation: DPE) (SPECIANOL DPE-PL, Lot C106 manufactured by Dainippon Ink and Chemicals Inc.) (In the chemical formula 3, a mixture of components wherein n is 1 to 7. The average composition as estimated by NMR measurement is n=4.0.) and 5.9873 g (0.043321 mole) of potassium carbonate were weighed into a 200 ml-four necked flask, and nitrogen was introduced therein. After addition of 100 ml of N-methyl-2-pyrrolidone, the mixture was stirred under heating, and the reaction temperature was raised to 195° C. to 200° C. and then reacted for 13 hours. After being left for cooling, the polymerized solution was poured into water to precipitate a polymer in a strand form, thereby to obtain a polymer composed of a sulfonic acid group-containing polyarylene ether-based compound. The polymer obtained was immersed in fresh water for one day and then dried. The polymer showed a logarithmic viscosity of 0.36.

20 g of the polymer was dissolved in 80 ml of NMP, casted to a thickness of about 500 μm on a glass plate placed on a hot plate, distilled to remove NMP until a film was formed, and then immersed in water overnight or longer. The film obtained was treated by immersion in diluted sulfuric acid (6 ml of concentrated sulfuric acid and 300 ml of water) for one day so that the acidic group in the polymer was converted from a salt type structure into an acid type structure, and immersed in pure water twice for one hour each time to remove the acid components, then dried. The ion conductivity of this film was measured to show 0.15 S/cm at 80° C., 95% RH, and 0.032 S/cm in water at 25° C. The weight loss starting temperature (measured based on a sample weight at 200° C.) of this film as estimated by thermogravimetry was 286° C., and 3% weight loss temperature was 352° C. The IEC determined by titration was 1.23 meq/g. The permeation rate of methanol was 2.6 mmol/($m^2$·sec). FIG. 1 is a chart showing a $^1$H-NMR spectrum of a film of the polyarylene ether-based compound containing a sulfonic acid group obtained in Example 1A, and a structural formula assigned from the spectrum. It is understood that an average value of n in the structural formula in FIG. 1 is about 4.4 from the integrated values of the spectrum.

Example 2A 10.2452 g (0.020855 mole) of S-DCDPS, 9.2246 g (0.053628 mole) of DCBN, 20.4777 g (0.03724 mole) of DPE (SPECIANOL DPE-PL, Lot C106 manufactured by Dainippon Ink and Chemicals Inc.), 7.5307 g (0.03724 mole) of 4,4'-dihydroxydiphenyl ether and 11.8385 g (0.08566 mole) of potassium carbonate were weighed into a 200 ml-four necked flask, and nitrogen was introduced therein. After addition of 140 ml of N-methyl-2-pyrrolidone, the mixture was stirred under heating, and the reaction temperature was raised to 195° C. to 200° C. and then reacted for 16 hours. After being left for cooling, the polymerized solution was poured into water to precipitate a polymer in a strand form, thereby to obtain a polymer composed of a sulfonic acid group-containing polyarylene ether-based compound. The polymer obtained was immersed in fresh water for one day and then dried. The polymer showed a logarithmic viscosity of 0.90.

20 g of the polymer was dissolved in 80 ml of NMP, casted to a thickness of about 500 μm on a glass plate placed on a hot plate, distilled to remove NMP until a film was formed, and immersed in water overnight or longer. The film obtained was treated by immersion in diluted sulfuric acid (6 ml of concentrated sulfuric acid and 300 ml of water) for one day so that the acidic group in the polymer was converted from a salt type structure into an acid type structure, and immersed in pure water twice for one hour each time to remove the acid components, then dried. The ion conductivity of this film was measured to show 0.05 S/cm at 80° C., 95% RH, and 0.019 S/cm in water at 25° C. The weight loss starting temperature (measured based on a sample weight at 200° C.) of this film as estimated by thermogravimetry was 297° C., and 3% weight loss temperature was 362° C. The IEC determined by titration was 0.90 meq/g. The permeation rate of methanol was 1.2 mmol/(m$^2$·sec). The glass transition temperature by dynamic viscoelasticity measurement showed 153° C.

Figure 2:
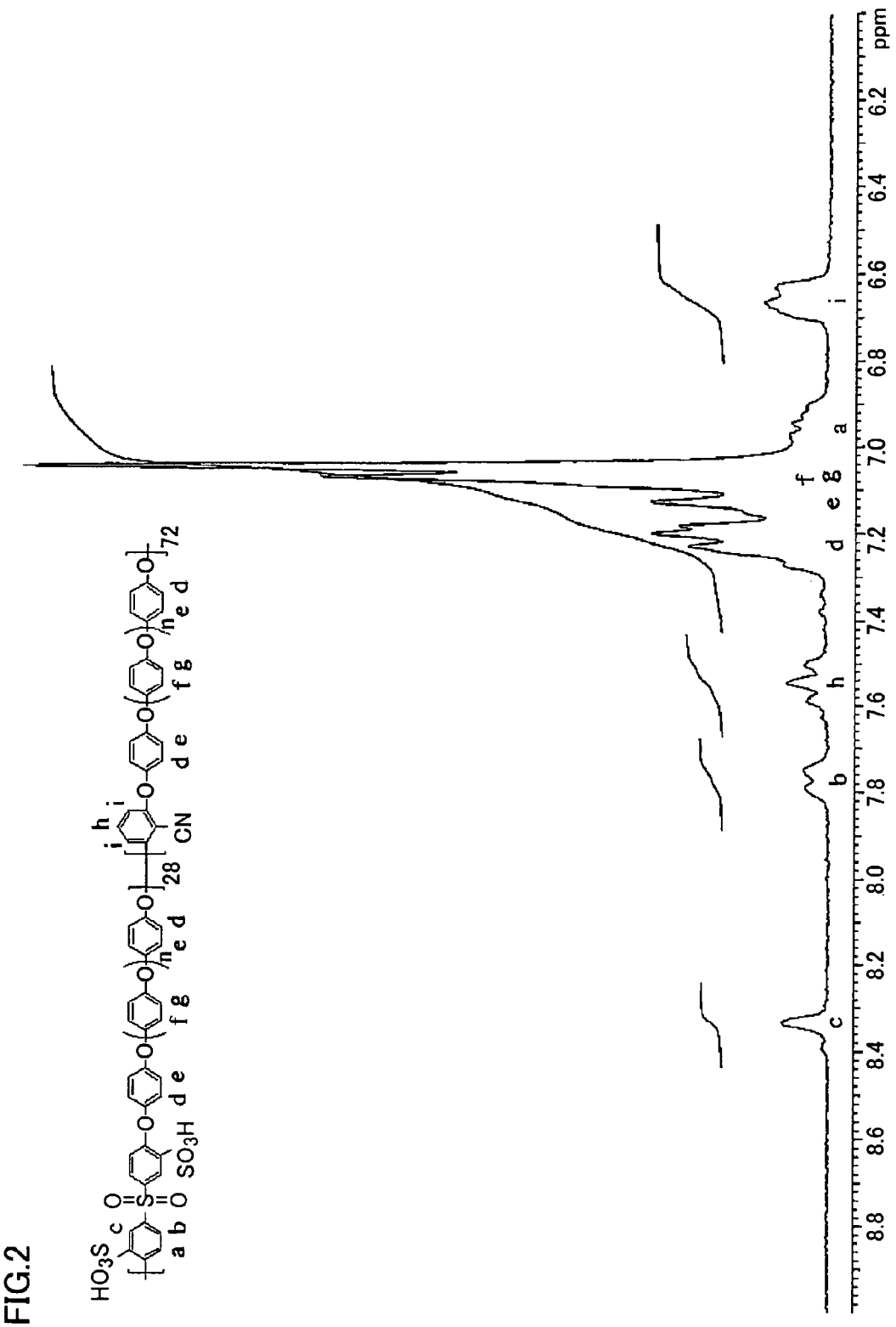
FIG. 2 is a chart showing a $^1$H-NMR spectrum of a film of a polyarylene ether-based compound containing a sulfonic acid group obtained in Example 2A, and a structural formula assigned from the spectrum.

FIG. 2 is a chart showing a $^1$H-NMR spectrum of a film of the polyarylene ether-based compound containing a sulfonic acid group obtained in Example 2A, and a structural formula assigned from the spectrum. It is understood from the integrated values of the spectrum that an average value of n in the structural formula of FIG. 2 is about 2.0.

Example 3A 11.0125 g (0.022417 mole) of S-DCDPS, 4.0134 g (0.02333 mole) of DCBN, 12.5779 g (0.022875 mole) of DPE (SPECIANOL DPE-PL, Lot C106 manufactured by Dainippon Ink and Chemicals Inc.), 4.6255 g (0.022875 mole) of 4,4'-dihydroxydiphenyl ether and 7.2715 g (0.05261 mole) of potassium carbonate were weighed into a 200 ml-four necked flask, and nitrogen was introduced therein. After addition of 100 ml of N-methyl-2-pyrrolidone, the mixture was stirred under heating, and the reaction temperature was raised to 195° C. to 200° C. and then reacted for hours. After being left for cooling, the polymerized solution was poured into water to precipitate a polymer in a strand form, thereby to obtain a polymer composed of a sulfonic acid group-containing polyarylene ether-based compound. The polymer obtained was immersed in fresh water for one day and then dried. The polymer showed a logarithmic viscosity of 0.56.

20 g of the polymer was dissolved in 80 ml of NMP, casted to a thickness of about 500 μm on a glass plate placed on a hot plate, distilled to remove NMP until a film was formed, and immersed in water overnight or longer. The film obtained was treated by immersion in diluted sulfuric acid (6 ml of concentrated sulfuric acid and 300 ml of water) for one day so that the acidic group in the polymer was converted from a salt type structure into an acid type structure, and immersed in pure water twice for one hour each time to remove the acid components, then dried. The ion conductivity of this film was measured to show 0.19 S/cm at 80° C., 95% RH, and 0.090 S/cm in water at 25° C. The weight loss starting temperature (measured based on a sample weight at 200° C.) of this film as estimated by thermogravimetry was 284° C., and 3% weight loss temperature was 346° C. The IEC determined by titration was 1.52 meq/g. The permeation rate of methanol was 4.4 mmol/(m$^2$ sec). The glass transition temperature by dynamic viscoelasticity measurement was 162° C.

Example 4A 10.0608 g (0.02048 mole) of S-DCDPS, 5.7477 g (0.03341 mole) of DCBN, 14.8173 g (0.026947 mole) of DPE (SPECIANOL DPE-PL, Lot C106 manufactured by Dainippon Ink and Chemicals Inc.), 5.4490 g (0.026947 mole) of 4,4'-dihydroxydiphenyl ether and 8.5661 g (0.061979 mole) of potassium carbonate were weighed into a 200 ml-four necked flask, and nitrogen was introduced therein. After addition of 110 ml of N-methyl-2-pyrrolidone, the mixture was stirred under heating, and the reaction temperature was raised to 195° C. to 200° C. and then reacted for hours. After being left for cooling, the polymerized solution was poured into water to precipitate a polymer in a strand form, thereby to obtain a polymer composed of a sulfonic acid group-containing polyarylene ether-based compound. The polymer obtained was immersed in fresh water for one day and then dried. The polymer showed a logarithmic viscosity of 0.51.

20 g of the polymer was dissolved in 80 ml of NMP, casted to a thickness of about 500 μm on a glass plate placed on a hot plate, distilled to remove NMP until a film was formed, and immersed in water overnight or longer. The film obtained was treated by immersion in diluted sulfuric acid (6 ml of concentrated sulfuric acid and 300 ml of water) for one day so that the acidic group in the polymer was converted from a salt type structure into an acid type structure, and immersed in pure water twice for one hour each time to remove the acid components, then dried. The ion conductivity of this film was measured to show 0.11 S/cm at 80° C., 95% RH, and 0.042 S/cm in water at 25° C. The weight loss starting temperature (measured based on a sample weight at 200° C.) of this film as estimated by thermogravimetry was 303° C., and 3% weight loss temperature was 361° C. The IEC determined by titration was 1.21 meq/g. The permeation rate of methanol was 2.6 mmol/(m$^2$·sec).

Example 5A 8.1896 g (0.016671 mole) of S-DCDPS, 9.6001 g (0.055811 mole) of DCBN, 10.3532 g (0.018121 mole) of DPE (SPECIANOL DPE-PL, Lot C106 manufactured by Dainippon Ink and Chemicals Inc.), 10.9925 g (0.054362 mole) of 4,4'-dihydroxydiphenyl ether and 11.5205 g (0.08336 mole) of potassium carbonate were weighed into a 200 ml-four necked flask, and nitrogen was introduced therein. After addition of 110 ml of N-methyl-2-pyrrolidone, the mixture was stirred under heating, and the reaction temperature was raised to 195° C. to 200° C. and then reacted for 14 hours. After being left for cooling, the polymerized solution was poured into water to precipitate a polymer in a strand form, thereby to obtain a polymer composed of a sulfonic acid group-containing polyarylene ether-based compound. The polymer obtained was immersed in fresh water for one day and then dried. The polymer showed a logarithmic viscosity of 0.93.

20 g of the polymer was dissolved in 80 ml of NMP, casted to a thickness of about 500 μm on a glass plate placed on a hot plate, distilled to remove NMP until a film was formed, and immersed in water overnight or longer. The film obtained was treated by immersion in diluted sulfuric acid (6 ml of concentrated sulfuric acid and 300 ml of water) for one day so that the acidic group in the polymer was converted from a salt type structure into an acid type structure, and immersed in pure water twice for one hour each time to remove the acid components, then dried. The ion conductivity of this film was measured to show 0.05 S/cm at 80° C., 95% RH, and 0.018 S/cm in water at 25° C. The weight loss starting temperature (measured based on a sample weight at 200° C.) of this film as measured by thermogravimetry was 304° C., and 3% weight loss temperature was 365° C. The IEC determined by titration was 0.93 meq/g. The permeation rate of methanol was 1.1 mmol/(m²·sec). The glass transition temperature by dynamic viscoelasticity measurement showed 173° C.

Example 6A 6.1115 g (0.01447 mole) of disodium 3,3'-disulfo-4,4'-difluorobenzophenone, 5.8085 g (0.03377 mole) of DCBN, 13.7812 g (0.02412 mole) of DPE (SPECIANOL DPE-PL, Lot C106 manufactured by Dainippon Ink and Chemicals Inc.), 4.8774 g (0.02412 mole) of 4,4'-dihydroxydiphenyl ether and 6.6675 g (0.05548 mole) of potassium carbonate were weighed into a 200 ml-four necked flask, and nitrogen was introduced therein. After addition of 90 ml of N-methyl-2-pyrrolidone, the mixture was stirred under heating, and the reaction temperature was raised to 195° C. to 200° C. and then reacted for 18 hours. After being left for cooling, the polymerized solution was poured into water to precipitate a polymer in a strand form, thereby to obtain a polymer composed of a sulfonic acid group-containing polyarylene ether-based compound. The polymer obtained was immersed in fresh water for one day and then dried. The polymer showed a logarithmic viscosity of 0.58.

20 g of the polymer was dissolved in 80 ml of NMP, casted to a thickness of about 500 μm on a glass plate placed on a hot plate, distilled to remove NMP until a film was formed, and immersed in water overnight or longer. The film obtained was treated by immersion in diluted sulfuric acid (6 ml of concentrated sulfuric acid and 300 ml of water) for one day so that the acidic group in the polymer was converted from a salt type structure into an acid type structure, and immersed in pure water twice for one hour each time to remove the acid components, then dried. The ion conductivity of this film was measured to show 0.06 S/cm at 80° C., 95% RH, and 0.021 S/cm in water at 25° C. The weight loss starting temperature (measured based on a sample weight at 200° C.) of this film as measured by thermogravimetry was 297° C., and 3% weight loss temperature was 362° C. The IEC determined by titration was 1.03 meq/g. The permeation rate of methanol was 1.3 mmol/(m²·sec).

Example 7A 7.1016 g (0.01446 mole) of S-DCDPS, 6.3941 g (0.03717 mole) of DCBN, 14.7491 g (0.025815 mole) of DPE (SPECIANOL DPE-PL, Lot C106 manufactured by Dainippon Ink and Chemicals Inc.), 4.8069 g (0.025815 mole) of 4,4'-biphenol and 8.2060 g (0.059373 mole) of potassium carbonate were weighed into a 200 ml-four necked flask, and nitrogen was introduced therein. After addition of 100 ml of N-methyl-2-pyrrolidone, the mixture was stirred under heating, and the reaction temperature was raised to 195° C. to 200° C. and then reacted for 15 hours. After being left for cooling, the polymerized solution was poured into water to precipitate a polymer in a strand form. The polymer obtained was immersed in fresh water for one day and then dried. The polymer showed a logarithmic viscosity of 0.79.

20 g of the polymer was dissolved in 80 ml of NMP, casted to a thickness of about 500 μm on a glass plate placed on a hot plate, distilled to remove NMP until a film was formed, and immersed in water overnight or longer. The film obtained was treated by immersion in diluted sulfuric acid (6 ml of concentrated sulfuric acid and 300 ml of water) for one day so that the acidic group in the polymer was converted from a salt type structure into an acid type structure, and immersed in pure water twice for one hour each time to remove the acid components, then dried. The ion conductivity of this film was measured to show 0.08 S/cm at 80° C., 95% RH, and 0.040 S/cm in water at 25° C. The IEC determined by titration was 0.95 meq/g. The permeation rate of methanol was 1.0 mmol/(m² sec).

Example 8A 8.3450 g (0.016987 mole) of S-DCDPS, 9.9040 g (0.03449 mole) of 4,4'-dichlorodiphenylsulfone, 14.7056 g (0.025738 mole) of DPE (SPECIANOL DPE-PL, Lot C106 manufactured by Dainippon Ink and Chemicals Inc.), 5.2045 g (0.025738 mole) of 4,4'-dihydroxydiphenyl ether and 8.1817 g (0.05920 mole) of potassium carbonate were weighed into a 200 ml-four necked flask, and nitrogen was introduced therein. After addition of 115 ml of N-methyl-2-pyrrolidone, the mixture was stirred under heating, and the reaction temperature was raised to 195° C. to 200° C. and then reacted for 19 hours. After being left for cooling, the polymerized solution was poured into water to precipitate a polymer in a strand form, thereby to obtain a polymer composed of a sulfonic acid group-containing polyarylene ether-based compound. The polymer obtained was immersed in fresh water for one day and then dried. The polymer showed a logarithmic viscosity of 0.67.

20 g of the polymer was dissolved in 80 ml of NMP, casted to a thickness of about 500 μm on a glass plate placed on a hot plate, distilled to remove NMP until a film was formed, and immersed in water overnight or longer. The film obtained was treated by immersion in diluted sulfuric acid (6 ml of concentrated sulfuric acid and 300 ml of water) for one day so that the acidic group in the polymer was converted from a salt type structure into an acid type structure, and immersed in pure water twice for one hour each time to remove the acid components, then dried. The ion conductivity of this film was measured to show 0.08 S/cm at 80° C., 95% RH, and 0.037 S/cm in water at 25° C. The IEC determined by titration was 0.94 meq/g. The permeation rate of methanol was 2.9 mmol/(m² sec).

Example 9A 1.500 g ($5.389 \times 10^{-3}$ mole) of 3,3',4,4'-tetraminodiphenylsulfone, 1.445 g ($5.389 \times 10^{-3}$ mole) of 2,5-dicarboxybenzenesulfonic acid, 20.5 g of polyphosphoric acid (content of phosphorus pentoxide: 75% by mass) and 16.5 g of phosphorus pentoxide were weighed into a polymerization vessel. Nitrogen was introduced therein and the reaction temperature was raised to 100° C. while stirring the mixture gently in an oil bath. After keeping the mixture at 100° C. for one hour, polymerization was performed at an elevated temperature of 150° C. for one hour and at an elevated temperature of 200° C. for 4 hours. After completion of the polymerization, the reaction mixture was allowed to stand for cooling, and a polymer was taken out upon addition of water, and washed repeatedly with water in a household mixer until a pH test paper became neutral, thereby to obtain a polymer composed of a sulfonic acid group-containing polyarylene ether-based compound. The polymer obtained was dried at 80° C. under reduced pressure overnight. The polymer showed a logarithmic viscosity of 2.19. One gram of this polymer was dissolved in 10 ml of N-methyl-2-pyrrolidone under heating and mixed with 40 ml of the membrane-forming solution prepared in Example 3A. After that, a blend film of 50 μm in thickness made from a resin composition containing the sulfonic acid group-containing polyarylene ether-based compound of the present invention was prepared in a manner similar to Example 1A, except that the casted thickness was adjusted. The content of the sulfonic acid group-containing polyarylene ether-based compound in the resin composition is 91% by mass.

The ion conductivity of this film was measured to be 0.06 S/cm in water at 25° C. The permeation rate of methanol showed 3.5 mmol/(m$^2$·sec).

Example 10A 1.830 g ($6.575 \times 10^{-3}$ mole) of 3,3',4,4'-tetraminodiphenylsulfone, 1.084 g ($4.405 \times 10^{-3}$ mole) of 3,5-dicarboxyphenylphosphonic acid, 0.360 g ($2.170 \times 10^{-3}$ mole) of terephthalic acid, 20.5 g of polyphosphoric acid (content of phosphorus pentoxide: 75% by mass) and 16.5 g of phosphorus pentoxide were weighed into a polymerization vessel. Nitrogen was introduced therein and the reaction temperature was raised to 100° C. while stirring the mixture gently in an oil bath. After keeping the mixture at 100° C. for one hour, polymerization was performed at an elevated temperature of 150° C. for one hour and at an elevated temperature of 200° C. for 7 hours. After completion of the polymerization, the reaction mixture was allowed to stand for cooling, and a polymer was taken out upon addition of water, and washed repeatedly with water in a household mixer until a pH test paper became neutral, thereby to obtain a polymer composed of a sulfonic acid group-containing polyarylene ether-based compound. The polymer obtained was dried at 80° C. under reduced pressure overnight. The polymer showed a logarithmic viscosity of 1.07 as measured using sulfuric acid.

In a manner similar to Example 9A, 1 g of this polymer was mixed with 40 ml of the membrane-forming solution prepared in Example 3A, thereby to obtain a blend film made from a resin composition containing the sulfonic acid group-containing polyarylene ether-based compound of the present invention. The content of the sulfonic acid group-containing polyarylene ether-based compound in the resin composition is 91% by mass.

The ion conductivity of this film was measured to be 0.04 S/cm in water at 25° C. The permeation rate of methanol showed 2.9 mmol/(m$^2$ sec).

Example 11A

Using the film prepared in Example 2A as a membrane sample, evaluation of power generation was performed according to the method as mentioned above to show good power generation performance, i.e. 0.34V at a current density of 100 mA.

Example 12A

A polymer electrolyte membrane/electrode assembly was fabricated in a manner similar to that as in the above production method of the polymer electrolyte membrane/electrode assembly in the evaluation of power generation, using as a membrane sample the film prepared in Example 2A, except that the polymer synthesized in Example 1A in a 10% by mass solution of N-methyl-2-pyrrolidone was used in place of the Nafion (registered trademark) solution. When the obtained polymer electrolyte membrane/electrode assembly was visually observed, it was found to be an excellent assembly without detachment of the electrode.

Examples 1B to 13B and Comparative Examples 1B to 6B

Various measurements were performed in the following manner. Since the evaluation of viscosity of the solution and ion conductivity measurement was performed according to the method as mentioned above, the description will not be repeated.

Methanol Permeation Coefficient: The methanol permeation coefficient was calculated from the methanol permeation rate measured by the above method and the membrane thickness of a sample.

Evaluation of Power Generation of Fuel Cell (PEFC) Using Hydrogen as Fuel: To a 20% Nafion (registered trademark) solution manufactured by DuPont Corporation were added a commercially available 40% carbon-supported Pt catalyst (a catalyst for fuel cells, TEC10V40E manufactured by Tanaka Precious Metals Co., Ltd.), and a small amount of ultrapure water and isopropanol, and the mixture was stirred until a uniformity was established, so that a catalyst paste was prepared. This catalyst paste was applied uniformly to carbon paper TGPH-060 manufactured by Toray Corporation so that the amount of platinum attached becomes 0.5 mg/cm$^2$ and dried, thereby to prepare a gas diffusion layer with an electrode catalyst layer. An ion exchange membrane was sandwiched between the gas diffusion layers with an electrode catalyst layer so that the electrode catalyst layer was contacted with the membrane. After that, pressure and heat were applied at 130° C., 2 MPa for 3 minutes by a hot press method to fabricate a polymer electrolyte membrane/electrode assembly. This assembly was incorporated in a fuel cell FC25-02SP for evaluation manufactured by Electrochem Inc., and hydrogen and air which were humidified at 75° C. were supplied to the anode and the cathode, respectively, at a cell temperature of 80° C. so as to evaluate the power generation characteristics. The output voltage at a current density of 0.5 A/cm$^2$ immediately after the starting was defined as an initial characteristic. Continuous operation was performed under the above conditions for evaluation of the durability while measuring an open-circuit voltage one time per hour. A time when the open-circuit voltage was lowered by 10% or more as compared with that immediately after starting was defined as a durability time. The durability time evaluation was performed with an upper limit of 1000 hours.

Evaluation of Power Generation of Direct Methanol Type Fuel Cell (DMFC): A small amount of ultrapure water and isopropyl alcohol were added to a carbon-supported Pt/Ru catalyst (TEC61E54, Tanaka Precious Metals Co., Ltd.) so that the catalyst was moistened, and after that, a 20% Nafion (registered trademark) solution (product number: SE-20192) manufactured by DuPont Corporation was added so that the weight ratio of the carbon-supported Pt/Ru catalyst to Nafion becomes 2.5:1. Then, the solution was stirred so as to prepare a catalyst paste for the anode. This catalyst paste was applied to carbon paper TGPH-060, manufactured by Toray Corporation to be the gas diffusion layer so that the amount of attached platinum becomes 2 mg/cm$^2$ by spreading and drying by screen printing, and thus, carbon paper attached with an electrode catalyst layer for the anode was prepared. In addition, a small amount of ultrapure water and isopropyl alcohol were added to the carbon-supported Pt catalyst (TEC10V40E, Tanaka Precious Metals Co., Ltd.) so that the catalyst was moistened, and after that, a 20% Nafion (registered trademark) solution (product number: SE-20192) manufactured by DuPont Corporation was added so that the mass ratio of the carbon-supported Pt catalyst to Nafion (registered trademark) becomes 2.5:1, and the solution was stirred so as to prepare a catalyst paste for the cathode. This catalyst paste was applied to water-repellent carbon paper TGPH-060 manufactured by Toray Corporation so that the amount of attached platinum became 1 mg/cm$^2$ by spreading and drying, and thus, carbon paper attached with an electrode catalyst layer for the cathode was prepared. A membrane sample was sandwiched between the above-described two types of carbon paper attached with an electrode catalyst layer, so that the electrode catalyst layers made contact with the membrane sample, and pressure and heat were applied to the resulting assembly for 3 minutes at 180° C. under 8 Mpa by a hot press method, and thus, a polymer electrolyte membrane/electrode assembly was obtained. This assembly was incorporated in a fuel cell FC25-02SP for evaluation manufactured by ElectroChem, Inc., and a power generation test was carried out using a fuel cell power generation testing apparatus (manufactured by Toyo Corporation). The power was generated while a highly pure oxygen gas (80 ml/min) and 5 mol/L of a methanol solution (1.5 ml/min), which were respectively adjusted to a temperature of 40° C., were supplied to the anode and the cathode at a cell temperature of 40° C. The output voltage at a current density of 0.02 A/cm$^2$ and the resistance values by the current interrupt method were measured.

Ion Exchange Capacity: A sample was dried at 100° C. for one hour, allowed to stand overnight at room temperature under a nitrogen atmosphere, weighed, treated with an aqueous sodium hydroxide solution with stirring, and subjected to back titration with an aqueous hydrochloric acid solution to measure its ion exchange capacity.

Glass Transition Temperature: An acid type membrane of 5 mm in width was heated at a chuck width of 10 mm and at 2° C./min of from 50° C. to 250° C., and a vibration of 10 Hz was applied, and then a dynamic viscoelasticity was measured using Rheogel E-4000 (manufactured by Toki Sangyo Co., Ltd.). The inflection point where E' is greatly decreased as the temperature rises was defined as a glass transition temperature.

Figure 3:
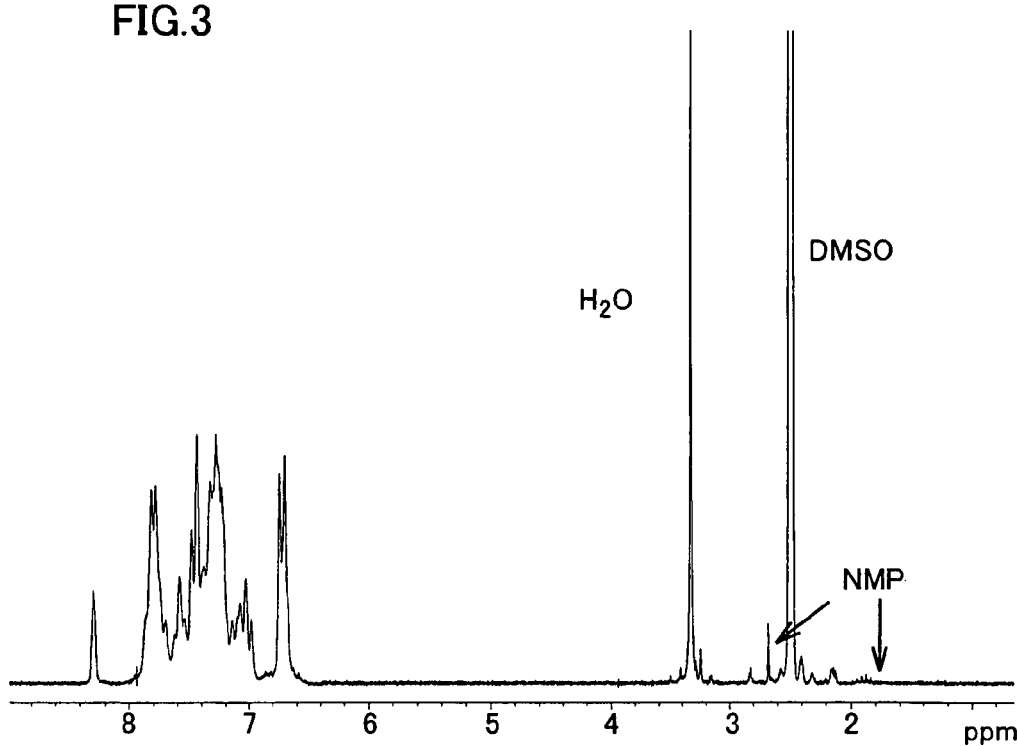
FIG. 3 is a chart showing a $^1$H-NMR spectrum of a polymer synthesized in Example 1B of the present invention, which was measured in deuterated dimethyl sulfoxide at room temperature by using a GEMINI-200 manufactured by VARIAN.

Example 1B 6.9499 g (14.15 mmol) of sodium 3,3'-disulfonate-4,4'-dichlorodiphenylsulfone (abbreviation: S-DCDPS), 9.7340 g (56.59 mol) of 2,6-dichlorobenzonitrile (abbreviation: DCBN), 6.5860 g (35.37 mmol) of 4,4'-biphenol (abbreviation: BP), 7.7199 g (35.37 mmol) of bis(4-hydroxyphenyl) sulfide (abbreviation: BPS), 10.7542 g (77.82 mmol) of potassium carbonate, and 7 g of a dried molecular sieve 3-A were weighed into a 200 ml-four necked flask, and nitrogen was introduced therein. After addition of 80 ml of N-methyl-2-pyrrolidone (abbreviation: NMP), the mixture was stirred at 150° C. for 30 minutes, and the reaction temperature was raised to 195° C. to 200° C., and the reaction was continued (for about 10 hours) until the viscosity in the system rises to a sufficient level. After the reaction mixture was left for cooling, the precipitated molecular sieve was removed and the reaction solution was precipitated in a strand form in the water. The polymer obtained was washed in boiling water for one hour and then dried. The polymer showed a logarithmic viscosity of 1.08 dL/g. FIG. 3 is a chart showing a $^1$H-NMR spectrum of the polymer synthesized in Example 1B of the present invention, which was measured in deuterated dimethyl sulfoxide at room temperature by using a GEMINI-200 manufactured by VARIAN. In FIG. 1, NMP indicates a signal derived from N-methyl-2-pyrrolidone as the polymerization solvent contained as impurities in the polymer, DMSO indicates a signal derived from dimethyl sulfoxide in deuterated dimethyl sulfoxide, and H$_2$O indicates a signal derived from water adsorbed on the polymer, respectively.

Figure 7:
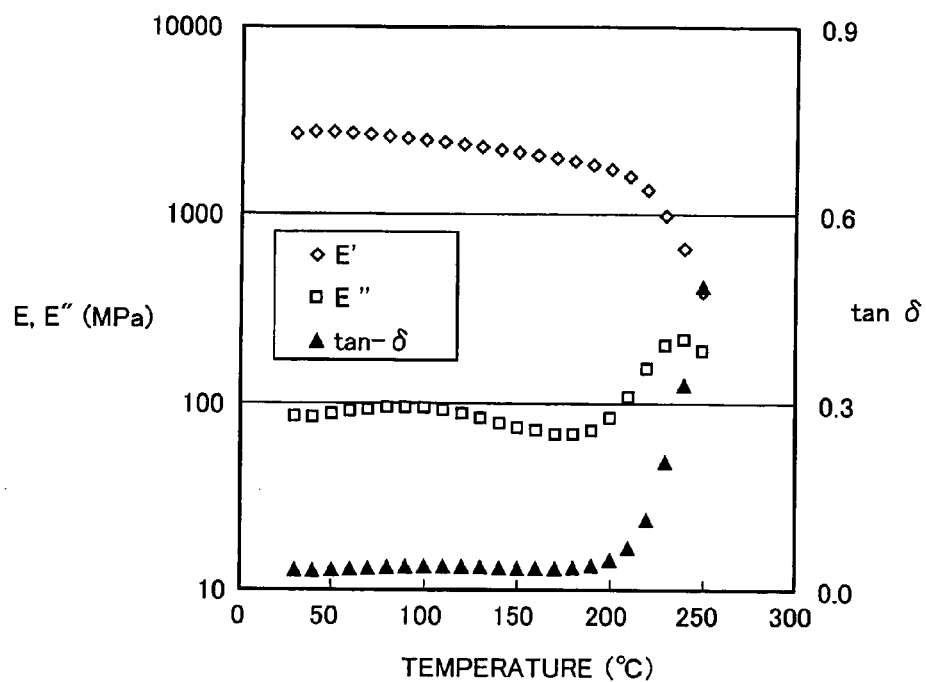
FIG. 7 is a graph showing dynamic viscoelastic characteristics of a polymer electrolyte membrane obtained in Example 1B of the present invention, which was measured by using a Rheogel E-4000 manufactured by Toki Sangyo Co., Ltd.

7.8 g of the polymer was dissolved in 28 g of NMP, casted to a thickness of about 400 μm on a glass plate placed on a hot plate, heated at 80° C. for 0.5 hours, at 120° C. for 0.5 hours and at 150° C. for 0.5 hours, and dried in an oven at 150° C. in a nitrogen atmosphere for one hour to peel a film off the glass plate. The resultant film was immersed in pure water at room temperature for one day, and then immersed in 2 mol/L of an aqueous sulfuric acid solution for 2 hours. After that, the film was washed with pure water until the washing water became neutral, and allowed to stand for drying in the air to obtain a polymer electrolyte membrane. Evaluation of the polymer electrolyte membrane obtained was carried out. FIG. 7 is a graph showing dynamic viscoelastic properties of the polymer electrolyte membrane obtained in Example 1B of the present invention, which was measured by using a Rheogel E-4000 manufactured by Toki Sangyo Co., Ltd.

Example 2B

Figure 4:
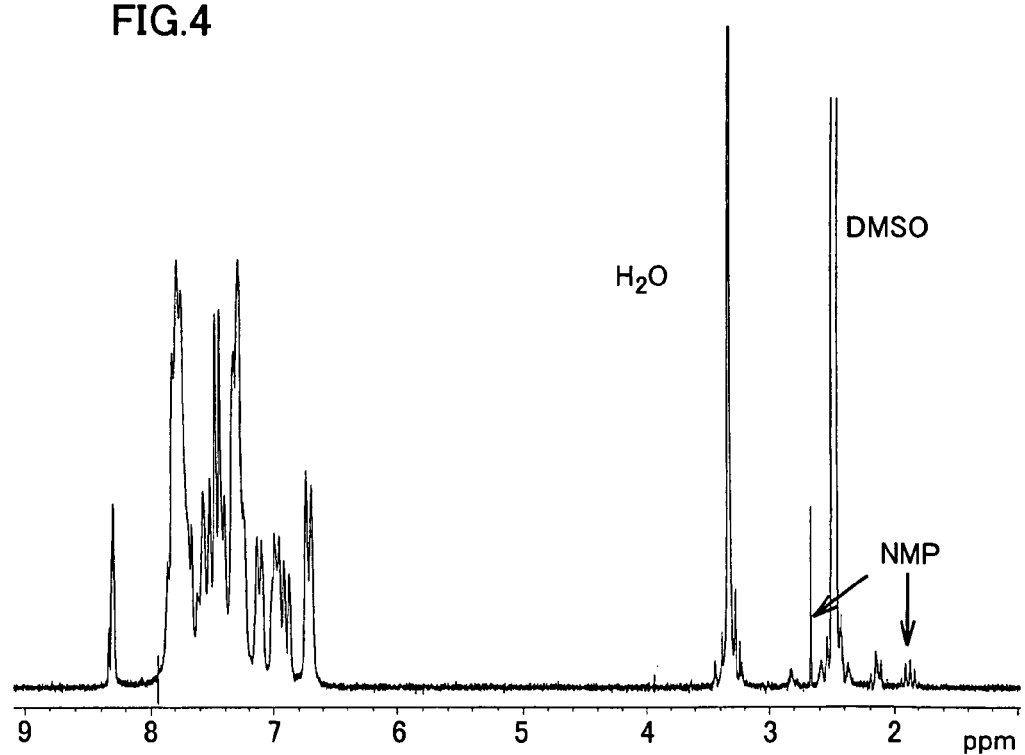
FIG. 4 is a chart showing a $^1$H-NMR spectrum of a polymer synthesized in Example 2B of the present invention, which was measured in deuterated dimethyl sulfoxide at room temperature by using a GEMINI-200 manufactured by VARIAN.

Using 4.6054 g (18.39 mmol) of 4,4'-thiobisbenzenethiol (abbreviation: TBT) in place of BPS, a polymer electrolyte membrane was prepared in a similar manner to Example 1B, except that the amount of BP was changed to 9.7472 g (52.35 mmol), and evaluation of the membrane was performed. FIG. 4 is a chart showing a $^1$H-NMR spectrum of the polymer synthesized in Example 2B of the present invention, which was measured in deuterated dimethyl sulfoxide at room temperature by using a GEMINI-200 manufactured by VARIAN. In FIG. 4, NMP indicates a signal derived from N-methyl-2-pyrrolidone which is the polymerization solvent contained as impurities in the polymer, DMSO indicates a signal derived from dimethyl sulfoxide in deuterated dimethyl sulfoxide, and H$_2$O indicates a signal derived from water adsorbed on the polymer, respectively.

Examples 3B to 6B

Figure 5:
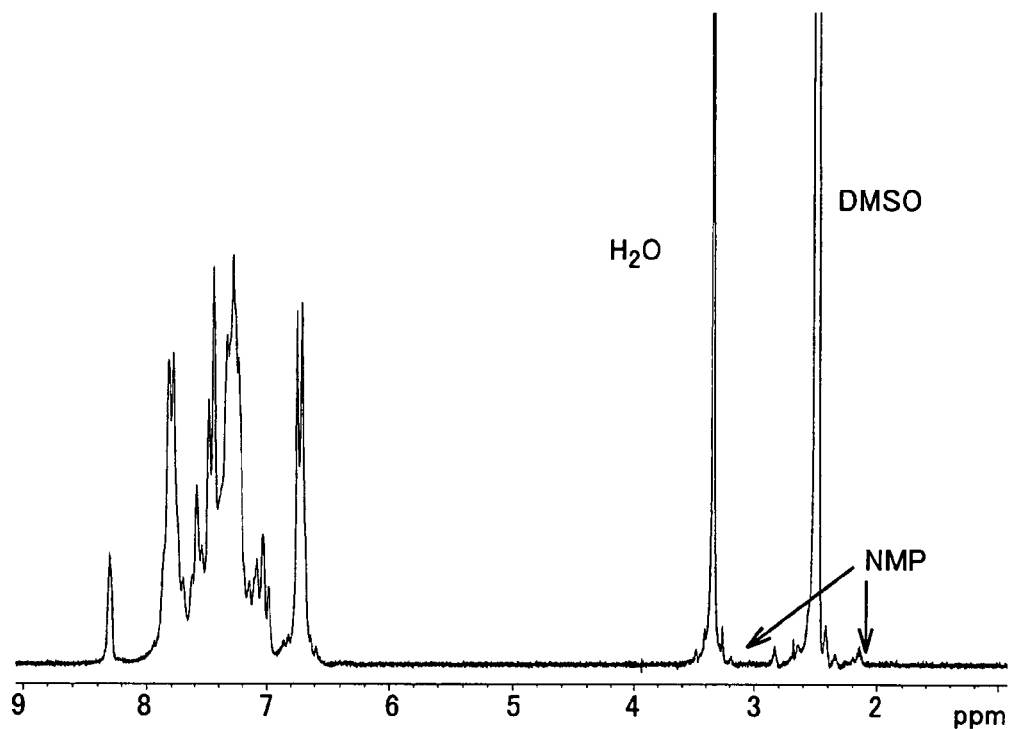
FIG. 5 is a chart showing a $^1$H-NMR spectrum of a polymer synthesized in Example 3B of the present invention, which was measured in deuterated dimethyl sulfoxide at room temperature by using a GEMINI-200 manufactured by VARIAN.
Figure 6:
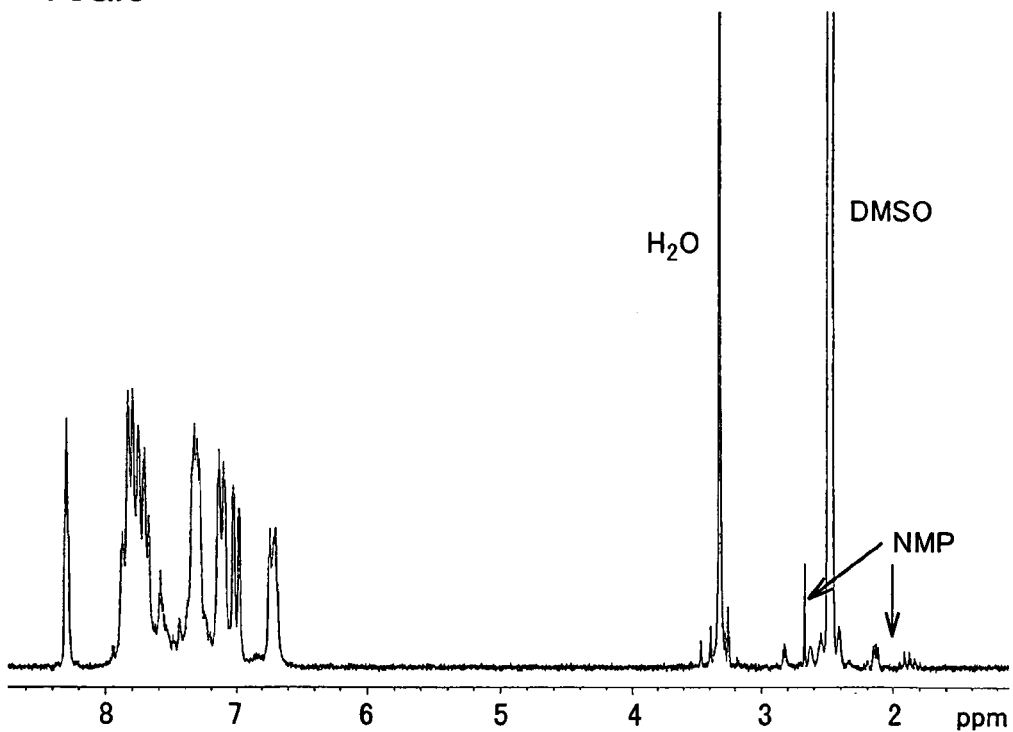
FIG. 6 is a chart showing a $^1$H-NMR spectrum of a polymer synthesized in Example 4B of the present invention, which was measured in deuterated dimethyl sulfoxide at room temperature by using a GEMINI-200 manufactured by VARIAN.

Polymer electrolyte membranes were prepared in a similar manner to Example 1B, except that the amounts of S-DCDPS, DCBN, BPS and BP were changed, and evaluation of the membranes was performed. FIG. 5 is a chart showing a $^1$H-NMR spectrum of the polymer synthesized in Example 3B of the present invention, which was measured in deuterated dimethyl sulfoxide at room temperature by using a GEMINI-200 manufactured by VARIAN. FIG. 6 is a chart showing a $^1$H-NMR spectrum of the polymer synthesized in Example 4B of the present invention, which was measured in deuterated dimethyl sulfoxide at room temperature by using a GEMINI-200 manufactured by VARIAN. In the figures, NMP indicates a signal derived from N-methyl-2-pyrrolidone which is the polymerization solvent contained as impurities in the polymer, DMSO indicates a signal derived from dimethyl sulfoxide in deuterated dimethyl sulfoxide, and H$_2$O indicates a signal derived from water adsorbed on the polymer, respectively.

Example 7B

A polymer electrolyte membrane was prepared in a similar manner to Example 1B, except that 8.0743 g (35.37 mmol) of 2,2-bis(4-hydroxyphenyl)propane (abbreviation: BPA) was used in place of BPS, and evaluation of the membrane was performed.

Example 8B

A polymer electrolyte membrane was prepared in a similar manner to Example 1B, except that 11.8919 g (35.37 mmol) of 2,2-bis(4-hydroxyphenyl)hexafloropropane (abbreviation: BPF) was used in place of BPS, and evaluation of the membrane was performed.

Examples 9B to 12B

Polymer electrolyte membranes were prepared in a similar manner to Example B, except that the molar ratio of each of the monomers was changed, and evaluation of each of the membranes was performed.

Example 13B

A polymer electrolyte membrane was prepared in a similar manner to Example 1B, except that 9.4915 g (35.37 mmol) of 1,1-bis(4-hydroxyphenyl)cyclohexane (abbreviation: BPH) was used in place of BPS and the molar ratios of S-DCDPS and DCBN were changed, and evaluation of the membrane was performed.

Comparative Example 1B

A polymer electrolyte membrane was prepared in a similar manner to Example 1B, except using a sulfonic acid group-containing polymer of the following chemical formula 41, which has a known structure and obtained by polymerization of S-DCDPS, BP and DCBN in such a manner that the molar ratio of S-DCDPS to DCBN is 16:84 and the total number of moles of S-DCDPS and DCBN is equal to the number of mole of BP, and evaluation of the membrane was performed.

(chemical formula 41)

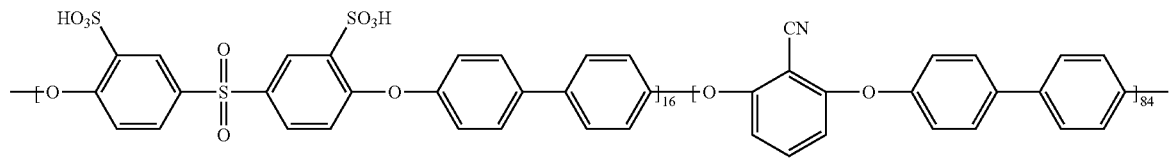

Comparative Example 2B

A polymer electrolyte membrane was prepared in a similar manner to Example 1B, except using a sulfonic acid group-containing polymer of the following chemical formula 42, which has a known structure and obtained by polymerization of S-DCDPS, BP and DCBN in such a manner that the molar ratio of S-DCDPS to DCBN is 20:80 and the total number of moles of S-DCDPS and DCBN is equal to the number of mole of BP, and evaluation of the membrane was performed.

(chemical formula 42)

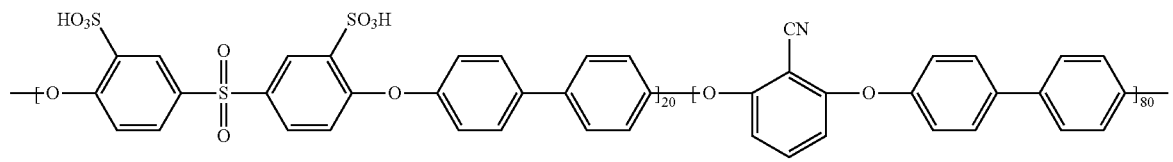

Comparative Example 3B

A polymer electrolyte membrane was prepared in a similar manner to Example 1B, except using a sulfonic acid group-containing polymer of the following chemical formula 43, which has a known structure and obtained by polymerization of S-DCDPS, BP and DCBN in such a manner that the molar ratio of S-DCDPS to DCBN is 44:56 and the total number of moles of S-DCDPS and DCBN is equal to the number of mole of BP, and evaluation of the membrane was performed.

(chemical formula 43)

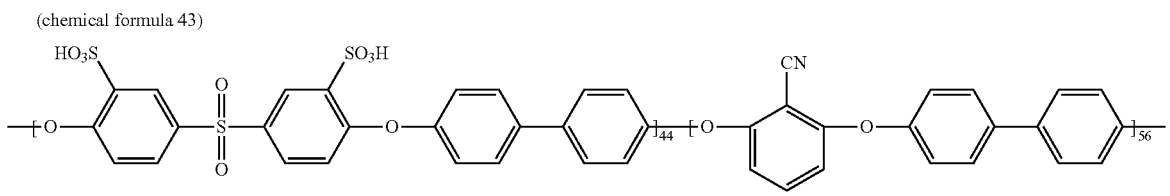

Comparative Example 4B

A polymer electrolyte membrane was prepared in a similar manner to Example 1, except using a sulfonic acid group-containing polymer of the following chemical formula 44, which has a known structure and obtained by polymerization of S-DCDPS, BP and 4,4'-dichlorodiphenylsulfone in such a manner that the molar ratio of S-DCDPS to 4,4'-dichlorodiphenylsulfone is 50:50 and the total number of moles of S-DCDPS and 4,4'-dichlorodiphenylsulfone is equal to the number of mole of BP, and evaluation of the membrane was performed.

(chemical formula 44)

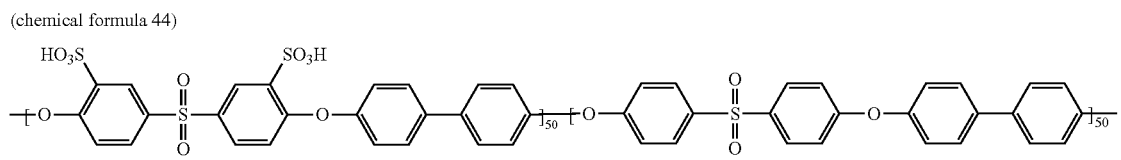

Comparative Example 5B

A variety of evaluations were performed on a commercially available ion exchange membrane, Nafion (registered trademark) 112.

Comparative Example 6B

A variety of evaluations were performed on a commercially available ion exchange membrane, Nafion (registered trademark) 117.

The results of evaluation of the polymer electrolyte membranes of Examples 1B to 13B and the ion exchange membranes of Comparative Examples 1B to 6B are shown in Table 1.

TABLE 1

| | Composition of polymer (Molar ratio of monomer) | | | | | | | | | | |
|---|---|---|---|---|---|---|---|---|---|---|---|
| | Chemical formula | S-DCDPS $n+m$ | DCBN $o+p$ | BP $n+o$ | BPS | TBT | BPA $m+p$ | BPF | BPH | Logarithmic viscosity (dL/g) | Thickness of membrane [μm] |
| Example 1B | 25A | 10 | 40 | 25 | 25 | | | | | 1.08 | 35 |
| Example 2B | 25E | 10 | 40 | 37 | | 13 | | | | 0.98 | 33 |
| Example 3B | 25A | 8 | 42 | 25 | 25 | | | | | 1.12 | 25 |

TABLE 1-continued

| | | | | | | | | | |
|---|---|---|---|---|---|---|---|---|---|
| Example 4B | 25A | 22 | 28 | 45 | 5 | | | 1.13 | 51 |
| Example 5B | 25A | 7 | 43 | 25 | 25 | | | 0.99 | 20 |
| Example 6B | 25A | 18 | 32 | 42 | 8 | | | 1.15 | 30 |
| Example 7B | 25B | 10 | 40 | 25 | | 25 | | 0.87 | 34 |
| Example 8B | 25C | 10 | 40 | 25 | | | 25 | 0.91 | 33 |
| Example 9B | 25A | 8 | 42 | 12 | 38 | | | 0.86 | 31 |
| Example 10B | 25A | 10 | 40 | 12 | 38 | | | 0.93 | 32 |
| Example 11B | 25A | 14 | 36 | 25 | 25 | | | 0.92 | 33 |
| Example 12B | 25A | 6 | 44 | 12 | 38 | | | 1.32 | 33 |
| Example 13B | 25BE | 12 | 38 | 25 | | | 25 | 1.22 | 32 |
| Comparative Example 1B | — | | | | | | | 1.12 | 25 |
| Comparative Example 2B | — | | | | | | | 1.23 | 30 |
| Comparative Example 3B | — | | | | | | | 1.22 | 60 |
| Comparative Example 4B | — | | | | | | | 1.34 | 52 |
| Comparative Example 5B | Nafion (registered trademark) 112 | | | | | | | — | 50 |
| Comparative Example 6B | Nafion (registered trademark) 117 | | | | | | | — | 200 |

| | Ion exchange capacity [meq/g] | Methanol permeation coefficient [µmol·m$^{-1}$·sec$^{-1}$] | Softening temperature (°C.) | Ion conductivity [S/cm] 80°C. 95% RH | Ion conductivity [S/cm] 25°C., in water | Evaluation of PEFC Initial voltage (V) | Evaluation of PEFC Durable time (hr) | Evaluation of DMFC Output voltage [V] | Evaluation of DMFC Resistance value (Ω·cm$^2$) |
|---|---|---|---|---|---|---|---|---|---|
| Example 1B | 1.06 | 0.053 | 230 | — | 0.017 | — | — | 0.37 | 430 |
| Example 2B | 1.00 | 0.045 | 220 | — | 0.023 | — | — | 0.38 | 420 |
| Example 3B | 0.93 | 0.038 | 230 | — | 0.013 | — | — | 0.39 | 510 |
| Example 4B | 2.01 | — | — | 0.26 | — | 0.72 | 721 | — | — |
| Example 5B | 0.89 | 0.032 | 240 | — | 0.010 | — | — | 0.40 | 530 |
| Example 6B | 1.83 | — | — | 0.18 | — | 0.68 | ≧1000 | — | — |
| Example 7B | 1.03 | 0.056 | 230 | — | 0.018 | — | — | 0.37 | 460 |
| Example 8B | 1.05 | 0.059 | 230 | — | 0.019 | — | — | 0.38 | 470 |
| Example 9B | 0.91 | 0.031 | 190 | — | 0.014 | — | — | 0.41 | 530 |
| Example 10B | 1.02 | 0.063 | 200 | — | 0.025 | — | — | 0.40 | 440 |
| Example 11B | 1.34 | 0.164 | 205 | — | 0.061 | — | — | 0.42 | 270 |
| Example 12B | 0.71 | 0.014 | 180 | — | 0.008 | — | — | 0.36 | 590 |
| Example 13B | 1.13 | 0.067 | 210 | — | 0.020 | — | — | 0.39 | 380 |
| Comparative Example 1B | 0.90 | 0.035 | ≧250 | — | 0.012 | — | — | 0.33 | 1410 |
| Comparative Example 2B | 1.10 | 0.059 | ≧250 | — | 0.023 | — | — | 0.31 | 780 |
| Comparative Example 3B | 2.04 | 0.43 | ≧250 | 0.25 | — | 0.71 | 534 | — | — |
| Comparative Example 4B | 2.07 | 0.52 | ≧250 | 0.22 | — | 0.68 | 152 | — | — |
| Comparative Example 5B | 0.90 | 0.41 | 90 | 0.18 | 0.11 | 0.70 | ≧1000 | 0.23 | 270 |
| Comparative Example 6B | 0.90 | 0.67 | — | 0.18 | 0.10 | — | — | 0.33 | 350 |

It is apparent from Table I that the polymer electrolyte membranes (Examples 1B to 3B, 5B, and 7B to 13B) of the present invention for direct methanol type fuel cells (DMFC) are improved in the joining property due to the lowered softening temperature and generate higher output voltage due to decreased resistance values, as compared to the ion exchange membranes of Comparative Examples (Comparative Examples 1B, 2B and 6B). It is also clear that the membranes obtained are ion exchange membranes excellent in resistance to methanol permeation because of its greatly decreased methanol permeability, as compared to the previous ion exchange membrane, Nafion (registered trademark) 117 (Comparative Example 6B).

Further, in comparison with the ion exchange membranes of Comparative Examples (Comparative Examples 3B and 4B), the polymer electrolyte membranes (Examples 4B and 6B) for fuel cells using hydrogen as a fuel (PEFC) are clearly found to be ion exchange membranes excellent in durability, because durable time is greatly improved though the initial voltage is the same level as those of the comparative membranes. In addition, since the present membranes have durability equivalent to the previous ion exchange membrane, Nafion (registered trademark) 112 (Comparative Example 5B) and show equivalent or larger initial voltage compared to Nafion, it is apparent that the present polymer electrolyte membranes are found to be hydrocarbon-based ion exchange membranes having sufficiently excellent characteristics with reduced generation of fluoric acid and less environmental load at the time of wasting. From these reasons, the sulfonic acid group-containing polymer of the present invention can be used as a polymer electrolyte membrane for fuel cells so that its characteristics are greatly improved, thereby to contribute very much to the industrial field.

Examples 1C to 8C, Comparative Examples 1C to 3C

Various measurements were performed in the following manner. Since evaluation of the viscosity of solutions was performed according to the method as mentioned above, the description thereof will not be repeated.

Ion Conductivity Measurement: According to the method as described above, alternating current impedance measurement was performed in an atmosphere of 80° C., 95% RH, and the conductivity was calculated as an ion conductivity index.

Fenton Test: A Fenton's reagent was prepared by dissolving 0.0199 g of ferrous sulfate (heptahydrate) in 500 ml of water, adding 150 g of a 20% aqueous hydrogen peroxide solution, and further adding water with sufficient stirring to make a total volume of 1 L. About 80 mg of an ion exchange membrane which had been previously dried at 100° C. for one hour and weighed thereafter was immersed in about 50 cc of the Fenton's reagent in a beaker. The mixture was treated at 66° C. for 3 hours and the residue was filtered by a glass filter, dried at 100° C. for one hour, then weighed. The residual percentage (%) of the weight after treatment to the weight before treatment was calculated.

Evaluation of Power Generation: To a 20% Nafion (registered trademark) solution manufactured by DuPont Corporation were added a commercially available 40% carbon-supported Pt/Ru catalyst (a catalyst for fuel cells, TEC10V40E manufactured by Tanaka Precious Metals Co., Ltd.), and a small amount of ultrapure water and isopropanol, and the mixture was stirred until a uniformity was established, thereby to prepare a catalyst paste. This catalyst paste was applied uniformly to carbon paper TGPH-060 manufactured by Toray Corporation so that the amount of platinum attached becomes 0.5 mg/cm$^2$ and dried, thereby to prepare a gas diffusion layer attached with an electrode catalyst layer. An ion exchange membrane was sandwiched between the gas diffusion layers attached with an electrode catalyst layer so that the electrode catalyst layer was contacted with the membrane. After that, pressure and heat were applied at 130° C., 2 MPa for 3 minutes by a hot press method to fabricate a polymer electrolyte membrane/electrode assembly. This assembly was incorporated in a fuel cell FC25-02SP for evaluation manufactured by ElectroChem, Inc., and hydrogen and air which were humidified at 75° C. were supplied to the anode and the cathode, respectively, at a cell temperature of 80° C. so as to evaluate the power generation characteristics. The output voltage at a current density of 0.5 A/cm$^2$ immediately after the starting was defined as an initial characteristic. Continuous operation was performed under the above conditions for evaluation of the durability while measuring an open-circuit voltage one time per hour. A time when the open-circuit voltage was lowered by 10% or more as compared with that immediately after starting was defined as a durability time. The durability time evaluation was performed with an upper limit of 1000 hours.

Ion Exchange Capacity: A sample which had been dried at 100° C. for one hour and allowed to stand overnight at room temperature under a nitrogen atmosphere was weighed, treated with an aqueous sodium hydroxide solution with stirring, and subjected to back titration with an aqueous hydrochloric acid to measure its ion exchange capacity.

Example 1C 12.1091 g (24.65 mmol) of sodium 3,3'-disulfonate-4,4'-dichlorodiphenylsulfone (abbreviation: S-DCDPS), 5.3963 g (31.37 mol) of 2,6-dichlorobenzonitrile (abbreviation: DCBN), 10.3275 g (55.46 mmol) of 4,4'-biphenol (abbreviation: BP), 0.1817 g (0.56 mol) of 10-(2,5-dihydroxyphenyl)-9,10-dihydro-9-oxa-10-phosphaphenathrene-10-oxide (abbreviation: DHPPP), 8.5170 g (61.62 mmol) of potassium carbonate and 5 g of a dried molecular sieve 3-A were weighed into a 200 ml-four necked flask, and nitrogen was introduced therein. After addition of 80 ml of N-methyl-2-pyrrolidone (abbreviation: NMP), the mixture was stirred at 150° C. for 30 minutes, and the reaction temperature was raised to 195° C. to 200° C., and then the reaction was continued (for about 20 hours) until the viscosity in the system rises to a sufficient level. After the reaction mixture was left for cooling, the precipitated molecular sieve was removed, and the reaction solution was precipitated in a strand form in the water. The polymer obtained was washed in boiling water for one hour and then dried. 7 g of the polymer was dissolved in 28 g of NMP, casted to a thickness of about 400 μm on a glass plate placed on a hot plate, heated at 80° C. for 0.5 hours, at 120° C. for 0.5 hours and at 150° C. for 0.5 hours, and dried for one hour in an oven at 150° C. in a nitrogen atmosphere to peel a film off the glass plate. The resultant film was immersed in pure water at room temperature for one day, and then immersed in 2 mol/L of an aqueous sulfuric acid solution for 2 hours. After that, the film was washed with pure water until the washing water became neutral, and allowed to stand for drying in the air to obtain a polymer electrolyte membrane. Evaluation of the polymer electrolyte membrane obtained was carried out.

Example 2C

Figure 8:
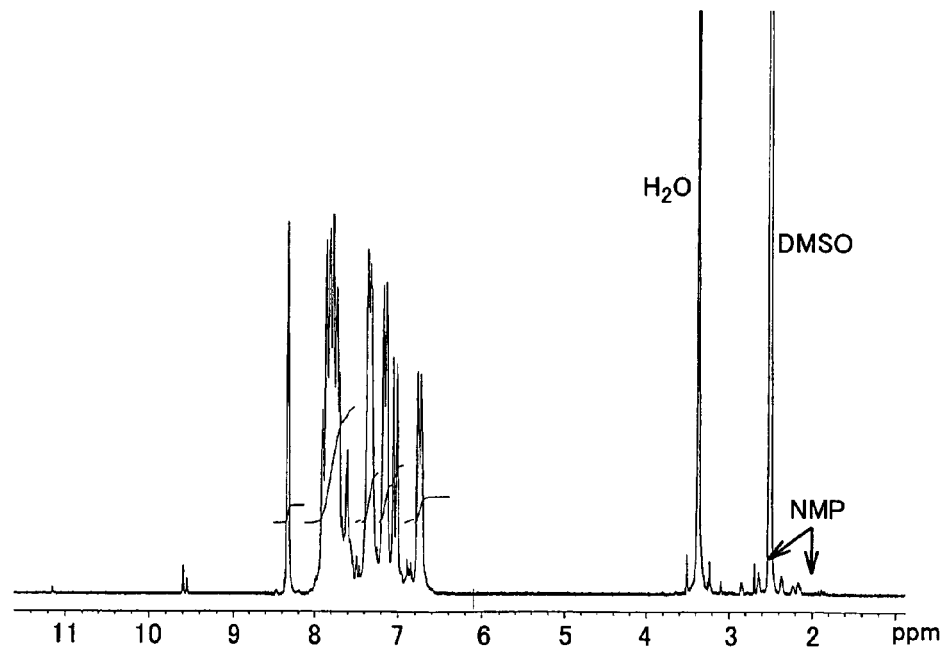
FIG. 8 is a chart showing a $^1$H-NMR spectrum of a polymer synthesized in Example 2C of the present invention, which was measured in deuterated dimethyl sulfoxide at room temperature by using a GEMINI-200 manufactured by VARIAN.

A polymer electrolyte membrane was prepared in a similar manner to Example 1C, except that the amounts of BP and DHPPP were changed to 10.1189 g (54.34 mmol) and 0.5450 g (1.68 mmol), respectively, and then evaluation of the membrane was performed. FIG. 8 is a chart showing a $^1$H-NMR spectrum of the polymer synthesized in Example 2C of the present invention, which was measured in deuterated dimethyl sulfoxide at room temperature by using a GEMINI-200 manufactured by VARIAN. In FIG. 8, NMP indicates a signal derived from N-methyl-2-pyrrolidone which is the polymerization solvent contained as impurities in the polymer, DMSO indicates a signal derived from dimethyl sulfoxide in deuterated dimethyl sulfoxide, and H$_2$O indicates a signal derived from water adsorbed on the polymer, respectively.

Example 3C

Figure 9:
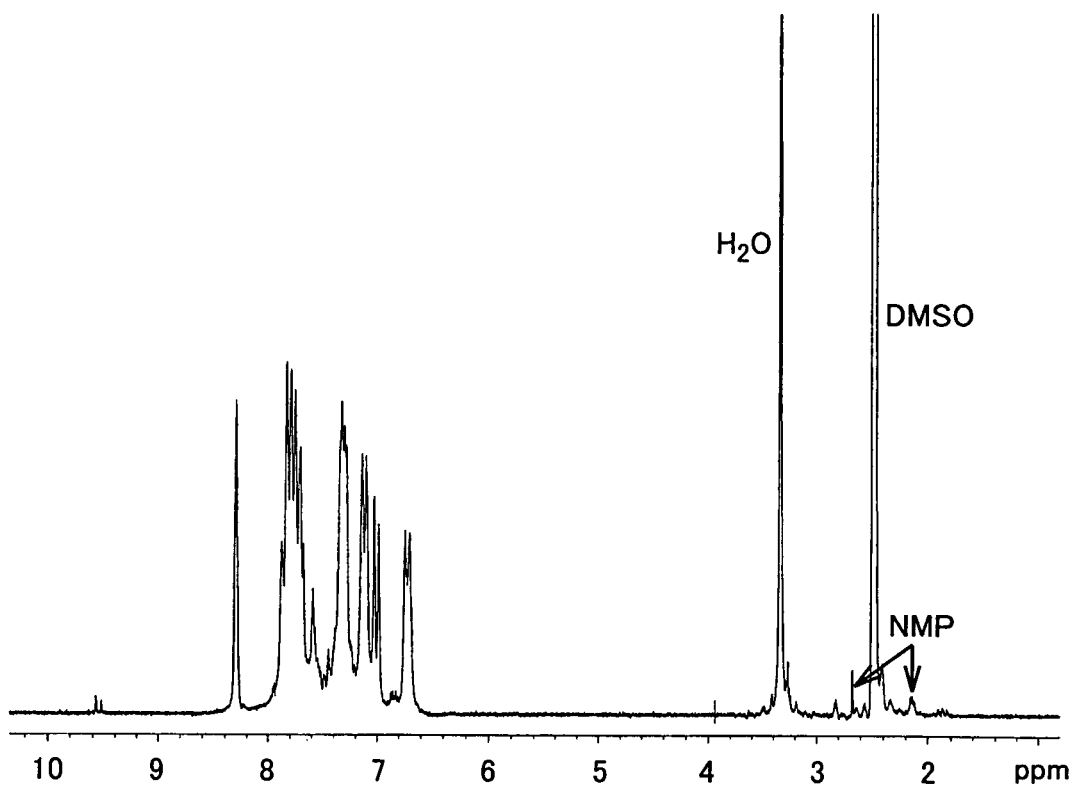
FIG. 9 is a chart showing a $^1$H-NMR spectrum of a polymer synthesized in Example 3C of the present invention, which was measured in deuterated dimethyl sulfoxide at room temperature by using a GEMINI-200 manufactured by VARIAN.

A polymer electrolyte membrane was prepared in a similar manner to Example 1C, except that the amounts of BP and DHPPP were changed to 9.1800 g (49.30 mmol) and 0.3633 g (1.12 mmol), respectively, and 1.2228 g (5.60 mmol) of bis(4-hydroxyphenyl)sulfide (abbreviation: BPS) was further added, and then evaluation of the membrane was performed. FIG. 9 is a chart showing a $^1$H-NMR spectrum of the polymer synthesized in Example 3C of the present invention, which was determined in deuterated dimethyl sulfoxide at room temperature by using a GEMINI-200 manufactured by VARIAN. In FIG. 9, NMP indicates a signal derived from N-methyl-2-pyrrolidone which is the polymerization solvent contained as impurities in the polymer, DMSO indicates a signal derived from dimethyl sulfoxide in deuterated dimethyl sulfoxide, and H₂O indicates a signal derived from water adsorbed on the polymer, respectively.

Examples 4C to 8C

Polymer electrolyte membranes were prepared in a similar manner to Examples 1C to 3C, except that the ratio of compositions of various monomers was changed, and then evaluation of the membranes was performed.

Comparative Example 1C

A polymer electrolyte membrane was prepared in a similar manner to Example 1C, except using a sulfonic acid group-containing polymer of the following chemical formula 43, which has a known structure and obtained by polymerization of S-DCDPS, BP and DCBN in such a manner that the molar ratio of S-DCDPS to DCBN is 44:56 and the total number of moles of S-DCDPS and DCBN is equal to the number of mole of BP, and then evaluation of the membrane was performed.

(chemical formula 43)

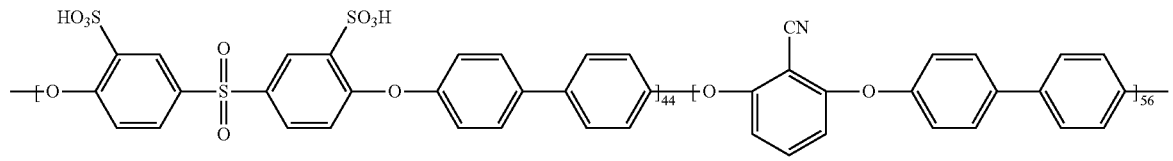

Comparative Example 2C

A polymer electrolyte membrane was prepared in a similar manner to Example 1C, except using a sulfonic acid group-containing polymer of the following chemical formula 44, which has a known structure and obtained by polymerization of S-DCDPS, BP and 4,4'-dichlorodiphenylsulfone in such a manner that the molar ratio of S-DCDPS to 4,4'-dichlorodiphenylsulfone is 50:50 and the total number of moles of S-DCDPS and 4,4'-dichlorodiphenylsulfone is equal to the number of mole of BP, and then evaluation of the membrane was performed.

(chemical formula 44)

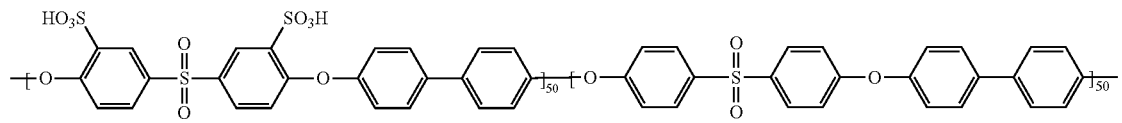

Comparative Example 3C

A variety of evaluations were performed on a commercially available ion exchange membrane, Nafion (registered trademark) 112.

The results of evaluation of the polymer electrolyte membranes of Examples 1C to 8C and the ion exchange membranes of Comparative Examples 1C to 3C are shown in Table 2.

TABLE 2

| | | Composition of polymer (Molar ratio of monomer) | | | | | | Logarithmic viscosity (dL/g) |
|---|---|---|---|---|---|---|---|---|
| | Chemical formula | S-DCDPS | DCBN | DCDPS | BP | BPS | DHPPP | |
| Example 1C | 37A | 22 | 28 | — | 49.5 | — | 0.5 | 1.11 |
| Example 2C | 37A | 22 | 28 | — | 48.5 | — | 1.5 | 1.06 |
| Example 3C | 37Q | 22 | 28 | — | 44 | 5 | 1 | 0.95 |
| Example 4C | 37A | 20 | 30 | — | 49.5 | — | 0.5 | 1.32 |
| Example 5C | 37I | 25 | — | 25 | 49.5 | — | 0.5 | 1.25 |
| Example 6C | 37A | 25 | 25 | — | 49 | — | 1 | 1.08 |
| Example 7C | 37Q | 23 | 27 | — | 43 | 5 | 2 | 1.03 |
| Example 8C | 37Q | 22 | 28 | — | 40 | 8 | 2 | 0.98 |
| Comparative Example 1C | — | 22 | 28 | — | — | — | — | 1.05 |

TABLE 2-continued

| | Thickness of membrane [μm] | Ion exchange capacity [meq/g] | Ion conductivity [S/cm] 80° C. 95% RH | Fenton test (Residual %) | Evaluation of PEFC Initial voltage (V) | Evaluation of PEFC Durable time (hr) |
|---|---|---|---|---|---|---|
| Comparative Example 2C | — | 25 | 25 | — | — | 1.33 |
| Comparative Example 3C | Nafion (registered trademark) 112 | | | | | — |
| Example 1C | 34 | 2.01 | 0.26 | 73 | 0.70 | 670 |
| Example 2C | 32 | 1.99 | 0.25 | 80 | 0.69 | 712 |
| Example 3C | 31 | 2.02 | 0.28 | 70 | 0.69 | 772 |
| Example 4C | 34 | 1.92 | 0.23 | 83 | 0.70 | ≧1000 |
| Example 5C | 32 | 2.03 | 0.21 | 37 | 0.68 | 352 |
| Example 6C | 33 | 2.23 | 0.32 | 40 | 0.73 | 389 |
| Example 7C | 31 | 2.10 | 0.27 | 71 | 0.72 | 613 |
| Example 8C | 32 | 2.08 | 0.26 | 75 | 0.71 | 703 |
| Comparative Example 1C | 35 | 2.05 | 0.25 | 38 | 0.69 | 514 |
| Comparative Example 2C | 40 | 2.06 | 0.22 | 12 | 0.67 | 163 |
| Comparative Example 3C | 49 | 0.90 | 0.18 | 100 | 0.69 | ≧1000 |

It is apparent from Table 2 that the polymer electrolyte membranes of Examples 1C to 8C show not only larger residual percentage in the Fenton test but also superiority in resistance to radicals, as compared to the previous hydrocarbon-based ion exchange membranes of Comparative Examples 1C and 2C. Further, from these reasons, power generation durability of the membranes is greatly improved, and it is therefore shown that these membranes are ion exchange membranes excellent in durability. Moreover, unlike commercially available fluorine-based ion exchange membranes, since the polymer electrolyte membrane of the present invention does not have problems such as mixing of harmful fluoric acid into exhaust gas depending on operating conditions, and infliction of large load to the environment at the time of wasting, and is an ion exchange membrane exhibiting almost the same level of performances in its initial voltage and durability, the membrane of the present invention is useful as a proton exchange membrane for solid polymer type fuel cells and contributes very much to the industrial world.

The presently disclosed embodiments and Examples are to be considered in all respects only as illustrative and not restrictive. The scope of the present invention is indicated by the claims, rather than by the above description, and all changes which come within the meaning and range of equivalency of the claims are to be embraced within the scope of the present invention.

INDUSTRIAL APPLICABILITY

The sulfonic acid group-containing polyarylene ether-based compound of the present invention can provide polymer electrolyte materials excellent in not only ion conductivity but also heat resistance, processability and dimension stability. These materials can be used, as an ion conducting membrane, for fuel cells using hydrogen or methanol as a raw material or water electrolytic cells, and are also expected to be used in electrolytes for various cells, humidification membranes, humidity adjusting membranes, display elements, sensors, binders, additives, and the like.

The invention claimed is:

1. A sulfonic acid group-containing polymer comprising, in the molecular chain, a constituent represented by the following chemical formula 1:

(chemical formula 1)

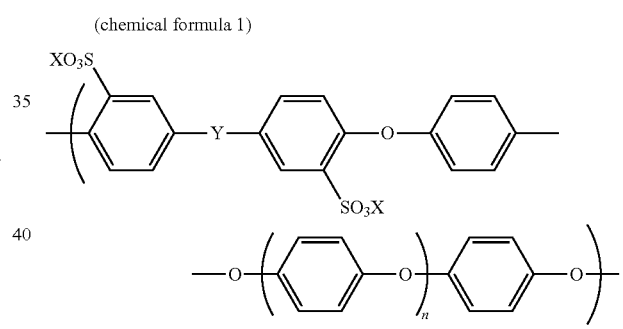

wherein X represents hydrogen or a monovalent cation species; Y represents a sulfone group or a ketone group; and n represents an arbitrary integer not less than 2,
wherein the sulfonic acid group-containing polymer further comprises a constituent represented by the following chemical formula 2:

(chemical formula 2)

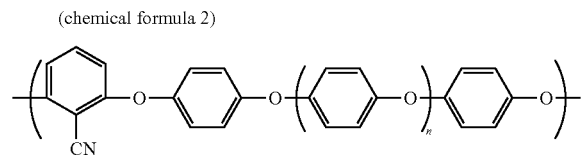

wherein n represents an arbitrary integer not less than 2.

2. The sulfonic acid group-containing polymer according to claim 1, wherein the content of the sulfonic acid group is within a range of 0.3 to 5.0 meq/g.

3. The sulfonic acid group-containing polymer according to claim 1, which is obtainable by using, as a part of monomer components, a terminal dihydroxy compound represented by the following chemical formula 3 being composed of a plurality of components each having a different number of n and an average composition within a range of $1 < n \leqq 10$:

(chemical formula 3)

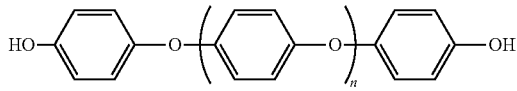

wherein n represents an arbitrary integer not less than 0.

4. The sulfonic acid group-containing polymer according to claim 1, having a glass transition temperature within a range of 130° C. to 270° C.

5. The sulfonic acid group-containing polymer according to claim 1, having a glass transition temperature within a range of 130° C. to 220° C.

6. A resin composition comprising the sulfonic acid group-containing polymer according to claim 1.

7. The resin composition according to claim 6, wherein the content of said sulfonic acid group-containing polymer is 50% by mass to 100% by mass.

8. A polymer electrolyte membrane comprising the resin composition according to claim 6.

9. A method for producing the sulfonic acid group-containing polymer according to claim 1, wherein said sulfonic acid group-containing polymer is obtainable by polymerization through an aromatic nucleophilic substitution reaction using, as at least one kind of monomer component(s), a compound represented by the following chemical formula 3:

(chemical formula 3)

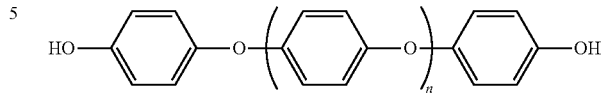

(3)

wherein n represents an arbitrary integer not less than 2.

10. A polymer electrolyte membrane comprising the sulfonic acid group-containing polymer according to claim 1.

11. A method for producing the polymer electrolyte membrane according to claim 10, comprising the steps of:
    casting a solution containing said sulfonic acid group-containing polymer and a solvent to a thickness within a range of 10 to 1500 µm; and
    drying the casted solution.

12. A polymer electrolyte membrane/electrode assembly comprising the polymer electrolyte membrane according to claim 10.

13. A fuel cell comprising the polymer electrolyte membrane/electrode assembly according to claim 12.

14. The fuel cell according to claim 13, wherein methanol is used as a fuel.

15. A polymer electrolyte membrane/electrode assembly comprising the sulfonic acid group-containing polymer according to claim 1 for an electrode catalyst layer.

16. A fuel cell comprising the polymer electrolyte membrane/electrode assembly according to claim 15.

\* \* \* \* \*